US012088992B2

(12) United States Patent
Lee et al.

(10) Patent No.: US 12,088,992 B2
(45) Date of Patent: Sep. 10, 2024

(54) DISPLAY APPARATUS

(71) Applicant: LG Display Co., Ltd., Seoul (KR)

(72) Inventors: Sungtae Lee, Paju-si (KR); Teh Hyeon Kim, Paju-si (KR); Yeongrak Choi, Paju-si (KR); Seungwan Ryu, Paju-si (KR); Kwanho Park, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/527,222

(22) Filed: Dec. 1, 2023

(65) Prior Publication Data

US 2024/0098403 A1 Mar. 21, 2024

Related U.S. Application Data

(60) Continuation of application No. 17/861,153, filed on Jul. 8, 2022, now Pat. No. 11,902,736, which is a (Continued)

(30) Foreign Application Priority Data

Feb. 28, 2019 (KR) ........................ 10-2019-0024025
Dec. 31, 2019 (KR) ........................ 10-2019-0180146

(51) Int. Cl.
*H04R 1/26* (2006.01)
*H04R 1/02* (2006.01)
(Continued)

(52) U.S. Cl.
CPC ............... *H04R 1/26* (2013.01); *H04R 1/028* (2013.01); *H04R 7/04* (2013.01); *H04R 7/26* (2013.01);
(Continued)

(58) Field of Classification Search
CPC .... H04R 2499/15; H04R 7/045; H04R 1/028; H04R 2499/11; H04R 17/00;
(Continued)

(56) References Cited

U.S. PATENT DOCUMENTS

| | | | |
|---|---|---|---|
| 10,511,912 | B2 | 12/2019 | Kirisken |
| 2001/0011993 | A1 | 8/2001 | Saarinen |

(Continued)

FOREIGN PATENT DOCUMENTS

| | | |
|---|---|---|
| CN | 202663535 U | 1/2013 |
| CN | 104918171 A | 9/2015 |

(Continued)

OTHER PUBLICATIONS

Office Action issued in corresponding Chinese Patent Application No. 202210372690.8, dated Feb. 28, 2024. (Note: CN 202663535 U, CN 205142492 U, CN 108933981 A, US 2018/343512 A1, US 2010/067726 A1 and CN 109257685 A were previously cited).

(Continued)

*Primary Examiner* — Kile O Blair
(74) *Attorney, Agent, or Firm* — Morgan, Lewis & Bockius LLP

(57) ABSTRACT

A display apparatus includes a display module including a display panel configured to display an image, a rear cover on a rear surface of the display module, and a sound generating module at the rear cover and configured to vibrate the display module to generate sound, and a rear surface of the sound generating module is covered by the rear cover.

48 Claims, 46 Drawing Sheets

Related U.S. Application Data division of application No. 16/804,090, filed on Feb. 28, 2020, now Pat. No. 11,412,322.

(51) Int. Cl.

| | |
|---|---|
| ***H04R 7/04*** | (2006.01) |
| ***H04R 7/26*** | (2006.01) |
| ***H04R 9/02*** | (2006.01) |
| ***H04R 9/04*** | (2006.01) |
| ***H04R 9/06*** | (2006.01) |
| ***H04R 17/00*** | (2006.01) |

(52) U.S. Cl.

CPC ............. *H04R 9/025* (2013.01); *H04R 9/046* (2013.01); *H04R 9/06* (2013.01); *H04R 17/00* (2013.01); *H04R 2499/15* (2013.01)

(58) Field of Classification Search

CPC ............ H04R 2440/00; H04R 2440/05; H04R 2440/07; H04R 17/005; H04R 7/04; H04R 7/26; H04R 2207/00; H04R 2207/021; H04R 2307/201; G06F 1/1688; G06F 1/1605; H04N 5/642

See application file for complete search history.

(56) References Cited

U.S. PATENT DOCUMENTS

| | | | |
|---|---|---|---|
| 2007/0104341 | A1 | 5/2007 | Kondo et al. |
| 2010/0067726 | A1 | 3/2010 | Suzuki et al. |
| 2013/0182878 | A1 | 7/2013 | Liu et al. |
| 2015/0117686 | A1 | 4/2015 | Kim et al. |
| 2016/0014526 | A1 | 1/2016 | Miyoshi et al. |
| 2016/0044220 | A1 | 2/2016 | Park |
| 2017/0280216 | A1 | 9/2017 | Lee |
| 2017/0287990 | A1 | 10/2017 | Choi et al. |
| 2018/0317000 | A1 | 11/2018 | Ham et al. |
| 2018/0343512 | A1 | 11/2018 | Choi et al. |
| 2019/0004566 | A1 | 1/2019 | Lee et al. |
| 2019/0018448 | A1 | 1/2019 | Lee et al. |
| 2019/0037164 | A1 | 1/2019 | Kim et al. |
| 2019/0037165 | A1 | 1/2019 | Lee et al. |
| 2019/0045286 | A1 | 2/2019 | Kim et al. |
| 2019/0045287 | A1 | 2/2019 | Lee et al. |
| 2020/0092650 | A1 | 3/2020 | Ham et al. |

FOREIGN PATENT DOCUMENTS

| | | | |
|---|---|---|---|
| CN | 205142492 | U | 4/2016 |
| CN | 205847543 | U | 12/2016 |
| CN | 107561753 | A | 1/2018 |
| CN | 108028990 | A | 5/2018 |
| CN | 108806556 | A | 11/2018 |
| CN | 108806560 | A | 11/2018 |
| CN | 108933981 | A | 12/2018 |
| CN | 109040917 | A | 12/2018 |
| CN | 109218943 | A | 1/2019 |
| CN | 109257685 | A | 1/2019 |
| CN | 109308849 | A | 2/2019 |
| CN | 109326236 | A | 2/2019 |
| CN | 109391883 | A | 2/2019 |
| CN | 109391889 | A | 2/2019 |
| DE | 10 2019 125 009 | B4 | 10/2022 |
| EP | 3330780 | A1 | 6/2018 |
| JP | 2009-302924 | A | 12/2009 |
| KR | 10-2018-0062320 | A | 6/2018 |
| KR | 10-2018-0130352 | A | 12/2018 |
| WO | 2008/004718 | A1 | 1/2008 |
| WO | 2014/162976 | A1 | 10/2014 |
| WO | 2018/070399 | A1 | 4/2018 |

OTHER PUBLICATIONS

Chinese Office Action dated Jul. 1, 2021, issued in corresponding Chinese Patent Application No. 202010127570.2.

Office Action issued in corresponding Japanese Patent Application No. 2020-032330, dated Jul. 13, 2021.

Office Action issued in corresponding Chinese Patent Application No. 202010127570.2, dated Jan. 25, 2021.

Chinese Office Action dated Oct. 21, 2021, issued in corresponding Chinese Patent Application No. 202010127570.2.

Office Action issued in corresponding Chinese Patent Application No. 202210367407.2, dated Mar. 19, 2024. (Note: CN 108933981 A was previously cited).

Office Action issued in corresponding Chinese Patent Application No. 202210372162.2, dated Mar. 12, 2024. (Note: US 2019/045287 A1, CN 104918171 A, CN 109218943 A, CN 202663535 U, CN 205142492 U, JP 2009-302924 A, US 2013/182878 A1, WO 2014/162976 A1 and WO 2018/070399 A1 were previously cited).

Office Action issued in corresponding Taiwan Patent Application No. 109106096, dated Feb. 2, 2021.

Office Action issued in corresponding Korean Patent Application No. 10-2019-0180146, dated Jun. 5, 2024. (Note: US 2013/0182878 A1, WO 2018/070399 A1 and JP 2009-302924 A were previously cited).

Office Action issued in corresponding Chinese Patent Application No. 202210372163.7, dated Oct. 16, 2023.

Office Action issued Dec. 11, 2023 for corresponding German Patent Application No. 10 2020 104 879.3. Note: US 2013/0182878 A1, US 2018/0343512 A1, US 2019/0004566 A1, US 2001/0011993 A1 & US 2015/0117686 A1 were cited in a prior IDS.

Office Action issued in corresponding Japanese Patent Application No. 2022-087195, dated Jun. 12, 2023.

30: 110, 300, 601,602, 603, 604

30: 110, 300, 601,602, 603, 604

30: 110, 300, 601,602, 603, 604

30: 110, 300, 601,602, 603, 604

DISPLAY APPARATUS

CROSS-REFERENCE TO RELATED APPLICATIONS

This application is a continuation of U.S. patent application Ser. No. 17/861,153, filed on Jul. 8, 2022, which is a divisional of U.S. patent application Ser. No. 16/804,090, filed on Feb. 28, 2020, which claims the benefit of and priority to Korean Patent Application No. 10-2019-0024025 filed on Feb. 28, 2019, and No. 10-2019-0180146 filed on Dec. 31, 2019, the entirety of all of which are hereby incorporated by reference.

BACKGROUND

Technical Field

The present disclosure relates to a display apparatus, and more particularly, to a display apparatus which vibrates a display panel to generate sound.

Discussion of the Related Art

Display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive display apparatuses, and are used as a screen for displaying an image.

Display apparatuses may include a display panel for displaying an image and a sound device for outputting a sound associated with the image.

However, in general display apparatuses, because a sound output from a sound device may travel to a rearward or a downward direction of the display apparatus, sound quality may be degraded due to interference between sounds reflected from a wall and the ground. For this reason, it may be difficult to transfer an accurate sound, and an immersion experience of a viewer is reduced.

The inventors have recognized problems of general display apparatuses and have performed various experiments so that, when a user in front of a display panel is watching an image, a traveling direction of sound is toward a front surface of the display panel. Thus, sound quality may be enhanced. Thus, through the various experiments, the inventors have invented a display apparatus that may generate sound traveling to a forward region in front of the display panel, thereby enhancing sound quality.

SUMMARY

Accordingly, embodiments of the present disclosure are directed to a display apparatus that substantially obviates one or more problems due to limitations and disadvantages of the related art.

An aspect of the present disclosure is to provide a display apparatus including a sound generating module which generates a sound for traveling to a forward region in front of a display panel.

Another aspect of the present disclosure is to provide a display apparatus including a sound generating module having a new structure, which improves assembling between a display module and the sound generating module.

Another aspect of the present disclosure is to provide a display apparatus including a sound generating module having a new structure, which prevents exposure of the sound generating module to improve a rear appearance design of the display apparatus.

Another aspect of the present disclosure is to provide a display apparatus having a new structure, which enables elements to be used in common.

Another aspect of the present disclosure is to provide a display apparatus including a sound generating module, which realizes a stereo sound.

Additional features and aspects will be set forth in part in the description that follows, and in part will become apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a display module including a display panel configured to display an image. A rear cover is disposed on a rear surface of the display module, and a sound generating module is disposed at the rear cover to vibrate the display module to generate a sound. A rear surface of the sound generating module is covered by the rear cover.

In another aspect of the present disclosure, a display apparatus comprises a display module configured to display an image. A rear cover is disposed on a rear surface of the display module with a gap space therebetween, and a sound generating module is disposed in the gap space to vibrate the display module to generate a sound. A module structure is disposed at the rear cover. A vibration device disposed at the module structure vibrates the display module. The module structure and the vibration device are modularized as one element.

In another aspect of the present disclosure, a display apparatus comprises a display module configured to display an image. A rear cover is disposed on a rear surface of the display module and includes a plurality of module accommodating parts. At least one sound generating module is accommodated into at least one of the plurality of module accommodating parts to vibrate the display module to generate a sound. At least one of the plurality of module accommodating parts is covered by the cover.

In another aspect of the present disclosure, a display apparatus comprises a plate including a first region, a second region, a third region, a fourth region, and a fifth region, a first sound generating module and a fourth sound generating module in the first region and the fourth region to correspond to a left region of a rear surface of the plate, a second sound generating module and a fifth sound generating module in the second region and the fifth region to correspond to a right region of the rear surface of the plate, and a third sound generating module in the third region to correspond to a center region of the rear surface of the plate. One or more of the first to fifth sound generating modules include a module structure, and the one or more sound generating modules are disposed at the module structure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION

Figure 1:
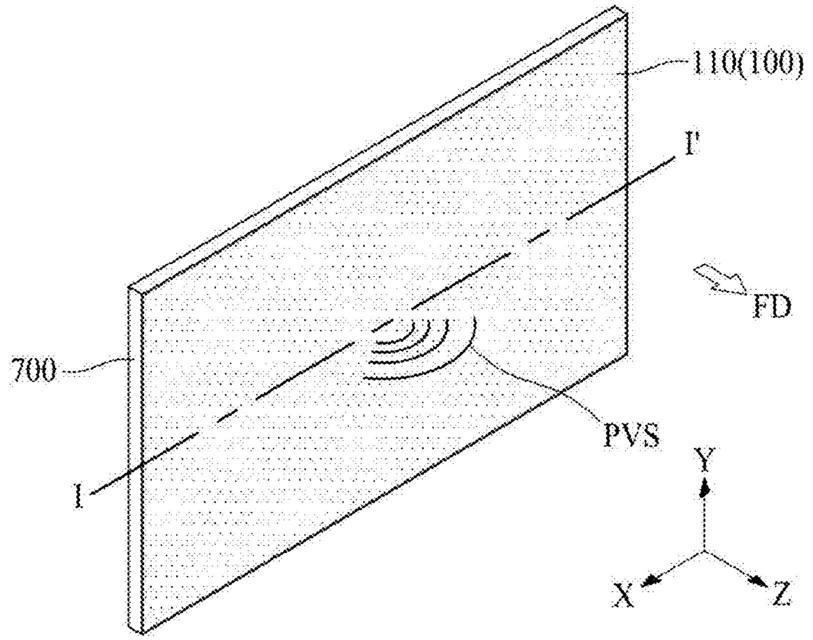
FIG. 1 illustrates a display apparatus according to an embodiment of the present disclosure.

Reference will now be made in detail to embodiments of the present disclosure, examples of which may be illustrated in the accompanying drawings.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

Throughout the drawings and the detailed description, unless otherwise described, the same drawing reference numerals should be understood to refer to the same elements, features, and structures. The relative size and depiction of these elements may be exaggerated for clarity, illustration, and convenience. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

When “comprise,” “have,” and “include” described in the present specification are used, another part may be added unless “only” is used. The terms of a singular form may include plural forms unless referred to the contrary.

In construing an element, the element is construed as including an error or tolerance range although there is no explicit description of such an error or tolerance range. In describing a position relationship, for example, when a position relation between two parts is described as, for example, “on,” “over,” “under,” and “next,” one or more other parts may be disposed between the two parts unless a more limiting term, such as “just” or “direct(ly)” is used. In describing a time relationship, for example, when the temporal order is described as, for example, “after,” “subsequent,” “next,” and “before,” a case that is not continuous may be included unless a more limiting term, such as “just,” “immediate(ly),” or “direct(ly)” is used.

It will be understood that, although the terms “first,” “second,” etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms “first,” “second,” “A,” “B,” “(a),” “(b),” etc. may be used. These terms are intended to identify the corresponding elements from the other elements, and basis, order, or number of the corresponding elements should not limited by these terms. The expression that an element is “connected,” “coupled,” or “adhered” to another element or layer the element or layer can not only be directly connected or adhered to another element or layer, but also be indirectly connected or adhered to another element or layer with one or more intervening elements or layers “disposed” between the elements or layers, unless otherwise specified.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

In the description of embodiments, when a structure is described as being positioned “on or above” or “under or below” another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic device which is a final product including an LCM or an OLED module may be referred to as a set device. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to the present embodiment may use all types of display panels such as a liquid crystal display panel, an organic light emitting diode (OLED) display panel, and an electroluminescent display panel, but is not limited to a specific display panel, which is vibrated by a sound generation device according to the present embodiment to output a sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Hereinafter, embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

Figure 2:
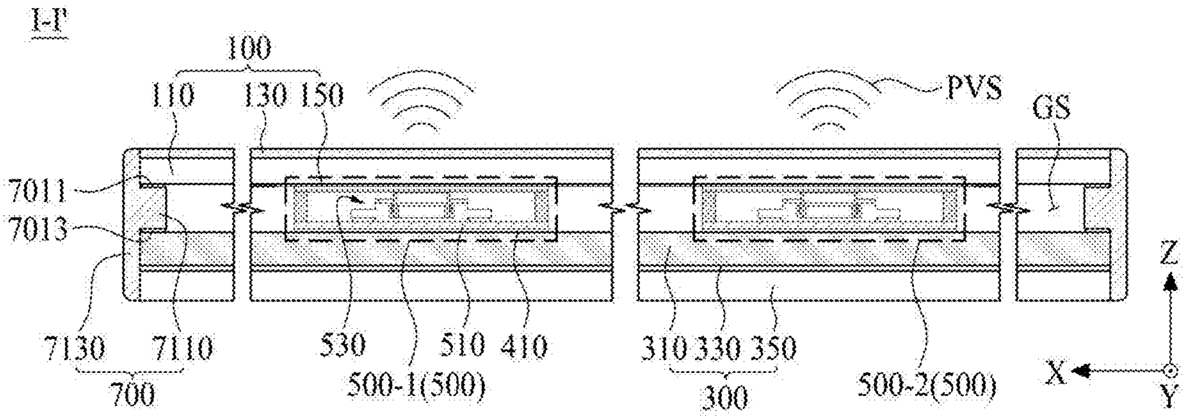
FIG. 2 is a cross-sectional view taken along line I-I' illustrated in FIG. 1.

FIG. 1 illustrates a display apparatus according to an embodiment of the present disclosure. FIG. 2 is a cross-sectional view taken along line I-I' illustrated in FIG. 1.

With reference to FIGS. 1 and 2, the display apparatus according to an embodiment of the present disclosure may include a display module 100, a rear cover 300, and at least one sound generating module 500.

The display module 100 may vibrate based on driving of the at least one sound generating module 500 to directly output a sound PVS (or a panel vibration sound) in a front-surface direction (or a forward region) FD while displaying an image. Alternatively, the display module 100 may vibrate based on driving of the at least one sound generating module 500 to directly output the sound PVS to the forward region FD in a state without displaying an image. Therefore, the display module 100 according to the present disclosure may display an image and may generate (or output) the sound PVS.

The display module 100 according to an embodiment of the present disclosure may include a display panel 110 which displays an image. For example, the image may include an electronic image or a digital image.

The display panel 110 may be implemented as all types of display panels such as an organic light emitting diode display panel, a liquid crystal display panel, an electroluminescent display panel, a micro light emitting diode display panel, and a quantum dot light emitting display panel. The display panel 110 may vibrate based on a vibration of the sound generating module 500 to directly output the sound PVS to the forward region FD, and thus, the display panel 110 may be a vibration plate or a speaker, which directly generates the sound PVS. For example, when the display module 100 generates the sound PVS, the display module 100 may be a vibration plate, a panel speaker, or a flat speaker, which directly generates the sound PVS.

According to some embodiments of the present disclosure, the display panel 110 may include a pixel circuit which is disposed on a substrate (or a base substrate) and a pixel array layer (or a display unit) which is connected to the pixel circuit and includes an anode electrode, a cathode electrode, and an organic light emitting layer. The display panel 110 may display an image in a type such as a top emission type, a bottom emission type, or a dual emission type, based on a structure of the pixel array layer. For example, the anode electrode may be referred to as a first electrode or a pixel electrode, and the term is not limited thereto. The cathode electrode may be referred to as a second electrode or a common electrode, and the term is not limited thereto.

In the top emission type, light generated from the pixel array layer may be output to the forward region FD in front of the substrate of the display panel 110. In the bottom emission type, the light generated from the pixel array layer may be output to the outside through the substrate, thereby displaying an image.

The display module 100 according to some embodiments of the present disclosure may further include a functional film 130 disposed on the display panel 110.

The functional film 130 may be attached on the display panel 110 using a transparent adhesive member. For example, the transparent adhesive member may include a pressure sensitive adhesive (PSA), an optical clear adhesive (OCA), or an optical clear resin (OCR), but is not limited thereto.

According to some embodiments, the functional film 130 may include an anti-reflection layer (or an anti-reflection film) for preventing reflection of external light to enhance outdoor visibility and a contrast ratio with respect to an image displayed by the display panel 110. For example, the anti-reflection layer may include a circular polarization layer (or a circular polarization film) which prevents external light, reflected by thin film transistors (TFT)s and/or lines disposed on the pixel array layer of the display panel 110, from traveling to the outside.

According to some embodiments of the present disclosure, the functional film 130 may further include a light path control layer (or a light path control film) for controlling a path of light output from the pixel array layer of the display panel 110 to the outside. The light path control layer may include a stacked structure where a high refraction layer and a low refraction layer are alternately stacked and may change a path of light incident from the pixel array layer to minimize a color shift phenomenon based on a viewing angle, and for example, the low refraction layer may be disposed on an uppermost layer of the light path control layer.

The display module 100 according to some embodiments of the present disclosure may further include a touch electrode unit for a user interface using a user touch. The touch electrode unit may be disposed between the display panel 110 and the functional film 130, or may be embedded into the display panel 110 on the basis of an in-cell touch type. For example, the touch electrode unit based on the in-cell touch type may include mutual capacitance type touch electrodes or self-capacitance type touch electrodes.

The rear cover 300 may be disposed on a rear surface of the display module 100. The rear cover 300 may support or fix the sound generating module 500.

According to some embodiments of the present disclosure, the rear cover 300 may cover the rear surface of the display module 100 and the sound generating module 500. The rear cover 300 may be referred to as a supporting member, a housing, a system cover, a set cover, a back cover, a cover bottom, a rear frame, or a chassis, but the term is not limited thereto. Also, the rear surface of the display module 100 may be referred to as one surface, a first surface, a rear surface, or a lower surface, but the term is not limited thereto.

According to some embodiments of the present disclosure, the rear cover 300 may include a first rear cover 310 and a second rear cover 350.

The first rear cover 310 may be disposed on the rear surface of the display module 100 and may cover the display module 100 (for example, a rear surface of the display panel 110). The first rear cover 310 may be spaced apart from a rearmost surface of the display module 100 with a gap space GS therebetween. The first rear cover 310 may support or fix the sound generating module 500. The first rear cover 310 may protect the rear surface of the display panel 110 from an external impact. Also, the first rear cover 310 may perform a function of a heat dissipation plate for dissipating heat occurring in the display module 100.

According to some embodiments of the present disclosure, the first rear cover 310 may be a plate member which covers the rearmost surface of the display module 100 (for example, the whole rear surface of the display panel 110). For example, an edge or a corner of the first rear cover 310 may have an inclined shape or a curved shape through a chamfer process or a corner rounding process.

According to some embodiments of the present disclosure, the first rear cover 310 according to an embodiment of the present disclosure may include a glass material, a metal material, or a plastic material. For example, the first rear cover 310 including a glass material may include one of sapphire glass and gorilla glass or a stacked structure (or a bonded structure) thereof, but is not limited thereto. For example, the first rear cover 310 including a metal material may include one material of aluminum (Al), an Al alloy, a Mg alloy, a Fe—Ni alloy, and stainless steel, or may include an alloy material thereof or a bonded (or a laminated) structure.

The second rear cover 350 may be disposed on a rear surface of the first rear cover 310 and may cover the rear surface of the first rear cover 310. According to some embodiments of the present disclosure, the second rear cover 350 may be a plate member which covers the whole rear surface of the first rear cover 310. For example, an edge or a corner of the second rear cover 350 may have an inclined shape or a curved shape through a chamfer process or a corner rounding process.

According to some embodiments of the present disclosure, the second rear cover 350 may be formed of one of a glass material, a metal material, or a plastic material, or may be formed of a material differing from that of the first rear cover 310. For example, the second rear cover 350 may be formed of a glass material, and the first rear cover 310 may be formed of a metal material such as Al which is good in thermal conductivity. For example, the display apparatus may be improved in appearance design, based on the second rear cover 350 which is disposed on a rearmost surface and includes a glass material, and a rear surface of the display apparatus may use the first rear cover 310 including a metal material as a mirror surface.

According to some embodiments of the present disclosure, the second rear cover 350 according to an embodiment of the present disclosure may have a thickness, which is the same as or relatively thinner than that of the first rear cover 310, within an error range in a manufacturing process. For example, in order to more stably support the sound generating module 500 and reduce a weight of the display apparatus, the first rear cover 310 may have a thickness which is relatively thicker than that of the second rear cover 350.

According to some embodiments of the present disclosure, the first rear cover 310 and the second rear cover 350 may be coupled or connected to each other by a cover coupling member 330. For example, the cover coupling member 330 may be an adhesive resin, a double-sided adhesive tape, or a double-sided adhesive foam pad and may have elasticity for absorbing an impact.

According to some embodiments of the present disclosure, the cover coupling member 330 may be disposed in a whole region between the first rear cover 310 and the second rear cover 350.

According to some embodiments, the cover coupling member 330 may be provided in a mesh structure including an air gap between the first rear cover 310 and the second rear cover 350. For example, a portion of the air gap between the first rear cover 310 and the second rear cover 350 may be used as a disposition region of a signal transfer member or a cable connected to the sound generating module 500.

The at least one sound generating module 500 may generate a sound PVS using the display module 100 as a vibration plate. For example, the at least one sound generating module 500 may generate a sound PVS using the display panel 110 as a vibration plate.

The display apparatus according to some embodiments of the present disclosure may include one sound generating module which is disposed at a rear center portion (or center region) of the display module 100. For example, the one sound generating module may vibrate the rear center portion of the display module 100 to generate the sound PVS based on a vibration of the display module 100.

According to another embodiment of the present disclosure, the display apparatus may include a first sound generating module 500-1 disposed in a first region (or a left region) of the display module 100 and a second sound generating module 500-2 disposed in a second region (or a right region) of the display module 100, with respect to the rear center portion of the display module 100. For example, the first sound generating module 500-1 may vibrate a first rear region of the display module 100 to generate a sound PVS based on a vibration of the first region of the display module 100. The second sound generating module 500-2 may vibrate a second rear region of the display module 100 to generate a sound PVS based on a vibration of the second region of the display module 100. The display apparatus according to another embodiment of the present disclosure may output a two-channel stereo sound on the basis on left-right sound separation by using the first and second sound generating modules 500-1 and 500-2. For example, the first sound generating module 500-1 may be configured to output a left sound, and the second sound generating module 500-2 may be configured to output a right sound.

According to some embodiments of the present disclosure, the at least one sound generating module 500 may be between the display module 100 and the rear cover 300 and may vibrate the display module 100 to generate a sound PVS. A rear surface of the at least one sound generating module 500 may be covered by the rear cover 300, and thus, may be concealed without being directly exposed at an outermost rear surface of the display apparatus. Therefore, since the rear surface of the at least one sound generating module 500 is covered by the rear cover 300, the display apparatus according to an embodiment of the present disclosure may have a clean back design where a rear surface or a portion of the at least one sound generating module 500 is not exposed or is not seen by eyes of a user, thereby improving a rear appearance design.

The at least one sound generating module 500 according to some embodiments of the present disclosure may be a single structure body or a single structure, in which a module structure 510 disposed at the rear cover 300 and a vibration device 530 disposed at the module structure 510 to vibrate the display module 100 are modularized as one element. For example, the module structure 510 and the vibration device 530 may be manufactured as a finished-product type such as a single structure body or a single structure through a modularization process (or an assembly process) instead of an assembly process performed on the display apparatus, and then, the at least one sound generating module 500 may be mounted or disposed in a gap space GS between the display module 100 and the rear cover 300 through a relatively simple part mounting (or positioning) process in the assembly process performed on the display apparatus. Accordingly, in the display apparatus according to an embodiment of the present disclosure, assemblability or assembling of the at least one sound generating module 500 may be improved in a process of assembling modules, thereby enhancing a production yield rate.

The at least one sound generating module 500 according to an embodiment of the present disclosure may directly or indirectly vibrate the display module 100. For example, the at least one sound generating module 500 may be directly connected to the display panel 110 and may directly vibrate the display panel 110. As another example, the at least one sound generating module 500 may indirectly vibrate the display panel 110 by using a vibration transfer member directly connected to the display panel 110. For example, the vibration transfer member may be implemented in a corresponding sound generating module 500 or the display module 100. For example, the vibration transfer member implemented in the at least one sound generating module 500 may be vibration transfer plate (or a vibration transfer sheet) contacting (or coupled to) the display module 100. Also, the vibration transfer member implemented in the display module 100 may be a backlight module disposed on the rear surface of the display panel 110, or may be a vibration transfer plate (or a heat dissipation plate) coupled to (or attached on) the rear surface of the display panel 110.

The display apparatus according to an embodiment of the present disclosure may further include a middle frame 700.

The middle frame 700 may be disposed between a rear edge of the display module 100 and a front edge of the rear cover 300. The middle frame 700 may support an edge (or a periphery) of each of the display module 100 and the rear cover 300 and may surround a side surface of each of the display module 100 and the rear cover 300. The middle frame 700 may provide a gap space GS between the display module 100 and the rear cover 300. The gap space GS may be referred to as an air gap, a vibration space, or a sound generating module disposition space, but the term is not limited thereto.

According to some embodiments of the present disclosure, the middle frame 700 may be connected or coupled to a rear edge (or a rear periphery) of the display module 100 by a first adhesive member 7011 and may be connected or coupled to a front edge (or a front periphery) of the rear cover 300 by a second adhesive member 7013. A front surface of the rear cover 300 may be referred to as the other surface, a second surface, or an upper surface, but the term is not limited thereto. Also, the middle frame 700 may be referred to as a middle cabinet, a middle cover, or a middle chassis, but the term is not limited thereto.

According to some embodiments of the present disclosure, the middle frame 700 may include a metal material or a plastic material. For example, the middle frame 700 may be formed of a metal material, for improving a side appearance design of the display apparatus and protecting side surfaces of the display apparatus.

The middle frame 700 according to some embodiments of the present disclosure may include a supporting part 7110 and a sidewall portion 7130. The supporting part 7110 may be a first portion and the sidewall portion 7130 may be a second portion, but the terms are not limited thereto.

The supporting part 7110 may be disposed between the rear edge (or the rear periphery) of the display module 100 and the front edge (or the front periphery) of the rear cover 300, and thus, may provide a gap space GS between the display module 100 and the rear cover 300. A front surface of the supporting part 7110 may be coupled to the rear edge of the display module 100 by the first adhesive member 7011, and a rear surface of the supporting part 7110 may be coupled to the front edge of the rear cover 300 by the second adhesive member 7013. The supporting part 7110 may have a thickness (or height) corresponding to a total module thickness of the sound generating module 500. For example, a thickness of the supporting part 7110 may be adjusted based on a module thickness of the sound generating module 500 between the display module 100 and the rear cover 300, a thickness of the first adhesive member 7011, and a thickness of the second adhesive member 7013.

According to some embodiments of the present disclosure, the supporting part 7110 may have a single tetragonal (e.g., quadrilateral) picture frame structure, but is not limited thereto. For example, the supporting part 7110 may be between the rear edge of the display module 100 and the front edge of the rear cover 300 to have a plurality of division bar shapes.

The first adhesive member 7011 may be between the rear edge of the display module 100 and a front surface of the supporting part 7110. For example, the first adhesive member 7011 may be an adhesive resin, a double-sided adhesive tape, or a double-sided adhesive foam pad, but is not limited thereto.

The second adhesive member 7013 may be between the front edge of the rear cover 300 and a rear surface of the supporting part 7110. For example, the second adhesive member 7013 may be an adhesive resin, a double-sided adhesive tape, or a double-sided adhesive foam pad. The second adhesive member 7013 may be formed of a material differing from that of the first adhesive member 7011.

The sidewall portion 7130 may be vertically coupled to an outer surface of the supporting part 7110 in parallel with a thickness direction Z of the display apparatus. The sidewall portion 7130 may surround all of an outer surface (or an outer sidewall) of the display module 100 and an outer surface (or an outer sidewall) of the rear cover 300, thereby protecting the outer surface of each of the display module 100 and the rear cover 300 and improving an appearance design of a side surface of the display apparatus. The middle frame 700 according to some embodiments of the present disclosure may be coupled to each other such that the supporting part 7110 and sidewall portion 7130 form a single body, and thus, may have a picture frame structure having a "⊢"-shaped single-sided structure.

The display apparatus according to an embodiment of the present disclosure may include an adhesive member instead of the middle frame 700.

The adhesive member may be between the rear edge of the display module 100 and the front edge of the rear cover 300 and may provide the gap space GS between the display module 100 and the rear cover 300. The adhesive member may have a thickness (or a height) corresponding to a total module thickness of the sound generating module 500. For example, a thickness of the adhesive member may be adjusted based on the module thickness of the sound generating module 500 between the display module 100 and the rear cover 300. The adhesive member may perform the same function as that of the supporting part 7110 of the middle frame 700.

When the display apparatus includes the adhesive member instead of the middle frame 700, the rear cover 300 may include a sidewall cover part which surrounds all of an outer surface (or an outer sidewall) of the display module 100, an outer surface (or an outer sidewall) of the rear cover 300, and an outer surface (or an outer sidewall) of the adhesive member.

The sidewall cover part may extend from an end of the second rear cover 350 and may be vertically bent to be parallel to a thickness direction Z of the display apparatus. According to some embodiments of the present disclosure, the sidewall cover part may have a single sidewall structure or a hemming structure. The hemming structure may denote a structure where ends of an arbitrary member is bent in a curved shape to overlap each other, or are spaced apart from each other in parallel. For example, the sidewall cover part having the hemming structure may include a first sidewall, which extends from the end of the second rear cover 350 and is vertically bent to be parallel to the thickness direction Z of the display apparatus, and a second sidewall which extends from an end of a first sidewall and is bent to be parallel to the first sidewall. The second sidewall may be between the outer surface of the display module 100 and the first sidewall, and For example, the second sidewall may not be exposed at an outermost side surface of the display apparatus and may be covered by the first sidewall, thereby improving a side appearance design of the display apparatus.

In the display apparatus according an embodiment of the present disclosure, the display module 100 may further include a heat diffusion member 150.

The heat diffusion member 150 may be between the vibration device 530 of the sound generating module 500 and the display module 100. The heat diffusion member 150 according to an embodiment of the present disclosure may be attached on the rear surface of the display module 100 to overlap the sound generating module 500 and may be coupled or connected to the vibration device 530 of the sound generating module 500. The heat diffusion member 150 may be disposed on the rear surface of the display module 100 to overlap the vibration device 530 and may diffuse heat, occurring in driving of the vibration device 530, toward the display module 100, thereby preventing a reduction in performance of the vibration device 530 caused by the heat. Also, the heat diffusion member 150 may have a relatively wider size than the vibration device 530 with respect to a center portion of the vibration device 530 and may diffuse heat, occurring in driving of the vibration device 530, to a wide region, thereby preventing the heat from being intensively transferred to a local region of the display module 100 overlapping the sound generating module 500. Accordingly, the local luminance non-uniformity of the display module 100 may be prevented or minimized.

According to some embodiments of the present disclosure, the heat diffusion member 150 may include one of aluminum (Al), copper (Cu), silver (Ag), and magnesium (Mg) or an alloy thereof or may include a metal material having high thermal conductivity like an alloy thereof, but is not limited thereto. The heat diffusion member 150 may be referred to as a heat diffusion sheet, a heat diffusion layer, a heat diffusion plate, a heat sink, a heat dissipation sheet, a heat dissipation layer, or a heat dissipation plate, but the term is not limited thereto.

Therefore, the display apparatus according to an embodiment of the present disclosure may output a sound PVS to the forward region FD on the basis of a vibration of the display module 100 (for example, the display panel 110) caused by a vibration of the sound generating module 500, thereby enhancing an immersion experience of a viewer watching an image displayed by the display apparatus.

Moreover, in the display apparatus according to an embodiment of the present disclosure, since a sound PVS is generated based on a vibration of the display module 100, a separate speaker may not be provided, thereby enhancing a design of a set apparatus and a degree of freedom in disposition of elements.

Moreover, since the sound generating module 500 is disposed in the gap space GS between the display module 100 and the rear cover 300, a rear surface of the sound generating module 500 may be covered by the rear cover 300, and thus, the display apparatus according to an embodiment of the present disclosure may have a clean back design where the rear surface or a portion of the sound generating module 500 is not exposed or is not seen by a user, thereby improving a rear appearance design of the display apparatus.

Moreover, in the display apparatus according to an embodiment of the present disclosure, the module structure 510 and the vibration device 530 of the sound generating module 500 may be modularized as one element and may be mounted in the gap space GS between the display module 100 and the rear cover 300 through a relatively simple part mounting process, and thus, assemblability or assembling of the sound generating module 500 may be improved in an assembly process performed on the display apparatus, thereby enhancing a production yield rate.

FIGS. 3A to 3E illustrate a sound generating module according to an embodiment of the present disclosure.

Figure 3A:
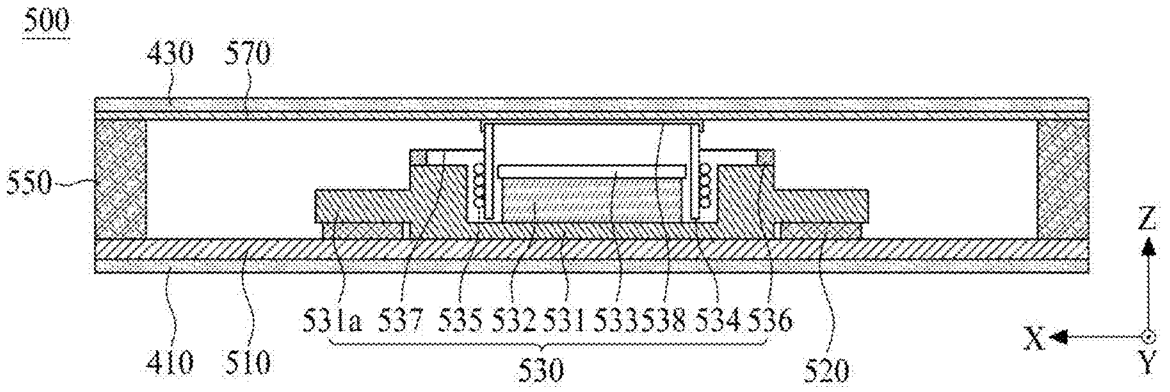
FIGS. 3A to 3E illustrate a sound generating module according to an embodiment of the present disclosure.
Figure 3B:
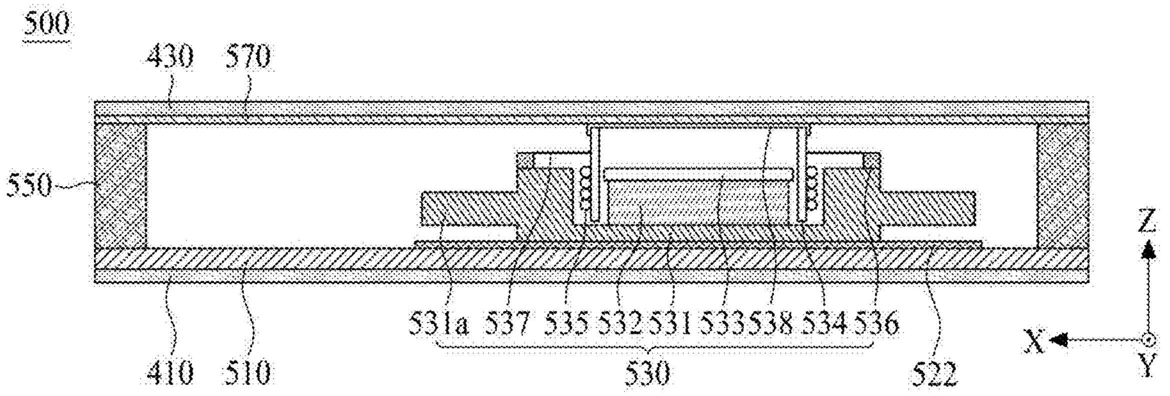
Figure 3C:
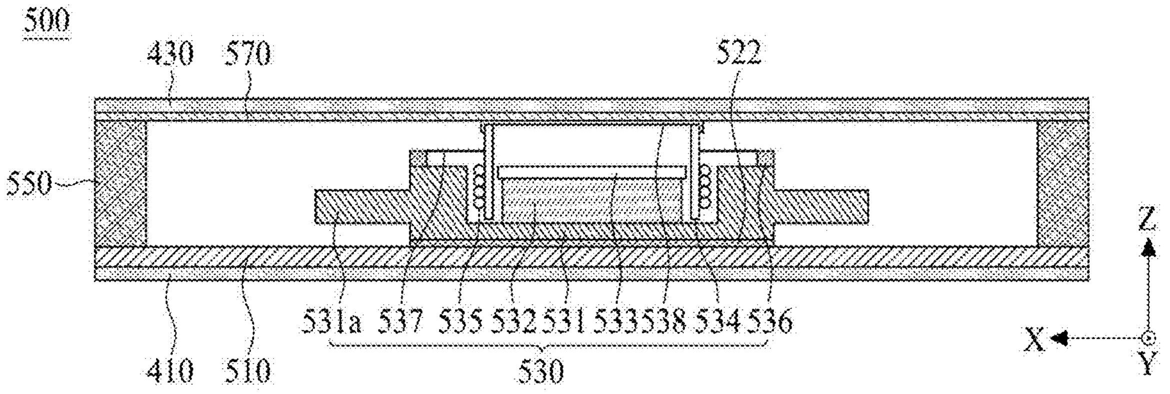
Figure 3D:
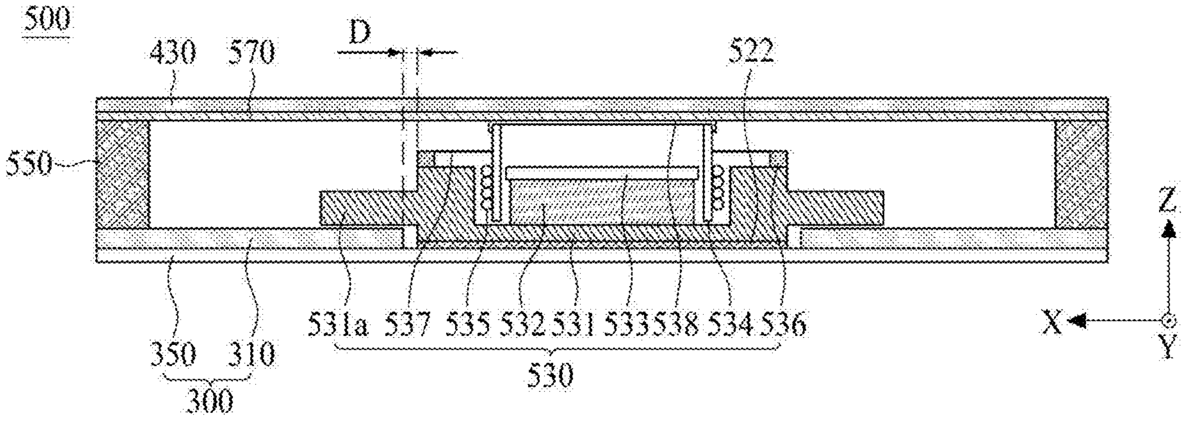
Figure 3E:
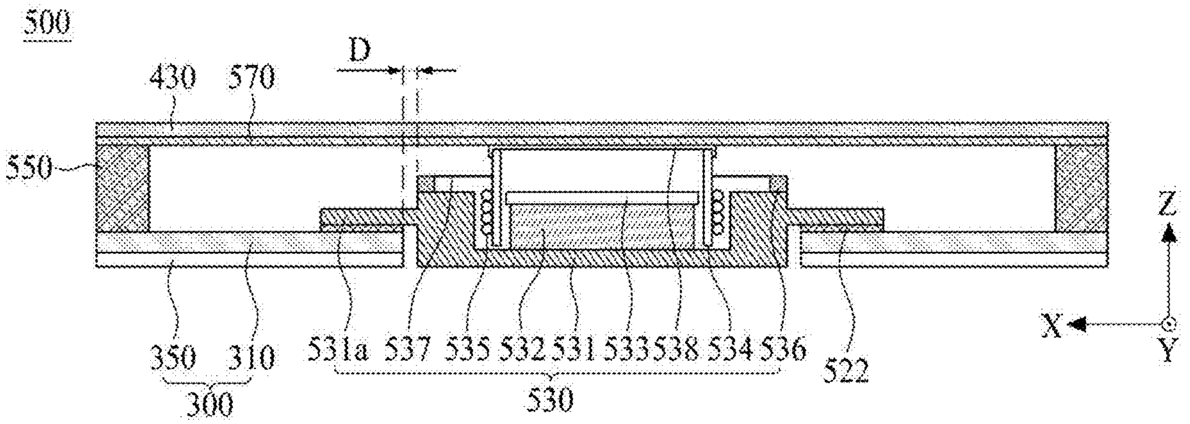

With reference to FIGS. 2 to 3E, the sound generating module 500 according to an embodiment of the present disclosure may include a module structure 510 and a vibration device 530.

The module structure 510 may be disposed at a rear cover 300. For example, the module structure 510 may be disposed at the rear cover 300 and may fix or support the vibration device 530. According to some embodiments of the present disclosure, the module structure 510 may be a metal plate which includes a metal material and has a plate shape. The module structure 510 may be referred to as a plate mechanism, a base structure, a base mechanism, a module supporting frame, or a module supporting plate, but the term is not limited thereto.

The module structure 510 may be disposed at or fixed to the rear cover 300 by using a first member 410 (or a module fixing member). A rear surface of the module structure 510 may be covered by the rear cover 300, and thus, may be concealed without being directly exposed at an outermost rear surface of a display apparatus. For example, the rear surface of the module structure 510 may be fully covered by the rear cover 300, and thus, may be concealed without being directly exposed at the outermost rear surface of the display apparatus.

The first member 410 according to some embodiments of the present disclosure may be a double-sided adhesive member between the module structure 510 and the rear cover 300. The double-sided adhesive member may be a double-sided tape or a double-sided foam tape, but is not limited thereto. One surface (or a front surface) of the first member 410 may be coupled to or disposed on the rear surface of the module structure 510, and the other surface (or a rear surface) of the first member 410 may be disposed at or fixed to the rear cover 300 (for example, a front surface of a first rear cover 310). For example, the other surface of the first member 410 may be fixed to or disposed on the front surface of the first rear cover 310 in a state where a lower protection sheet is delaminated therefrom.

According to some embodiments of the present disclosure, the first member 410 may be coupled (or modularized) to a rearmost surface of a sound generating module 500 modularized as one element, for convenience of assembly between the sound generating module 500 and a display module 100, and may be protected by a lower protection sheet. For example, the lower protection sheet may be referred to as a lower delamination sheet or a bottom liner, but the term is not limited thereto.

According to some embodiments of the present disclosure, the double-sided adhesive member which is the first member 410 may further include a heat transfer material. The heat transfer material may quickly transfer heat, occurring in the sound generating module 500, to the rear cover 300, and thus, may dissipate the heat of the sound generating module 500 toward the rear cover 300, thereby preventing or minimizing the local luminance non-uniformity of the display module 100 which occurs because heat occurring in driving of the sound generating module 500 is locally transferred to a region of the display module 100 overlapping the sound generating module 500. According to some embodiments of the present disclosure, the heat transfer material may include a conductive particle or a conductive layer, but is not limited thereto. For example, the double-sided adhesive member including the heat transfer material may be referred to as a heat transfer tape or a heat dissipation tape, but the term is not limited thereto.

The vibration device 530 may be disposed at the module structure 510 and may vibrate the display module 100. For example, the vibration device 530 may be disposed at the module structure 510 and may vibrate the display panel 110. The vibration device 530 may be provided as one body with or fixed to the module structure 510 using a module integration member 520.

The vibration device 530 may include a sound device or a vibration generating device, which vibrates the display module 100 on the basis of an electrical signal. For example, the vibration device 530 may be configured to vibrate the display module 100 with a current (or a voice current) applied thereto on the basis of Fleming's left hand rule. The vibration device 530 may be referred to as a sound generating unit, a sound generating module, a vibration generating module, a vibration generating unit, an actuator, an exciter, or a transducer, but the term is not limited thereto.

The vibration device 530 may include an actuator (or an exciter) disposed to contact a rear surface of the display module 100. For example, the vibration device 530 including the actuator may include a base plate 531, a magnet 532, a center pole 533, a bobbin 534, a coil 535, an edge frame 536, and a damper 537. For example, the vibration device 530 may be a vibration device including a voice coil, but the term is not limited thereto.

The base plate 531 may be disposed at or fixed to the module structure 510 and may be a main body of the vibration device 530. The base plate 531 may support each of the magnet 532, the center pole 533, and the edge frame 536. The base plate 531 may include a metal material having magnetism like iron (Fe). The base plate 531 may be referred to as a lower plate, a base frame, or a yoke, but the term is not limited thereto.

The base plate 531 may include a groove portion which accommodates the magnet 532 and the bobbin 534. For example, the groove portion may be provided concavely from an upper surface of the base plate 531 to have a circular shape.

The base plate 531 may be provided as one body with or disposed at the module structure 510 using the module integration member 520.

The module integration member 520 may be an adhesive member. The adhesive member may be disposed between an extension portion (or a fixing portion) 531*a* of the base plate 531 and the module structure 510, and thus, the base plate 531 may be disposed at the module structure 510. The module integration member 520 including the adhesive member may be an adhesive or a double-sided tape, but is not limited thereto.

According to another embodiment of the present disclosure, the module integration member 520 may include a plurality of screws. The plurality of screws may pass through the extension portion 531*a* of the base plate 531 and may be fastened to the module structure 510, and thus, the base plate 531 may be disposed at the module structure 510.

According to another embodiment of the present disclosure, the module integration member 520 may include a bolt and a nut. The nut may be disposed at or fixed to the module structure 510 overlapping the extension portion 531*a* of the base plate 531. The bolt may pass through the extension portion 531*a* of the base plate 531 and may be fastened to the nut. The nut according to some embodiments of the present disclosure may be a self-clinching nut disposed at the module structure 510, but is not limited thereto. The self-clinching nut may be a PEM® nut.

The magnet 532, the center pole 533, the bobbin 534, and the coil 535 may be referred to as a magnetic circuit unit or a magnetic vibration unit, which is installed on the base plate 531 to vibrate the display module 100.

The magnetic circuit unit according to some embodiments of the present disclosure may have an external or dynamic magnetic type structure where the magnet 532 is disposed outward from the coil 535, or may have an internal magnetic type or micro type structure where the magnet 532 is disposed inward from the coil 535. The vibration device 530 including the magnetic circuit unit having the internal magnetic type structure may have a totally small size and a low leakage magnetic flux. The vibration device 530 according to some embodiments of the present disclosure may have an external magnetic type or internal magnetic type structure. Hereinafter, an example where the vibration device 530 has the internal magnetic type will be described.

The magnet 532 according to some embodiments of the present disclosure may be inserted or accommodated into the groove portion of the base plate 531. The magnet 532 may be a permanent magnet having a cylindrical shape capable of being inserted or accommodated into the bobbin 534. According to some embodiments of the present disclosure, the magnet 532 may be implemented with a sintered magnet such as barium ferrite, and a material of the magnet 532 may include one or more of $Fe_2O_3$, $BaCO_3$, a neodymium magnet, strontium ferrite ($Fe_{12}O_{19}Sr$) with improved magnet component, an alloy cast magnet including Al, nickel (Ni), and cobalt (Co). For example, the neodymium magnet may be neodymium-iron-boron (Nd—Fe—B), but is not limited thereto.

The bobbin 534 according to some embodiments of the present disclosure may be disposed on the base plate 531 and surround around the magnet 532. The bobbin 534 may have a circular shape or an oval shape, but is not limited thereto. The oval shape may have an elliptical shape, a rectangular shape with rounded corners, or non-circular curved shape having a width different from its height, but the present embodiment is not limited thereto. For example, in the bobbin 534 having the oval shape, a ratio of a long-axis diameter to a short-axis diameter may be set to 1.3:1 to 2:1. The bobbin 534 having the oval shape may more improve a sound of a high-pitched sound band than a circular shape and may decrease the occurrence of heat caused by a vibration, and thus, may have an excellent heat dissipation characteristic.

The coil 535 according to some embodiments of the present disclosure may be wound to surround an outer circumference surface of the bobbin 534 and may be supplied with a sound-generating current (or a voice current) from the outside. The coil 535 may be lowered or raised along with the bobbin 534. The coil 535 may be referred to as a voice coil. When a current is applied to the coil 535, a whole portion of the bobbin 534 may move upward and downward according to Fleming's left hand rule based on an application magnetic field generated around the coil 535 and an external magnetic field generated around the magnet 532, and a sound PVS or a sound wave may be generated based on a vibration of the display module 100 caused by a vertical movement (or vibration) of the bobbin 534.

According to an embodiment of the present disclosure, as the coil 535 is wound to surround an outer circumference surface of the bobbin 534, heat occurring in the coil 535 may be transferred to the bobbin 534, and the coil 535 may include a material which is relatively good in heat dissipation characteristic, for decreasing an image quality defect affecting the display panel 110 due to the heat of the bobbin 534. Also, since the bobbin 534 vibrates upward and downward, a horizontal vibration may occur due to a vertical vibration, and a horizontal vibration of the bobbin 534 may be affected by a weight of the bobbin 534. A weight of the bobbin 534 may be affected by a weight of the coil 535. Therefore, when a weight of the coil 535 is reduced, a horizontal vibration of the bobbin 534 may decrease. Therefore, considering heat transferred to the bobbin 534 and the horizontal vibration of the bobbin 534, the coil 535 may have a relatively good heat dissipation characteristic because thermal conductivity thereof is better than that of copper which is a material of a general coil, and may include an Al material which has a relatively good heat dissipation characteristic and is relatively lightweight compared to copper.

Moreover, in aluminum, since oxide is formed in air, welding may not be easy in manufacturing the vibration device 530, and thus, the coil 535 according to an embodiment of the present disclosure may include an Al layer (or a first metal layer) for dissipating heat and a metal covering layer (or a second metal layer) surrounding the Al layer. The metal covering layer may include one of Cu, Ag, and gold (Au). For example, the coil 535 may be a copper clad aluminum wire by which copper is covered. The metal covering layer may be formed as a thin film type outside the first metal layer, and thus, may not greatly affect an increase in weight of the coil 535. Therefore, a weight of the coil 535 according to an embodiment of the present disclosure may decrease by about 60% compared to a coil including only Cu or a Cu wire.

According to some embodiments of the present disclosure, the bobbin 534 may include a structure including a material obtained by processing pulp or paper, Al or Mg or an alloy thereof, or synthetic resin such as polyimide. For example, the bobbin 534 may be implemented with a polyimide film which is relatively good in heat dissipation characteristic and is relatively lightweight, for preventing an image quality defect of the display panel 110 caused by heat occurring in the coil 535.

The polyimide film may have physical properties which are not changed within a wide temperature range from −273° C. to 400° C. and may have a heat resistance, electrical insulation, flexibility, and nonflammable. Also, since the polyimide film is good in thermal and mechanical strength, the polyimide film may enhance the reliability of the bobbin 534, and the occurrence of heat caused by a vibration of the bobbin 534 may be reduced based on an excellent heat dissipation characteristic. For example, the polyimide film may be KAPTON and may be a condensation of pyromellitec dianhydride and 4,4'-oxydianiline, but is not limited thereto.

The center pole 533 may be accommodated or inserted into the bobbin 534 and may guide raising or lowering of the bobbin 534. For example, since the center pole 533 is accommodated or inserted into the bobbin 534, an outer circumference surface of the center pole 533 may be surrounded by the bobbin 534. The center pole 533 may be referred to as an elevation guider or pole pieces, but the term is not limited thereto.

The edge frame 536 may be disposed at a front edge (or a front periphery) of the base plate 531 and may support the damper 537. The edge frame 536 according to some embodiments of the present disclosure may be provided at the front edge of the base plate 531 to have a certain height and the same shape as that of the bobbin 534. According to another embodiment of the present disclosure, the edge frame 536 may include a hollow portion that is provided at the front edge of the base plate 531 to have a certain height and the same shape as that of the bobbin 534.

The damper 537 may be disposed or connected between the edge frame 536 and the magnetic circuit unit. For example, the damper 537 may be disposed or connected between the edge frame 536 and the bobbin 534. The damper 537 may be referred to as a spider, a suspension, or an edge, but the term is not limited thereto.

One end or one portion of the damper 537 according to some embodiments of the present disclosure may be connected to the edge frame 536, and the other end or the other portion of the damper 537 may be connected to an upper outer surface of the bobbin 534. The damper 537 may have a creased structure between the one end and the other end thereof and may be contracted and relaxed based on a vertical motion of the bobbin 534 to control a vibration of the bobbin 534. The damper 537 may be connected between the bobbin 534 and the edge frame 536 and may limit a vibration distance of the bobbin 534 with a restoring force. For example, when the bobbin 534 vibrates by a certain distance or more or vibrates by a certain distance or less, the bobbin 534 may be restored to an original position by the restoring force of the damper 537.

Since the vibration device 530 is disposed between the display module 100 and the rear cover 300, the vibration device 530 should have a relatively thin thickness so as to thinly reduce a thickness of the display apparatus or slim the display apparatus, and due to this, when a height (or a thickness) of the bobbin 534 is reduced, a sound pressure level may be lowered. Therefore, so as to solve a problem where a sound pressure level is lowered due to a reduction in height of the bobbin 534, the inventors have designed a structure where an area of the damper 537 disposed near the bobbin 534 is wide. When an area of the damper 537 is enlarged, the inventors have recognized that a space where a line for applying a current to the coil 535 is disposed is narrowed, causing interference between the line and the damper 537. Therefore, through various experiments, the inventors have configured the damper 537 which is formed of a conductor and performs a function of the line.

The damper 537 according to some embodiments of the present disclosure may include a metal material electrically connected to the coil 535. For example, the damper 537 may be formed of stainless or copper (Cu), but is not limited thereto.

The vibration device 530 according to some embodiments of the present disclosure may further include a bobbin protection member 538.

The bobbin protection member 538 may be disposed on a front surface (or a front end portion) of the bobbin 534 and may transfer a rising and lowering motion (or vibration) of the bobbin 534 to the rear surface of the display module 100. The bobbin protection member 538 according to some embodiments of the present disclosure may have a ring shape disposed on the front surface of the bobbin 534, a disc shape covering the whole front surface of the bobbin 534, or a cap shape surrounding the front surface and the upper outer surface of the bobbin 534, but the shapes are not limited thereto. For example, the bobbin protection member 538 may be referred to as a bobbin ring, but the term is not limited thereto.

The sound generating module 500 according to an embodiment of the present disclosure may further include a connection member 550.

The connection member 550 may be disposed between the module structure 510 and the display module 100. The connection member 550 according to some embodiments of the present disclosure may be disposed between a front edge portion (or a front periphery portion) of the module structure 510 and a rear edge portion (or a rear periphery portion) of the display module 100. For example, the connection member 550 may be a double-sided tape or a double-sided foam tape, but is not limited thereto. The connection member 550 may provide a vibration space, surrounding the vibration device 530, between the module structure 510 and the display module 100. The vibration space may be referred to as a sound pressure space, a sound box, a sound part, a resonance box, or a resonance part, but the term is not limited thereto.

The sound generating module 500 according to an embodiment of the present disclosure may further include a vibration transfer member 570.

The vibration transfer member 570 may be connected or coupled to each of the connection member 550 and the vibration device 530 and may vibrate based on a vibration of the vibration device 530 to transfer the vibration of the vibration device 530 to the display module 100.

According to some embodiments of the present disclosure, a rear edge portion or rear periphery portion of the vibration transfer member 570 may be connected or coupled to the connection member 550, and a rear center portion of the vibration transfer member 570 may be coupled to a front surface of the bobbin 534 of the vibration device 530, or may be coupled to the bobbin protection member 538 of the vibration device 530.

The vibration transfer member 570 according to some embodiments of the present disclosure may be formed of one or more materials of aluminum (Al), a magnesium (Mg) alloy, a Mg-lithium (Li) alloy, and an Al alloy, but is not limited thereto. For example, the Mg alloy may include one or more materials of Al, zinc (Zn), and manganese (Mn). The Mg alloy may be a lightest material of metal materials usable as a vibration plate of a speaker, may have relatively high non-rigidity (stiffness/specific gravity) and relatively high vibration damping ability (ability to absorb and progressively reduce vibration), and may be good in dimension stability with respect to a variation of a temperature and the elapse of time.

According to some embodiments of the present disclosure, the front surface of the vibration transfer member 570 may be coupled or connected to the rear surface of the display module 100 using a second member 430 (or a module adhesive member).

The second member 430 may be a double-sided adhesive member between the display module 100 and the vibration transfer member 570. The double-sided adhesive member may be a double-sided tape or a double-sided foam tape, but is not limited thereto. One surface (or a front surface) of the second member 430 may be disposed on or coupled to the rear surface of the display module 100, and the other surface (or a rear surface) of the second member 430 may be disposed on or coupled to the front surface of the vibration transfer member 570. For example, the one surface of the second member 430 may be disposed on or fixed to the rear surface of the display module 100 in a state where an upper protection sheet is delaminated.

According to some embodiments of the present disclosure, the second member 430 may be coupled (or modularized) to an uppermost surface of the sound generating module 500 modularized as one element, for convenience of assembly between the sound generating module 500 and the display module 100, and may be protected by the upper protection sheet. For example, the upper protection sheet may be referred to as an upper delamination sheet or a top liner, but the term is not limited thereto.

For example, all of the vibration transfer member 570 and the second member 430 may be omitted. For example, the sound generating module 500 may include the upper protection sheet coupled or connected to each of the connection member 550 and the vibration device 530. The upper protection sheet may be coupled or connected to each of the connection member 550 and the vibration device 530 to cover the whole front surface of the sound generating module 500, and thus, in a transfer process after a modularization process performed on the sound generating module 500 modularized as one element, each of the vibration device 530 and the connection member 550 of the sound generating module 500 may be prevented from being externally exposed and penetration of particles such as dust into the sound generating module 500 may be prevented. The upper protection sheet may be delaminated from the sound generating module 500 immediately before an assembly process between the sound generating module 500 and the display module 100.

Therefore, the sound generating module 500 according to an embodiment of the present disclosure may be disposed between the display module 100 and the rear cover 300 in a state where the module structure 510 and the vibration device 530 are modularized as one element, and thus, by using the display module 100 as a vibration plate, a sound PVS based on a vibration of the display panel 110 may be output and an outermost rear surface of the display apparatus may not be exposed, thereby improving a rear appearance design of the display apparatus.

With reference to FIGS. 3B and 3C, an adhesive member 522 may be disposed between the vibration device 530 and the module structure 510. The adhesive member 522 may include one or more of a double-sided tape, a double-sided foam tape, a double-sided pad, a double-sided foam pad, and a bond, but is not limited thereto. When the adhesive member 522 is provided, comparing with a screw or a nut and a bolt, an assembly process may be simplified and a hole for fastening with a screw or a nut and a bolt or an extension portion of a plate may not be needed, thereby providing a vibration device which is slimmer. A description of the vibration device is the same as description given above with reference to FIG. 3A, and thus, is omitted.

With reference to FIG. 3B, the vibration device 530 may be asymmetrically disposed. When the vibration device 530 is asymmetrically disposed, a dip phenomenon in a specific frequency may be reduced. For example, when a standing wave occurs in upper, lower, left, and right portions with respect to the vibration device 530, the dip phenomenon may occur in the upper, lower, left, and right portions, but when the vibration device 530 is asymmetrically disposed, a phenomenon where the standing wave occurs simultaneously in the upper, lower, left, and right portions may be reduced. Accordingly, the dip phenomenon may be reduced, and thus, a sound characteristic may be more enhanced.

With reference to FIGS. 3D and 3E, a rear cover 300 may include a first rear cover 310 and a second rear cover 350. Descriptions of the first rear cover 310 and the second rear cover 350 are the same as descriptions given above with reference to FIG. 2, and thus, are omitted.

With reference to FIG. 3D, the vibration device 530 may be accommodated into the first rear cover 310. For example, the vibration device 530 may be disposed at a removed portion of the first rear cover 310. The first rear cover 310 may be attached on the vibration device 530 by an adhesive member 522. The adhesive member 522 may be disposed between the vibration device 530 and the second rear cover 350. As another example, the adhesive member 522 may be further disposed between the vibration device 530 and the first rear cover 310. For example, the adhesive member 522 may be further disposed between an extension portion 531*a* of a base plate 531 and the first rear cover 310. The adhesive member 522 may include one or more of a double-sided tape, a double-sided foam tape, a double-sided pad, a double-sided foam pad, and a bond, but is not limited thereto. A portion of the first rear cover 310 may be removed and the vibration device 530 may be disposed at a removed region of the first rear cover 310, and thus, a thickness of the vibration device 530 may be reduced, thereby decreasing a thickness of a display apparatus. Also, when the vibration device 530 is disposed adjacent to the first rear cover 310 and/or the second rear cover 350, an abnormal vibration may occur when the vibration device 530 vibrates, and thus, the vibration device 530 may be spaced apart from the first rear cover 310 and/or the second rear cover 350 by an interval or a distance D. For example, the vibration device 530 may be spaced apart from the first rear cover 310 and/or the second rear cover 350 by the interval or the distance D. For example, the interval or the distance D may be 1 mm or more, but is not limited thereto.

With reference to FIG. 3E, the vibration device 530 may be accommodated between the first rear cover 310 and the second rear cover 350. For example, the base plate 531 of the vibration device 530 may have an external appearance. The base plate 531 of the vibration device 530 may be disposed between the first rear cover 310 and the second rear cover 350. The base plate 531 of the vibration device 530 may be configured to penetrate the first rear cover 310 and the second rear cover 350. The adhesive member 522 may be disposed between the vibration device 530 and the first rear cover 310. For example, the adhesive member 522 may be disposed at the extension portion 531*a* of the base plate 531 and one side of the first rear cover 310. The adhesive member 522 may include one or more of a double-sided tape, a double-sided foam tape, a double-sided pad, a double-sided foam pad, and a bond, but is not limited thereto. Since the base plate 531 of the vibration device 530 is configured to have an external appearance, a thickness of the vibration device 530 may be reduced, thereby decreasing a thickness of the display apparatus. Also, when the vibration device 530 is disposed adjacent to the first rear cover 310 and the second rear cover 350, an abnormal vibration may occur when the vibration device 530 vibrates, and thus, the vibration device 530 may be spaced apart from the first rear cover 310 and the second rear cover 350 by an interval or a distance D. For example, the vibration device 530 may be spaced apart from the first rear cover 310 and the second rear cover 350 by the interval or the distance D. For example, the interval or the distance D may be 1 mm or more, but is not limited thereto.

Figure 4:
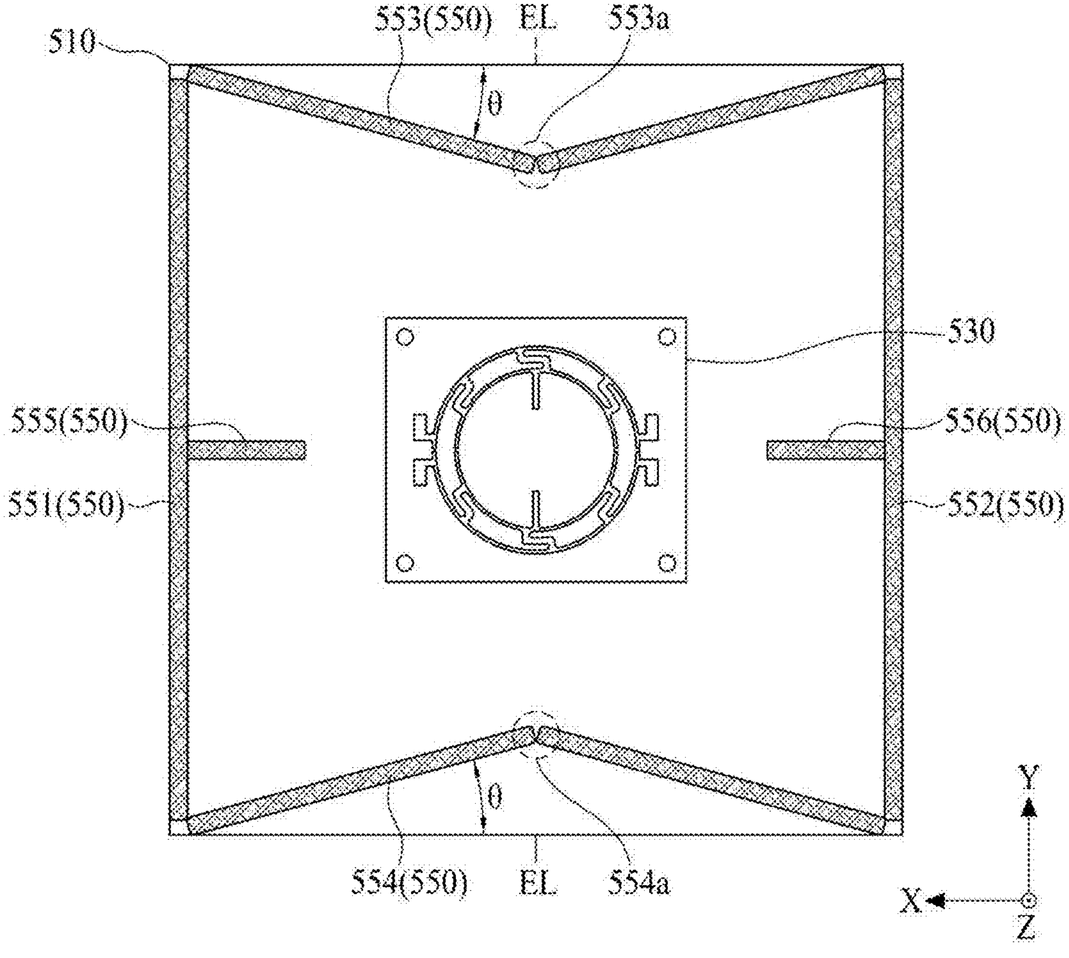
FIG. 4 illustrates a connection member illustrated in FIGS. 3A to 3E.

FIG. 4 illustrates the connection member illustrated in FIGS. 3A to 3E.

With reference to FIGS. 3A to 3E and 4, a connection member 550 according to some embodiments of the present disclosure may include first to fourth connection parts 551 to 554. The first to fourth connection parts 551 to 554 may respectively be first to fourth coupling parts, but the terms are not limited thereto.

Each of the first to fourth connection parts 551 to 554 may have a line shape having a certain width and length, and may be disposed between the module structure 510 and the vibration transfer member 570.

According to some embodiments of the present disclosure, with respect to a plan view of the module structure 510 illustrated in FIG. 4, the module structure 510 may include a first front edge portion or a first front surface periphery portion (or a left side), a second front edge portion or a second front surface periphery portion (or a right side) parallel to the first front edge portion, a third front edge portion or a third front surface periphery portion (or an upper side) between one portion of the first front edge portion and one portion of the second front edge portion, and a fourth front edge portion or a fourth front surface periphery portion (or a lower side) parallel to the third front edge portion and between the other portion of the first front edge portion and the other portion of the second front edge portion.

The first connection part 551 may be disposed at the first front edge portion of the module structure 510, and the second connection part 552 may be disposed at the second front edge portion of the module structure 510. The third connection part 553 may be disposed at the third front edge portion of the module structure 510, and the fourth connection part 554 may be disposed at the fourth front edge portion of the module structure 510.

Each of the first to fourth connection parts 551 to 554 may have a structure which is separated from a corresponding corner of the module structure 510. For example, each of the first to fourth connection parts 551 to 554 may have a tetragonal (e.g., quadrilateral) band shape which is not separated therefrom, and in this case, materials other than the connection member 550 among raw materials for forming the connection member 550 may be wasted, causing an increase in the material cost.

A portion of each of the first to fourth connection parts 551 to 554 may be disposed to contact an adjacent connection part of the first to fourth connection parts 551 to 554 at a corresponding corner of the module structure 510, and thus, the external leakage of a sound wave generated in a vibration space defined by the connection member 550 may be minimized.

At least one of the first to fourth connection parts 551 to 554 may include a plurality of bent portions 553*a* and 554*a* facing the vibration device 530.

A sound wave which is generated when the display module 100 vibrates by using the vibration device 530 may be spread radially from a center of the vibration generating device and may travel. The sound wave may be referred to as a progressive wave. The progressive wave may be reflected by the connection member 550 to generate a reflected wave, and the reflected wave may travel in a direction opposite to the progressive wave. The reflected wave overlaps and interferes in the progressive wave and does not travel, thereby generating a standing wave which stands at a certain position. A sound pressure is reduced by the standing wave, and for this reason, a sound output characteristic is reduced. Therefore, the bent portions 553*a* and 554*a* may be provided in the connection member 550, for decreasing a phenomenon where a sound pressure is reduced by a standing wave occurring due to interference between a reflected wave and a progressive wave. For example, the bent portions 553*a* and 554*a* may be provided at a position, at which a level of each of the progressive wave and the reflected wave is highest, or in at least one connection part, which a strongest sound wave reaches, of the first to fourth connection parts 551 to 554. For example, the bent portions 553*a* and 554*a* may be disposed on an extension line EL of a center portion of the vibration device 530 to face the center portion of the vibration device 530, thereby minimizing a phenomenon where a sound pressure is reduced by the standing wave.

According to some embodiments, the bent portions 553*a* and 554*a* may be provided in the third and fourth connection parts 553 and 554. Also, the bent portions 553*a* and 554*a* may have a certain inclined angle θ with respect to a horizontal direction (or a widthwise direction) X of the display apparatus. The inclined angle θ of each of the bent portions 553*a* and 554*a* according to some embodiments of the present disclosure may vary based on a degree to which a standing wave is suppressed, and for example, may be set to vary within a range of 10 degrees to 30 degrees. For example, when the vibration device 530 outputs a sound of a low-pitched sound band or an output of the vibration device 530 is large, the bent portions 553*a* and 554*a* may have a relatively large inclined angle θ. For example, when the vibration device 530 outputs a sound of a high-pitched sound band or an output of the vibration device 530 is small, the bent portions 553*a* and 554*a* may have a relatively small inclined angle θ.

The third and fourth connection parts 553 and 554 may have a left-right symmetrical structure with respect to the bent portions 553*a* and 554*a*. The bent portions 553*a* and 554*a* may have an open structure on the extension line EL of the center portion of the vibration device 530, but is not limited thereto and may have a V-shaped closed structure. When the bent portions 553*a* and 554*a* have the open structure on the extension line EL of the center portion of the vibration device 530, the material cost may be reduced compared to the closed structure. Also, according to a sound characteristic experiment, in a case where the bent portions 553*a* and 554*a* have the open structure on the extension line EL of the center portion of the vibration device 530 and a case where the bent portions 553*a* and 554*a* have the closed structure on the extension line EL, the inventors have confirmed that a sound characteristic difference is very small or there is no sound characteristic difference.

Moreover, the bent portions 553*a* and 554*a* may be identically or similarly applied to the first and second connection parts 551 and 552.

At least one of the first to fourth connection parts 551 to 554 may include at least one protrusion portions 555 and 556 facing the vibration device 530. For example, the at least one protrusion portions 555 and 556 may be respectively provided in the first and second connection parts 551 and 552 to face the center portion of the vibration device 530. The at least one protrusion portions 555 and 556 may trap a reflected wave and may decrease a peak or a dip phenomenon caused by a standing wave, thereby minimizing a phenomenon where a sound pressure is reduced.

Figure 5A:
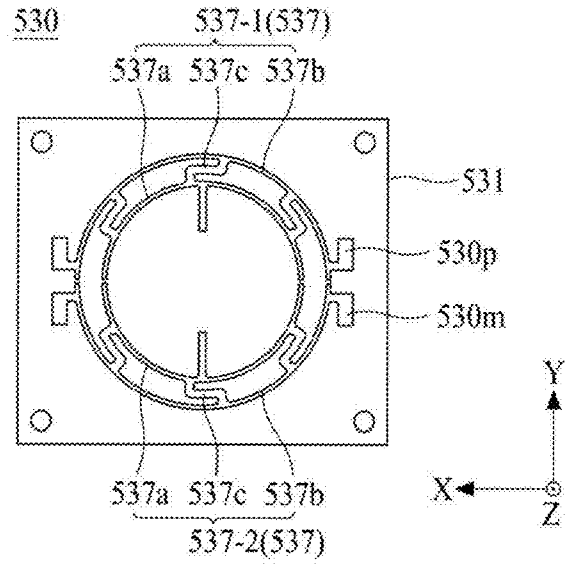
FIGS. 5A and 5B illustrate a damper structure of a vibration device according to an embodiment of the present disclosure.
Figure 5B:
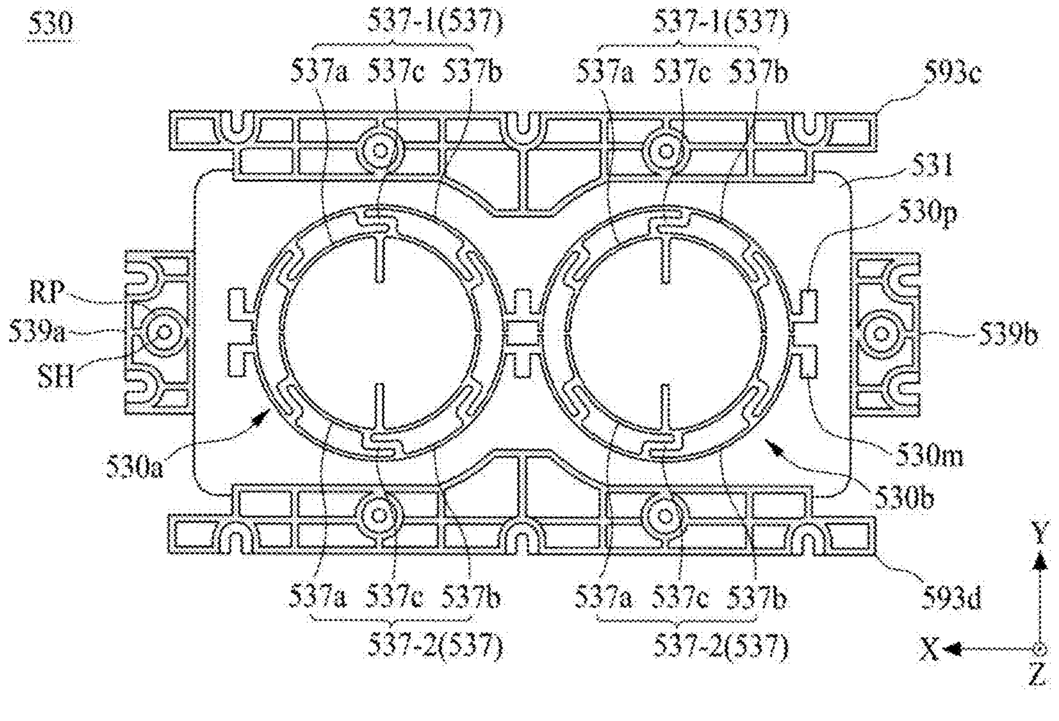

FIGS. 5A and 5B are diagrams for describing a damper structure of a vibration device according to an embodiment of the present disclosure.

FIG. 5A illustrates a vibration device having a single type structure, and FIG. 5B illustrates a vibration device having a twin type structure. The twin type structure may be referred to as a two-array structure. One vibration device according to the present disclosure may be configured in a two or more-array structure, and for example, may be configured in a four-array structure or a six-array structure.

With reference to FIGS. 3A to 3E and 5A, in a vibration device 530 according to an embodiment of the present disclosure, a damper 537 may be connected to a bobbin 534 and an edge frame 536 disposed on a base plate 531.

The damper 537 may be configured to act as a signal line or a signal wire, and thus, may include a first damper 537-1 which receives a positive power (or a positive voice signal) and a second damper 537-2 which receives a negative power (or a negative voice signal).

For example, the damper 537 may be vertically divided with respect to a widthwise direction X, and For example, with respect to a center line passing through a center portion of the bobbin 534 in the widthwise direction X, the first damper 537-1 may be disposed over the center line and the second damper 537-2 may be disposed under the center line. For example, the first damper 537-1 may be electrically connected to a first line terminal 530*p*, and the second damper 537-2 may be electrically connected to a second line terminal 530*m*. The line terminals may be referred to as line pads, but the terms are not limited thereto. For example, the first line terminal 530*p* may be a positive (+) terminal, and the second line terminal 530*m* may be a negative (−) terminal.

According to some embodiments of the present disclosure, each of the first damper 537-1 and the second damper 537-2 may include an inner portion 537*a*, an outer portion 537*b*, and a plurality of damping portions 537*c*.

The inner portion 537*a* may have a semicircular shape (or an oval shape), and may be coupled or connected to the bobbin 534. For example, a center portion of the inner portion 537*a* having a semicircular shape (or an oval shape). The inner portions 537*a* of the first damper 537-1 and the second damper 537-2 may be spaced apart (or separated) from each other on the center line passing through the center portion of the bobbin 534 in the widthwise direction X, and thus, may be electrically disconnected from each other.

The outer portion 537*b* may have a semicircular shape (or an oval shape) to surround the inner portion 537*a*, and may be disposed at or coupled to the edge frame 536. For example, a center portion of the outer portion 537*b* having a semicircular shape (or an oval shape) may be the same as the center portion of the bobbin 534. The outer portions 537*b* of the first damper 537-1 and the second damper 537-2 may be spaced apart (or separated) from each other on the center line passing through the center portion of the bobbin 534 in the widthwise direction X, and thus, may be electrically disconnected from each other.

Each of the plurality of damping portions 537*c* may be connected between the inner portion 537*a* and the outer portion 537*b* to have a certain interval or distance (or an equal interval). Each of the plurality of damping portions 537*c* according to some embodiments of the present disclosure may have an S-shape or a zigzag shape. Each of the plurality of damping portions 537*c* may be contracted and relaxed based on a vertical motion of the inner portion 537*a* based on a vertical motion of the bobbin 534 to control a vibration of the bobbin 534. For example, each of the plurality of damping portions 537*c* may have a length which is relatively longer than a shortest distance between the edge frame 536 and the bobbin 534, and thus, a length of the damper 537 may be set to be long, for decreasing a thickness of the vibration device 530 and enhancing performance of a magnet 532.

According to some embodiments of the present disclosure, one end or one portion of each of the plurality of damping portions 537*c* may be connected to the inner portion 537*a*. For example, a connection portion between the one end or one portion of each of the plurality of damping portions 537*c* and the inner portion 537*a* may be rounded in a curve shape, and thus, each of the damping portions 537*c* may be prevented from being torn by a vertical motion of a corresponding damping portion 537*c*.

With reference to FIGS. 3A to 3E and 5B, a vibration device 530 according to another embodiment of the present disclosure may include two sub vibration devices 530*a* and 530*b* disposed on a base plate 531. A vibration device 530 including the two sub vibration devices 530*a* and 530*b* may be referred to as a twin type vibration device, but the term is not limited thereto.

In twin type vibration device 530, dampers 537 of the two sub vibration devices 530*a* and 530*b* may be connected to each other in parallel. The damper 537 of each of the two sub vibration devices 530*a* and 530*b* may be configured to act as a signal line or a signal wire, and thus, may include a first damper 537-1 which receives a positive power (or a positive voice signal) and a second damper 537-2 which receives a negative power (or a negative voice signal).

According to some embodiments of the present disclosure, the damper 537 of each of the two sub vibration devices 530*a* and 530*b* may be vertically divided with respect to a widthwise direction X, and For example, with respect to a center line passing through a center portion of the bobbin 534 in the widthwise direction X, the first damper 537-1 may be disposed over the center line and the second damper 537-2 may be disposed under portion of the center line. For example, the first damper 537-1 may be electrically connected to a first line terminal 530*p*, and the second damper 537-2 may be electrically connected to a second line terminal 530*m*.

According to some embodiments of the present disclosure, each of the first damper 537-1 and the second damper 537-2 may include an inner portion 537*a*, an outer portion 537*b*, and a plurality of damping portions 537*c*. A description of each of the first damper 537-1 and the second damper 537-2 is the same as description given above with reference to FIG. 5A, and thus, a repetitive description is omitted.

The first dampers 537-1 of the two sub vibration devices 530*a* and 530*b* may be electrically connected to each other in a center region of the base plate 531, and the second dampers 537-2 of the two sub vibration devices 530*a* and 530*b* may be electrically connected to each other in the center region of the base plate 531. Accordingly, the dampers 537 of the two sub vibration devices 530*a* and 530*b* may be connected to each other in parallel.

In the vibration device 530 according to another embodiment of the present disclosure, each of the first line terminal 530*p* and the second line terminal 530*m* may be electrically connected to an audio amplifier (or an audio processor) through a signal cable (or a signal transfer member). Accordingly, a position of each of the first line terminal 530*p* and the second line terminal 530*m* exposed at the base plate 531 may be changed to a corner portion of the base plate 531, for an easy electrical connection to the signal cable.

The vibration device 530 according to another embodiment of the present disclosure may further include first to fourth brackets 539*a* to 539*d*.

Each of the first to fourth brackets 539*a* to 539*d* may be disposed on or coupled to a corresponding side surface of the base plate 531. For example, the first bracket 539*a* may be disposed on a first side surface (or a first short side) of the base plate 531, and the second bracket 539*b* may be disposed on a second side surface (or a second short side) of the base plate 531. The third bracket 539*c* may be disposed on a third side surface (or a first long side) of the base plate 531, and the fourth bracket 539*d* may be disposed on a fourth side surface (or a second long side) of the base plate 531.

Each of the first to fourth brackets 539*a* to 539*d* may be fixed to the module structure 510 by the module integration member 520, and thus, the base plate 531 may be disposed on or fixed to the module structure 510.

For example, each of the first to fourth brackets 539*a* to 539*d* may be fixed to or disposed at the module structure 510 by using the module integration member 520 such as a double-sided tape. For example, one surface of each of the first to fourth brackets 539*a* to 539*d* facing the module structure 510 may be provided in a flat surface structure, for increasing an adhesive area with the double-sided tape.

As another example, each of the first to fourth brackets 539*a* to 539*d* may be fixed to or disposed at the module structure 510 by using the module integration member 520 such as an adhesive (or a bond). For example, the one surface of each of the first to fourth brackets 539*a* to 539*d* facing the module structure 510 may be provided in a concave-convex structure including a plurality of rib patterns RP for controlling a flow of the adhesive and preventing an overflow of the adhesive.

As another example, each of the first to fourth brackets 539*a* to 539*d* may be fixed to or disposed at the module structure 510 by using the module integration member 520 such as a plurality of screws. For example, each of the first to fourth brackets 539*a* to 539*d* facing the module structure 510 may include at least one hole SH through which at least one screw passes.

Each of the first to fourth brackets 539*a* to 539*d* may fundamentally include the at least one hole SH, and for compatibility based on a modularization process performed between the vibration device 530 and the module structure 510 by using the module integration member 520, the one surface of each of the first to fourth brackets 539*a* to 539*d* may include a flat surface structure or a concave-convex structure.

Figure 6:
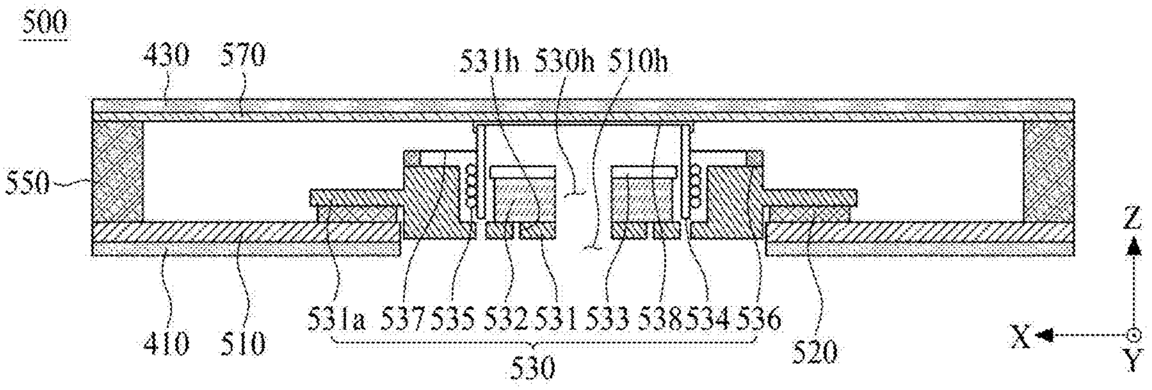
FIG. 6 illustrates a sound generating module according to another embodiment of the present disclosure.

FIG. 6 illustrates a sound generating module according to another embodiment of the present disclosure.

FIG. 6 illustrates an embodiment where a heat dissipation structure is added to the sound generating module illustrated in FIGS. 3A to 3E. Hereinafter, therefore, descriptions of the same elements other than elements relevant to a heat dissipation structure of a sound generating module will be briefly given or are omitted.

With reference to FIGS. 2 and 6, a sound generating module 500 according to another embodiment of the present disclosure may include a module structure 510 and a vibration device 530.

The module structure 510 may be a base structure of the sound generating module 500 and may be disposed at or fixed to a rear cover 300 by using a first member 410. The module structure 510 may include a groove 510*h* overlapping the vibration device 530.

The groove 510*h* may be formed to vertically pass through the module structure 510 in a vertical direction Z and may expose a rear surface of the vibration device 530 at the rear cover 300. For example, the groove 510*h* may have a circular, oval, or polygonal shape, but is not limited thereto. The groove 510*h* may be referred to as a through hole or a hole, but the term is not limited thereto.

The groove 510*h* according to an embodiment of the present disclosure may have a size which is less than that of the rear surface of the vibration device 530. For example, the groove 510*h* according to an embodiment of the present disclosure may be a heat dissipation path through which heat occurring in the vibration device 530 travels toward the rear cover 300.

According to another embodiment of the present disclosure, the groove 510*h* may have a size which enables a portion of the rear surface of the vibration device 530 to be accommodated or inserted thereinto. For example, the groove 510*h* may be an accommodating hole which accommodates a portion of the rear surface of the vibration device 530, and moreover, may be a heat dissipation path through which heat occurring in the vibration device 530 travels toward the rear cover 300. Also, the groove 510*h* according to another embodiment of the present disclosure may decrease a distance between the rear surface of the vibration device 530 and the rear cover 300 to increase heat dissipation efficiency.

Except for that the module structure 510 further includes the groove 510*h*, the other structure is the same as the module structure illustrated in FIGS. 3A to 3E, and thus, its repetitive description may be omitted.

The vibration device 530 may be provided as one body with or disposed at the module structure 510 by using a module integration member 520 to overlap the groove 510*h* of the module structure 510. The vibration device 530 may include an actuator (or an exciter) disposed to contact a rear surface of the display module 100. For example, the vibration device 530 including the actuator may include a base plate 531, a magnet 532, a center pole 533, a bobbin 534, a coil 535, an edge frame 536, a damper 537, and a hollow portion 530*h*.

The elements, other than the base plate 531 and the hollow portion 530*h*, of the vibration device 530 are the same as those of the vibration device illustrated in FIGS. 3A to 3E, and thus, their repetitive descriptions are omitted.

A rear surface of the base plate 531 according to an embodiment of the present disclosure may be disposed on the groove 510*h* of the module structure 510. For example, when the groove 510*h* of the module structure 510 has a size which is less than that of the base plate 531, a rearmost surface of the base plate 531 may be stably placed at the module structure 510 and may be disposed on the groove 510*h*.

According to another embodiment of the present disclosure, the rear surface of the base plate 531 may be inserted or accommodated into the groove 510*h* of the module structure 510. For example, when the groove 510*h* of the module structure 510 has a size which is equal to or greater than that of the base plate 531, a portion of the rear surface of the base plate 531 may be inserted or accommodated into the groove 510*h* of the module structure 510. For example, the rearmost surface of the base plate 531 may not be protruded at the outside of the rearmost surface of the module structure 510 through the groove 510*h* of the module structure 510, and may be disposed in the groove 510*h* of the module structure 510. Accordingly, a thickness of the sound generating module 500 may decrease by an accommodation height (or depth) or an insertion height (or depth) of the base plate 531 accommodated or inserted into the groove 510*h* of the module structure 510, and thus, the sound generating module may be slimmed.

At least one of an extension portion 531*a* of the base plate 531 (or brackets 539*a* to 539*d*) and a module integration member 520 may be implemented so that a portion of the rear surface of the base plate 531 is accommodated or inserted into the groove 510*h* of the module structure 510. For example, the extension portion 531*a* of the base plate 531 (or the brackets 539*a* to 539*d*) may have a relatively thin thickness or extend from an upper surface of the base plate 531 maximally spaced part from the rear surface of the base plate 531, so that a portion of the rear surface of the base plate 531 is accommodated or inserted into the groove 510*h* of the module structure 510. Also, a thickness of the module integration member 520 may be adjusted within a range which enables some portion of the rear surface of the base plate 531 to be accommodated or inserted into the groove 510*h* of the module structure 510.

The hollow portion 530*h* may pass through each of the base plate 531, the magnet 532, and the center pole 533 in a vertical direction Z to overlap the groove 510*h* of the module structure 510. The hollow portion 530*h* may be a heat dissipation path through which heat occurring due to driving of the vibration device 530 is dissipated toward the rear cover 300, may increase a sound pressure based on driving of the vibration device 530, and may decrease a weight of the vibration device 530. Also, when a vibration space provided in the connection member 550 is sealed, a sound pressure generated based on driving of the vibration device 530 may be insufficient due to a limited sealed space, but since the vibration space communicates with the outside through the hollow portion 530*h*, a sound pressure which is generated in the vibration space based on the driving of the vibration device 530 may increase.

According to some embodiments of the present disclosure, the vibration device 530 may further include a plurality of plate holes 531*h* which are provided in the base plate 531 and overlap the groove 510*h* of the module structure 510. The plurality of plate holes 531*h* may pass through the base plate 531 in the vertical direction Z, and thus, may overlap at least one of the bobbin 534 and the magnet 532. For example, there may be a possibility that the plate hole 531*h* overlapping the magnet 532 is plugged in a process of manufacturing the vibration device 530, and thus, the plate hole 531*h* may be provided in the base plate 531 overlapping the bobbin 534. For example, each of the plurality of plate holes 531*h* may be radially provided in the rear surface of the base plate 531, but is not limited thereto. The plate hole 531*h* may be referred to as a vent hole, but the term is not limited thereto. The plurality of plate holes 531*h* may additionally dissipate heat occurring in the vibration device 530.

Therefore, the sound generating module 500 according to another embodiment of the present disclosure may include the groove 510*h* provided in the module structure 510 and the hollow portion 530*h* and the plate hole 531*h* which are provided in the vibration device 530, thereby enhancing a heat dissipation function and increasing a sound pressure which is generated in a vibration space based on the driving of the vibration device 530.

Figure 7:
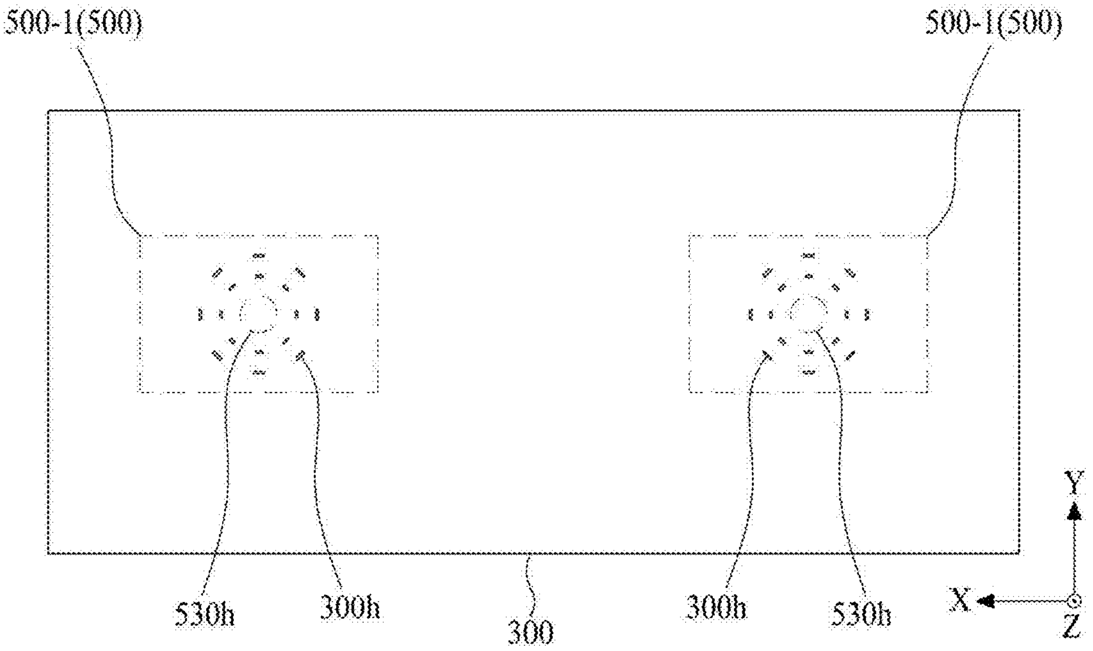
FIG. 7 illustrates a rear cover covering a rear surface of the sound generating module according to another embodiment illustrated in FIG. 6.

FIG. 7 illustrates a rear cover covering a rear surface of the sound generating module according to another embodiment of the present disclosure illustrated in FIG. 6.

FIG. 7 illustrates an embodiment where a plurality of holes (or vent holes) are additionally provided in a rear cover overlapping a sound generating module. Hereinafter, therefore, descriptions of the same elements other than elements relevant to a plurality of holes will be briefly given or are omitted.

With reference to FIGS. 2, 6, and 7, a rear cover 300 according to another embodiment of the present disclosure may include a plurality of holes 300*h* overlapping a sound generating module 500.

Each of the plurality of holes 300*h* may be provided to vertically pass through all of a second rear cover 350 and a first rear cover 310 of the rear cover 300 in a thickness direction Z, and may overlap the vibration device 530.

The plurality of holes 300*h* may be radially disposed to overlap the hollow portion 530*h* provided in the vibration device 530. The plurality of holes 300*h* according to some embodiments of the present disclosure may be radially arranged at certain intervals or distances (or equal intervals) with respect to a center portion of the hollow portion 530*h* provided in the vibration device 530. For example, the plurality of holes 300*h* may be arranged at certain intervals on respective circumferences of a plurality of concentric circles which form a concentric shape along with the hollow portion 530*h* provided in the vibration device 530.

According to some embodiments of the present disclosure, each of the plurality of holes 300*h* may have a certain width and a certain length, which are set within a range which does not decrease a clean back design of a display apparatus. When each of the plurality of holes 300*h* has a hole shape or a line shape having a size capable of being easily seen in the rear cover 300, the clean back design of the display apparatus may not be implemented. Therefore, each of the plurality of holes 300*h* may have a size which enables the external air of the display apparatus to flow in or out through the sound generating module 500 or the hollow portion 530*h* provided in the vibration device 530, and thus, the clean back design of the display apparatus may not be reduced.

Figure 8:
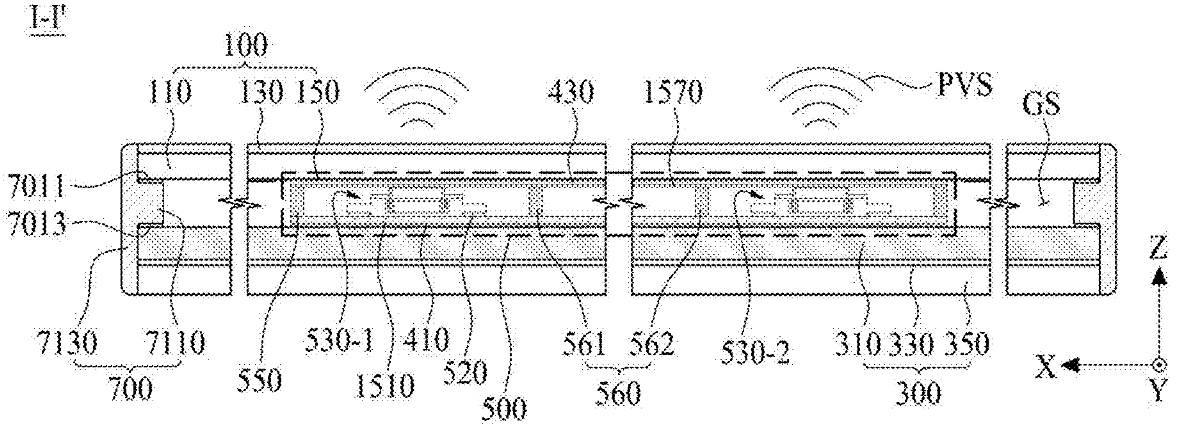
FIG. 8 is another cross-sectional view taken along line I-I' illustrated in FIG. 1.

FIG. 8 is another schematic cross-sectional view taken along line I-I' illustrated in FIG. 1 and illustrates a display apparatus according to another embodiment of the present disclosure.

With reference to FIGS. 1 and 8, the display apparatus according to another embodiment of the present disclosure may include one sound generating module 500 between a display module 100 and a rear cover 300.

The display module 100 and the rear cover 300 are the same as the display module and the rear cover illustrated in FIGS. 2 and 3A to 3E, and thus, their repetitive descriptions are omitted.

The one sound generating module 500 may be configured by modularizing the first and second sound generating modules 500-1 and 500-2 of FIGS. 2 and 3A to 3E as one element.

According to some embodiments of the present disclosure, the one sound generating module 500 may include a module structure 1510, a first vibration device 530-1, and a second vibration device 530-2.

The module structure 1510 may be disposed at or fixed to the rear cover 300 by using a first member 410 (or a first module fixing member). A rear surface of the module structure 1510 may be fully covered by the rear cover 300, and thus, may be concealed without being directly exposed at an outermost rear surface of a display apparatus. Except for that the module structure 510 of each of the first and second sound generating modules 500-1 and 500-2 of FIGS. 2 and 3A to 3E is configured in one plate structure, the module structure 1510 is the same as the module structure illustrated in FIGS. 2 and 3A to 3E, and thus, its repetitive description is omitted.

The first vibration device 530-1 may be disposed in or fixed to a first region of the module structure 1510, and may vibrate the display module 100 (for example, a first region (or a left region) of a display panel 110). For example, by using a module integration member 520, the first vibration device 530-1 may be disposed in or fixed to the first region of the module structure 1510 or may be provided as one body with the module structure 1510. According to some embodiments of the present disclosure, the first vibration device 530-1 may be disposed at a center portion of the first region of the module structure 1510, or may be disposed close to an edge or periphery portion of the first region of the module structure 1510.

The second vibration device 530-2 may be disposed in or fixed to a second region of the module structure 1510, and may vibrate the display module 100 (for example, a second region (or a right region) of the display panel 110). For example, by using the module integration member 520, the second vibration device 530-2 may be disposed in or fixed to the second region of the module structure 1510 or may be provided as one body with the module structure 1510. According to some embodiments of the present disclosure, the second vibration device 530-2 may be disposed at a center portion of the second region of the module structure 1510, or may be disposed close to an edge or periphery portion of the second region of the module structure 1510. For example, the second vibration device 530-2 may be disposed to be symmetrical with the first vibration device 530-1 with respect to a center portion of the module structure 1510.

Except for that each of the first and second vibration devices 530-1 and 530-2 is disposed a single module structure 1510, each of the first and second vibration devices 530-1 and 530-2 is the same as the vibration device illustrated in FIGS. 2 and 3A to 3E, and thus, its repetitive description is omitted. Also, each of the first and second vibration devices 530-1 and 530-2 may have the single type structure illustrated in FIG. 5A, but is not limited thereto, and may have the twin type structure illustrated in FIG. 5B.

The one sound generating module 500 illustrated in FIG. 8 is illustrated as including two vibration devices 530-1 and 530-2, but is not limited thereto, and may include three or more vibration devices. In a case which includes three or more vibration devices, a three or more-channel stereo sound PVS may be output based on a vibration of each of the three or more vibration devices embedded into the one sound generating module 500.

The one sound generating module 500 may further include a connection member 550 and a partition member 560.

The connection member 550 may be disposed between the module structure 1510 and the display module 100. For example, the connection member 550 may be disposed between an edge or periphery portion of the module structure 1510 and the display module 100. For example, the connection member 550 may be configured to wholly surround the plurality of vibration devices 530-1 and 530-2 disposed on or fixed to the module structure 1510.

The partition member 560 may be disposed between the plurality of vibration devices 530-1 and 530-2 disposed on or fixed to the module structure 1510 and may spatially separate the first region and the second region of the module structure 1510. For example, the partition member 560 may include first and second partitions 561 and 562 which are disposed in parallel in a center region between the first region and the second region of the module structure 1510. The first and second partitions 561 and 562 may decrease an influence of a sound characteristic caused by a resonance frequency difference of a middle-high-pitched sound, based on a vibration generated in each of the first region and the second region of the module structure 1510, in the display module 100 (for example, the first and second regions of the display panel 110).

The one sound generating module 500 may further include a vibration transfer member 1570 and a second member 430.

The vibration transfer member 1570 may be disposed at or coupled to the connection member 550, the partition member 560, and each of the plurality of vibration devices 530-1 and 530-2 and may vibrate based on a vibration of each of the plurality of vibration devices 530-1 and 530-2 to transfer the vibration of each of the plurality of vibration devices 530-1 and 530-2 to the display module 100 (for example, the display panel 110). Except for that the vibration transfer member 1570 is additionally coupled to the partition member 560 and each of the plurality of vibration devices 530-1 and 530-2, the vibration transfer member 1570 is the same as the vibration device illustrated in FIGS. 2 and 3A to 3E, and thus, its repetitive description is omitted.

The second member 430 may be a double-sided adhesive member disposed between the display module 100 and the vibration transfer member 570. The double-sided adhesive member may be a double-sided tape or a double-sided foam tape, but is not limited thereto. The second member 430 is the same as the second member 430 illustrated in FIGS. 3A to 3E, and thus, its repetitive description is omitted.

Therefore, the display apparatus according to another embodiment of the present disclosure may include the one sound generating module 500 where the one module structure 1510 and plurality of vibration devices 530-1 and 530-2 are modularized as one element, and thus, assemblability or assembling of the sound generating module 500 may be more improved in a process of assembling modules, thereby enhancing a production yield ratio of display apparatuses.

Figure 9:
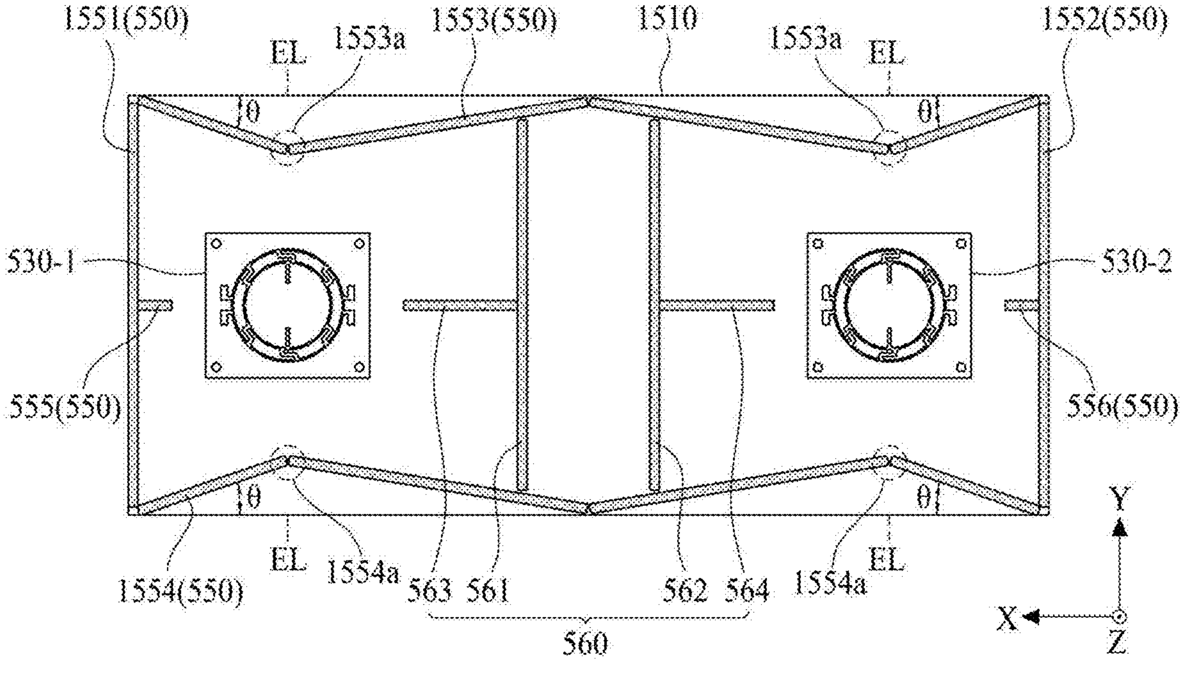
FIG. 9 illustrates a connection member and a partition member illustrated in FIGS. 3A to 3E.

FIG. 9 illustrates a connection member and a partition member illustrated in FIGS. 3A to 3E.

With reference to FIGS. 8 and 9, a connection member 550 according to an embodiment of the present disclosure may include first to fourth connection parts 1551 to 1554.

Each of the first to fourth connection parts 1551 to 1554 may be disposed between a front edge or periphery portion of the module structure 1510 and a display module 100, or may be disposed between the front edge or periphery portion of the module structure 1510 and the vibration transfer member 1570.

According to some embodiments of the present disclosure, each of the first to fourth connection parts 1551 to 1554 may have a line shape having a certain width and length.

According to some embodiments of the present disclosure, with respect to a plan view of the module structure 1510 illustrated in FIG. 9, the module structure 1510 may include a first front edge portion or a first front surface periphery portion (or a left side), a second front edge portion or a second front surface periphery portion (or a right side) parallel to the first front edge portion, a third front edge portion or a third front surface periphery portion (or an upper side) between one portion of the first front edge portion and one portion of the second front edge portion, and a fourth front edge portion or a fourth front surface periphery portion (or a lower side) parallel to the third front edge portion and between the other portion of the first front edge portion and the other portion of the second front edge portion.

The first connection part 1551 may be disposed at the first front edge portion of the module structure 1510, and the second connection part 1552 may be disposed at the second front edge portion of the module structure 1510. The third connection part 1553 may be disposed at the third front edge portion of the module structure 1510, and the fourth connection part 1554 may be disposed at the fourth front edge portion of the module structure 1510.

Each of the first to fourth connection parts 1551 to 1554 may have a structure which is separated from a corresponding corner of the module structure 1510. For example, each of the first to fourth connection parts 1551 to 1554 may have a tetragonal (e.g., quadrilateral) band shape which is not separated therefrom, and in this case, materials other than the connection member 550 among raw materials for forming the connection member 550 may be wasted, causing an increase in the material cost.

A portion of each of the first to fourth connection parts 1551 to 1554 may be disposed to contact an adjacent connection part of the first to fourth connection parts 1551 to 1554 at a corresponding corner of the module structure 1510, and thus, the external leakage of a sound wave generated in a vibration space defined by the connection member 550 may be minimized.

At least one of the first to fourth connection parts 1551 to 1554 may include a plurality of bent portions **1553*a* and 1554*a* facing the first and second vibration devices 530-1 and 530-2**.

Each of the plurality of bent portions **1553*a* and 1554*a* may be provided at a position, at which a level of each of the progressive wave and the reflected wave is highest, or in at least one connection part, which a strongest sound wave reaches, of the first to fourth connection parts 1551 to 1554. For example, each of the plurality of bent portions 1553*a* and 1554*a* may be disposed on an extension line EL of a center portion of each of the first and second vibration devices 530-1 and 530-2 to face the center portion of each of the first and second vibration devices 530-1 and 530-2**, thereby minimizing a phenomenon where a sound pressure is reduced by the standing wave.

According to some embodiments of the present disclosure, the plurality of bent portions 1553*a* and 1554*a* may be provided in the third and fourth connection parts 1553 and 1554. Also, the plurality of bent portions 1553*a* and 1554*a* may have a certain inclined angle θ with respect to a horizontal direction (or a widthwise direction) X of the display apparatus. The inclined angle θ of each of the plurality of bent portions 1553*a* and 1554*a* according to some embodiments of the present disclosure may vary based on a degree to which a standing wave is suppressed, and for example, may be set to vary within a range of 10 degrees to 30 degrees.

Each of the plurality of bent portions 1553*a* and 1554*a* may have an open structure on the extension line EL of the center portion of a corresponding vibration device of the first and second vibration devices 530-1 and 530-2, but is not limited thereto and may have a V-shaped closed structure.

Moreover, each of the plurality of bent portions 1553*a* and 1554*a* may be identically or similarly applied to at least one of the first and second connection parts 1551 and 1552.

At least one of the first to fourth connection parts 1551 to 1554 may include at least one protrusion portions 555 and 556 facing a corresponding vibration device of the first and second vibration devices 530-1 and 530-2. For example, the at least one protrusion portions 555 and 556 may be respectively provided in the first and second connection parts 1551 and 1552 to face the center portion of a corresponding vibration device of the first and second vibration devices 530-1 and 530-2. The at least one protrusion portions 555 and 556 may trap a reflected wave and may decrease a peak or a dip phenomenon caused by a standing wave, thereby minimizing a phenomenon where a sound pressure is reduced. The at least one protrusion portions 555 and 556 may be referred to as first protrusion portions, but the term is not limited thereto.

The partition member 560 may include first and second partitions 561 and 562 which are disposed in parallel in a center region between the first region and the second region of the module structure 1510.

Each of the first and second partitions 561 and 562 may be disposed between the third and fourth connection parts 1553 and 1554 in parallel with each of the first and second connection parts 1551 and 1552. For example, each of the first and second partitions 561 and 562 may have the same width as that of each of the first to fourth connection parts 1551 to 1554, but is not limited thereto.

An end of one portion of each of the first and second partitions 561 and 562 may get close to the third connection part 1553 in a state which contacts or does not contact the third connection part 1553. An end of the other portion of each of the first and second partitions 561 and 562 may get close to the fourth connection part 1554 in a state which contacts or does not contact the fourth connection part 1554. The first and second partitions 561 and 562 may decrease an influence of a sound characteristic caused by a resonance frequency difference of a middle-high-pitched sound, based on a vibration generated in each of the first region and the second region of the module structure 1510, in the display module 100 (for example, the first and second regions of the display panel 110).

The first and second partitions 561 and 562 according to some embodiments of the present disclosure may respectively include at least one second protrusion portions 563 and 564.

According to some embodiments of the present disclosure, the at least one second protrusion portion 563 in the first partition 561 may be provided in the first partition 561 to face a center portion of the first vibration device 530-1. The at least one second protrusion portion 564 in the second partition 562 may be provided in the second partition 562 to face a center portion of the second vibration device 530-2. The second protrusion portions 563 and 564 may have the same or different lengths as the first protrusion portions 555 and 556. For example, the second protrusion portions 563 and 564 may have a longer length than the first protrusion portions 555 and 556. The at least one protrusion portions 563 and 564 may trap a reflected wave and may decrease a peak or a dip phenomenon caused by a standing wave, thereby minimizing a phenomenon where a sound pressure is reduced.

Figure 10:
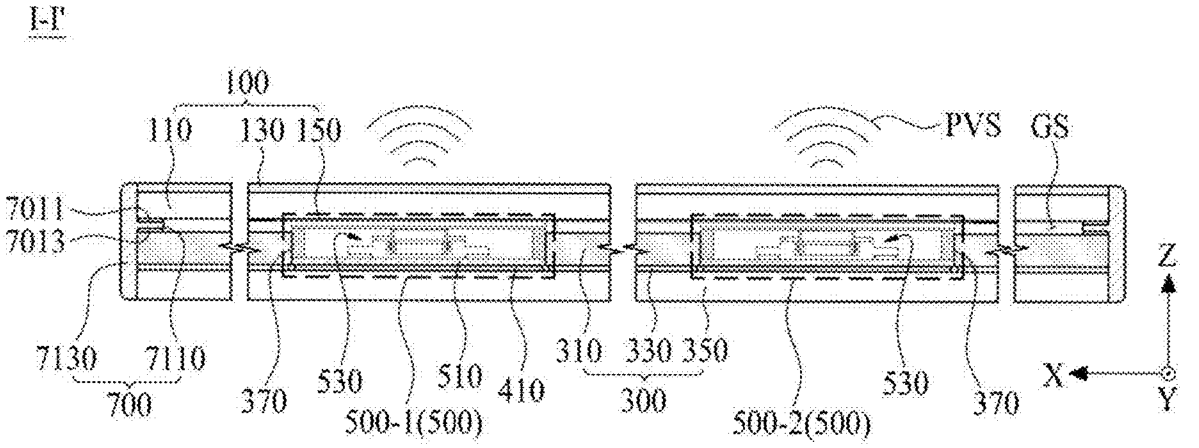
FIG. 10 is another cross-sectional view taken along line I-I' illustrated in FIG. 1.
Figure 11:
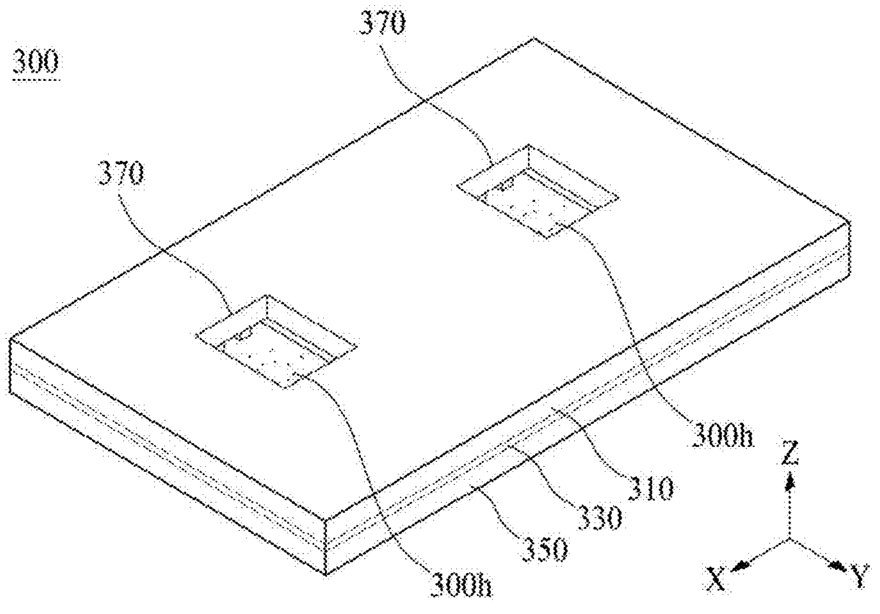
FIG. 11 illustrates a rear cover illustrated in FIG. 10.

FIG. 10 is another cross-sectional view taken along line IT illustrated in FIG. 1. FIG. 11 illustrates a rear cover illustrated in FIG. 10.

FIG. 10 illustrates an embodiment where a module accommodating part is additionally provided in a rear cover according to an embodiment of the present disclosure. Hereinafter, therefore, descriptions of the same elements other than a module accommodating part and elements relevant thereto will be briefly given or are omitted.

With reference to FIGS. 10 and 11, a rear cover 300 according to an embodiment of the present disclosure may further include at least one module accommodating part 370 with at least one sound generating module 500 accommodated thereinto.

The at least one module accommodating part 370 may be provided in a first rear cover 310 of the rear cover 300, and may be covered by a second rear cover 350. For example, the at least one module accommodating part 370 may be provided to vertically pass through the first rear cover 310 of the rear cover 300 in a thickness direction Z and may be covered by the second rear cover 350. To slim a thickness of a display apparatus and improve a clean back design of the display apparatus, the at least one module accommodating part 370 may be provided in only the first rear cover 310 without being provided in the second rear cover 350, and thus, may not be exposed at the outside of the rear cover 300. The at least one module accommodating part 370 may not completely pass through the rear cover 300, and thus, may be referred to as a module accommodating groove. The at least one module accommodating part 370 may be referred to as a module inserting part, a module inserting groove, a module receiving part, a module receiving groove, or a groove, but the term is not limited thereto.

According to some embodiments of the present disclosure, the rear cover 300 may include two module accommodating parts 370 which a first sound generating module 500-1 and a second sound generating module 500-2 are respectively accommodated into or disposed in.

According to some embodiments of the present disclosure, each of the two module accommodating parts 370 may have a size which enables a corresponding sound generating module 500 to be accommodated thereinto. Also, each of the two module accommodating parts 370 may have a height (or a depth) which is smaller than a total height of the sound generating module 500. Each of the two module accommodating parts 370 may be provided to pass through the first rear cover 310, and thus, a thickness of the first rear cover 310 may have a height (or a depth) which is smaller than a total height of the sound generating module 500. When a thickness of the first rear cover 310 is larger than a total height of the sound generating module 500, a height of a gap space GS disposed between the display module 100 and the rear cover 300 may be insufficient, and due to this, due to a physical contact between the first rear cover 310 and the display module 100 vibrating based on driving of the vibration device 530, a desired sound may not be generated or noise such as a frictional sound may occur. Therefore, a thickness of the first rear cover 310 or a height (or a depth) of the module accommodating part 370 may be set within a range for preventing the physical contact between the first rear cover 310 and the display module 100 vibrating based on driving of the vibration device 530.

According to some embodiments of the present disclosure, except for that the at least one sound generating module 500 is disposed on a rear surface of the display module 100 and is disposed at the second rear cover 350 exposed by the module accommodating part 370 by using the first member 410 (or a module fixing member), the at least one sound generating module 500 is the same as the sound generating module illustrated in FIGS. 2 to 5B, and thus, its repetitive description is omitted.

According to another embodiment of the present disclosure, the rear cover 300 may include one module accommodating part 370 which the one sound generating module 500 illustrated in FIGS. 8 and 9 is accommodated into and disposed in. For example, the one module accommodating part 370 may be provided to vertically pass through the first rear cover 310 of the rear cover 300 in a thickness direction Z, and may be covered by the second rear cover 350.

Therefore, in the display apparatus according to another embodiment of the present disclosure, since the at least one sound generating module 500 is accommodated into and disposed in the module accommodating part 370 in the rear cover 300, a thickness may decrease by a height (or a depth) of the module accommodating part 370 and a weight may decrease by a size of the module accommodating part 370. In the display apparatus according to another embodiment of the present disclosure, since the sound generating module 500 is accommodated into and disposed in the module accommodating part 370 in the rear cover 300, an assembly process between the sound generating module 500 and the rear cover 300 may be simplified.

As another example, the rear cover 300 may include a plurality of holes 300*h* overlapping the at least one module accommodating part 370.

Each of the plurality of holes 300*h* may be provided to vertically pass through the second rear cover 350 of the rear cover 300 in the thickness direction Z, and may be connected to (or communicate with) the at least one module accommodating part 370. The plurality of holes 300*h* may be radially disposed to overlap the sound generating module 500 accommodated into the at least one module accommodating part 370. For the clean back design of the display apparatus, the description of FIG. 7 may be identically applied to a shape and a size of each of the plurality of holes 300*h*, and thus, repetitive descriptions are omitted.

Figure 12:
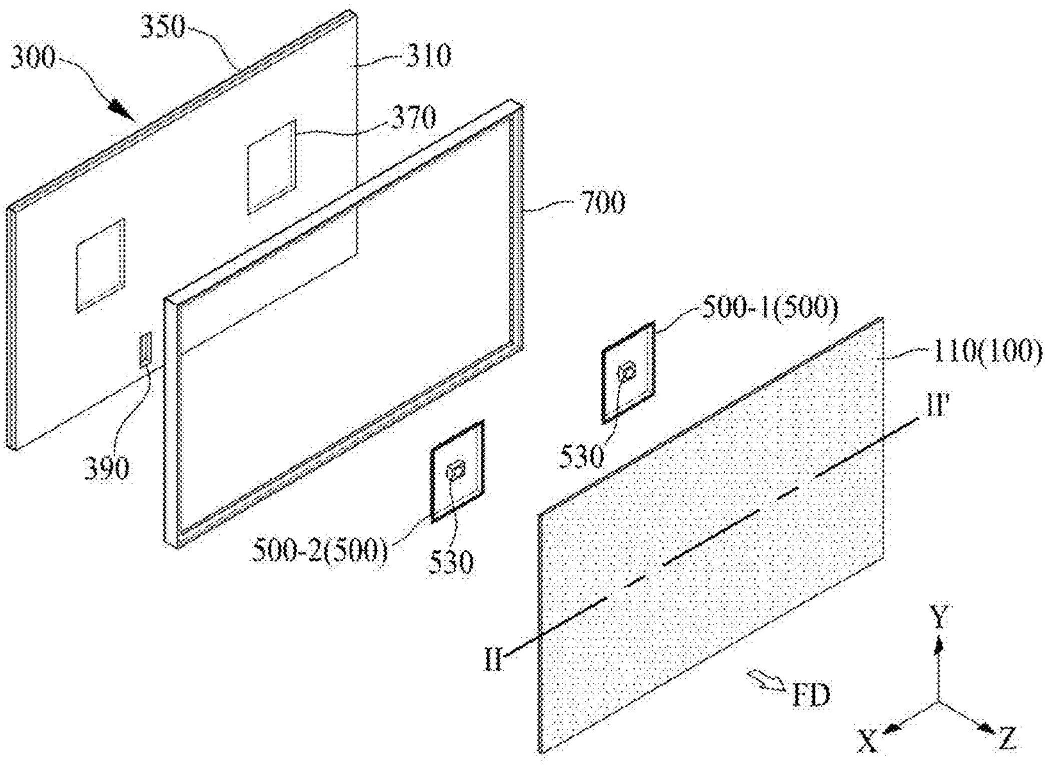
FIG. 12 illustrates a display apparatus according to another embodiment of the present disclosure.
Figure 13:
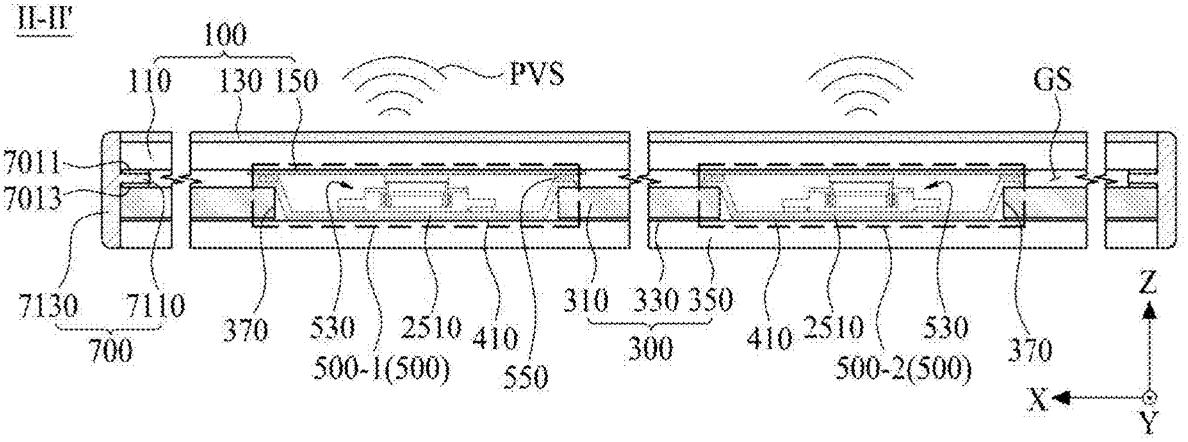
FIG. 13 is a cross-sectional view taken along line II-IF illustrated in FIG. 12.

FIG. 12 illustrates a display apparatus according to another embodiment of the present disclosure. FIG. 13 is a cross-sectional view taken along line II-II' illustrated in FIG. 12.

FIGS. 12 and 13 illustrate an embodiment where a structure of a sound generating module is modified in the display apparatus illustrated in FIGS. 10 and 11. Hereinafter, therefore, repetitive descriptions of elements other than a sound generating module will be briefly given or are omitted.

With reference to FIGS. 12 and 13, a display apparatus according to another embodiment of the present disclosure may include at least one sound generating module 500 which is disposed between a display module 100 and a rear cover 300 to vibrate the display module 100, and the at least one sound generating module 500 may be accommodated into and disposed in at least one module accommodating part 370 provided in the rear cover 300.

The at least one module accommodating part 370 in the rear cover 300 is the same as the module accommodating part illustrated in FIGS. 10 and 11, and thus, its repetitive description is omitted.

The at least one sound generating module 500 may be accommodated into and disposed in the at least one module accommodating part 370 provided in the rear cover 300 with being modularized as one element. The at least one sound generating module 500 according to some embodiments of the present disclosure may be accommodated into the at least one module accommodating part 370 provided in the first rear cover 310 of the rear cover 300, and may be supported by a front surface of the first rear cover 310. For example, the at least one sound generating module 500 may have a box structure where one side thereof is open and includes a border. The at least one sound generating module 500 may directly vibrate the display module 100 to generate a sound PVS based on a vibration of the display module 100 (for example, the display panel 110).

According to an embodiment of the present disclosure, a rear center portion of the sound generating module 500 may pass through the module accommodating part 370, and may be disposed at or fixed to the second rear cover 350 by using the first member 410 (or the module fixing member). A border portion or a boundary portion of the sound generating module 500 may be supported by (or stably placed on) a front surface of the first rear cover 310, and may be disposed on or coupled to the display module 100, for example, a rear surface of the display panel 110 by using a connection member 550, or may be disposed on or coupled to a rear surface of a heat diffusion member 150 disposed on a rearmost surface of the display module 100 by using a connection member 550.

According to another embodiment of the present disclosure, the sound generating module 500 may be disposed at or fixed to the second rear cover 350 by a plurality of screws. For example, the border portion or the boundary portion of the sound generating module 500 may be disposed at or fastened to the first rear cover 310 by a plurality of screws. For example, each of the plurality of screws may pass through the connection member 550 and the border portion of the sound generating module 500, and may be disposed at or fastened to the first rear cover 310.

According to another embodiment of the present disclosure, the sound generating module 500 may be disposed at or fixed to the second rear cover 350 by a bolt and a nut. The nut may be disposed on or fixed to a front surface of the first rear cover 310 overlapping the border portion of the sound generating module 500. The bolt may pass through the connection member 550 and the border portion of the sound generating module 500, and may be fastened to the nut. The nut according to an embodiment of the present disclosure may be a self-clinching nut fixed to the front surface of the first rear cover 310.

Therefore, in the display apparatus according to another embodiment of the present disclosure, since the at least one sound generating module 500 is accommodated into and disposed in the module accommodating part 370 provided in the rear cover 300, a thickness may decrease by a height (or a depth) of the module accommodating part 370 and a weight may decrease by a size of the module accommodating part 370. In the display apparatus according to another embodiment of the present disclosure, since the sound generating module 500 is accommodated into and disposed in the module accommodating part 370 disposed in the rear cover 300, an assembly process between the sound generating module 500 and the rear cover 300 may be simplified.

Figure 14:
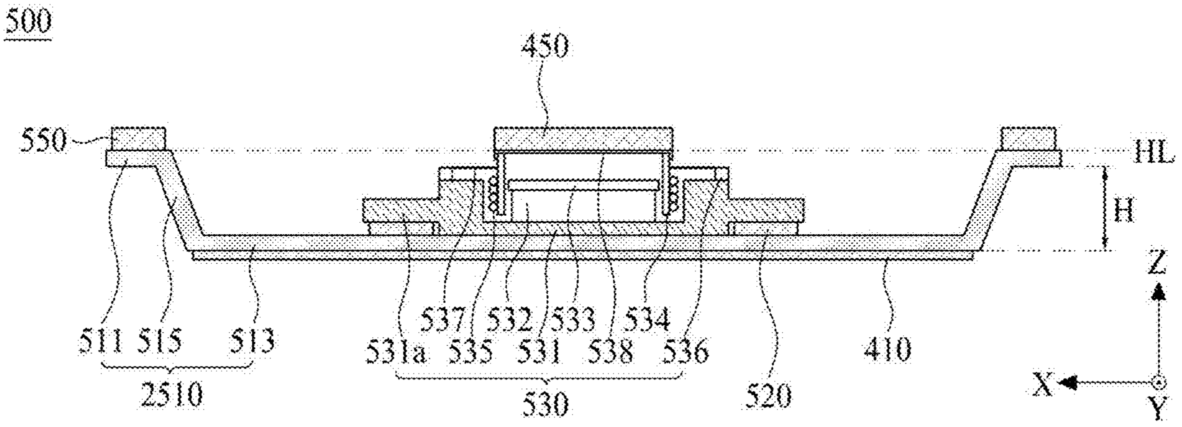
FIG. 14 illustrates a sound generating module illustrated in FIGS. 12 and 13.
Figure 15:
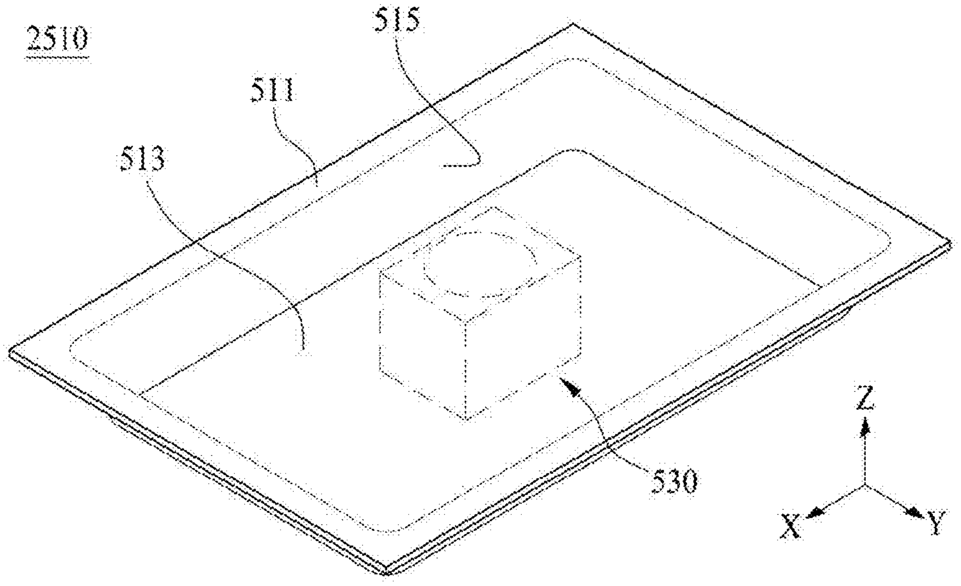
FIG. 15 illustrates a module structure illustrated in FIG. 14.

FIG. 14 illustrates a sound generating module illustrated in FIGS. 12 and 13. FIG. 15 illustrates a module structure illustrated in FIG. 14.

With reference to FIGS. 12 to 15, a sound generating module 500 according to another embodiment of the present disclosure may include a module structure 2510, a vibration device 530, a connection member 550, and a module adhesive member 450.

The module structure 2510 may be accommodated into and disposed in a module accommodating part 370 in a rear cover 300 and may fix (or support) the vibration device 530. According to some embodiments of the present disclosure, the module structure 2510 may include a forming-enabled metal material.

The module structure 2510 according to some embodiments of the present disclosure may include a border portion or a boundary portion 511, a bottom portion 513, and an inclined portion 515. The border portion 511, the bottom portion 513, and the inclined portion 515 may be respectively referred to as a first portion, a second portion, and a third portion, but the terms are not limited thereto.

The border portion 511 may have a tetragonal (e.g., quadrilateral) band shape, and may be supported by (or stably placed on) a front surface of the rear cover 300 adjacent to the module accommodating part 370, for example, a first rear cover 310. For example, the border portion 511 may be a border portion (or an edge or periphery portion or a boundary portion) of a metal plate which is a base member for forming the module structure 2510.

The bottom portion 513 may be disposed at or fixed to a second rear cover 350 of the rear cover 300 exposed by the module accommodating part 370. For example, the bottom portion 513 may pass through the module accommodating part 370, and may be disposed at or fixed to the second rear cover 350 by using a first member 410 (or a module fixing member).

The inclined portion 515 may be provided to be inclined between the border portion 511 and the bottom portion 513, and thus, may define a receiving space on the bottom portion 513. For example, the bottom portion 513 and the inclined portion 515 may have a structure where a portion other than a border portion of a metal plate protrudes toward the rear cover 300 by using a forming process using molding. The bottom portion 513 and the inclined portion 515 may be referred to as a receiving part, a forming part, or a pocket part for receiving the vibration device 530, but the terms are not limited thereto.

According to some embodiments of the present disclosure, a height H of the inclined portion 515 or a height H between a rear surface of the bottom portion 513 and a rear surface of the border portion 511 may be equal to or smaller than a height of the first rear cover 310. When the height H of the inclined portion 515 is larger than the height of the first rear cover 310, the border portion 511 may not stably be supported by a front surface of the first rear cover 310 and a portion of the inclined portion 515 and the border portion 511 may protrude upward from the front surface of the first rear cover 310, causing a problem where a portion of the inclined portion 515 and the border portion 511 vibrate based on a vibration of the display module 100. Therefore, the height H of the inclined portion 515 or the height H between the rear surface of the bottom portion 513 and the rear surface of the border portion 511 may be equal to or smaller than the height of the first rear cover 310 so that the border portion 511 is stably supported to (or stably placed on) the front surface of the first rear cover 310.

The vibration device 530 may be accommodated into a receiving space of the module structure 2510. The vibration device 530 according to some embodiments of the present disclosure may be disposed at or fixed to the bottom portion 513 of the module structure 2510 and may vibrate the display module 100 (for example, the display panel 110). By using a module integration member 520, the vibration device 530 may be disposed at or fixed to the module structure 2510 or may be provided as one body with the module structure 2510, and thus, the vibration device 530 and the module structure 2510 may be modularized as one element.

The vibration device 530 according to some embodiments of the present disclosure may include an arbitrary sound device or vibration generating device for vibrating the display module 100 based on an electrical signal. According to some embodiments of the present disclosure, the vibration device 530 may include an actuator (or an exciter) disposed to contact a rear surface of the display module 100. For example, the vibration device 530 including the actuator may include a base plate 531, a magnet 532, a center pole 533, a bobbin 534, a coil 535, an edge frame 536, and a damper 537. The elements are the same as those of the vibration device illustrated in FIGS. 2 to 5B, and thus, their repetitive descriptions are omitted.

An uppermost surface of the vibration device 530 according to some embodiments of the present disclosure may be disposed on the same uppermost surface extension line HL (or horizontal line) as the border portion 511 of the module structure 2510, or may protrude upward from an uppermost surface extension line of the border portion 511. For example, when the uppermost surface of the vibration device 530 is disposed under the uppermost surface extension line HL of the border portion 511 and is fully received into the receiving space of the module structure 2510, it may be difficult to couple or connect the vibration device 530 to the rear surface of the display module 100. Therefore, by using only a simple module disposition process, the uppermost surface of the vibration device 530 may protrude upward from the uppermost surface extension line HL of the border portion 511, for coupling or connecting the vibration device 530 to the rear surface of the display module 100.

The connection member 550 may be disposed between the border portion 511 of the module structure 2510 and the rear surface of the display module 100, and thus, a gap space GS may be provided between the rear surface of the display module 100 and the rear cover 300 and the module structure 2510 may be disposed on or coupled to the rear surface of the display module 100.

According to some embodiments of the present disclosure, one surface (or a front surface) of the connection member 550 may be disposed on or coupled to a rear surface of the heat diffusion member 150 coupled to the display module 100 (for example, the display panel 110 or the rear surface of the display panel 110), and the other surface (or a rear surface) of the connection member 550 may be disposed on or coupled to the border portion 511 of the module structure 2510. For example, the connection member 550 may be a double-sided tape or a double-sided foam tape, but is not limited thereto. The connection member 550 may provide a vibration space, surrounding the vibration device 530, between the module structure 2510 and the display module 100.

A module adhesive member 450 may be a double-sided adhesive member between the display module 100 and the vibration device 530. The double-sided adhesive member may be a double-sided tape or a double-sided foam tape, but is not limited thereto. One surface (or a front surface) of the module adhesive member 450 may be disposed on or coupled to the rear surface of the heat diffusion member 150 disposed in the display module 100 (for example, the display panel 110 or the rear surface of the display panel 110), and the other surface (or a rear surface) of the module adhesive member 450 may be disposed on or coupled to the bobbin 534 or the bobbin protection member 538 of the vibration device 530.

As another example, the heat diffusion member 150 coupled to or disposed on the rear surface of the display panel 110 may be provided as one body with the sound generating module 500. For example, the heat diffusion member 150 may be coupled to or disposed on each of the connection member 550 of the sound generating module 500 and the module adhesive member 450 to cover the front surface of the sound generating module 500, and thus, in a transfer process after a modularization process performed on the sound generating module 500 modularized as one element, each of the vibration device 530 and the connection member 550 of the sound generating module 500 and the module adhesive member 450 may be prevented from being externally exposed and penetration of particles such as dust into the sound generating module 500 may be prevented.

The sound generating module 500 according to another embodiment of the present disclosure may include a groove which is provided in the bottom portion 513 of the module structure 2510 to overlap the vibration device 530, a hollow portion which passes through each of the base plate 531, the magnet 532, and the center pole 533 of the vibration device 530 in a vertical direction Z to overlap the groove, and at least one of a plurality of plate holes which are provided in the base plate 531 to overlap each of the magnet 532 and the bobbin 534 of the vibration device 530. For example, the groove, the hollow portion, and each of the plurality of plate holes may substantially and respectively correspond to the groove **510*h* and the hollow portion 530*h* of the sound generating module 500 and each of the plurality of plate holes 531*h* illustrated in FIG. 6, and thus, their repetitive descriptions are omitted. For example, the groove 510*h* and the hollow portion 530*h* of the sound generating module 500 and each of the plurality of plate holes 531*h* illustrated in FIG. 6 may be identically or similarly applied to corresponding elements of sound generating module illustrated in FIG. 14**.

Figure 16A:
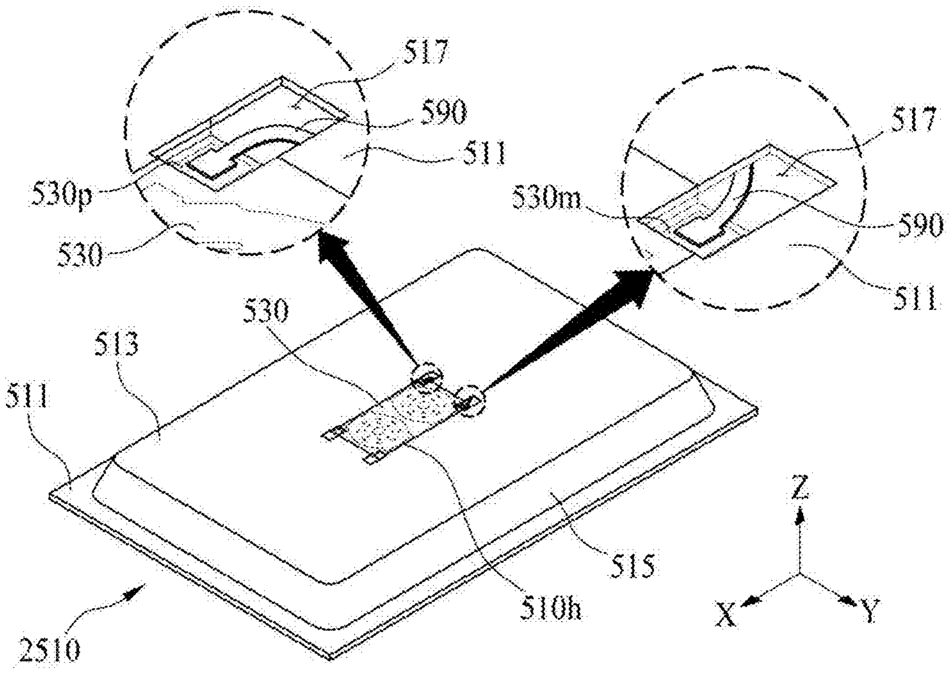
FIG. 16A illustrates a rear surface of a module structure of a sound generating module according to an embodiment of the present disclosure.
Figure 16B:
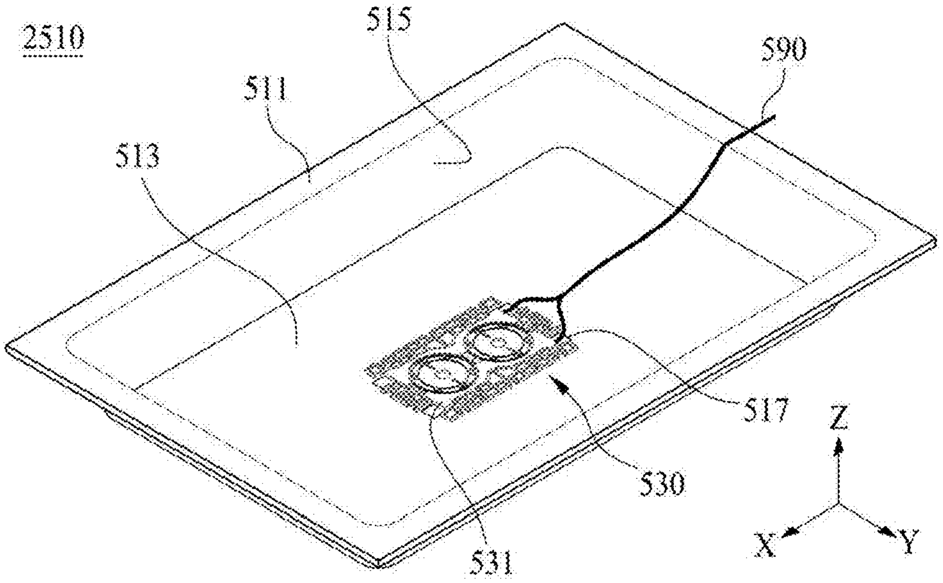
FIG. 16B illustrates a voice signal cable and a vibration device in a module structure of a sound generating module according to an embodiment of the present disclosure.

FIG. 16A illustrates a rear surface of a module structure of a sound generating module according to an embodiment of the present disclosure. FIG. 16B illustrates a voice signal cable and a vibration device disposed in a module structure of a sound generating module according to an embodiment of the present disclosure.

With reference to FIGS. 16A and 16B, a module structure 2510 according to an embodiment of the present disclosure may include a groove **510*h* and a plurality of cable holes 517** (or cable-through holes).

The groove **510*h* may be provided to pass through a bottom portion 513 of the module structure 2510 in a vertical direction Z to overlap a vibration device 530. The groove 510*h* may accommodate a portion of a rear surface of the vibration device 530. For example, the groove 510*h* may have a tetragonal (e.g., quadrilateral) shape corresponding to a base plate 531 of the vibration device 530, but is not limited thereto. For example, the groove 510*h*** may have a circular or oval shape.

The groove **510*h* according to some embodiments of the present disclosure may expose line terminals 530*p* and 530*m* of the vibration device 530 at a rear surface of the module structure 2510**.

Each of the plurality of cable holes 517 may extend from a corresponding corner portion of the groove **510*h* to have a certain size and shape and may communicate with the corresponding corner portion of the groove 510*h*. For example, each of the plurality of cable holes 517 may be a path through which a voice signal cable 590 electrically connected to the line terminals 530*p* and 530*m* of the vibration device 530 exposed at the groove 510*h* is unloaded to a receiving space of the module structure 2510. Therefore, the voice signal cable 590 may be electrically connected to the line terminals 530*p* and 530*m* of the vibration device 530 exposed at the groove 510*h* and then may be unloaded to the receiving space of the module structure 2510 through a corresponding cable hole 517, and the voice signal cable 590 unloaded to the receiving space of the module structure 2510 may be unloaded to the outside of the module structure 2510 via the bottom portion 513, the inclined portion 515, and the border portion 511 of the module structure 2510**.

The module structure 2510 according to an embodiment of the present disclosure may accommodate the voice signal cable 590 connected to the line terminals **530*p* and 530*m* of the vibration device 530, and thus, a defect such as a disconnection of the voice signal cable 590 may be prevented in a transfer process after a modularization process performed on the sound generating module 500** modularized as one element.

Figure 17:
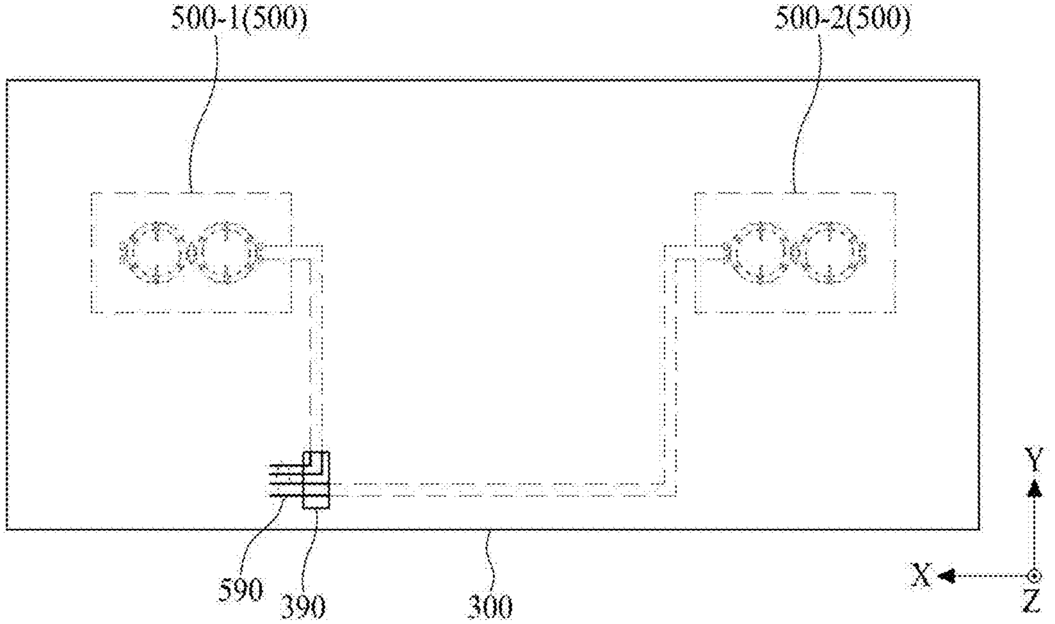
FIG. 17 illustrates a rear surface of a rear cover according to an embodiment of the present disclosure.

FIG. 17 illustrates a rear surface of a rear cover according to an embodiment of the present disclosure.

FIG. 17 is a diagram for describing a disposition structure of a voice signal cable through which a voice signal is applied to a sound generating module.

With reference to FIGS. 12 and 17, a voice signal cable 590 according to an embodiment of the present disclosure may be disposed between a display module 100 and a sound generating module 500 and may be unloaded to the outside through a cable unloading hole 390 provided in a rear cover 300.

According to some embodiments of the present disclosure, one end or one portion of the voice signal cable 590 may be electrically connected to a line terminal provided in a corresponding sound generating module 500. For example, the one end or one portion of the voice signal cable 590 may be electrically connected to the line terminal provided in the corresponding sound generating module 500 through soldering.

According to some embodiments of the present disclosure, the other end or the other portion of the voice signal cable 590 may be unloaded to the outside of a receiving space of a corresponding sound generating module 500 via the receiving space of the corresponding sound generating module 500 and a space between the display module 100 and the sound generating module 500, and then, may pass through the cable unloading hole 390 via a space between the display module 100 and the rear cover 300 and may be unloaded to the outside of a display apparatus. In FIG. 17, a portion of the voice signal cable 590 illustrated by a dotted line may be covered by the rear cover 300 and thus may not be seen from a rear surface of the rear cover 300, and the other portion of the voice signal cable 590 illustrated by a thick solid line may be unloaded to the outside of the display apparatus via the cable unloading hole 390 and thus may be seen from the rear surface of the rear cover 300. Also, the voice signal cable 590 unloaded through the cable unloading hole 390 may be covered by a circuit cover or a cover shield, which covers a circuit unit of the display apparatus.

Therefore, since the voice signal cable 590 and the sound generating module 500 are covered by the rear cover 300, the display apparatus according to an embodiment of the present disclosure may have a clean back design thereof.

Figure 18:
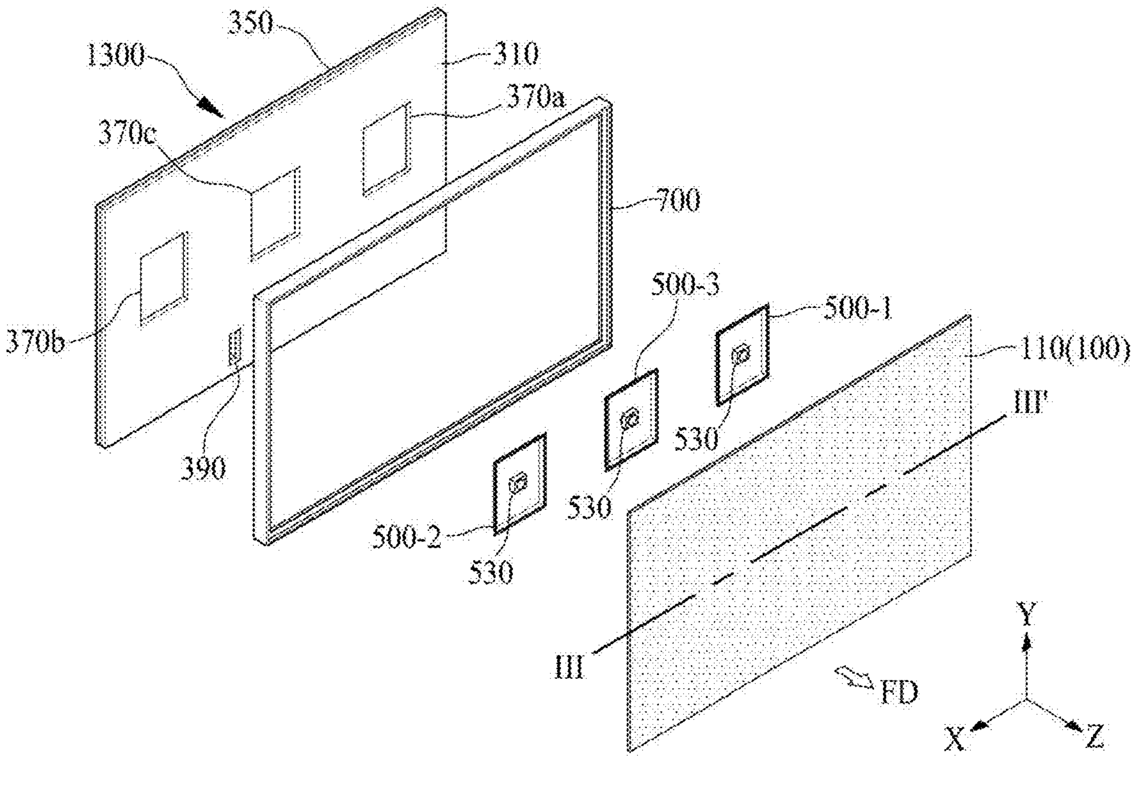
FIG. 18 illustrates a display apparatus according to another embodiment of the present disclosure.
Figure 19:
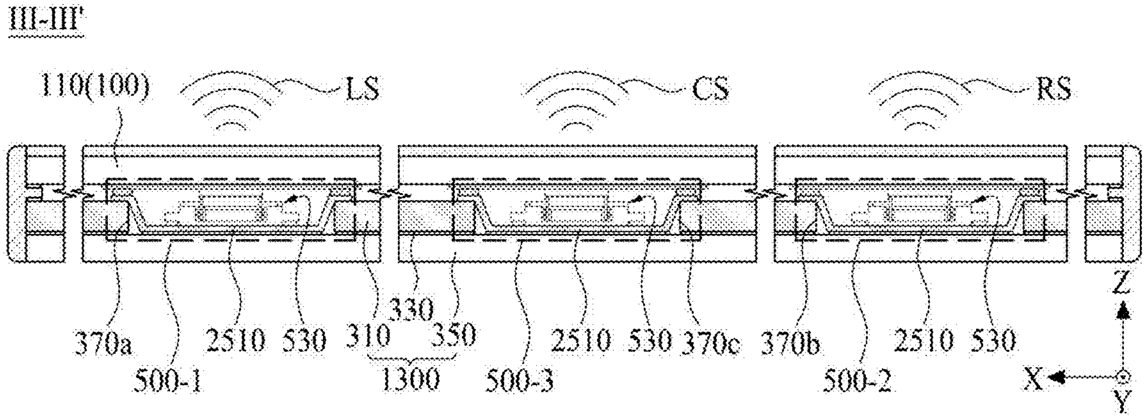
FIG. 19 is a cross-sectional view taken along line illustrated in FIG. 18.
Figure 20:
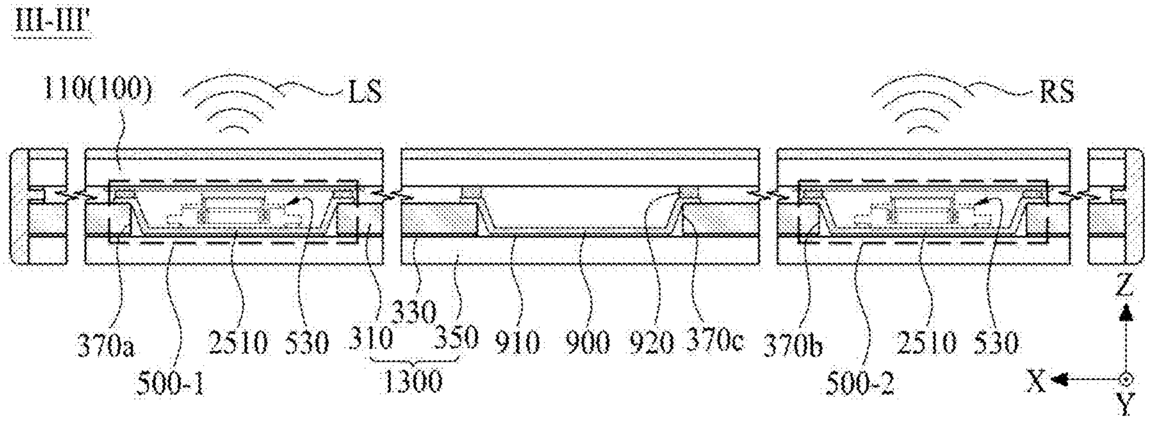
FIG. 20 is another cross-sectional view taken along line illustrated in FIG. 18.
Figure 21:
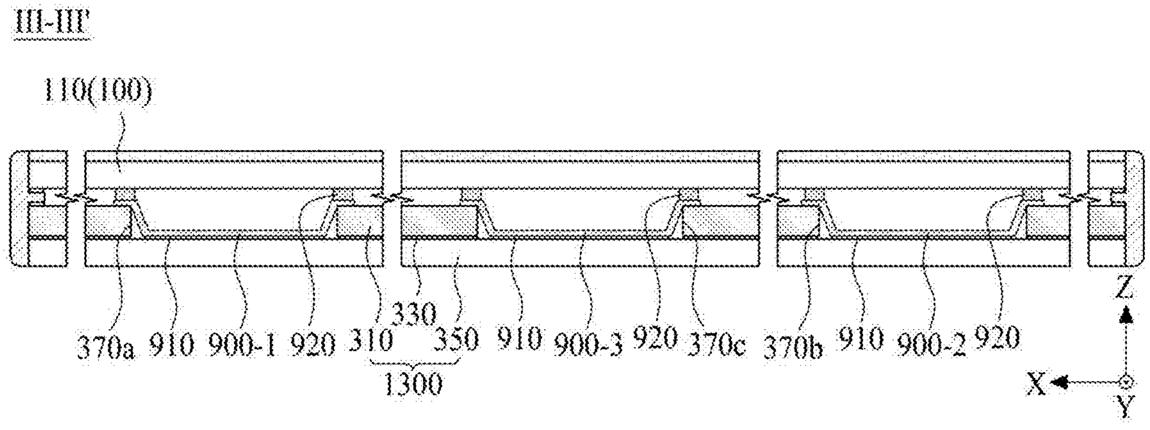
FIG. 21 is another cross-sectional view taken along line illustrated in FIG. 18.

FIG. 18 illustrates a display apparatus according to another embodiment of the present disclosure. FIG. 19 is a cross-sectional view taken along line illustrated in FIG. 18. FIG. 20 is another cross-sectional view taken along line illustrated in FIG. 18. FIG. 21 is another cross-sectional view taken along line illustrated in FIG. 18.

FIGS. 18 and 19 illustrate an embodiment where a structure of a rear cover according to an embodiment of the present disclosure is modified based on the display apparatus illustrated in FIGS. 12 to 17. Hereinafter, therefore, descriptions of the same elements other than a rear cover and elements relevant thereto will be briefly given or are omitted.

First, in the display apparatus illustrated in FIGS. 12 to 17, the rear cover 300 may include the plurality of module accommodating parts 370 into which the sound generating module 500 modularized as one element is accommodated or inserted. In a display apparatus having only one sound generating module 500 based on a finished product structure of the display apparatus, the rear cover 300 including only one module accommodating part 370 may be used. Also, in a display apparatus without the sound generating module 500 based on a finished product structure of the display apparatus, the rear cover 300 without module accommodating part 370 may be used. Much cost may be expended in manufacturing a rear cover corresponding to each finished product structure of a display apparatus, and due to this, the manufacturing cost of the display apparatus may increase. To solve such a problem, the display apparatus according to an embodiment of the present disclosure may include a rear cover which is used in common regardless of a finished product structure. For example, the display apparatus according to an embodiment of the present disclosure may include a rear cover which is used in common regardless of a display apparatus including no sound generating module 500 and a display apparatus including the sound generating module 500, and thus, the cost (for example, the molding cost) expended in manufacturing a rear cover based on a finished product structure of a display apparatus may be reduced, and by modularizing a sound generating module, a degree of freedom in the disposition or not of a sound generating module of a finished product may be enhanced.

With reference to FIGS. 18 and 19, a display apparatus according to another embodiment of the present disclosure may include first to third sound generating modules 500-1 to 500-3 disposed between a display module 100 and a rear cover 1300.

The display module 100 is the same as the display module illustrated in FIGS. 2 and 3A to 3E, and thus, its repetitive description is omitted.

The rear cover 1300 may be a common rear cover, and may include a plurality of module accommodating parts 370*a* to 370*c*. Each of the plurality of module accommodating parts 370 may be provided to pass through a first rear cover 310 of the rear cover 1300 in a vertical direction Z. For example, the rear cover 1300 may include a first module accommodating part 370*a* overlapping a first region (or a left region) of the display module 100, a second module accommodating part 370*b* overlapping a second region (or a right region) of the display module 100, and a third module accommodating part 370*c* overlapping a third region (or a center region) between the first region and the second region of the display module 100

The first to third sound generating modules 500-1, 500-2, and 500-3 may be respectively accommodated into and disposed in the plurality of module accommodating parts 370*a*, 370*b*, and 370*c*, and may respectively and individually vibrate the first to third regions of the display module 100 (for example, the display panel 110). Each of the first to third sound generating modules 500-1, 500-2, and 500-3 is the same as the sound generating module illustrated in FIGS. 3A to 3E, 6, 10, and 14 to 16B, and thus, their repetitive descriptions are omitted.

Therefore, the display apparatus according to another embodiment of the present disclosure may output a three-channel stereo sound based on a left sound LS, a right sound RS, and a center sound CS based on a vibration of the display module 100, for example, the display panel 110 based on driving of each of the first to third sound generating modules 500-1, 500-2, and 500-3.

As another example, the display apparatus according to another embodiment of the present disclosure may include some of the first to third sound generating modules 500-1, 500-2, and 500-3 based on a finished product structure. For example, the display apparatus according to another embodiment of the present disclosure may not include the third sound generating module 500-3 of the first to third sound generating modules 500-1, 500-2, and 500-3, and may include the first and second sound generating modules 500-1 and 500-2. For example, as illustrated in FIGS. 18 and 20, each of the first and second sound generating modules 500-1 and 500-2 including a vibration device 530 may be respectively accommodated into and disposed in the first and second module accommodating parts 370*a* and 370*b* provided in the rear cover 1300 and may respectively and individually vibrate the first and second regions of the display module 100, for example, the display panel 110, thereby outputting a two-channel stereo sound based on the left sound LS and the right sound RS based on a vibration of each of the first and second regions of the display panel 110.

Moreover, in the display apparatus according to another embodiment of the present disclosure, since the third sound generating module 500-3 is not accommodated or inserted into the third module accommodating part 370*c* provided in the rear cover 1300 and the third module accommodating part 370*c* is open, a problem may occur due to a variation of a sound pressure caused by a gap space between the rear cover 1300 and the display module 100 overlapping the third module accommodating part 370*c*, and a heat dissipation characteristic of the display module 100 overlapping the third module accommodating part 370*c* may be reduced. To solve such problems, the display apparatus according to another embodiment of the present disclosure may further include a cover 900, as illustrated in FIG. 20.

The cover 900 may be a cover structure for covering a module accommodating part into which the third sound generating module 500-3 is not inserted (or accommodated). The cover 900 according to some embodiments of the present disclosure may be configured in substantially the same structure as a module structure 2510 of each of the sound generating modules 500-1, 500-2, and 500-3 and, unlike the sound generating modules 500-1, 500-2, and 500-3, may not include a vibration device. For example, the cover 900 may include the border portion 511, the bottom portion 513, and the inclined portion 515 of module structure 2510 illustrated in FIG. 15. For example, a rear surface of the cover 900 may be disposed at or fixed to a second rear cover 350 exposed by the third module accommodating part 370*c* by using a first member 910 (or a cover fixing member). Also, a front surface of the cover 900 may be connected to a rear surface of the display module 100 by using a cover adhesive member 920. Therefore, the cover 900 may cover the third module accommodating part 370*c* into which the third sound generating module 500-3 is not accommodated, and thus, may solve a problem which occurs because the third module accommodating part 370*c* is open. The cover 900 may be referred to as a hole cover, a cap, or a lid, but the term is not limited thereto.

As another example, the display apparatus according to another embodiment of the present disclosure may not include all of the first to third sound generating modules 500-1, 500-2, and 500-3 based on a finished product structure. For example, as illustrated in FIGS. 18 and 21, in the display apparatus according to another embodiment of the present disclosure, the first to third sound generating modules 500-1, 500-2, and 500-3 may not be accommodated into the first to third module accommodating parts 370*a*, 370*b*, and 370*c* provided in the rear cover 1300, and the first to third module accommodating parts 370*a*, 370*b*, and 370*c* may be open, causing a reduction in heat dissipation characteristic in the display module 100 overlapping each of the first to third module accommodating parts 370*a*, 370*b*, and 370*c*. To solve such a problem, the display apparatus according to another embodiment of the present disclosure may further include first to third covers 900-1, 900-2, and 900-3 which are respectively accommodated into and disposed in the first to third module accommodating parts 370*a*, 370*b*, and 370*c*.

Each of the first to third covers 900-1, 900-2, and 900-3 may be configured in substantially the same structure as the module structure 2510 of the first to third sound generating modules 500-1, 500-2, and 500-3 and, unlike the first to third sound generating modules 500-1, 500-2, and 500-3, may not include a vibration device. For example, each of the first to third covers 900-1, 900-2, and 900-3 may be disposed in or fixed to the second rear cover 350 exposed by each of the first to third module accommodating parts 370*a*, 370*b*, and 370*c* by using the first member 910 (or the cover fixing member). Also, a front surface of each of the first to third covers 900-1, 900-2, and 900-3 may be disposed on or coupled to the rear surface of the display module 100 by using a cover adhesive member 920. Therefore, the first to third covers 900-1, 900-2, and 900-3 may respectively cover the first to third module accommodating parts 370*a*, 370*b*, and 370*c* into which the first to third sound generating modules 500-1, 500-2, and 500-3 are not accommodated or inserted, thereby solving a problem which occurs because each of the first to third module accommodating parts 370*a*, 370*b*, and 370*c* is open. Accordingly, the rear cover 1300 may include the plurality of module accommodating parts 370*a*, 370*b*, and 370*c* which are selectively equipped with the first to third sound generating modules 500-1, 500-2, and 500-3 and the cover 900, and thus, may be used in common regardless of a finished product structure of a display apparatus.

Figure 22:
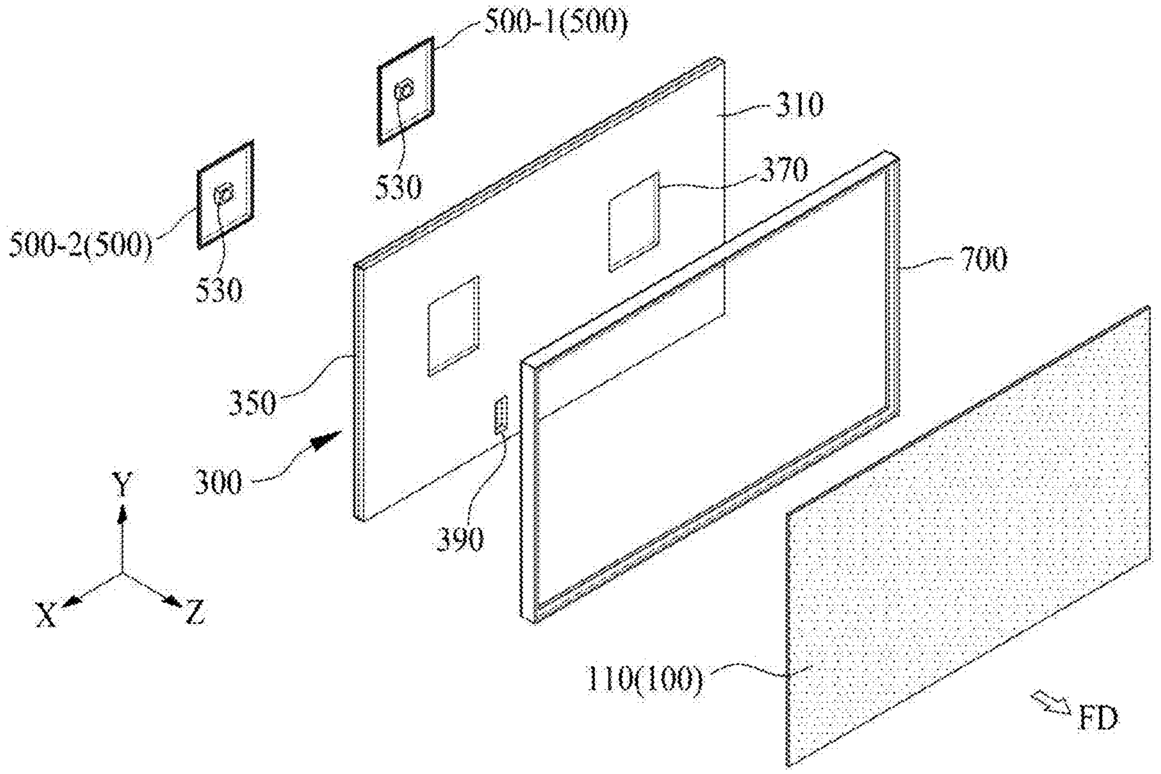
FIG. 22 illustrates a display apparatus according to another embodiment of the present disclosure.

FIG. 22 illustrates a display apparatus according to another embodiment of the present disclosure.

With reference to FIG. 22, the display apparatus according to another embodiment of the present disclosure may include at least one sound generating module 500 disposed on a rear surface of a rear cover 300. The at least one sound generating module 500 may be accommodated into and disposed in at least one module accommodating part 370 provided in the rear cover 300. The at least one sound generating module 500 may be attached on the rear cover 300.

The at least one module accommodating part 370 provided in the rear cover 300 is the same as the module accommodating part illustrated in FIGS. 10 and 11, and thus, its repetitive description is omitted.

The at least one sound generating module 500 may be accommodated into and disposed in the at least one module accommodating part 370 provided in the rear cover 300 with being modularized as one element. The at least one sound generating module 500 according to some embodiments of the present disclosure may be accommodated into the at least one module accommodating part 370 provided in a first rear cover 310 of the rear cover 300 and may be supported by a rear surface of the first rear cover 310. For example, the at least one sound generating module 500 may have a box structure where one side thereof is open and includes a border or boundary. The at least one sound generating module 500 may indirectly vibrate the display module 100 to generate a sound PVS based on a vibration of a display module 100 (for example, a display panel 110).

Therefore, in the display apparatus according to another embodiment of the present disclosure, since the at least one sound generating module 500 is accommodated into and disposed in the module accommodating part 370 provided in the rear cover 300, a thickness may decrease by a height (or a depth) of the module accommodating part 370 and a weight may decrease by a size of the module accommodating part 370. In the display apparatus according to another embodiment of the present disclosure, since the sound generating module 500 is disposed on the rear surface of the rear cover 300, an assembly process between the sound generating module 500 and the rear cover 300 may be simplified.

FIGS. 23A to 23D illustrate a plate according to another embodiment of the present disclosure.

With reference to FIGS. 23A to 23D, a sound may be generated using the plate as a vibration plate.

Figure 23A:
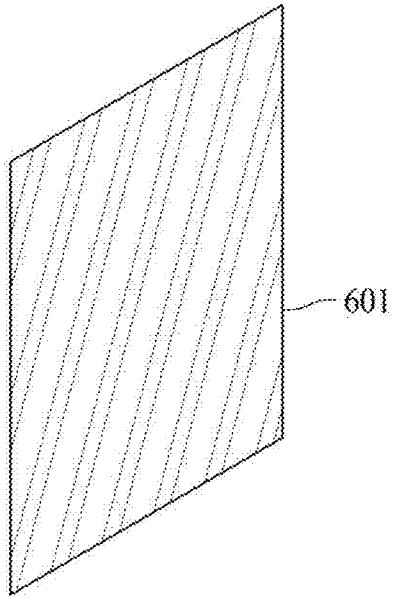
FIGS. 23A to 23D illustrate a plate according to another embodiment of the present disclosure.

For example, FIG. 23A may be a glass plate 601 including a glass material, and the glass plate 601 may be implemented as a sound plate where the sound generating module of FIGS. 3A to 3E, 5, 6, and 14 to 16B is disposed on a rear surface of the glass 601 to output sound. Alternatively, a sound generating module or a sound generating device described below with reference to FIGS. 24A to 46B may be disposed on the rear surface of the glass plate 601. For example, the glass plate 601 may be provided as a picture frame type. A sound generating module may be provided on a rear surface of a picture frame including a photograph or a picture, and thus, a user may listen to a sound while looking or watching at the photograph or the picture.

Figure 23B:
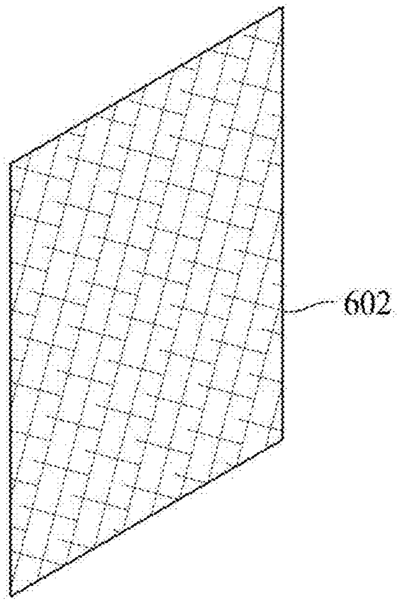

As another example, FIG. 23B may be a tree plate 602 including a wood material, and the wood plate 602 may be implemented as a sound plate. For example, the wood plate 602 may be implemented as a sound plate where the sound generating module of FIGS. 3A to 3E, 5, 6, and 14 to 16B is disposed on a rear surface of the ood plate 602 to output a sound. Alternatively, the sound generating module or the sound generating device described below with reference to FIGS. 24A to 46B may be disposed on the rear surface of the wood plate 602.

Figure 23C:
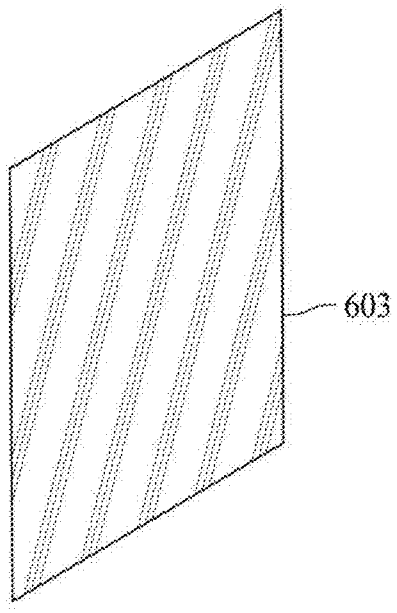

As another example, FIG. 23C may be a plastic plate 603 including a plastic material, and the plastic plate 603 may be implemented as a sound plate. For example, the plastic plate 603 may be implemented as a sound plate where the sound generating module of FIGS. 3A to 3E, 5, 6, and 14 to 16B is disposed on a rear surface of the plastic plate 603 to output a sound. Alternatively, the sound generating module or the sound generating device described below with reference to FIGS. 24A to 46B may be disposed on the rear surface of the plastic plate 603.

Figure 23D:
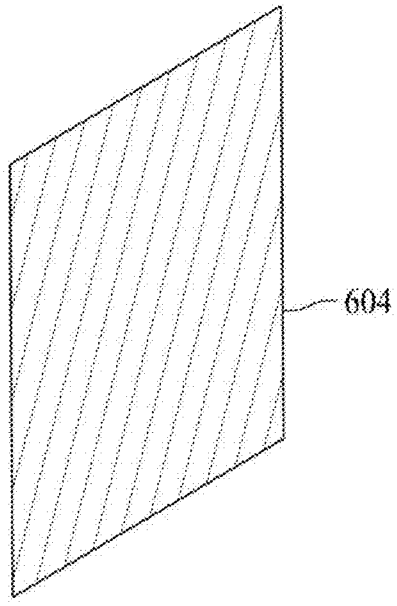

As another example, FIG. 23D may be a metal plate 604 including a metal material, and the metal plate 604 may be implemented as a sound plate. The metal plate 604 may be a metal injection material. For example, the metal plate 604 may be implemented as a sound plate where the sound generating module of FIGS. 3A to 3E, 5, 6, and 14 to 16B is disposed on a rear surface of the metal plate 604 to output a sound. Alternatively, the sound generating module or the sound generating device described below with reference to FIGS. 24A to 46B may be disposed on the rear surface of the metal plate 604.

As another example, the sound generating module of FIGS. 3A to 3E, 5, 6, and 14 to 16B may be provided in a projection screen or an image reproduction apparatus to output a sound, thereby providing a stereo sound to a user. As another example, the sound generating module of FIGS. 3A to 3E, 5, 6, and 14 to 16B may be provided in an apparatus such as a Bluetooth apparatus to output sound, thereby providing sound to a user.

As another example, when a sound generating module having a multi-channel described below with reference to FIGS. 24A to 32E is provided in the embodiments of FIGS. 23A to 23D and a projection screen, an image reproduction apparatus, or a Bluetooth apparatus, a stereo sound and a stereophonic sound or surround sound having a realistic sense may be provided to a user.

As another example, when a sound generating module of a film type or a piezoelectric composite described below with reference to FIGS. 33 to 44C is provided in the embodiments of FIGS. 23A to 23D and a projection screen, an image reproduction apparatus, or a Bluetooth apparatus, a vibration device having a thin thickness may be configured, and a stereo sound and a stereophonic sound or surround sound having a realistic sense may be provided to a user.

Therefore, according to another embodiment of the present disclosure, since a sound plate and a modularized sound generating module are applied, an image and a stereo sound may be provided, thereby enhancing an immersion experience of a user and providing a stereophonic sound or surround sound having a realistic sense.

When the sound generating module described above with reference to FIGS. 1 to 23D is applied to a display apparatus, the sound generating module may be provided in at least two of three regions. For example, the sound generating module may be disposed in a left region and a right region of the display apparatus, and a left sound and a right sound may be output to a forward region in front of a display panel. For example, the inventors have recognized that a sound of the display panel in a left-right direction is output, but a sound of the display panel in an upward-downward direction is not output. A plurality of sound generating modules may be disposed for enhancing the sound of the display panel in the upward-downward direction, but when the plurality of sound generating modules are disposed, a problem where a thickness of the display apparatus is thickened may occur. Also, to output a stereo sound, an additional speaker may be disposed near the display apparatus. Since the speaker should need to control a distance to a user based on a desired frequency, there may be problem where a speaker should be disposed based on a location of a user or a position of an image. Therefore, the inventors have performed various experiments for implementing a sound generating module where a thickness of a display apparatus is not thickened and which realizes a left sound, a right sound, a height sound, and a bottom sound based on an image. Through the various experiments, the inventors have invented a display apparatus including a sound generating module having a new structure, which realizes a left sound, a right sound, a height sound, and a bottom sound. This will be described below with reference to FIGS. 24A to 44C.

Figure 24A:
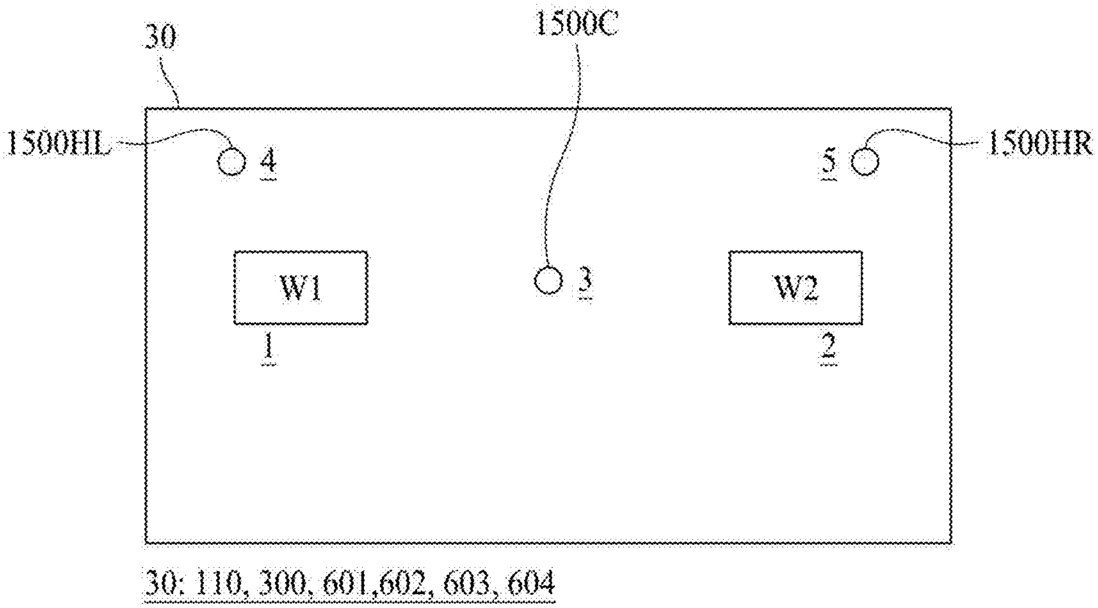
FIGS. 24A and 24B illustrate a display apparatus including a sound generating module according to an embodiment of the present disclosure.
Figure 24B:
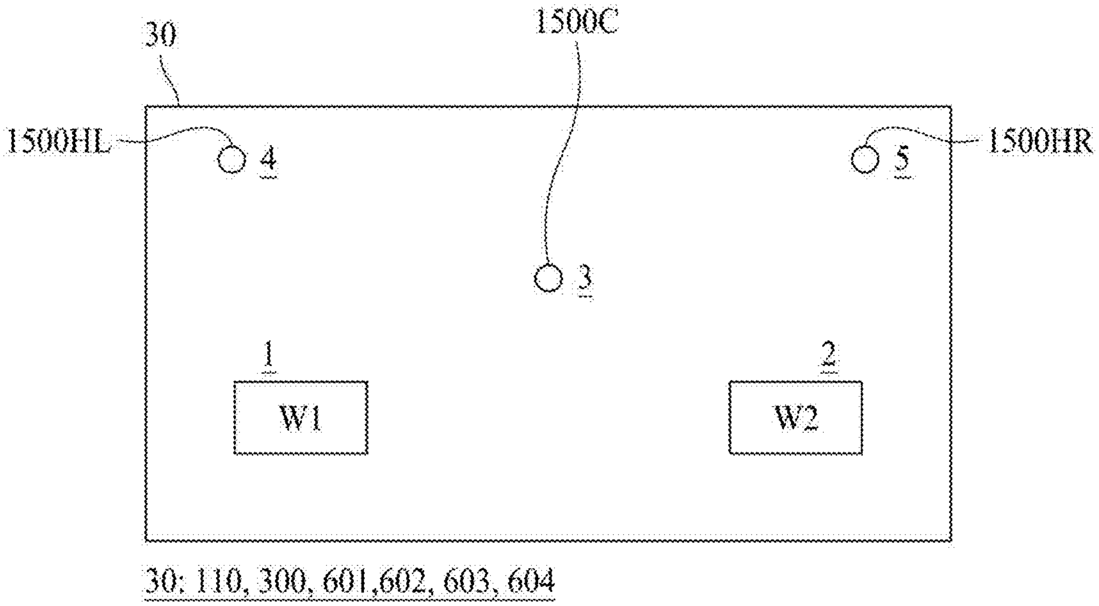

FIGS. 24A and 24B illustrate a display apparatus including a sound generating module according to an embodiment of the present disclosure.

With reference to FIGS. 24A and 24B, the display apparatus according to an embodiment of the present disclosure may include a plate 30 including a first region 1, a second region 2, a third region 3, a fourth region 4, and a fifth region 5. As one example, as described above with reference to FIGS. 1 to 22, the plate 30 may be a display panel 110 which displays an image. Hereinafter, an example where the plate 30 is the display panel 110 or the rear cover 300 will be described. As another example, as described above with reference to FIGS. 23A to 23D, the plate 30 may be one of the glass plate 601, the wood plate 602, the plastic plate 603, and the metal plate 604. As another example, the display apparatus according to an embodiment of the present disclosure may further include a second plate including a first region 1, a second region 2, a third region 3, a fourth region 4, and a fifth region 5. For example, the plate 30 may be a display panel which displays an image, and a sound generating device or a sound generation module may be disposed on the second plate including the first region 1, the second region 2, the third region 3, the fourth region 4, and the fifth region 5. For example, the plate 30 may display an image, and the second plate may be a sound plate which outputs a sound.

A rear surface of a display panel 110 may include first to fifth regions 1 to 5. For example, the first region 1 and the fourth region 4 may be left regions of the rear surface of the display panel 110. For example, the second region 2 and the fifth region 5 may be right regions of the rear surface of the display panel 110. For example, the third region 3 may be a center region of the rear surface of the display panel 110. As another example, when a sound generating module is disposed on a rear surface of a rear cover 300 as described above with reference to FIG. 2, the first to fifth regions 1 to 5 may be regions of the rear surface of the rear cover 300. Description relevant thereto may be identically or similarly applied to FIGS. 26A to 32E and 41A to 44C. In embodiments described below, an example where a sound generating module is disposed on a rear surface of a display panel will be described, but embodiments are not limited thereto. In other embodiments, a sound generating module may be disposed on a rear surface of a rear cover.

At least one sound generating module may be disposed in at least one of the first region 1, the second region 2, the third region 3, the fourth region 4, and the fifth region 5. The at least one sound generating module may include the vibration device or the sound generating module described above with reference to FIGS. 1 to 22. The vibration device may be a vibration device including a voice coil.

For example, a fourth sound generating module 1500HL may be disposed in the fourth region 4 of the rear surface of the display panel 110. A first woofer-integrated sound generating module W1 may be disposed in the first region 1 of the rear surface of the display panel 110. A fifth sound generating module 1500HR may be disposed in the fifth region 5 of the rear surface of the display panel 110, and a second woofer-integrated sound generating module W2 may be disposed in the second region 2 of the rear surface of the display panel 110. A third sound generating module 1500C may be disposed in the third region 3 of the rear surface of the display panel 110. The fourth sound generating module 1500HL may be a height left channel of the display panel 110, and the fifth sound generating module 1500HR may be a height right channel of the display panel 110. The third sound generating module 1500C may be a center channel of the display panel 110.

The first woofer-integrated sound generating module W1 and the second woofer-integrated sound generating module W2 may each be a sound generating module configured as one body with a woofer, and thus, a separate woofer may not be provided. The first woofer-integrated sound generating module W1 and the second woofer-integrated sound generating module W2 may each be a sound generating module including a woofer. The first woofer-integrated sound generating module W1 and the second woofer-integrated sound generating module W2 will be described below with reference to FIGS. 25A and 25B.

The first woofer-integrated sound generating module W1 and the second woofer-integrated sound generating module W2 may output a sound of about 60 Hz to about 40 kHz, and the third sound generating module 1500C, the fourth sound generating module 1500HL, and the fifth sound generating module 1500HR may output a sound of about 80 Hz to about 40 kHz. Accordingly, the display apparatus may output a 3.2-channel sound.

Comparing with sound generating modules on the left and the right of a display panel, since sound generating modules are further provided at an upper portion and a lower portion of the display panel, left and right sounds and height and bottom sounds may be enhanced, and a user may feel a sense of sound field like a real sound. For example, since the fourth sound generating module 1500HL and the fifth sound generating module 1500HR are further provided, a sound may be output from an upper portion of the display panel 110, thereby providing a display apparatus for realizing a stereo sound including left and right sounds and height and bottom sounds. Therefore, left and right sounds corresponding to left and right images and height and bottom sounds corresponding to upper and lower images may be realized, and a real stereo sound of a real sound including stereo left and right sounds and stereo height and bottom sounds may be realized, thereby providing a user with a real sound instead of a virtual sound. Therefore, a real stereo sound or surround sound of a real sound including stereo left and right sounds and stereo height and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic audio visual (AV) or Dolby sound system.

Moreover, when a sound generating module having a multi-channel illustrated in FIGS. 24A and 24B is implemented in the sound plate of FIGS. 23A to 23D, a real stereo sound or surround sound of a real sound including stereo left and right sounds and stereo height and bottom sounds may be provided to a user, thereby enhancing a sense of realism. When the sound generating module having a multi-channel illustrated in FIGS. 24A and 24B and a projection or image reproduction device are provided in the sound plate of FIGS. 23A to 23D, a realistic AV or Dolby sound system may be provided so that a user simultaneously feels a realistic sound and image similarly or identically to reality, and moreover, a stereo sound for providing an immersion experience of a user and a realistic sense may be provided. Also, as described above with reference to FIGS. 1 to 22, a modularized sound generating module may be applied, and thus, a degree of freedom in design of a display apparatus or a rear cover may be enhanced in a case where a sound generating module is provided.

For example, the fourth sound generating module 1500HL and the fifth sound generating module 1500HR may be symmetrically disposed, but the present disclosure is not limited thereto. For example, the fourth sound generating module 1500HL and the fifth sound generating module 1500HR may be disposed on the same line, but the present disclosure is not limited thereto. For example, the first woofer-integrated sound generating module W1 may be disposed to be symmetrical with the second woofer-integrated sound generating module W2, but the present disclosure is not limited thereto. For example, the first woofer-integrated sound generating module W1 and the second woofer-integrated sound generating module W2 may be disposed on the same line, but the present disclosure is not limited thereto. For example, the first woofer-integrated sound generating module W1 and the second woofer-integrated sound generating module W2 may be disposed to be symmetrical with the third sound generating module 1500C, but the present disclosure is not limited thereto. For example, the first woofer-integrated sound generating module W1 and the second woofer-integrated sound generating module W2 may be disposed on the same line as the third sound generating module 1500C, but the present disclosure is not limited thereto.

With reference to FIG. 24B, the first woofer-integrated sound generating module W1 and the second woofer-integrated sound generating module W2 may be disposed to be asymmetrical with the third sound generating module 1500C, but an embodiment of the present disclosure is not limited thereto. For example, the first woofer-integrated sound generating module W1 and the second woofer-integrated sound generating module W2 may be disposed on a line which differs from the third sound generating module 1500C, but an embodiment of the present disclosure is not limited thereto. For example, the first woofer-integrated sound generating module W1 may be spaced apart from the fourth sound generating module 1500HL disposed in the fourth region 4, and thus, a sound of a lower portion of the display panel 110 may be more vividly realized in the first woofer-integrated sound generating module W1, and based on a distance between the first woofer-integrated sound generating module W1 and the fourth sound generating module 1500HL, a sound for distinguishing a difference between a sound of the first woofer-integrated sound generating module W1 and a sound of the fourth sound generating module 1500HL may be realized. Also, the second woofer-integrated sound generating module W2 may be spaced apart from the fifth sound generating module 1500HR disposed in the fifth region 5, and thus, a sound of a lower portion of the display panel 110 may be more vividly realized in the second woofer-integrated sound generating module W2, and based on a distance between the second woofer-integrated sound generating module W2 and the fifth sound generating module 1500HR, a sound for distinguishing a difference between a sound of the second woofer-integrated sound generating module W2 and a sound of the fifth sound generating module 1500HR may be realized.

With reference to FIGS. 24A and 24B, the first woofer-integrated sound generating module W1 may be disposed to be asymmetrical with the fourth sound generating module 1500HL. The second woofer-integrated sound generating module W2 may be disposed to be asymmetrical with the fifth sound generating module 1500HR. For example, sound constructive interference or destructive interference caused by vibration interference between a vibration and a standing wave generated by the first woofer-integrated sound generating module W1 and a vibration and a standing wave generated by the fourth sound generating module 1500HL may be reduced. Undesired sound constructive or destructive interference caused by external interference except for a vibration based on a reproduced sound source may cause distortion of a sound to degrade sound quality, and an asymmetrical structure between the first woofer-integrated sound generating module W1 and the fourth sound generating module 1500HL may prevent the undesired interference, thereby reproducing a natural sound similar to an original sound. Sound constructive interference or destructive interference caused by vibration interference between a vibration and a standing wave generated by the second woofer-integrated sound generating module W2 and a vibration and a standing wave generated by the fifth sound generating module 1500HR may be reduced. Undesired sound constructive or destructive interference caused by external interference except for a vibration based on a reproduced sound source may cause distortion of a sound to degrade sound quality, and an asymmetrical structure between the second woofer-integrated sound generating module W2 and the fifth sound generating module 1500HR may prevent the undesired interference, thereby reproducing a natural sound similar to an original sound. As another example, the first woofer-integrated sound generating module W1 may be disposed to be symmetrical with the fourth sound generating module 1500HL. The second woofer-integrated sound generating module W2 may be disposed to be symmetrical with the fifth sound generating module 1500HR. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

As another example, at least one of the fourth sound generating module 1500HL and the fifth sound generating module 1500HR may be configured as a sound generating module including a woofer. For example, the first woofer-integrated sound generating module W1 may be provided in the fourth region 4, and the second woofer-integrated sound generating module W2 may be provided in the fifth region 5. For example, a sound generating module including a woofer may be provided in one or more of the fourth region 4 and the fifth region 5. As another example, a sound generating module including a woofer may be provided in the third region 3. As another example, the third sound generating module 1500C may be configured as a sound generating module including a woofer. Accordingly, a sound generating module including a woofer may be disposed in one or more of the first to fifth regions 1 to 5 and may output a sound of a low-pitched sound band, thereby providing a display apparatus for outputting sounds of the low-pitched sound band, a middle-pitched sound band, and a high-pitched sound band. For example, a sound generating module may be driven based on the same signal or a mono signal applied thereto.

Figure 25A:
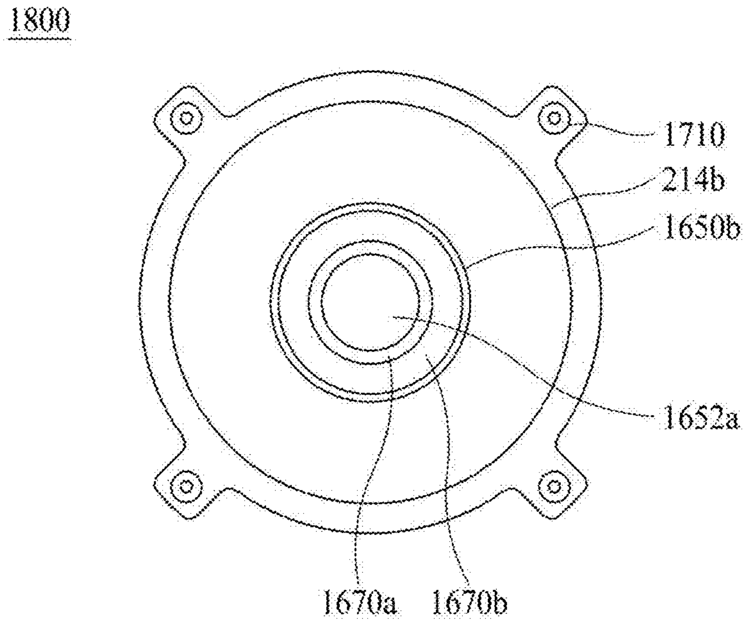
FIGS. 25A and 25B illustrate a sound generating module according to another embodiment of the present disclosure.
Figure 25B:
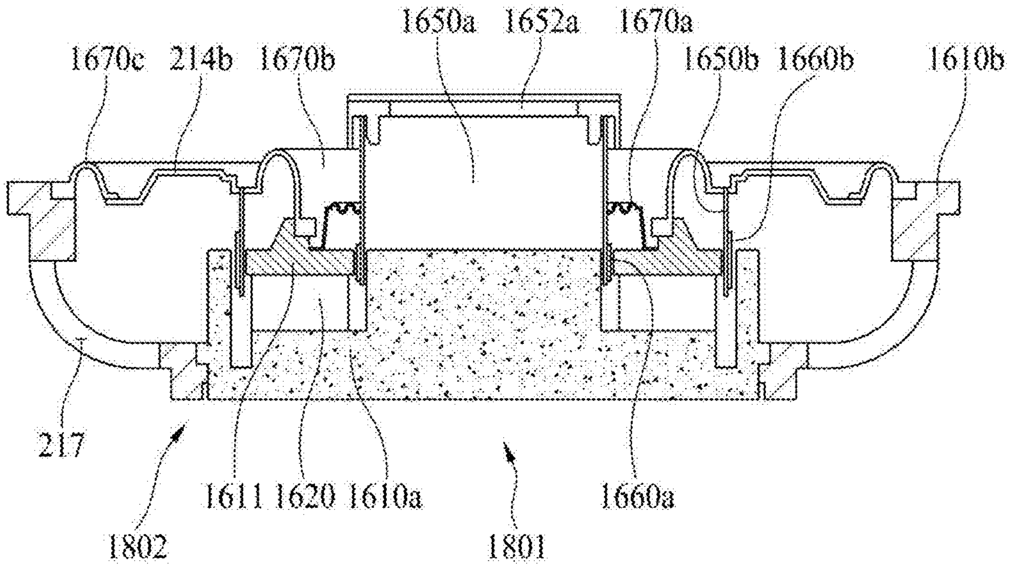

FIGS. 25A and 25B illustrate a sound generating module according to another embodiment of the present disclosure.

A sound generating module 1800 according to another embodiment of the present disclosure may be a woofer-integrated sound generating module, a hybrid sound generating module, and a sound generating module having a woofer, but the term is not limited thereto. FIG. 25A is a front view of a sound generating module, and FIG. 25B is a cross-sectional view of a sound generating module.

With reference to FIGS. 25A and 25B, the sound generating module 1800 may include a first sound generating device 1801 and a second sound generating device 1802. For example, the first sound generating device 1801 may be disposed on a rear surface of a display panel, and the second sound generating device 1802 may be spaced apart from the rear surface of the display panel.

The sound generating module 1800 may include a frame for accommodating the first sound generating device 1801 and the second sound generating device 1802. The frame may include a lower frame 1610*a* which supports a lower portion of each of the first and second sound generating devices 1801 and 1802 and a side frame 1610*b* connected to the lower frame 1610*a*. The frame may be a yoke, but the term is not limited thereto.

The lower frame 1610*a* may support a magnet 1620. The magnet 1620 may share the first sound generating device 1801 and the second sound generating device 1802. For example, a bobbin 1650*a* of the first sound generating device 1801 and a coil 1660*a* near the bobbin 1650*a* may be disposed near the magnet 1620. For example, a second bobbin 1650*b* of the second sound generating device 1802 and a second coil 1660*b* near the second bobbin 1650*b* may be disposed near the magnet 1620. For example, the lower frame 1610*a* and a plate 1611 may be respectively disposed under and on the magnet 1620 and may increase a magnet flux density generated through the magnet 1620, the coil 1660*a*, and the second coil 1660*b*, thereby enhancing a vibration characteristic. The lower frame 1610*a* may be a yoke, but the term is not limited thereto.

The side frame 1610*b* may be connected to the lower frame 1610*a*, and may include at least one hole 217 to output sound. For example, the hole 217 may a vent hole. For example, the hole 217 may output sound of a low-pitched sound band, generated by a vibration plate 214*b* of the second sound generating device 1802 in an air gap in the sound generating module 1800, to a rearward region behind a display panel 110.

The side frame 1610*b* may include a conductive material, and may control a magnet flux generated by the magnet 1620. For example, the side frame 1610*b* may surround the magnet 1620 with being apart therefrom, and thus, may allow a magnet flux generated by the magnet 1620 to concentrate on the inside of the second bobbin 1650*b*, thereby preventing a leakage magnet flux. The side frame 1610*b* may be a yoke, but the term is not limited thereto. The hole 217 may be provided in the side frame 1610*b*, and moreover, may be provided in the lower frame 1610*a* and may be provided in a region connected to the side frame 1610*b* and the lower frame 1610*a*. The side frame 1610*b* may be connected to a rear cover using a connection member 1710 such as a nut, or may be disposed in the display panel 110.

The first sound generating device 1801 may include the magnet 1620 disposed on the frame, the bobbin 1650*a* near the magnet 1620, and a coil 1660*a* and a damper 1670*a* near the bobbin 1650*a*. For example, their descriptions are similar to descriptions given above with reference to FIGS. 3A to 3E, 6, and 14, and thus, their detailed descriptions are omitted.

The magnet 1620 may be disposed on the lower frame 1610*a*. For example, the magnet 1620 may be disposed between a plate 1611 and the lower frame 1610*a*. The lower frame 1610*a* and the plate 1611 may control a magnet flux generated by the magnet 1620. For example, the magnet 1620 may be surrounded by the lower frame 1610*a* and the plate 1611, and thus, the magnet flux generated by the magnet 1620 may concentrate on the inside of the bobbin 1650*a* and may be controlled.

The bobbin 1650*a* may be attached on a rear surface of a bobbin ring 1652*a*. For example, when a sound-generating current is applied to the coil 1660*a* wound around an outer circumference surface of the bobbin 1650*a* and thus a magnetic field is generated in the first sound generating device 1801, the display panel may vibrate based on the magnetic field by using the bobbin ring 1652*a*. The bobbin ring 1652*a* may be disposed between the bobbin 1650*a* and the display panel and may transfer a vibration of the bobbin 1650*a* to the display panel. The first sound generating device 1801 may output a sound of a middle-high-pitched sound band.

The second sound generating device 1802 may include the magnet 1620 disposed on the frame, the plate 1611 on the magnet 1620, the second bobbin 1650*b* near the magnet 1620, and a second coil 1660*b* and a second damper 1670*b* near the second bobbin 1650*b*.

A vibration plate 214*b* may be disposed on the second bobbin 1650*b*. For example, the vibration plate 214*b* may be spaced apart from the rear surface of the display panel 110, and may prevent heat occurring in the second bobbin 1650*b* from being transferred to the display panel.

When the sound-generating current is applied to the second coil 1660*b* wound around an outer circumference surface of the second bobbin 1650*b* and thus a magnetic field is generated in the second sound generating device 1802, the second bobbin 1650*b* may vibrate an air layer or an air gap of a vibration plate peripheral portion by using the vibration plate 214*b* based on the magnetic field. For example, a front surface of the second bobbin 1650*b* may contact the vibration plate 214*b*, and may vibrate the vibration plate 214*b* on the basis of a state where a current is applied thereto or not. The second sound generating device 1802 may output sound to a forward region and a rearward region with respect to the vibration plate 214*b*. For example, the second sound generating device 1802 may output a sound of a low-pitched sound band. For example, a sound generated by the vibration plate 214*b* of the second sound generating device 1802 may include a first low-pitched sound propagated to an upper portion of the vibration plate 214*b* and a second low-pitched sound propagated to a lower portion of the vibration plate 214*b*. For example, the second sound generating device 1802 may be a woofer, but the term is not limited thereto.

The magnet 1620 may be disposed on the lower frame 1610*a*. The plate 1611 may be spaced apart from the vibration plate 214*b*. The second bobbin 1650*b* may be disposed on a rear surface of the vibration plate 214*b*. For example, the second bobbin 1650*b* may surround the magnet 1620 and the plate 1611.

The second damper 1670*b* may be disposed between the first sound generating device 1801 and the second sound generating device 1802. For example, the second damper 1670*b* may be disposed between the damper 1670*a* of the first sound generating device 1801 and the second bobbin 1650*b* of the second sound generating device 1802. For example, the second damper 1670*b* may be disposed between the first sound generating device 1801 and the vibration plate 214*b* of the second sound generating device 1802. The vibration plate 214*b* may not physically contact the first sound generating device 1801. For example, the second damper 1670*b* may prevent sound interference between the first sound generating device 1801 and the second sound generating device 1802. An edge 1670*c* may be disposed on the vibration plate 214*b*. The edge 1670*c* may prevent deformation such as distortion of the vibration plate 214*b* when the vibration plate 214*b* performs a vertical motion, and thus, may provide clean sound quality and may enhance the reliability of the sound generating module 1800. The second damper 1670*b* may be a first suspension, and the edge 1670*c* may be a second suspension.

The magnet 1620 of the first sound generating device 1801 and the magnet 1620 of the second sound generating device 1802 may have opposite magnetic fields. The first sound generating device 1801 may directly vibrate the display panel to output sound of a high-pitched sound band to a forward region in front of the display panel, and the second sound generating device 1802 may output sound of a low-pitched sound band to a rearward region behind the display panel. Accordingly, since the first sound generating device 1801 and the second sound generating device 1802 have the opposite magnetic fields, a vibration of each of the first sound generating device 1801 and the second sound generating device 1802 may be independently driven or controlled.

Therefore, the woofer-integrated sound generating module may include a woofer disposed near the sound generating module. The sound generating module may be disposed on the rear surface of the display panel and may generate a sound of a middle-high-pitched sound band, and the woofer may be spaced apart from the rear surface of the display panel and may perform a vertical vibration to generate a sound of a low-pitched sound band. For example, the sound generating module and the woofer may be driven based on different sound signals or voice signals applied thereto. Accordingly, the sound of the low-pitched sound band may be enhanced by the woofer-integrated sound generating module.

Figure 26A:
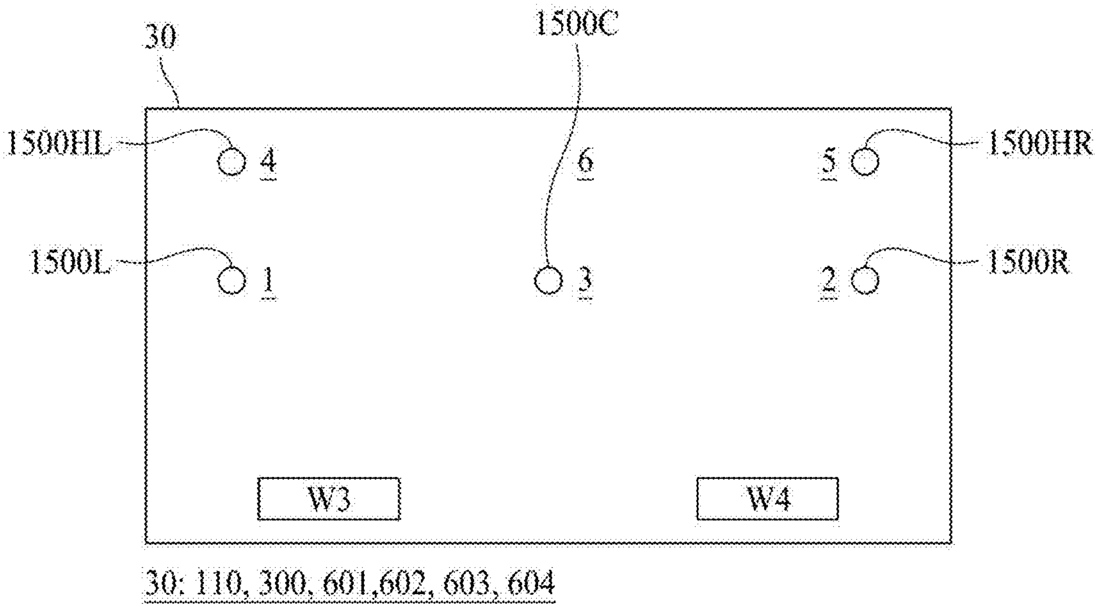
FIGS. 26A and 26B illustrate a display apparatus including a sound generating module according to another embodiment of the present disclosure.
Figure 26B:
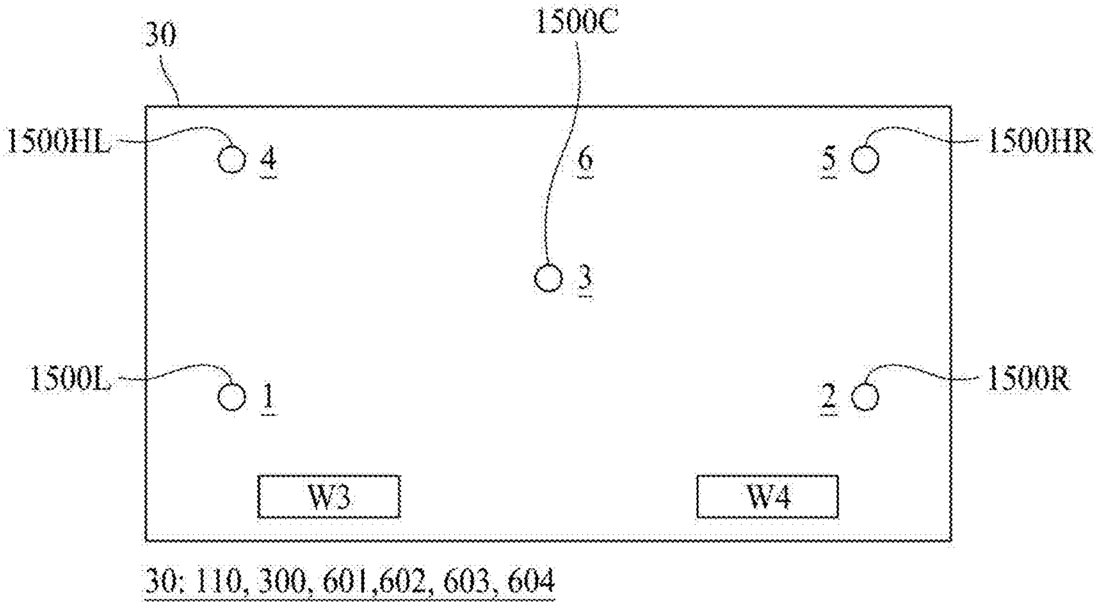

FIGS. 26A and 26B illustrate a display apparatus including a sound generating module according to another embodiment of the present disclosure.

With reference to FIGS. 26A and 26B, at least one sound generating module may be disposed in at least one of a first region 1, a second region 2, a third region 3, a fourth region 4, and a fifth region 5. For example, a first sound generating module 1500L may be disposed in the first region 1 of a rear surface of a display panel 110, and a fourth sound generating module 1500HL may be disposed in a fourth region 4 of the rear surface of the display panel 110. A second sound generating module 1500R may be disposed in the second region 2 of the rear surface of the display panel 110, and a fifth sound generating module 1500HR may be disposed in the fifth region 5 of the rear surface of the display panel 110. A third sound generating module 1500C may be disposed in the third region 3 of the rear surface of the display panel 110. As another example, as described above with reference to FIG. 22, first to fifth sound generating modules may be disposed on a rear surface of a rear cover 300. For example, the first to fifth sound generating modules may be disposed in a module structure.

The first sound generating module 1500L may be a left channel of the display panel 110, and the fourth sound generating module 1500HL may be a height left channel of the display panel 110. The second sound generating module 1500R may be a right channel of the display panel 110, and the fifth sound generating module 1500HR may be a height right channel of the display panel 110. The third sound generating module 1500C may be a center channel of the display panel 110.

With reference to FIGS. 26A and 26B, the first sound generating module 1500L may be disposed to be symmetrical with the fourth sound generating module 1500HL, but is not limited thereto. For example, the first sound generating module 1500L may be disposed on the same line as the fourth sound generating module 1500HL, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. For example, the second sound generating module 1500R may be disposed to be symmetrical with the fifth sound generating module 1500HR. For example, the second sound generating module 1500R may be disposed on the same line as the fifth sound generating module 1500HR, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. For example, the first sound generating module 1500L and the fourth sound generating module 1500HL may be disposed to be symmetrical with the second sound generating module 1500R and the fifth sound generating module 1500HR, but the present disclosure is not limited thereto. For example, the first sound generating module 1500L and the fourth sound generating module 1500HL may be disposed on the same line as the second sound generating module 1500R and the fifth sound generating module 1500HR, but an embodiment of the present disclosure is not limited thereto.

With reference to FIG. 26A, the first sound generating module 1500L and the second sound generating module 1500R may be disposed on the same line as the third sound generating module 1500C, but are not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

With reference to FIG. 26B, the first sound generating module 1500L and the second sound generating module 1500R may be disposed to be asymmetrical with the third sound generating module 1500C, but an embodiment of the present disclosure is not limited thereto. For example, the first sound generating module 1500L and the second sound generating module 1500R may be disposed on a line which differs from the third sound generating module 1500C, but an embodiment of the present disclosure is not limited thereto. For example, the first sound generating module 1500L and the second sound generating module 1500R may be disposed on the same line. For example, the third sound generating module 1500C may be disposed on a line which differs from the first sound generating module 1500L. For example, the third sound generating module 1500C may be disposed on a line which differs from the second sound generating module 1500R. For example, the first sound generating module 1500L may be apart from the fourth sound generating module 1500HL disposed in the fourth region 4, and thus, a sound of a lower portion of the display panel 110 may be more vividly realized in the first sound generating module 1500L, and based on a distance between the first sound generating module 1500L and the fourth sound generating module 1500HL, a sound for distinguishing a difference between a sound of the first sound generating module 1500L and a sound of the fourth sound generating module 1500HL may be realized. Also, the second sound generating module 1500R may be apart from the fifth sound generating module 1500HR disposed in the fifth region 5, and thus, a sound of a lower portion of the display panel 110 may be more vividly realized in the second sound generating module 1500R, and based on a distance between the second sound generating module 1500R and the fifth sound generating module 1500HR, a sound for distinguishing a difference between a sound of the second sound generating module 1500R and a sound of the fifth sound generating module 1500HR may be realized.

The fourth sound generating module 1500HL may be provided in the fourth region 4, the fifth sound generating module 1500HR may be provided in the fifth region 5, and a sound generating module may not be provided in a sixth region 6 between the fourth region 4 and the fifth region 5. Therefore, a vibration of each of the fourth sound generating module 1500HL and the fifth sound generating module 1500HR may be attenuated or absorbed in a sixth region 6 of the display panel 110, and thus, may block or decrease the transfer of a sound of the fourth region 4 to the fifth region 5 and may block or decrease the transfer of a sound of the fifth region 5 to the fourth region 4. Accordingly, the degradation in sound quality caused by sound interference occurring in the fourth sound generating module 1500HL and the fifth sound generating module 1500HR may be reduced, and a sound characteristic of a middle-high-pitched sound band may be more enhanced.

Therefore, the first sound generating module 1500L and the fourth sound generating module 1500HL may be disposed in the first region 1 and the fourth region 4 that are a left region of a rear surface of the display panel 110, and may vibrate a left region of the display panel 110. The second sound generating module 1500R and the fifth sound generating module 1500HR may be disposed in the second region 2 and the fifth region 5 that are a right region of the rear surface of the display panel 110, and may vibrate a right region of the display panel 110. The third sound generating module 1500C may be disposed in the third region 3 that is a center region of the rear surface of the display panel 110, and may vibrate a center region of the display panel 110. The first sound generating module 1500L, the second sound generating module 1500R, the third sound generating module 1500C, the fourth sound generating module 1500HL, and the fifth sound generating module 1500HR may receive different vibration signals, and may each be independently driven. For example, the first sound generating module 1500L and the fourth sound generating module 1500HL may generate sounds by using the left region of the rear surface of the display panel 110 as a vibration plate, and the second sound generating module 1500R and the fifth sound generating module 1500HR may generate sounds by using the right region of the rear surface of the display panel 110 as a vibration plate. Also, the third sound generating module 1500C may generate a sound by using the center region of the display panel 110 as a vibration plate.

In the display apparatus according to an embodiment of the present disclosure, a woofer may be disposed for more enhancing a sound of a low-pitched sound band. For example, one or more woofers may be further disposed under or a lower portion of at least one of the first sound generating module 1500L and the second sound generating module 1500R. For example, one or more woofers may be further disposed under or a lower portion of at least one of the first region 1 and the second region 2. For example, a first woofer W3 may be disposed under or a lower portion of the first region 1 of the display panel 110. For example, the first woofer W3 may be disposed under or a lower portion of the first sound generating module 1500L. For example, a second woofer W4 may be disposed under or a lower portion of the second region 2 of the display panel 110. For example, the second woofer W4 may be disposed under or a lower portion of the second sound generating module 1500R. Therefore, the first woofer W3 and the second woofer W4 may output sounds of a low-pitched sound band. The first sound generating module 1500L, the second sound generating module 1500R, the third sound generating module 1500C, the fourth sound generating module 1500HL, and the fifth sound generating module 1500HR may output sounds of about 80 Hz to about 40 kHz, and the first woofer W3 and the second woofer W4 may output sounds of 80 Hz or less. Accordingly, the display apparatus may output a 5.1-channel sound.

Comparing with sound generating modules disposed on the left and the right of the display panel, since sound generating modules are further provided at an upper portion and a lower portion of the display panel with respect to a widthwise direction of the display panel, left and right sounds and height and bottom sounds may be enhanced, and a user may feel a sense of sound field like a real sound. For example, since the fourth sound generating module 1500HL and the fifth sound generating module 1500HR are further provided, a sound may be output from an upper portion of the display panel 110, thereby providing a display apparatus for realizing a stereo sound including left and right sounds and height and bottom sounds. Therefore, left and right sounds corresponding left and right images and height and bottom sounds corresponding to upper and lower images may be realized, and a real stereo sound of a real sound including stereo left and right sounds and stereo height and bottom sounds may be realized, thereby providing a user with a real sound instead of a virtual sound. Therefore, a real stereo sound or surround sound of a real sound including stereo left and right sounds and stereo height and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic AV (Audio Visual) or Dolby sound system.

Moreover, when a sound generating module having a multi-channel illustrated in FIGS. 24A and 24B is implemented in the sound plate of FIGS. 23A to 23D, a real stereo sound or surround sound of a real sound including stereo left and right sounds and stereo height and bottom sounds may be provided to a user, thereby enhancing a realistic sense When the sound generating module having a multi-channel illustrated in FIGS. 24A and 24B and a projection or image reproduction apparatus are provided in the sound plate of FIGS. 23A to 23D, a realistic AV or Dolby sound system may be provided so that a user simultaneously feels a realistic sound and image similarly or identically to reality, and moreover, a stereo sound for providing an immersion experience of a user and a realistic sense may be provided. Also, as described above with reference to FIGS. 1 to 22, a modularized sound generating module may be applied, and thus, a degree of freedom in design of a display apparatus or a rear cover may be enhanced in a case where a sound generating module is provided.

Figure 27:
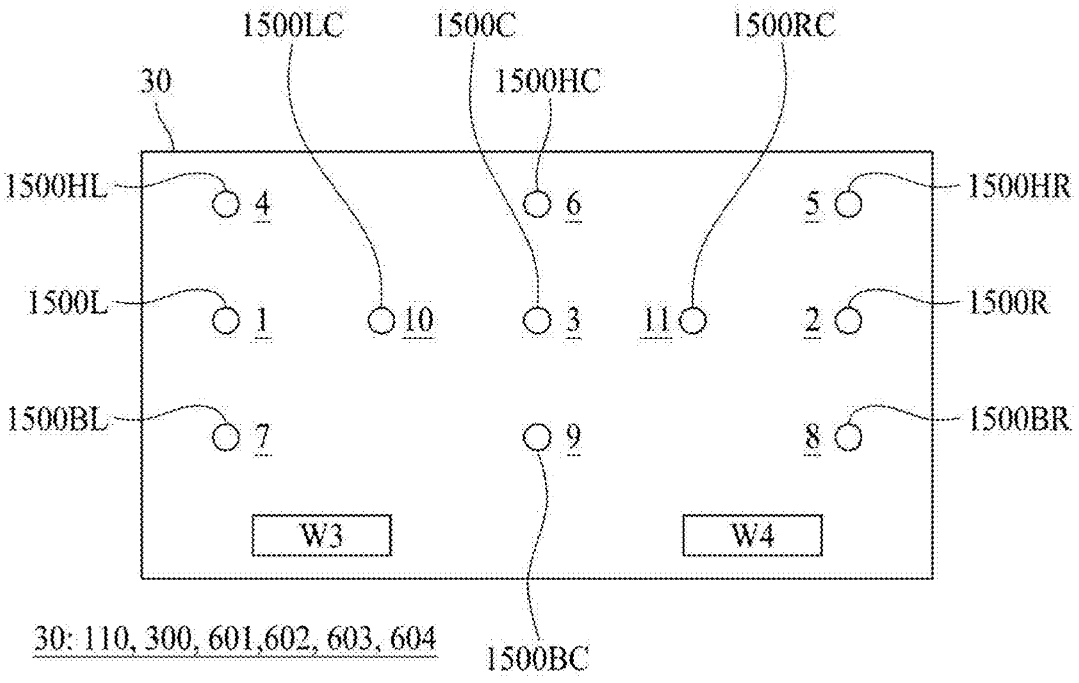
FIG. 27 illustrates a display apparatus including a sound generating module according to another embodiment of the present disclosure.

FIG. 27 illustrates a display apparatus including a sound generating module according to another embodiment of the present disclosure.

With reference to FIG. 27, a display panel 110 may include first to eleventh regions 1 to 11. For example, the first region 1, the fourth region 4, and the seventh region 7 may be a left region of a rear surface of the display panel 110. For example, the second region 2, the fifth region 5, and the eighth region 8 may be a right region of the rear surface of the display panel 110. For example, the third region 3, the sixth region 6, and the ninth region 9 may be a center region of the rear surface of the display panel 110. For example, the sixth region 6 may be a region between the fourth region 4 and the fifth region 5. For example, the ninth region 9 may be a region between the seventh region 7 and the eighth region 8. For example, the tenth region 10 may be a region between the first region 1 and the third region 3. For example, the eleventh region 11 may be a region between the second region 2 and the third region 3. For example, the seventh region 7 may be under the first region 1, and the eighth region 8 may be under the second region 2. For example, the tenth region 10 may be a region between the first, fourth, and seventh regions 1, 4, and 7 and the third, sixth, and ninth regions 3, 6, and 9. For example, the eleventh region 11 may be a region between the second, fifth, and eighth regions 2, 5, and 8 and the third, sixth, and ninth regions 3, 6, and 9. Reference numerals 1 to 11 referring to regions in the first to eleventh regions may be arbitrarily illustrated, and classification of reference numerals 1 to 11 and the first to eleventh regions do not limit descriptions of the present disclosure. Description relevant thereto may be identically or similarly applied to FIGS. 28 to 44C.

At least one sound generating module may be disposed in at least one of the first to eleventh regions 1 to 11. For example, a first sound generating module 1500L may be disposed in the first region 1 of the rear surface of the display panel 110, a fourth sound generating module 1500HL may be disposed in the fourth region 4 of the rear surface of the display panel 110, and a seventh sound generating module 1500BL may be disposed in the seventh region 7 of the rear surface of the display panel 110. A second sound generating module 1500R may be disposed in the second region 2 of the rear surface of the display panel 110, a fifth sound generating module 1500HR may be disposed in the fifth region 5 of the rear surface of the display panel 110, and an eighth sound generating module 1500BR may be disposed in the eighth region 8 of the rear surface of the display panel 110. A third sound generating module 1500C may be disposed in the third region 3 of the rear surface of the display panel 110, a sixth sound generating module 1500HC may be disposed in the sixth region 6 of the rear surface of the display panel 110, and a ninth sound generating module 1500BC may be disposed in the ninth region 9 of the rear surface of the display panel 110. A tenth sound generating module 1500LC may be disposed in the tenth region 10 of the rear surface of the display panel 110, and an eleventh sound generating module 1500RC may be disposed in the eleventh region 11 of the rear surface of the display panel 110. As another example, as described above with reference to FIG. 22, the first to eleventh sound generating modules may be disposed on a rear surface of a rear cover. For example, the first to eleventh sound generating modules may be disposed in a module structure.

The first sound generating module 1500L may be a left channel of the display panel 110, the fourth sound generating module 1500HL may be a height left channel of the display panel 110, and the seventh sound generating module 1500BL may be a bottom left channel of the display panel 110. The tenth sound generating module 1500LC may be a left center channel of the display panel 110. The second sound generating module 1500R may be a right channel of the display panel 110, the fifth sound generating module 1500HR may be a height right channel of the display panel 110, and the eighth sound generating module 1500BR may be a bottom right channel of the display panel 110. The eleventh sound generating module 1500RC may be a right center channel of the display panel 110. The third sound generating module 1500C may be a center channel of the display panel 110, the sixth sound generating module 1500HC may be a height center channel of the display panel 110, and the ninth sound generating module 1500BC may be a bottom center channel of the display panel 110.

For example, the first sound generating module 1500L may be disposed to be symmetrical with the fourth sound generating module 1500HL and/or the seventh sound generating module 1500BL, but is not limited thereto. For example, the first sound generating module 1500L may be disposed on the same line as the fourth sound generating module 1500HL and/or the seventh sound generating module 1500BL, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

For example, the second sound generating module 1500R may be disposed to be symmetrical with the fifth sound generating module 1500HR and/or the eighth sound generating module 1500BR, but is not limited thereto. For example, the second sound generating module 1500R may be disposed on the same line as the fifth sound generating module 1500HR and/or the eighth sound generating module 1500BR, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

For example, the third sound generating module 1500C may be disposed to be symmetrical with the sixth sound generating module 1500HC and/or the ninth sound generating module 1500BC, but is not limited thereto. For example, the third sound generating module 1500C may be disposed on the same line as the sixth sound generating module 1500HC and/or the ninth sound generating module 1500BC, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

For example, the tenth sound generating module 1500LC and the eleventh sound generating module 1500RC may be disposed to be symmetrical with at least one of the first sound generating module 1500L, the second sound generating module 1500R, and the third sound generating module 1500C, but is not limited thereto. For example, the tenth sound generating module 1500LC and the eleventh sound generating module 1500RC may be disposed on the same line as at least one of the first sound generating module 1500L, the second sound generating module 1500R, and the third sound generating module 1500C, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

For example, one of the fourth sound generating module 1500HL and the fifth sound generating module 1500HR may be disposed to be symmetrical with the sixth sound generating module 1500HC, but is not limited thereto. For example, one of the fourth sound generating module 1500HL and the fifth sound generating module 1500HR may be disposed on the same line as the sixth sound generating module 1500HC, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. For example, one of the first sound generating module 1500L, the second sound generating module 1500R, the tenth sound generating module 1500LC, and the eleventh sound generating module 1500RC may be disposed to be symmetrical with the third sound generating module 1500C, but is not limited thereto. For example, one of the first sound generating module 1500L, the second sound generating module 1500R, the tenth sound generating module 1500LC, and the eleventh sound generating module 1500RC may be disposed on the same line as the third sound generating module 1500C, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. For example, one of the seventh sound generating module 1500BL and the eighth sound generating module 1500BR may be disposed to be symmetrical with the ninth sound generating module 1500BC, but is not limited thereto. For example, one of the seventh sound generating module 1500BL and the eighth sound generating module 1500BR may be disposed on the same line as the ninth sound generating module 1500BC, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

Therefore, the first sound generating module 1500L, the fourth sound generating module 1500HL, and the seventh sound generating module 1500BL may be disposed in the first region 1, the fourth region 4, and the seventh region 7 that are a left region of the rear surface of the display panel 110, and may vibrate a left region of the display panel 110. The second sound generating module 1500R, the fifth sound generating module 1500HR, and the eighth sound generating module 1500BR may be disposed in the second region 2, the fifth region 5, and the eighth region 8 that are a right region of the rear surface of the display panel 110, and may vibrate a right region of the display panel 110. The third sound generating module 1500C, the sixth sound generating module 1500HC, and the ninth sound generating module 1500BC may be disposed in the third region 3, the sixth region 6, and the ninth region 9 that are a center region of the rear surface of the display panel 110, and may vibrate a center region of the display panel 110. The first sound generating module 1500L, the second sound generating module 1500R, the third sound generating module 1500C, the fourth sound generating module 1500HL, the fifth sound generating module 1500HR, the sixth sound generating module 1500HC, the seventh sound generating module 1500BL, the eighth sound generating module 1500BR, the ninth sound generating module 1500BC, the tenth sound generating module 1500LC, and the eleventh sound generating module 1500RC may receive different vibration signals and may each be independently driven. For example, the first sound generating module 1500L, the fourth sound generating module 1500HL, and the seventh sound generating module 1500BL may generate sounds by using the left region of the rear surface of the display panel 110 as a vibration plate. The second sound generating module 1500R, the fifth sound generating module 1500HR, and the eighth sound generating module 1500BR may generate sounds by using the right region of the rear surface of the display panel 110 as a vibration plate. The third sound generating module 1500C, the sixth sound generating module 1500HC, and the ninth sound generating module 1500BC may generate sounds by using the center region of the rear surface of the display panel 110 as a vibration plate. The tenth sound generating module 1500LC and the eleventh sound generating module 1500RC may generate sounds by using the left region, the center region, and the right region of the rear surface of the display panel 110 as a vibration plate. For example, the sixth sound generating module 1500HC may generate a sound toward an upper portion of the display panel 110. For example, the fourth sound generating module 1500HL, the fifth sound generating module 1500HR, and the sixth sound generating module 1500HC may generate sounds toward the upper portion of the display panel 110, thereby enhancing a sound at the upper portion of the display panel 110. For example, the seventh sound generating module 1500BL, the eighth sound generating module 1500BR, and the ninth sound generating module 1500C may generate sounds toward a lower upper portion of the display panel 110, thereby enhancing a sound at the lower portion of the display panel 110.

Moreover, a woofer may be disposed for more enhancing a sound of a low-pitched sound band. For example, one or more woofers may be further disposed under or a lower portion of at least one of the seventh region 7 and the eighth region 8. For example, one or more woofers may be further provided under or a lower portion of at least one of the seventh sound generating module 1500BL and the eighth sound generating module 1500BR. For example, a first woofer W3 may be disposed under the seventh region 7 or a lower portion of the seventh region 7 of the display panel 110. For example, the first woofer W3 may be disposed under or a lower portion of the seventh sound generating module 1500BL. For example, a second woofer W4 may be disposed under or a lower portion of the eighth region 8 of the display panel 110. For example, the second woofer W4 may be disposed under or a lower portion of the eighth sound generating module 1500BR. Therefore, the first woofer W3 and the second woofer W4 may output sounds of a low-pitched sound band.

As another example, the first woofer W3 and the second woofer W4 may not be provided, and at least one of the seventh sound generating module 1500BL and the eighth sound generating module 1500BR may be configured as a sound generating module having a woofer. For example, a first woofer-integrated sound generating module W1 may be provided in the seventh region 7, and a second woofer-integrated sound generating module W2 may be provided in the eighth region 8. For example, a sound generating module having a woofer may be provided in one or more of the seventh region 7 and the eighth region 8. Descriptions of the first woofer-integrated sound generating module W1 and the second woofer-integrated sound generating module W2 are the same as descriptions given above with reference to FIGS. 24A to 25B, and thus, their descriptions are omitted.

When a first woofer-integrated sound generating module W1 is disposed in the seventh region 7, the first woofer-integrated sound generating module W1 may be disposed to be symmetrical with one of the first sound generating module 1500L and the fourth sound generating module 1500HL. For example, the first woofer-integrated sound generating module W1 may be disposed on the same line as one of the first sound generating module 1500L and the fourth sound generating module 1500HL. When a second woofer-integrated sound generating module W2 is disposed in the eighth region 8, the second woofer-integrated sound generating module W2 may be disposed to be symmetrical with one of the second sound generating module 1500R and the fifth sound generating module 1500HR. For example, the second woofer-integrated sound generating module W2 may be disposed on the same line as one of the second sound generating module 1500R and the fifth sound generating module 1500HR. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

As another example, when the first woofer-integrated sound generating module W1 is disposed in the seventh region 7, the first woofer-integrated sound generating module W1 may be disposed to be asymmetrical with one of the first sound generating module 1500L and the fourth sound generating module 1500HL. For example, the first woofer-integrated sound generating module W1 may be disposed on a line which differs from one of the first sound generating module 1500L and the fourth sound generating module 1500HL. When the second woofer-integrated sound generating module W2 is disposed in the eighth region 8, the second woofer-integrated sound generating module W2 may be disposed to be asymmetrical with one of the second sound generating module 1500R and the fifth sound generating module 1500HR. For example, the second woofer-integrated sound generating module W2 may be disposed on a line which differs from one of the second sound generating module 1500R and the fifth sound generating module 1500HR. For example, the first woofer-integrated sound generating module W1 and the second woofer-integrated sound generating module W2 may be disposed on a line which differs from the third sound generating module 1500C. For example, sound constructive interference or destructive interference caused by vibration interference between a vibration and a standing wave generated by the first woofer-integrated sound generating module W1 and a vibration and a standing wave generated by the fourth sound generating module 1500HL or the seventh sound generating module 1500BL may be reduced. Undesired sound constructive or destructive interference caused by external interference except for a vibration based on a reproduced sound source may cause distortion of a sound to degrade sound quality, and an asymmetrical structure between the first woofer-integrated sound generating module W1 and one of the fourth sound generating module 1500HL and the seventh sound generating module 1500BL may prevent the undesired interference, thereby reproducing a natural sound similar to an original sound. Sound constructive interference or destructive interference caused by vibration interference between a vibration and a standing wave generated by the second woofer-integrated sound generating module W2 and a vibration and a standing wave generated by the fifth sound generating module 1500HR or the eighth sound generating module 1500BR may be reduced. Undesired sound constructive or destructive interference caused by external interference except for a vibration based on a reproduced sound source may cause distortion of a sound to degrade sound quality, and an asymmetrical structure between the second woofer-integrated sound generating module W2 and one of the fifth sound generating module 1500HR and the eighth sound generating module 1500BR may prevent the undesired interference, thereby reproducing a natural sound similar to an original sound.

As another example, the first woofer W3 and the second woofer W4 may not be provided, and at least one of the first sound generating module 1500L and the second sound generating module 1500R may be configured as a woofer-including sound generating module or a sound generating module having a woofer. For example, the first woofer-integrated sound generating module W1 may be provided in the first region 1, and the second woofer-integrated sound generating module W2 may be provided in the second region 2. For example, a woofer-including sound generating module may be provided in one or more of the first region 1 and the second region 2. Descriptions of the first woofer-integrated sound generating module W1 and the second woofer-integrated sound generating module W2 are the same as descriptions given above with reference to FIGS. 24A to 25B, and thus, their descriptions are omitted. Descriptions relevant thereto are the same as descriptions of an example where the first woofer-integrated sound generating module W1 and the second woofer-integrated sound generating module W2 are disposed in the seventh region 7 and the eighth region 8, and thus, are omitted.

As another example, the first woofer W3 and the second woofer W4 may not be provided, and at least one of the tenth sound generating module 1500LC and the eleventh sound generating module 1500RC may be configured as a woofer-including sound generating module. For example, the first woofer-integrated sound generating module W1 may be provided in the tenth region 10, and the second woofer-integrated sound generating module W2 may be provided in the eleventh region 11. For example, a woofer-including sound generating module may be provided in one or more of the tenth region 10 and the eleventh region 11.

As another example, the first woofer W3 and the second woofer W4 may not be provided, and at least one of the fourth sound generating module 1500HL and the fifth sound generating module 1500HR may be configured as a woofer-including sound generating module. For example, the first woofer-integrated sound generating module W1 may be provided in the fourth region 4, and the second woofer-integrated sound generating module W2 may be provided in the fifth region 5. For example, a woofer-including sound generating module may be provided in one or more of the fourth region 4 and the fifth region 5.

As another example, the first woofer W3 and the second woofer W4 may not be provided, and at least one of the sixth sound generating module 1500BC and the ninth sound generating module 1500HC may be configured as a woofer-including sound generating module. For example, the first woofer-integrated sound generating module W1 may be provided in the sixth region 6, and the second woofer-integrated sound generating module W2 may be provided in the ninth region 9. For example, a woofer-including sound generating module may be provided in one or more of the sixth region 6 and the ninth region 9. As another example, a woofer-including sound generating module may be provided in the third region 3. For example, the third sound generating module 1500C may be configured as a woofer-including sound generating module.

Therefore, a woofer may not be separately provided, and a woofer-integrated sound generating module may be disposed in one or more of the first to eleventh regions 1 to 11 and may output a sound of a low-pitched sound band, thereby providing a display apparatus for outputting sounds of the low-pitched sound band, a middle-pitched sound band, and a high-pitched sound band. For example, a sound generating module may be driven based on the same signal or a mono signal applied thereto.

The first sound generating module 1500L, the second sound generating module 1500R, the third sound generating module 1500C, the fourth sound generating module 1500HL, the fifth sound generating module 1500HR, the sixth sound generating module 1500HC, the seventh sound generating module 1500BL, the eighth sound generating module 1500BR, the ninth sound generating module 1500BC, the tenth sound generating module 1500LC, and the eleventh sound generating module 1500RC may output sounds of about 80 Hz to about 40 kHz. The first woofer W3 and the second woofer W4 may output sounds of 80 Hz or less. Accordingly, the display apparatus may output an 11.1-channel sound.

The display apparatus according to an embodiment of the present disclosure may realize left and right sounds corresponding left and right images and height and bottom sounds corresponding to upper and lower images, and a real stereo sound of a real sound including stereo left and right sounds and stereo height and bottom sounds may be realized, thereby providing a user with a real sound instead of a virtual sound. Therefore, a real stereo sound or surround sound of a real sound including stereo left and right sounds and stereo height and bottom sounds may be provided to a user, thereby enhancing a sense of realism. Accordingly, in theaters, private cinemas, and devices such as televisions, a user may simultaneously feel a realistic sound and image similarly or identically to reality, and for example, may feel a realistic AV or Dolby sound system.

Moreover, when a sound generating module having a multi-channel illustrated in FIGS. 24A and 24B is implemented in the sound plate of FIGS. 23A to 23D, a real stereo sound or surround sound of a real sound including stereo left and right sounds and stereo height and bottom sounds may be provided to a user, thereby enhancing a realistic sense. When the sound generating module having a multi-channel illustrated in FIGS. 24A and 24B and a projection or image reproduction apparatus are provided in the sound plate of FIGS. 23A to 23D, a realistic AV or Dolby sound system may be provided so that a user simultaneously feels a realistic sound and image similarly or identically to reality, and moreover, a stereo sound for providing an immersion experience of a user and a realistic sense may be provided. Also, as described above with reference to FIGS. 1 to 22, a modularized sound generating module may be applied, and thus, a degree of freedom in design of a display apparatus or a rear cover may be enhanced in a case where a sound generating module is provided.

Figure 28:
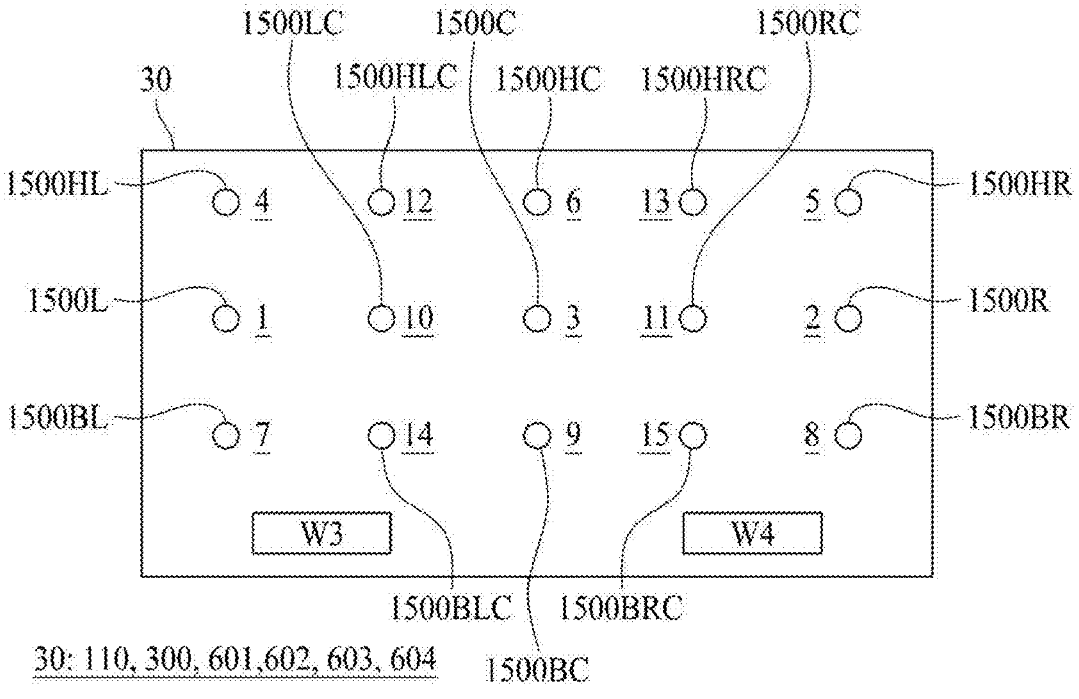
FIG. 28 illustrates a display apparatus including a sound generating module according to another embodiment of the present disclosure.

FIG. 28 illustrates a display apparatus including a sound generating module according to another embodiment of the present disclosure.

With reference to FIG. 28, a display panel 110 may include first to fifteenth regions 1 to 15. The first to fifteenth regions 1 to 15 may have the same area, but are not limited thereto. For example, the first to fifteenth regions 1 to 15 may be arranged at equal intervals, but are not limited thereto. For example, the first region 1, the fourth region 4, and the seventh region 7 may be a left region of a rear surface of the display panel 110. For example, the second region 2, the fifth region 5, and the eighth region 8 may be a right region of the rear surface of the display panel 110. For example, the third region 3, the sixth region 6, and the ninth region 9 may be a center region of the rear surface of the display panel 110. For example, the twelfth region 12 may be a region between the fourth region 4 and the sixth region 6. For example, the fourteenth region 14 may be a region between the seventh region 7 and the ninth region 9. For example, the fifteenth region 15 may be a region between the eighth region 8 and the ninth region 9. For example, the tenth region 10, the twelfth region 12, and the fourteenth region 14 may be regions between the first, fourth, and seventh regions 1, 4, and 7 and the third, sixth, and ninth regions 3, 6, and 9. For example, the eleventh region 11, the thirteenth region 13, and the fifteenth region 15 may be regions between the second, fifth, and eighth regions 2, 5, and 8 and the third, sixth, and ninth regions 3, 6, and 9. Reference numerals 1 to 15 referring to regions in the first to fifteenth regions 1 to 15 may be arbitrarily illustrated, and classification of reference numerals 1 to 15 and the first to fifteenth regions 1 to 15 do not limit descriptions of the present disclosure. Description relevant thereto may be identically or similarly applied to FIGS. 29 to 44C.

At least one sound generating module may be disposed in at least one of the first to fifteenth regions 1 to 15. For example, a first sound generating module 1500L may be disposed in the first region 1 of the rear surface of the display panel 110, a fourth sound generating module 1500HL may be disposed in the fourth region 4 of the rear surface of the display panel 110, and a seventh sound generating module 1500BL may be disposed in the seventh region 7 of the rear surface of the display panel 110. A second sound generating module 1500R may be disposed in the second region 2 of the rear surface of the display panel 110, a fifth sound generating module 1500HR may be disposed in the fifth region 5 of the rear surface of the display panel 110, and an eighth sound generating module 1500BR may be disposed in the eighth region 8 of the rear surface of the display panel 110. A third sound generating module 1500C may be disposed in the third region 3 of the rear surface of the display panel 110, a sixth sound generating module 1500HC may be disposed in the sixth region 6 of the rear surface of the display panel 110, and a ninth sound generating module 1500BC may be disposed in the ninth region 9 of the rear surface of the display panel 110. A tenth sound generating module 1500LC may be disposed in the tenth region 10 of the rear surface of the display panel 110, and a twelfth sound generating module 1500HLC may be disposed in the twelfth region 12 of the rear surface of the display panel 110. A fourteenth sound generating module 1500BLC may be disposed in the fourteenth region 14 of the rear surface of the display panel 110. An eleventh sound generating module 1500RC may be disposed in the eleventh region 11 of the rear surface of the display panel 110, a thirteenth sound generating module 1500HRC may be disposed in the thirteenth region 13 of the rear surface of the display panel 110, and a fifteenth sound generating module 1500BRC may be disposed in the fifteenth region 15 of the rear surface of the display panel 110. As another example, as described above with reference to FIG. 22, the first to fifteenth sound generating modules may be disposed on a rear surface of a rear cover. For example, the first to fifteenth sound generating modules may be disposed in a module structure.

The first sound generating module 1500L may be a left channel of the display panel 110, the fourth sound generating module 1500HL may be a height left channel of the display panel 110, and the seventh sound generating module 1500BL may be a bottom left channel of the display panel 110. The tenth sound generating module 1500LC may be a left center channel of the display panel 110, the twelfth sound generating module 1500HLC may be a height left channel of the display panel 110, and the fourteenth sound generating module 1500BLC may be a bottom left channel of the display panel 110. The second sound generating module 1500R may be a right channel of the display panel 110, the fifth sound generating module 1500HR may be a height right channel of the display panel 110, and the eighth sound generating module 1500BR may be a bottom right channel of the display panel 110. The eleventh sound generating module 1500RC may be a right center channel of the display panel 110, the thirteenth sound generating module 1500HRC may be a height right channel of the display panel 110, and the fifteenth sound generating module 1500BRC may be a bottom right channel of the display panel 110. The third sound generating module 1500C may be a center channel of the display panel 110, the sixth sound generating module 1500HC may be a height center channel of the display panel 110, and the ninth sound generating module 1500BC may be a bottom center channel of the display panel 110.

For example, the first sound generating module 1500L may be disposed to be symmetrical with the fourth sound generating module 1500HL and/or the seventh sound generating module 1500BL, but is not limited thereto. For example, the first sound generating module 1500L may be disposed on the same line as the fourth sound generating module 1500HL and/or the seventh sound generating module 1500BL, but is not limited thereto. For example, the second sound generating module 1500R may be disposed to be symmetrical with the fifth sound generating module 1500HR and/or the eighth sound generating module 1500BR, but is not limited thereto. For example, the second sound generating module 1500R may be disposed on the same line as the fifth sound generating module 1500HR and/or the eighth sound generating module 1500BR, but is not limited thereto. For example, the third sound generating module 1500C may be disposed to be symmetrical with the sixth sound generating module 1500HC and/or the ninth sound generating module 1500BC, but is not limited thereto. For example, the third sound generating module 1500C may be disposed on the same line as the sixth sound generating module 1500HC and/or the ninth sound generating module 1500BC, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

For example, the tenth sound generating module 1500LC may be disposed to be symmetrical with the twelfth sound generating module 1500HLC and/or the fourteenth sound generating module 1500BLC, but is not limited thereto. For example, the tenth sound generating module 1500LC may be disposed on the same line as the twelfth sound generating module 1500HLC and/or the fourteenth sound generating module 1500BLC, but is not limited thereto. For example, the eleventh sound generating module 1500RC may be disposed to be symmetrical with the thirteenth sound generating module 1500HRC and/or the fifteenth sound generating module 1500BRC, but is not limited thereto. For example, the eleventh sound generating module 1500RC may be disposed on the same line as the thirteenth sound generating module 1500HRC and/or the fifteenth sound generating module 1500BRC, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

For example, one of the fourth sound generating module 1500HL, the fifth sound generating module 1500HR, and the sixth sound generating module 1500HC may be disposed to be symmetrical with one of the twelfth sound generating module 1500HLC and the thirteenth sound generating module 1500HRC, but is not limited thereto. For example, one of the fourth sound generating module 1500HL, the fifth sound generating module 1500HR, and the sixth sound generating module 1500HC may be disposed on the same line as one of the twelfth sound generating module 1500HLC and the thirteenth sound generating module 1500HRC, but is not limited thereto. For example, one of the first sound generating module 1500L, the second sound generating module 1500R, and the third sound generating module 1500C may be disposed to be symmetrical with one of the tenth sound generating module 1500LC and the eleventh sound generating module 1500RC, but is not limited thereto. For example, one of the first sound generating module 1500L, the second sound generating module 1500R, and the third sound generating module 1500C may be disposed on the same line as one of the tenth sound generating module 1500LC and the eleventh sound generating module 1500RC, but is not limited thereto. For example, one of the seventh sound generating module 1500BL, the eighth sound generating module 1500BR, and the ninth sound generating module 1500BC may be disposed to be symmetrical with one of the fourteenth sound generating module 1500BLC and the fifteenth sound generating module 1500BRC, but is not limited thereto. For example, one of the seventh sound generating module 1500BL, the eighth sound generating module 1500BR, and the ninth sound generating module 1500BC may be disposed on the same line as one of the fourteenth sound generating module 1500BLC and the fifteenth sound generating module 1500BRC, but is not limited thereto. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

Moreover, a woofer may be disposed for more enhancing a sound of a low-pitched sound band. For example, a woofer may be further disposed under or a lower portion of at least one of the first to fifteenth regions 1 to 15. For example, a woofer may be further provided under or a lower portion of at least one of the first to fifteenth sound generating modules 1500L to 1500BRC. For example, a first woofer W3 may be disposed under or a lower portion of the seventh region 7 of the display panel 110. For example, the first woofer W3 may be disposed under or a lower portion of the seventh sound generating module 1500BL. For example, the first woofer W3 may be disposed between the seventh region 7 and the fourteenth region 14. For example, a second woofer W4 may be disposed under or a lower portion of the eighth region 8 of the display panel 110. For example, the second woofer W4 may be disposed under or a lower portion of the eighth sound generating module 1500BR. For example, the second woofer W4 may be disposed between the eighth region 8 and the fifteenth region 15. Therefore, the first woofer W3 and the second woofer W4 may output sounds of a low-pitched sound band.

As another example, the first woofer W3 and the second woofer W4 may not be provided, and at least one of the seventh sound generating module 1500BL and the eighth sound generating module 1500BR may be configured as a woofer-including sound generating module. For example, a first woofer-integrated sound generating module W1 may be provided in the seventh region 7, and a second woofer-integrated sound generating module W2 may be provided in the eighth region 8. For example, a woofer-including sound generating module may be provided in one or more of the seventh region 7 and the eighth region 8. Descriptions of the first woofer-integrated sound generating module W1 and the second woofer-integrated sound generating module W2 are the same as descriptions given above with reference to FIGS. 24A to 25B, and thus, their descriptions are omitted.

When a first woofer-integrated sound generating module W1 is disposed in the seventh region 7, the first woofer-integrated sound generating module W1 may be disposed to be symmetrical with one of the first sound generating module 1500L and the fourth sound generating module 1500HL. For example, the first woofer-integrated sound generating module W1 may be disposed on the same line as one of the first sound generating module 1500L and the fourth sound generating module 1500HL. When a second woofer-integrated sound generating module W2 is disposed in the eighth region 8, the second woofer-integrated sound generating module W2 may be disposed to be symmetrical with one of the second sound generating module 1500R and the fifth sound generating module 1500HR. For example, the second woofer-integrated sound generating module W2 may be disposed on the same line as one of the second sound generating module 1500R and the fifth sound generating module 1500HR. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound.

As another example, when the first woofer-integrated sound generating module W1 is disposed in the seventh region 7, the first woofer-integrated sound generating module W1 may be disposed to be asymmetrical with one of the first sound generating module 1500L and the fourth sound generating module 1500HL. For example, the first woofer-integrated sound generating module W1 may be disposed on a line which differs from one of the first sound generating module 1500L and the fourth sound generating module 1500HL. When the second woofer-integrated sound generating module W2 is disposed in the eighth region 8, the second woofer-integrated sound generating module W2 may be disposed to be asymmetrical with one of the second sound generating module 1500R and the fifth sound generating module 1500HR. For example, the second woofer-integrated sound generating module W2 may be disposed on a line which differs from one of the second sound generating module 1500R and the fifth sound generating module 1500HR. For example, the first woofer-integrated sound generating module W1 and the second woofer-integrated sound generating module W2 may be disposed on a line which differs from the third sound generating module 1500C. For example, sound constructive interference or destructive interference caused by vibration interference between a vibration and a standing wave generated by the first woofer-integrated sound generating module W1 and a vibration and a standing wave generated by the fourth sound generating module 1500HL or the seventh sound generating module 1500BL may be reduced. Undesired sound constructive or destructive interference caused by external interference except for a vibration based on a reproduced sound source may cause distortion of a sound to degrade sound quality, and an asymmetrical structure between the first woofer-integrated sound generating module W1 and one of the fourth sound generating module 1500HL and the seventh sound generating module 1500BL may prevent the undesired interference, thereby reproducing a natural sound similar to an original sound. Sound constructive interference or destructive interference caused by vibration interference between a vibration and a standing wave generated by the second woofer-integrated sound generating module W2 and a vibration and a standing wave generated by the fifth sound generating module 1500HR or the eighth sound generating module 1500BR may be reduced. Undesired sound constructive or destructive interference caused by external interference except for a vibration based on a reproduced sound source may cause distortion of a sound to degrade sound quality, and an asymmetrical structure between the second woofer-integrated sound generating module W2 and one of the fifth sound generating module 1500HR and the eighth sound generating module 1500BR may prevent the undesired interference, thereby reproducing a natural sound similar to an original sound.

As another example, the first woofer W3 and the second woofer W4 may not be provided, and at least one of the first sound generating module 1500L and the second sound generating module 1500R may be configured as a woofer-including sound generating module or a sound generating module having a woofer. For example, the first woofer-integrated sound generating module W1 may be provided in the first region 1, and the second woofer-integrated sound generating module W2 may be provided in the second region 2. For example, a woofer-including sound generating module may be provided in one or more of the first region 1 and the second region 2. Descriptions of the first woofer-integrated sound generating module W1 and the second woofer-integrated sound generating module W2 are the same as descriptions given above with reference to FIGS. 24A to 25B, and thus, their descriptions are omitted. Descriptions relevant thereto are the same as descriptions of an example where the first woofer-integrated sound generating module W1 and the second woofer-integrated sound generating module W2 are disposed in the first region 1 and the second region 2, and thus, are omitted.

As another example, the first woofer W3 and the second woofer W4 may not be provided, and at least one of the tenth sound generating module 1500LC and the eleventh sound generating module 1500RC may be configured as a woofer-including sound generating module. For example, the first woofer-integrated sound generating module W1 may be provided in the tenth region 10, and the second woofer-integrated sound generating module W2 may be provided in the eleventh region 11. For example, a woofer-including sound generating module may be provided in one or more of the tenth region 10 and the eleventh region 11. Descriptions of the first woofer-integrated sound generating module W1 and the second woofer-integrated sound generating module W2 are the same as descriptions given above with reference to FIGS. 24A to 25B, and thus, their descriptions are omitted. Descriptions relevant thereto are the same as descriptions of an example where the first woofer-integrated sound generating module W1 and the second woofer-integrated sound generating module W2 are disposed in the tenth region 10 and the eleventh region 11, and thus, are omitted.

As another example, the first woofer W3 and the second woofer W4 may not be provided, and at least one of the fourteenth sound generating module 1500BLC and the fifteenth sound generating module 1500BRC may be configured as a woofer-including sound generating module. For example, the first woofer-integrated sound generating module W1 may be provided in the fourteenth region 14, and the second woofer-integrated sound generating module W2 may be provided in the fifteenth region 15. For example, a woofer-including sound generating module may be provided in one or more of the fourteenth region 14 and the fifteenth region 15. Descriptions of the first woofer-integrated sound generating module W1 and the second woofer-integrated sound generating module W2 are the same as descriptions given above with reference to FIGS. 24A to 25B, and thus, their descriptions are omitted. Descriptions relevant thereto are the same as descriptions of an example where the first woofer-integrated sound generating module W1 and the second woofer-integrated sound generating module W2 are disposed in the fourteenth region 14 and the fifteenth region 15, and thus, are omitted.

As another example, the first woofer W3 and the second woofer W4 may not be provided, and at least one of the fourth sound generating module 1500HL and the fifth sound generating module 1500HR may be configured as a woofer-including sound generating module. For example, the first woofer-integrated sound generating module W1 may be provided in the fourth region 4, and the second woofer-integrated sound generating module W2 may be provided in the fifth region 5. For example, a woofer-including sound generating module may be provided in one or more of the fourth region 4 and the fifth region 5.

As another example, the first woofer W3 and the second woofer W4 may not be provided, and at least one of the twelfth sound generating module 1500HLC and the thirteenth sound generating module 1500HRC may be configured as a woofer-including sound generating module. For example, the first woofer-integrated sound generating module W1 may be provided in the twelfth region 12, and the second woofer-integrated sound generating module W2 may be provided in the thirteenth region 13. For example, a woofer-including sound generating module may be provided in one or more of the twelfth region 12 and the thirteenth region 13.

As another example, the first woofer W3 and the second woofer W4 may not be provided, and at least one of the sixth sound generating module 1500HC and the ninth sound generating module 1500BC may be configured as a woofer-including sound generating module. For example, the first woofer-integrated sound generating module W1 may be provided in the sixth region 6, and the second woofer-integrated sound generating module W2 may be provided in the ninth region 9. For example, a woofer-including sound generating module may be provided in one or more of the sixth region 6 and the ninth region 9. As another example, a woofer-including sound generating module may be provided in the third region 3. For example, the third sound generating module 1500C may be configured as a woofer-including sound generating module.

Therefore, a woofer may not be separately provided, and a woofer-integrated sound generating module may be disposed in one or more of the first to fifteenth regions 1 to 15 and may output a sound of a low-pitched sound band, thereby providing a display apparatus for outputting sounds of the low-pitched sound band, a middle-pitched sound band, and a high-pitched sound band. For example, a sound generating module may be driven based on the same signal or a mono signal applied thereto.

The first sound generating module 1500L, the second sound generating module 1500R, the third sound generating module 1500C, the fourth sound generating module 1500HL, the fifth sound generating module 1500HR, the sixth sound generating module 1500HC, the seventh sound generating module 1500BL, the eighth sound generating module 1500BR, the ninth sound generating module 1500BC, the tenth sound generating module 1500LC, the eleventh sound generating module 1500RC, the twelfth sound generating module 1500HLC, the thirteenth sound generating module 1500HRC, the fourteenth sound generating module 1500BLC, and the fifteenth sound generating module 1500BRC may output sounds of about 80 Hz to about 40 kHz. The first woofer W3 and the second woofer W4 may output sounds of 80 Hz or less. Accordingly, the display apparatus may output a 15.1-channel sound.

The display apparatus according to an embodiment of the present disclosure may realize left and right sounds corresponding left and right images and height and bottom sounds corresponding to upper and lower images, and a real stereo sound of a real sound including stereo left and right sounds and stereo height and bottom sounds may be realized, thereby providing a user with a real sound instead of a virtual sound. Therefore, a real stereo sound or surround sound of a real sound including stereo left and right sounds and stereo height and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic AV or Dolby sound system.

Moreover, when a sound generating module having a multi-channel illustrated in FIGS. 24A and 24B is implemented in the sound plate of FIGS. 23A to 23D, a real stereo sound or surround sound of a real sound including stereo left and right sounds and stereo height and bottom sounds may be provided to a user, thereby enhancing a realistic sense. When the sound generating module having a multi-channel illustrated in FIGS. 24A and 24B and a projection or image reproduction apparatus are provided in the sound plate of FIGS. 23A to 23D, a realistic AV or Dolby sound system may be provided so that a user simultaneously feels a realistic sound and image similarly or identically to reality, and moreover, a stereo sound for providing an immersion experience of a user and a realistic sense may be provided. Also, as described above with reference to FIGS. 1 to 22, a modularized sound generating module may be applied, and thus, a degree of freedom in design of a display apparatus or a rear cover may be enhanced in a case where a sound generating module is provided.

FIGS. 29A to 29E illustrate a sound generating module and a partition according to another embodiment of the present disclosure.

With reference to FIGS. 29A to 29E, a display panel 110 may include first to sixth regions 1 to 6. The first to sixth regions 1 to 6 may have the same area, but are not limited thereto. For example, the first to sixth regions 1 to 6 may be arranged at equal intervals or distances. For example, all channels of sound generating modules disposed in the first to sixth regions 1 to 6 may reproduce or output sounds having the same frequency domain or range, and thus, sound harmony between the channels may be uniform. Therefore, a sound quality difference between a case (for example, a case where a sound field is widened) having an acoustic effect and a case (for example, a case where a sound field is not widened) having no acoustic effect may decrease, and uniform or constant sound quality may be realized. As another example, the first region 1, the second region 2, and the third region 3 may have an area which are greater than those of the fourth region 4, the fifth region 5, and the sixth region 6. For example, a low sound range of a left-right stereo may be reinforced, and thus, the quality of a normal sound having no acoustic effect may be enhanced. As another example, the fourth region 4, the fifth region 5, and the sixth region 6 may have an area which are less than those of the first region 1, the second region 2, and the third region 3. For example, a low sound range of a channel associated with an acoustic effect may be reinforced, and thus, in a case which reproduces a sound having an acoustic effect, a sound field which is a space for expressing a sound may increase, thereby enhancing an acoustic effect expressing a position of a sound. Accordingly, a size of each of the first to sixth regions 1 to 6 may be adjusted based on a desired-pitched sound band.

With reference to FIGS. 29A to 29E, a partition may be further provided near a sound generating module. The partition may be an air gap or a space where a sound is generated when the display panel 110 vibrates. An air gap or a space which generates or transfers a sound may be referred to as a partition. The partition may separate sounds or may separate channels, and may prevent or decrease the occurrence of a non-clear sound caused by sound interference. The partition may be referred to as an enclosure or a baffle, but the term is not limited thereto. In embodiments, an example where the partition is disposed at a rear cover will be described, but an embodiment of the present disclosure is not limited thereto. In other embodiments, the partition may be disposed on a rear surface of the display panel 110. In order to illustrate the sound generating module and the partition, an example where the partition is disposed at the rear cover will be described. For example, in a case where the partition is disposed at the rear cover, an influence of the partition on the image quality of the display panel may be reduced. As described above with reference to FIG. 22, in a case where the sound generating module is disposed at the rear cover, the partition may be disposed at the rear cover.

Figure 29A:
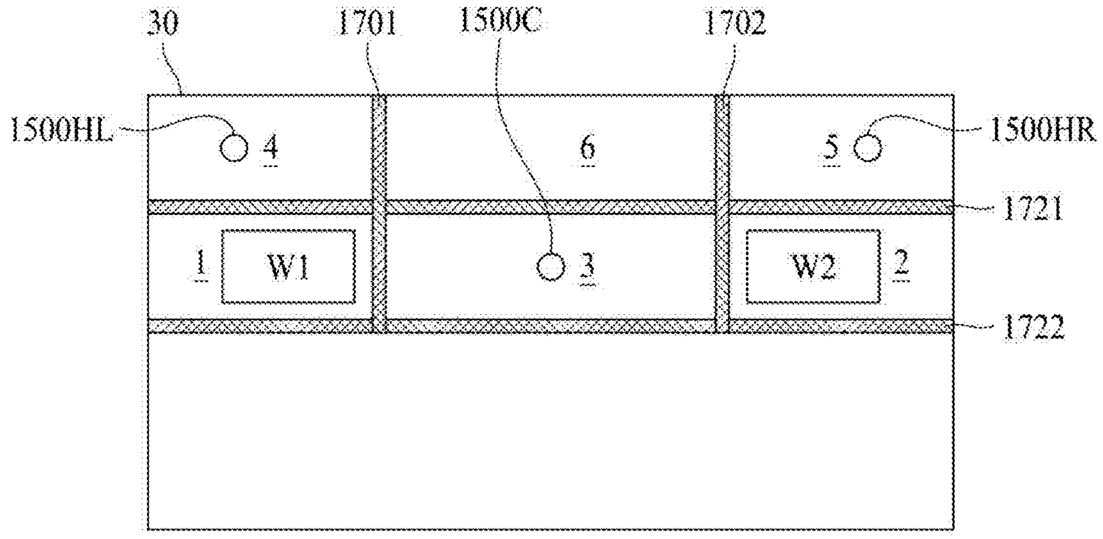
FIGS. 29A to 29E illustrate a sound generating module and a partition according to another embodiment of the present disclosure.

With reference to FIG. 29A, a partition may separate a left sound and a right sound which are output from a sound generating module disposed on a rear surface of a display panel 110. For example, the partition may be disposed between a rear cover 300 and the display panel 110 corresponding to first to sixth regions 1 to 6 of the display panel 110. For example, a fourth partition 1701 may be disposed between the first and fourth regions 1 and 4 and the third region 3. For example, the fourth partition 1701 may be disposed between the first and fourth regions 1 and 4 and the third and sixth regions 3 and 6. A fifth partition 1702 may be disposed between the second and fifth regions 2 and 5 and the third region 3. For example, the fifth partition 1702 may be disposed between the second and fifth regions 2 and 5 and the third and sixth regions 3 and 6. The fourth partition 1701 and the fifth partition 1702 may separate a left channel and a right channel or a left sound and a right sound generated in first woofer-integrated and fourth sound generating modules W1 and 1500HL and second woofer-integrated and fifth sound generating modules W2 and 1500HR.

To realize a stereo sound or a stereophonic sound, the fourth sound generating module 1500HL and the fifth sound generating module 1500HR may be further provided, and a partition should be further provided for separating channels or sounds, generated by the fourth sound generating module 1500HL and the fifth sound generating module 1500HR, and channels or sounds generated by the first woofer-integrated sound generating module W1, the second woofer-integrated sound generating module W2, and a third sound generating module 1500C. In a case where the fourth partition 1701 and the fifth partition 1702 are provided, a left sound and a right sound or a left channel and a right channel may be separated. A partition for generating a sound of each sound generating module should be provided so that a height sound or a height channel is separated and sound generating modules disposed in regions of a rear surface of the display panel 110 realize independent sounds for each region.

The partition may be configured to separate a height channel of the display panel 110 and a bottom channel of the display panel 110. For example, a first partition 1721 may separate the height channel of the display panel 110 and the bottom channel of the display panel 110. For example, the first partition 1721 may separate the channels or the sounds, generated by the fourth sound generating module 1500HL and the fifth sound generating module 1500HR disposed at an upper portion of the display panel 110, and the channels or the sounds generated by the first woofer-integrated sound generating module W1, the second woofer-integrated sound generating module W2, and a third sound generating module 1500C disposed at a lower portion of the display panel 110. A second partition 1722 may be disposed at the lower portion of the display panel 110 and may be separated from a driver for driving the display panel 110. For example, a second partition 1722 may be disposed under or a lower portion of the first woofer-integrated sound generating module W1, the second woofer-integrated sound generating module W2, and the third sound generating module 1500C. For example, the second partition 1722 may be separated from a driver for driving the first woofer-integrated sound generating module W1, the second woofer-integrated sound generating module W2, the third sound generating module 1500C, and the display panel 110.

The first partition 1721, the second partition 1722, the fourth partition 1701, and the fifth partition 1702 may be disposed at the rear cover 300. For example, the first partition 1721, the second partition 1722, the fourth partition 1701, and the fifth partition 1702 may be disposed on a front surface of the rear cover 300. For example, the first partition 1721, the second partition 1722, the fourth partition 1701, and the fifth partition 1702 may be disposed between the display panel 110 and the rear cover 300. For example, the first partition 1721, the second partition 1722, the fourth partition 1701, and the fifth partition 1702 may be disposed between the rear surface of the display panel 110 and the front surface of the rear cover 300.

The first partition 1721, the second partition 1722, the fourth partition 1701, and the fifth partition 1702 may be formed of one or more of a double-sided tape, a double-sided foam tape, a double-sided foam pad, a single-sided tape, a single-sided foam pad, an adhesive, and a bond, but is not limited thereto. When each of the first partition 1721, the second partition 1722, the fourth partition 1701, and the fifth partition 1702 is formed of the double-sided tape or the double-sided foam pad, an adhesive force may be enhanced in a process of attaching the front surface of the rear cover 300 on the rear surface of the display panel 110. For example, the first partition 1721, the second partition 1722, the fourth partition 1701, and the fifth partition 1702 may include a material having an elastic force which enables compression to be made to a certain degree, and for example, may include polyurethane, polyolefin, polyethylene, and/or the like, but is not limited thereto.

Figure 29B:
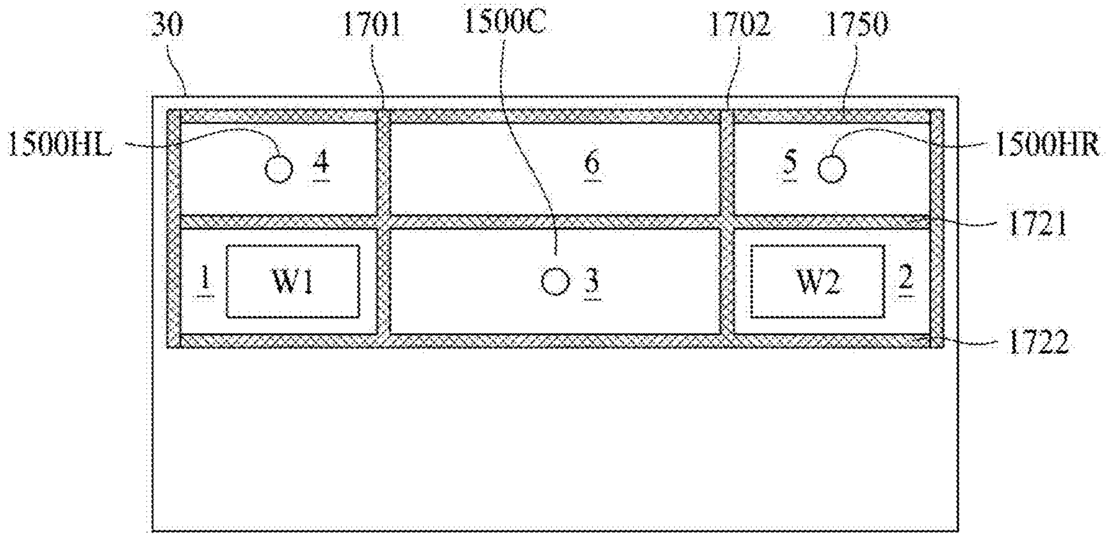

With reference to FIG. 29B, a first partition 1721, a fourth partition 1701, and a fifth partition 1702 may be provided, and a partition 1750 may be disposed between a rear cover 300 and a display panel 110. For example, the partition 1750 may be disposed at an edge or periphery of the rear cover 300. For example, the partition 1750 may be disposed at an edge or periphery of an front surface of the rear cover 300. The partition 1750 may be a whole region of four outer sides of the front surface of the rear cover 300. As another example, the partition 1750 may be disposed at an edge or periphery of the rear surface of the display panel 110. The partition 1750 may be a whole region of four outer sides of the rear surface of the display panel 110. The partition 1750 may be a whole region of the rear cover 300 or the four outer sides of the rear surface of the display panel 110. For example, the partition 1750 may be disposed to surround a third sound generating module 1500C, a fourth sound generating module 1500HL, and a fifth sound generating module 1500HR. The partition 1750 may be disposed along a shape of the display panel 110 so as to prevent a wave phenomenon of the display panel 110. The wave phenomenon may be a phenomenon where a shape of the connection part described above with reference to FIG. 4 or 9 is bounced to a screen of a display panel when a thickness of a substrate configuring the display panel is thinned, and may be a problem where the display panel is not flat or a rear cover is not flat, and a screen is unevenly seen. For example, when the partition 1750 is an adhesive member for attaching a rear cover on the display panel described above with reference to FIGS. 8, 10, and 19 to 21, the adhesive member described above with reference to FIGS. 8, 10, and 19 to 21 may be omitted, and the partition 1750 may act as an adhesive member. However, an embodiment of the present disclosure is not limited thereto, and an adhesive for attaching a display panel on a rear cover may be provided on a rear surface of the display panel or at the rear cover.

In a process of placing the first partition 1721, the fourth partition 1701, the fifth partition 1702, and the partition 1750, the first partition 1721 may be placed, the partition 1750 may be placed, and the fourth partition 1701 and the fifth partition 1702 may be placed subsequently. As another example, the first partition 1721 may be placed, the fourth partition 1701 and the fifth partition 1702 may be placed, and the partition 1750 may be placed subsequently. However, an order in which the partitions are placed does not limit descriptions of the embodiment of the present disclosure. The partition 1750 may be first placed in a lengthwise direction of the rear cover, and then, may be placed in a widthwise direction. However, an order in which the partitions are placed does not limit descriptions of the embodiment of the present disclosure. In the following embodiments, an example where the first partition 1721 is placed, the partition 1750 is placed, and the fourth partition 1701 and the fifth partition 1702 are placed subsequently is illustrated, but an embodiment of the present disclosure is not limited thereto. Such a description may be identically or similarly applied to the following embodiments.

Figure 29C:
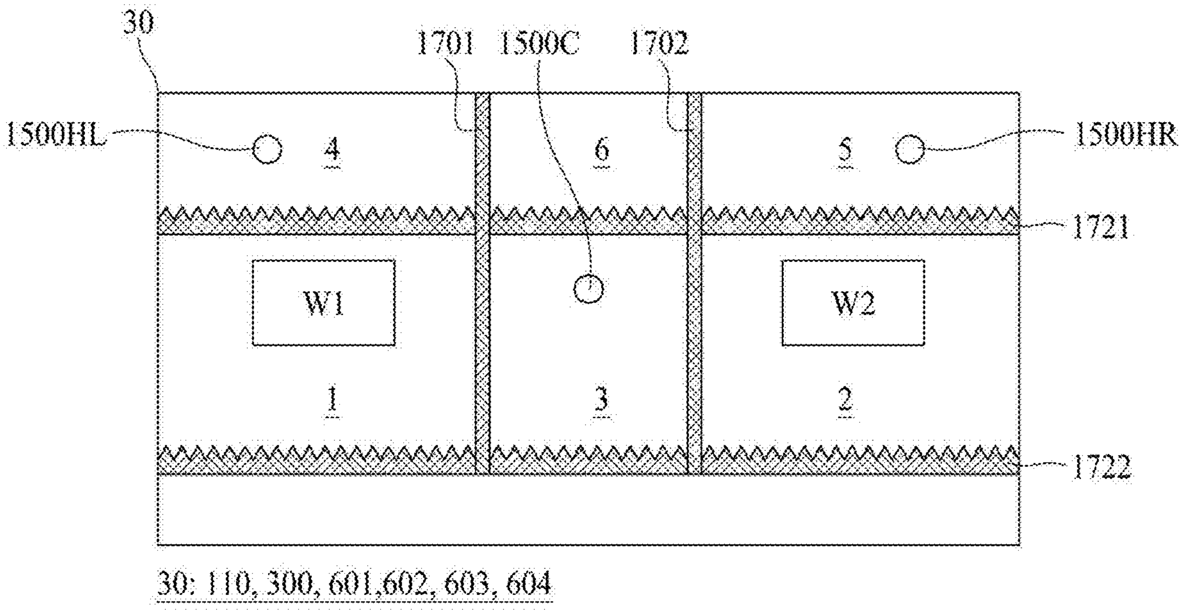

With reference to FIG. 29C, a shape of a first partition 1721 and a shape of a second partition 1722 may be differently implemented. A shape of the first partition 1721 and a shape of the second partition 1722 may differ from a shape of a display panel 110 or shapes of the fourth partition 1701 and the fifth partition 1702. For example, the first partition 1721 and the second partition 1722 may have a non-flat shape or may not have a linear shape. When a partition has a non-flat shape or does not have a linear shape, the partition may diffuse a standing wave. For example, when a partition is implemented in a saw-toothed shape, a triangular shape, and an end-rounded triangular shape, a standing wave may be diffused in various directions by the saw-toothed shape, the triangular shape, and the end-rounded triangular shape, thereby enhancing a sound output characteristic. For example, the first partition 1721 and the second partition 1722 may have a saw-toothed shape, a triangular shape, and an end-rounded triangular shape. For example, sawtooth of a partition may be disposed toward a sound generating module. For example, when a partition has a triangular shape, an end of a triangle may be disposed toward a sound generating module. For example, when a partition has an end-rounded triangular shape, an end of an end-rounded triangle may be disposed toward a sound generating module. For example, with reference to FIG. 29C, when the first partition 1721 has an end-rounded triangular shape, an end of an end-rounded triangle may be provided toward a fourth sound generating module 1500HL and a fifth sound generating module 1500HR. For example, with reference to FIG. 29C, when the second partition 1722 has an end-rounded triangular shape, an end of an end-rounded triangle may be provided toward a first woofer-integrated sound generating module W1, a second woofer-integrated sound generating module W2, and a third sound generating module 1500C. Accordingly, since a shape of a partition is provided toward at least one sound generating module, a peak or a dip phenomenon caused by a standing wave of the sound generating module may be controlled, and a wave phenomenon of a display panel may be reduced. Also, by modifying a shape of a partition, sound interference such as diffused reflection of a sound generating module may be solved.

Figure 29D:
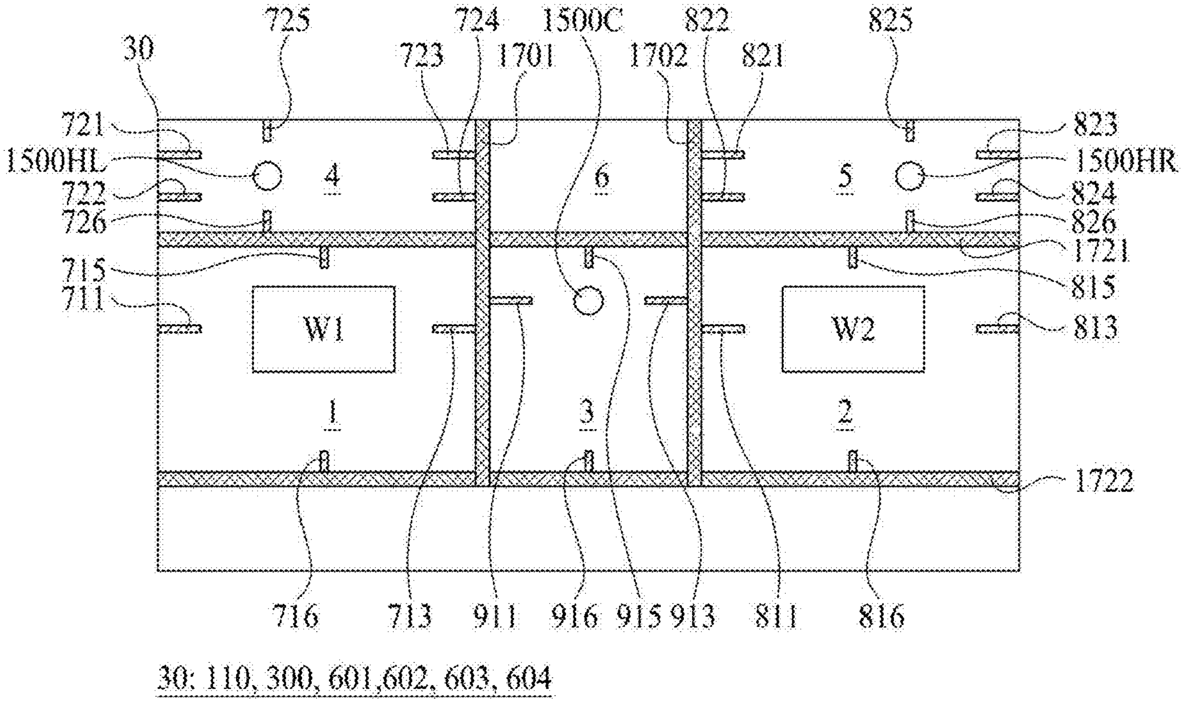
Figure 29E:
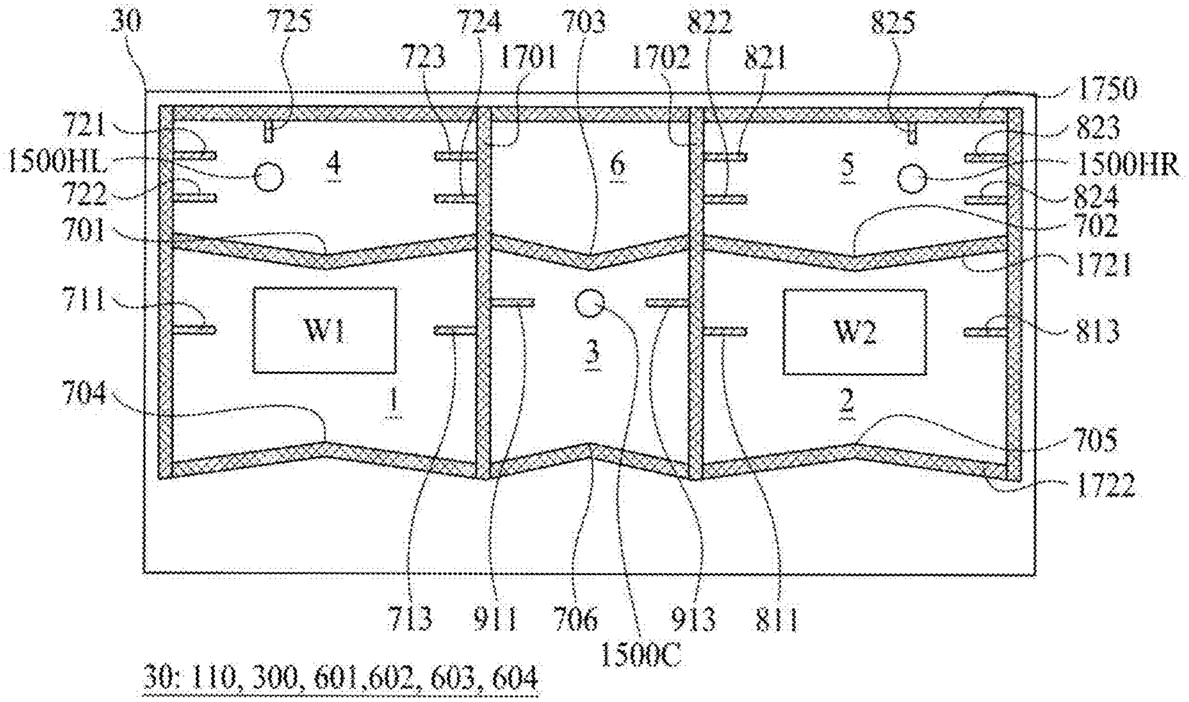

With reference to FIGS. 29D and 29E, a pad may be further provided on at least one side of a partition. A standing wave causing the reduction in sound pressure may much occur at a position at which a level of each of a progressive wave and a reflected wave is highest. Therefore, the pad may be disposed at a position at which a sound wave transferred from a sound generating module is strongest. For example, the pad may be disposed on one or more sides, which a strongest sound wave reaches, of the partition and may be provided toward the sound generating module.

With reference to FIG. 29D, a pad may be disposed on at least one side of a fourth partition 1701 to face a first woofer-integrated sound generating module W1 and a fourth sound generating module 1500HL. For example, a 1-3$^{rd}$ pad 713 may be disposed on at least one side of the fourth partition 1701 to face the first woofer-integrated sound generating module W1. A 1-1$^{st}$ pad 711 may be disposed on a side facing the 1-3$^{rd}$ pad 713. The 1-1$^{st}$ pad 711 and the 1-3$^{rd}$ pad 713 may be provided as one, but are not limited thereto. One of the 1-1$^{st}$ pad 711 and the 1-3$^{rd}$ pad 713 may be provided as two or more. For example, a 4-3$^{rd}$ pad 723 and a 4-4$^{th}$ pad 724 may be disposed on at least one side of the fourth partition 1701 to face the fourth sound generating module 1500HL. A 4-1$^{st}$ pad 721 and a 4-2$^{nd}$ pad 722 may be disposed on a side facing the 4-3$^{rd}$ pad 723 and the 4-4$^{th}$ pad 724. The 4-1$^{st}$ to 4-4$^{th}$ pads 721 to 724 may be provided as two, but are not limited thereto. One of the 4-1$^{st}$ to 4-4$^{th}$ pads 721 to 724 may be provided as one or three or more. For example, a 3-1$^{st}$ pad 911 may be disposed on at least other side of the fourth partition 1701 to face a third sound generating module 1500C. The 3-1$^{st}$ pad 911 may be provided as one or more.

A pad may be disposed on at least one side of a fifth partition 1702 to face a second woofer-integrated sound generating module W2 and a fifth sound generating module 1500HR. For example, a 2-1$^{st}$ pad 811 may be disposed on at least one side of the fifth partition 1702 to face the second woofer-integrated sound generating module W2. A 2-3$^{rd}$ pad 813 may be disposed on a side facing the 2-1$^{st}$ pad 811. In FIG. 29D, the 2-1$^{st}$ pad 811 and the 2-3$^{rd}$ pad 813 may be provided as one, but are not limited thereto. One of the 2-1$^{st}$ pad 811 and the 2-3$^{rd}$ pad 813 may be provided as two or more. For example, a 5-1$^{st}$ pad 821 and a 5-2$^{nd}$ pad 822 may be disposed on at least one side of the fifth partition 1702 to face the fifth sound generating module 1500HR. A 5-3$^{rd}$ pad 823 and a 5-4$^{th}$ pad 824 may be disposed on a side facing the 5-1$^{st}$ pad 821 and the 5-2$^{nd}$ pad 822. The 5-1$^{st}$ to 5-4$^{th}$ pads 821 to 824 may be provided as two, but are not limited thereto and one of the 5-1$^{st}$ to 5-4$^{th}$ pads 821 to 824 may be provided as one or three or more. For example, a 3-3$^{rd}$ pad 913 may be disposed on at least other side of the fifth partition 1702 to face the third sound generating module 1500C. One of the 3-1$^{st}$ pad 911 and the 3-3$^{rd}$ pad 913 may be provided as one or more.

A pad may be disposed on at least one side of a first partition 1721 to face the first woofer-integrated sound generating module W1, the second woofer-integrated sound generating module W2, and the third sound generating module 1500C. For example, a 1-5$^{th}$ pad 715 may be disposed on at least one side of the first partition 1721 to face the first woofer-integrated sound generating module W1. For example, a 2-5$^{th}$ pad 815 may be disposed on at least one side of the first partition 1721 to face the second woofer-integrated sound generating module W2. For example, a 3-5$^{th}$ pad 915 may be disposed on at least one side of the first partition 1721 to face the third sound generating module 1500C. For example, a 4-6$^{th}$ pad 726 may be disposed on at least other side of the first partition 1721 to face the fourth sound generating module 1500HL. For example, a 5-6$^{th}$ pad 826 may be disposed on at least other side of the first partition 1721 to face the fifth sound generating module 1500HR. For example, a 4-5$^{th}$ pad 725 may be disposed on a side facing the 4-6$^{th}$ pad 726, and the 4-5$^{th}$ pad 725 may be disposed to face the fourth sound generating module 1500HL. A 5-5$^{th}$ pad 825 may be disposed on a side facing the 5-6$^{th}$ pad 826, and the 5-5$^{th}$ pad 825 may be disposed to face the fifth sound generating module 1500HR. The 1-5$^{th}$ pad 715, the 2-5$^{th}$ pad 815, the 3-5$^{th}$ pad 915, the 4-5$^{th}$ pad 725, the 4-6$^{th}$ pad 726, the 5-5$^{th}$ pad 825, and the 5-6$^{th}$ pad 826 may be provided as one. As another example, one of the 1-5$^{th}$ pad 715, the 2-5$^{th}$ pad 815, the 3-5$^{th}$ pad 915, the 4-5$^{th}$ pad 725, the 4-6$^{th}$ pad 726, the 5-5$^{th}$ pad 825, and the 5-6$^{th}$ pad 826 may be provided as two or more.

For example, a 1-6$^{th}$ pad 716 may be disposed on at least one side of a second partition 1722 to face the first woofer-integrated sound generating module W1. For example, a 2-6$^{th}$ pad 816 may be disposed on at least one side of the second partition 1722 to face the second woofer-integrated sound generating module W2. For example, a 3-6$^{th}$ pad 916 may be disposed on at least one side of the second partition 1722 to face the third sound generating module 1500C. For example, the 1-5$^{th}$ pad 715 may be disposed on a side facing the 1-6$^{th}$ pad 716, and the 1-5$^{th}$ pad 715 may be disposed to face the first woofer-integrated sound generating module W1. The 2-5$^{th}$ pad 815 may be disposed on a side facing the 2-6$^{th}$ pad 816, and the 2-5$^{th}$ pad 815 may be disposed to face the second woofer-integrated sound generating module W2. The 3-5$^{th}$ pad 915 may be disposed on a side facing the 3-6$^{th}$ pad 916, and the 3-5$^{th}$ pad 915 may be disposed to face the third sound generating module 1500C. The 1-5$^{th}$ pad 715, the 1-6$^{th}$ pad 716, the 2-5$^{th}$ pad 815, the 2-6$^{th}$ pad 816, the 3-5$^{th}$ pad 915, and the 3-6$^{th}$ pad 916 may be provided as one. As another example, one of the 1-5$^{th}$ pad 715, the 1-6$^{th}$ pad 716, the 2-5$^{th}$ pad 815, the 2-6$^{th}$ pad 816, the 3-5$^{th}$ pad 915, and the 3-6$^{th}$ pad 916 may be provided as two or more.

In embodiments of the present disclosure, sizes of each of the 1-1$^{st}$ pad 711 and the 1-3$^{rd}$ pad 713 are illustrated to be greater than that of each of the 1-5$^{th}$ pad 715 and the 1-6$^{th}$ pad 716, but a size of each pad does not limit descriptions of the present disclosure. For example, sizes of the 1-1$^{st}$ pad 711 and the 1-3$^{rd}$ pad 713 may be equal to or greater than that of each of the 1-5$^{th}$ pad 715 and the 1-6$^{th}$ pad 716. This may be identically applied to the other pads. In FIG. 29D, a partition may not be disposed near the rear cover 300. The rear cover 300 may be attached on the display panel 110 by an adhesive member, described above with reference to FIGS. 8, 10, and 19 to 21, for attaching the display panel on the rear cover, and the adhesive member may be a partition.

With reference to FIG. 29E, a first partition 1721 and a second partition 1722 may include at least one bent portion. The bent portion may be disposed to decrease a reduction in sound pressure caused by a standing wave which occurs due to interference between a reflected wave and a progressive wave. The bent portion may be disposed on one or more sides, which a strongest sound wave reaches, of a partition and may be provided toward a sound generating module.

The first partition 1721 may include at least one bent portion. For example, the first partition 1721 may include a first bent portion 701 toward a first woofer-integrated sound generating module W1 and may include a second bent portion 702 toward a second woofer-integrated sound generating module W2. Also, the first partition 1721 may include a third bent portion 703 toward a third sound generating module 1500C. Also, a reduction in sound pressure caused by standing waves of a fourth sound generating module 1500HL and a fifth sound generating module 1500HR may be reduced by a 4-5$^{th}$ pad 725 and a 5-5$^{th}$ pad 825.

The second partition 1722 may include at least one bent portion. For example, the second partition 1722 may include a fourth bent portion 704 toward the first woofer-integrated sound generating module W1 and may include a fifth bent portion 705 toward the second woofer-integrated sound generating module W2. Also, the second partition 1722 may include a sixth bent portion 706 toward the third sound generating module 1500C. The bent portion may have a V-shaped closed structure at a center portion of a sound generating module, but is not limited thereto and may have an open structure at the center portion of the sound generating module. In a case where the bent portion has the open structure at the center portion of the sound generating module, the material cost may be reduced compared to the closed structure. According to a sound characteristic experiment, in a case where the bent portion has the open structure at the center portion of the sound generating module and a case where the bent portion has the closed structure at the center portion of the sound generating module, the inventors have confirmed that a sound characteristic difference is very small or there is no sound characteristic difference. Accordingly, since each of the first partition 1721 and the second partition 1722 includes at least one bent portion, a reduction in sound pressure caused by a standing wave of a sound generating module may be reduced.

With reference to FIG. 29E, the first partition 1721 and the second partition 1722 may include at least one bent portion, and the partition 1750 may be disposed. For example, one or more pads may be provided on a side of the partition 1750. The 4-5$^{th}$ pad 725 may be disposed on one side of the partition 1750 to face the fourth sound generating module 1500HL, and the 5-5$^{th}$ pad 825 may be disposed on one side of the partition 1750 to face the fifth sound generating module 1500HR. Since the partition 1750 is provided, a fixing force of a sound generating module disposed on the rear surface of the display panel may be enhanced, and the leakage of a sound occurring in an edge of the display panel may be reduced, thereby enhancing a sound output characteristic.

FIGS. 30A to 30E illustrate a sound generating module and a partition according to another embodiment of the present disclosure.

Figure 30A:
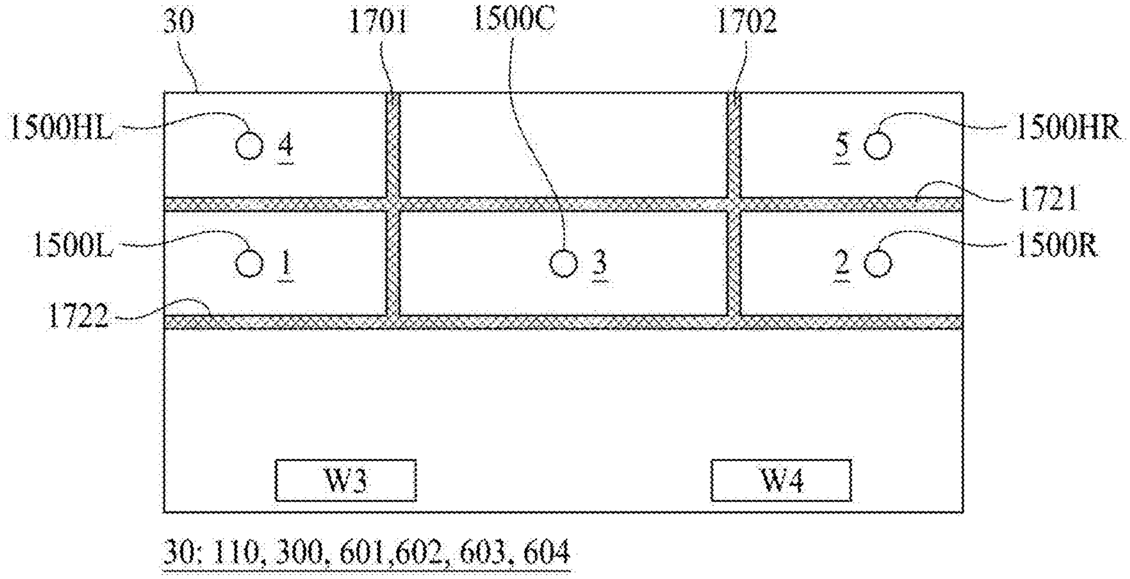
FIGS. 30A to 30E illustrate a sound generating module and a partition according to another embodiment of the present disclosure.
Figure 30B:
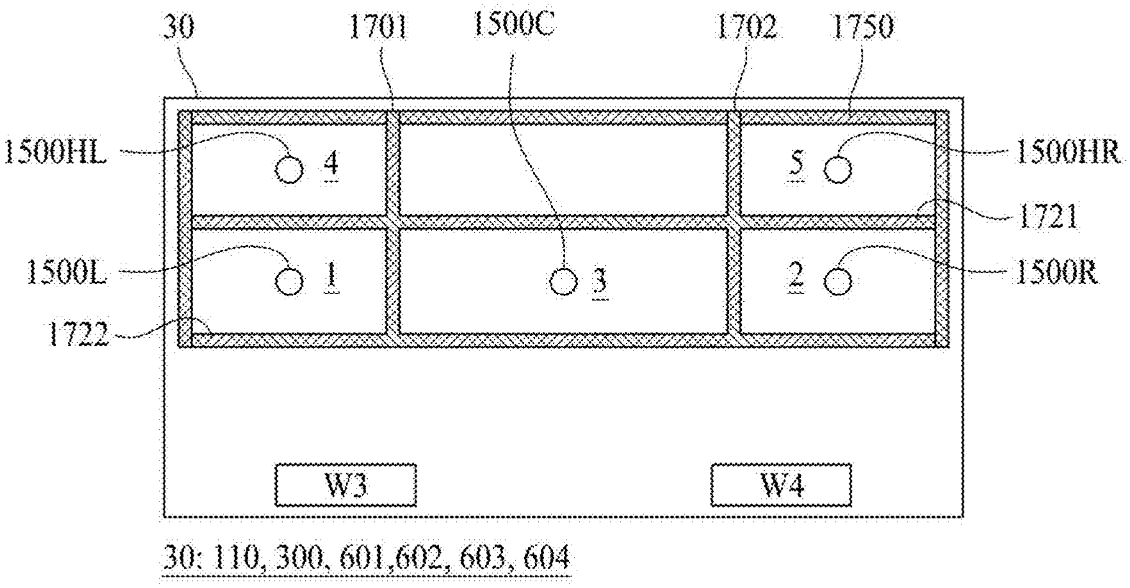

With reference to FIGS. 30A and 30B, descriptions are the same as or similar to descriptions given above with reference to FIGS. 29A and 29B, and thus, are omitted.

Figure 30C:
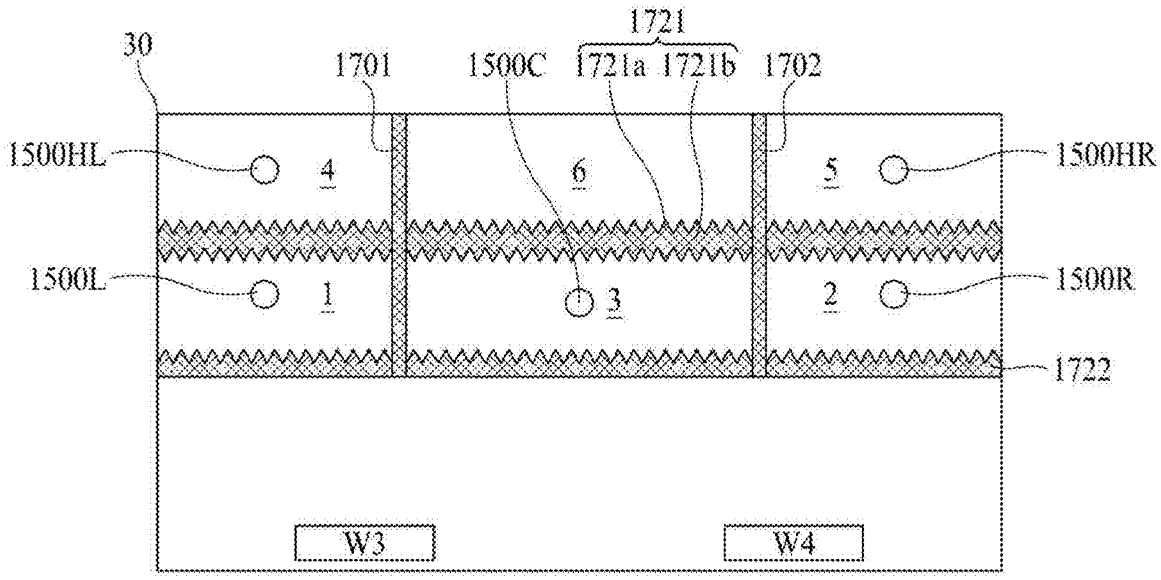

With reference to FIG. 30C, a first partition 1721 may be provided as two partitions, but is not limited thereto. For example, the first partition 1721 may include a 1-1$^{st}$ partition 1721*a* and a 1-2$^{nd}$ partition 1721*b* and may be configured in an end-rounded triangular shape. An end of a triangular or end-rounded triangular shape of the 1-1$^{st}$ partition 1721*a* may be provided to face a fourth sound generating module 1500HL and a fifth sound generating module 1500HR. An end of a triangular or end-rounded triangular shape of the 1-2$^{nd}$ partition 1721*b* may be provided to face a first sound generating module 1500L, a second sound generating module 1500R, and a third sound generating module 1500C. An end of a triangular or end-rounded triangular shape of a second partition 1722 may be provided to face the first sound generating module 1500L, the second sound generating module 1500R, and the third sound generating module 1500C. Accordingly, a peak or a dip phenomenon caused by a standing wave of a sound generating module may be controlled, and a wave phenomenon of a display panel may be reduced. The other elements are the same as or similar to FIG. 29C, and thus, their detailed descriptions are omitted. The embodiment of FIG. 29C may be identically applied to each partition of FIG. 30. The embodiment of FIG. 30C may be identically applied to each partition of FIG. 29.

Figure 30D:
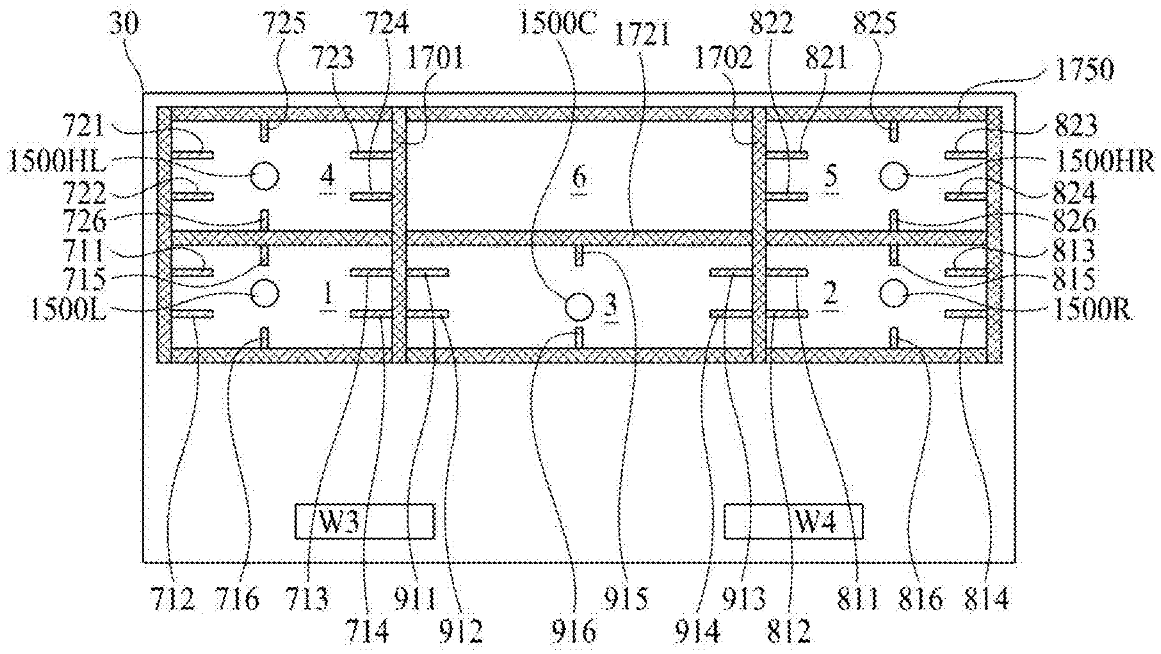

With reference to FIG. 30D, a first partition 1721, a fourth partition 1701, a fifth partition 1702, and a partition 1750 may be provided. For example, the partition 1750 may be disposed to surround first to fifth sound generating modules 1500L to 1500HR. For example, one or more pads may be provided on a side of the partition 1750. A 4-5$^{th}$ pad 725 may be disposed on one side of the partition 1750 to face the fourth sound generating module 1500HL, and a 5-5$^{th}$ pad 825 may be disposed on the one side of the partition 1750 to face the fifth sound generating module 1500HR. A 1-6$^{th}$ pad 716 may be disposed on one other side of the partition 1750 to face the first sound generating module 1500L, a 3-6$^{th}$ pad 916 may be disposed on the one other side of the partition 1750 to face the third sound generating module 1500C, and a 2-6$^{th}$ pad 816 may be disposed on the one other side of the partition 1750 to face the second sound generating module 1500R. Since the partition 1750 is provided, a fixing force of a sound generating module disposed on the rear surface of the display panel may be enhanced, and the leakage of a sound occurring in the edge of the display panel may be reduced, thereby enhancing a sound output characteristic. In FIG. 30D, a partition may not be disposed near the rear cover 300. The rear cover 300 may be attached on the display panel 110 by an adhesive member, described above with reference to FIGS. 8, 10, and 19 to 21, for attaching the display panel on the rear cover, and the adhesive member may be a partition. The other elements are the same as or similar to FIG. 29D, and thus, their detailed descriptions are omitted. The embodiment of FIG. 29D may be identically applied to each partition of FIG. 30. The embodiment of FIG. 30D may be identically applied to each partition of FIG. 29.

Figure 30E:
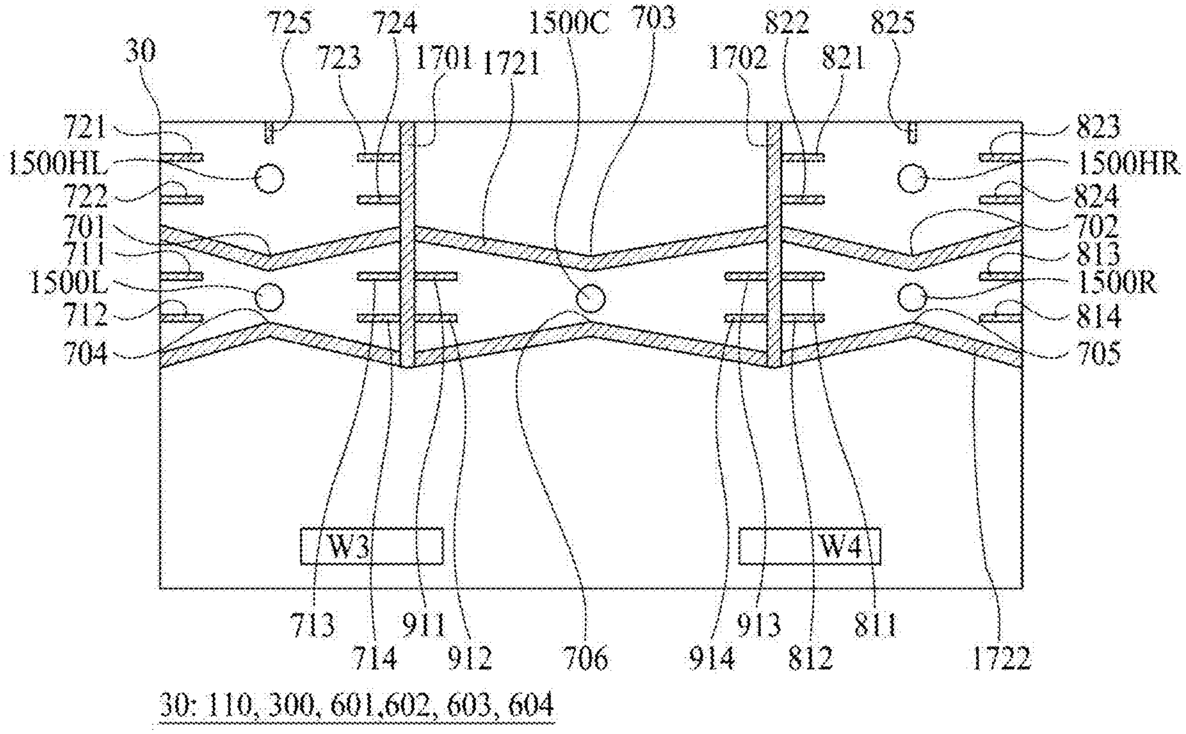

With reference to FIG. 30E, a first partition 1721 may include one or more bent portions. For example, the first partition 1721 may include a first bent portion 701 toward a first sound generating module 1500L and may include a second bent portion 702 toward a second sound generating module 1500R. Also, the first partition 1721 may include a third bent portion 703 toward a third sound generating module 1500C. Also, a reduction in sound pressure caused by standing waves of a fourth sound generating module 1500HL and a fifth sound generating module 1500HR may be reduced by a 4-5$^{th}$ pad 725 and a 5-5$^{th}$ pad 825.

A second partition 1722 may include one or more bent portions. For example, the second partition 1722 may include a fourth bent portion 704 toward the first sound generating module 1500L and may include a fifth bent portion 705 toward the second sound generating module 1500R. Also, the second partition 1722 may include a sixth bent portion 706 toward the third sound generating module 1500C. The bent portion may have a V-shaped closed structure at a center portion of a sound generating module, but is not limited thereto and may have an open structure at the center portion of the sound generating module. In a case where the bent portion has the open structure at the center portion of the sound generating module, the material cost may be reduced compared to the closed structure. According to a sound characteristic experiment, in a case where the bent portion has the open structure at the center portion of the sound generating module and a case where the bent portion has the closed structure at the center portion of the sound generating module, the inventors have confirmed that a sound characteristic difference is very small or there is no sound characteristic difference. Accordingly, since each of the first partition 1721 and the second partition 1722 includes at least one bent portion, a reduction in sound pressure caused by a standing wave of a sound generating module may be reduced. The other elements are the same as or similar to FIG. 29E, and thus, their detailed descriptions are omitted. The embodiment of FIG. 29E may be identically applied to each partition of FIG. 30. The embodiment of FIG. 30E may be identically applied to each partition of FIG. 29.

FIGS. 31A to 31E illustrate a sound generating module and a partition according to another embodiment of the present disclosure.

With reference to FIGS. 31A to 31E, a rear surface of a display panel 110 may include first to fifteenth regions 1 to 15. The first to fifteenth regions 1 to 15 may have the same area, but are not limited thereto. For example, the first to fifteenth regions 1 to 15 may be arranged at equal intervals, but are not limited thereto. A size of each of the first to fifteenth regions 1 to 15 may be controlled based on a desired-pitched sound band. For example, the first region 1, the fourth region 4, and the seventh region 7 may be a left region of the rear surface of the display panel 110. For example, the second region 2, the fifth region 5, and the eighth region 8 may be a right region of the rear surface of the display panel 110. For example, the third region 3, the sixth region 6, and the ninth region 9 may be a center region of the rear surface of the display panel 110. For example, the sixth region 6 may be a region between the fourth region 4 and the fifth region 5. For example, the ninth region 9 may be a region between the seventh region 7 and the eighth region 8. For example, the tenth region 10 may be a region between the first region 1 and the third region 3. For example, the eleventh region 11 may be a region between the second region 2 and the third region 3. For example, the seventh region 7 may be under the first region 1, and the eighth region 8 may be under the second region 2. For example, the tenth region 10, the twelfth region 12, and the fourteenth region 14 may be regions between the first, fourth, and seventh regions 1, 4, and 7 and the third, sixth, and ninth regions 3, 6, and 9. For example, the eleventh region 11, the thirteenth region 13, and the fifteenth region 15 may be regions between the second, fifth, and eighth regions 2, 5, and 8 and the third, sixth, and ninth regions 3, 6, and 9. Reference numerals 1 to 15 referring to regions in the first to fifteenth regions 1 to 15 may be arbitrarily illustrated, and classification of reference numerals 1 to 15 and the first to fifteenth regions 1 to 15 do not limit descriptions of the present disclosure. Description relevant thereto may be identically or similarly applied to FIGS. 31B to 43C.

Figure 31A:
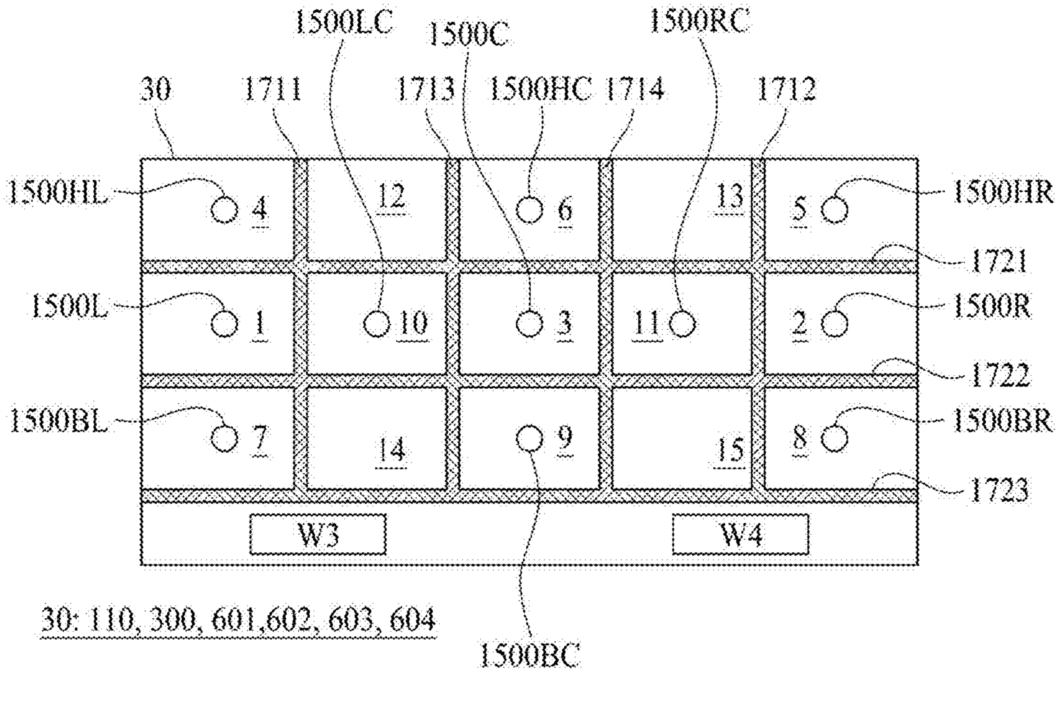
FIGS. 31A to 31E illustrate a sound generating module and a partition according to another embodiment of the present disclosure.

With reference to FIG. 31A, a partition may be further provided near a sound generating module. For example, the partition may be disposed between a rear cover 300 and a display panel 110 corresponding to first to eleventh regions 1 to 11. For example, a fourth partition 1713 may be disposed between the first, fourth, and seventh regions 1, 4, and 7 and the third, sixth, and ninth regions 3, 6, and 9. The fourth partition 1713 may separate channels or sounds, generated by first, fourth, and seventh sound generating modules 1500L, 1500HL, and 1500BL, and channels or sounds generated by third, sixth, and ninth sound generating modules 1500C, 1500HC, and 1500BC. For example, a fifth partition 1714 may be disposed between the second, fifth, and eighth regions 2, 5, and 8, the third, sixth, and ninth regions 3, 6, and 9. The fifth partition 1714 may separate channels or sounds, generated by second, fifth, and eighth sound generating modules 1500R, 1500HR, and 1500BR, and channels or sounds generated by third, sixth, and ninth sound generating modules 1500C, 1500HC, and 1500BC. Accordingly, the fourth partition 1713 and the fifth partition 1714 may separate a left sound and a right sound.

A first partition 1721 may separate a height channel of the display panel 110 and a bottom channel of the display panel 110. For example, the first partition 1721 may separate the channels or the sounds, generated by the fourth sound generating module 1500HL, the fifth sound generating module 1500HR, and the sixth sound generating modules 1500HC disposed at an upper portion of the display panel 110, and the channels or the sounds generated by the seventh sound generating module 1500BL, the eighth sound generating module 1500BR, and the ninth sound generating module 1500BC disposed at a lower portion of the display panel 110.

To realize a stereo sound or a stereophonic sound, the tenth sound generating module 1500LC and the eleventh sound generating module 1500RC may be further provided, and a partition should be provided for separating a channel or a sound, generated by the tenth sound generating module 1500LC, and channels or sounds generated by the seventh sound generating module 1500BL, the eighth sound generating module 1500BR, and the ninth sound generating module 1500BC. Also, a partition should be provided for separating a channel or a sound, generated by the eleventh sound generating module 1500RC, and channels or sounds generated by the seventh sound generating module 1500BL, the eighth sound generating module 1500BR, and the ninth sound generating module 1500BC. The fourth partition 1713 and the fifth partition 1714 may separate a left sound and a right sound or a left channel and a right channel. In order to realize a stereo sound or a stereophonic sound, the tenth sound generating module 1500LC and the eleventh sound generating module 1500RC may be further provided, and a partition should be provided for separating the channel or the sound, generated by the tenth sound generating module 1500LC, and channels or sounds generated by the first sound generating module 1500L, the fourth sound generating module 1500HL, and the seventh sound generating module 1500BL. Also, a partition should be provided for separating the channel or the sound, generated by the eleventh sound generating module 1500RC, and channels or sounds generated by the second sound generating module 1500R, the fifth sound generating module 1500HR, and the eighth sound generating module 1500BR. In a case where the first partition 1721 is provided, a height sound and a bottom sound or a height channel and a bottom channel may be separated from each other, but a height sound and a bottom sound or a height channel and a bottom channel may not be separated from a center sound or a center channel, whereby a partition should be provided. In a case where the fourth partition 1713 and the fifth partition 1714 are provided, a left sound and a right sound or a left channel and a right channel may be separated, but a left sound and a right sound or a left channel and a right channel may not be separated from a center sound or a center channel, whereby a partition should be provided.

For example, a sixth partition 1711 may be between the first, fourth, and seventh regions 1, 4, and 7 and the tenth region 10. For example, the sixth partition 1711 may separate channels or sounds generated by the first, fourth, and seventh sound generating modules 1500L, 1500HL, and 1500BL, and the channel or the sound generated by the tenth sound generating module 1500LC, thereby enhancing a sound output characteristic. For example, the sixth partition 1711 may separate channels or sounds generated by the first, fourth, and seventh sound generating modules 1500L, 1500HL, and 1500BL, and channels or sounds generated by the third, sixth, and ninth sound generating module 1500C, 1500HC, and 1500BC, thereby enhancing a sound output characteristic. For example, the sixth partition 1711 may separate a left sound or a left channel, a left center sound or a left center channel, and a center sound or a center channel, thereby enhancing a sound output characteristic.

For example, a seventh partition 1712 may be between the second, fifth, and eighth regions 2, 5, and 8 and the eleventh region 11. For example, the seventh partition 1712 may separate channels or sounds generated by the second, fifth, and eighth sound generating modules 1500R, 1500HR, and 1500BR, and a channel or a sound generated by the eleventh sound generating module 1500RC, thereby enhancing a sound output characteristic. For example, the seventh partition 1712 may separate channels or sounds generated by the second, fifth, and eighth sound generating modules 1500R, 1500HR, and 1500BR, and the channels or the sounds generated by the third, sixth, and ninth sound generating module 1500C, 1500HC, and 1500BC, thereby enhancing a sound output characteristic. For example, the seventh partition 1712 may separate a right sound or a right channel, a right center sound or a right center channel, and a center sound or a center channel, thereby enhancing a sound output characteristic.

For example, a fourth partition 1713 may be disposed between the third, sixth, and ninth regions 3, 6, and 9 and the tenth region 10. For example, the fourth partition 1713 may separate channels or sounds generated by the third, sixth, and ninth sound generating modules 1500C, 1500HC, and 1500BC, and a channel or a sound generated by the tenth sound generating module 1500LC, thereby enhancing a sound output characteristic. For example, a fifth partition 1714 may be disposed between the third, sixth, and ninth regions 3, 6, and 9 and the eleventh region 11. For example, the fifth partition 1714 may separate the channels or the sounds generated by the third, sixth, and ninth sound generating modules 1500C, 1500HC, and 1500BC, and the channel or the sound generated by the eleventh sound generating module 1500RC, thereby enhancing a sound output characteristic. For example, the fourth partition 1713 may separate a channel or a sound of a center region and a channel or a sound of a left center region. For example, the fifth partition 1714 may separate the channel or the sound of the center region and a channel or a sound of a right center region.

The first partition 1721 may separate the height channel of the display panel 110 and the bottom channel of the display panel 110. For example, the first partition 1721 may separate the channels or the sounds, generated by the fourth, fifth, and sixth sound generating modules 1500HL, 1500HR, and 1500HC, and the channels or the sounds generated by the seventh, eighth, and ninth sound generating modules 1500BL, 1500BR, and 1500BC. The first partition 1721 may separate the height channel of the display panel 110 and the center channel of the display panel 110. For example, the first partition 1721 may separate the channels or the sounds, generated by the fourth, fifth, and sixth sound generating modules 1500HL, 1500HR, and 1500HC, and the channels or the sounds generated by the first, second, third, tenth, and eleventh sound generating modules 1500L, 1500R, 1500C, 1500LC, and 1500RC.

The second partition 1722 may separate the center channel of the display panel 110 and the bottom channel of the display panel 110. For example, the second partition 1722 may separate the channels or the sounds, generated by the first, second, third, tenth, and eleventh sound generating modules 1500L, 1500R, 1500C, 1500LC, and 1500RC and the channels or the sounds generated by the seventh, eighth, and ninth sound generating modules 1500BL, 1500BR, and 1500BC. The third partition 1723 may separate the bottom channel of the display panel 110 and a woofer. For example, the third partition 1723 may be disposed under or a lower portion of the seventh, eighth, and ninth sound generating modules 1500BL, 1500BR, and 1500BC. For example, the third partition 1723 may separate the channels or the sounds, generated by the seventh, eighth, and ninth sound generating modules 1500BL, 1500BR, and 1500BC, and channels or sounds generated by a first woofer W3 and a second woofer W4.

The first partition 1721, the second partition 1722, the third partition 1723, the fourth partition 1713, the fifth partition 1714, the sixth partition 1711, and the seventh partition 1712 may be disposed at the rear cover 300. For example, the first partition 1721, the second partition 1722, the third partition 1723, the fourth partition 1713, the fifth partition 1714, the sixth partition 1711, and the seventh partition 1712 may be disposed on a front surface of the rear cover 300. For example, the first partition 1721, the second partition 1722, the third partition 1723, the fourth partition 1713, the fifth partition 1714, the sixth partition 1711, and the seventh partition 1712 may be disposed between the display panel 110 and the rear cover 300. For example, the first partition 1721, the second partition 1722, the third partition 1723, the fourth partition 1713, the fifth partition 1714, the sixth partition 1711, and the seventh partition 1712 may be disposed between the rear surface of the display panel 110 and the front surface of the rear cover 300.

The first partition 1721, the second partition 1722, the third partition 1723, the fourth partition 1713, the fifth partition 1714, the sixth partition 1711, and the seventh partition 1712 may be formed of one or more of a double-sided tape, a double-sided foam tape, a double-sided foam pad, a single-sided tape, a single-sided foam tape, a single-sided foam pad, an adhesive, and a bond, but is not limited thereto. When each of the first partition 1721, the second partition 1722, the third partition 1723, the fourth partition 1713, the fifth partition 1714, the sixth partition 1711, and the seventh partition 1712 is formed of the double-sided tape, the double-sided foam tape, or the double-sided foam pad, an adhesive force may be enhanced in a process of attaching the front surface of the rear cover 300 on the rear surface of the display panel 110. For example, the first partition 1721, the second partition 1722, the third partition 1723, the fourth partition 1713, the fifth partition 1714, the sixth partition 1711, and the seventh partition 1712 may include a material having an elastic force which enables compression to be made to a certain degree, and for example, may include polyurethane, polyolefin, polyethylene, and/or the like, but is not limited thereto.

With reference to FIGS. 31A to 31E, the fourth sound generating module 1500HL may be provided in the fourth region 4, the sixth sound generating module 1500HC may be provided in the sixth region 6, and a sound generating module may not be provided in the twelfth region 12. Therefore, a vibration of each of the fourth sound generating module 1500HL and the sixth sound generating module 1500HC may be attenuated or absorbed in the twelfth region 12 of the display panel 110, and thus, may block or decrease the transfer of a sound of the fourth region 4 to the sixth region 6 and may block or decrease the transfer of a sound of the sixth region 6 to the fourth region 4. Accordingly, the degradation in sound quality caused by sound interference occurring in the fourth region 4 and the fifth region 5 may be reduced, and a sound characteristic of a middle-high-pitched sound band may be more enhanced. For example, the fifth sound generating module 1500HR may be provided in the fifth region 5, the sixth sound generating module 1500HC may be provided in the sixth region 6, and a sound generating module may not be provided in the thirteenth region 13. Therefore, a vibration of each of the fifth sound generating module 1500HR and the sixth sound generating module 1500HC may be attenuated or absorbed in the thirteenth region 13 of the display panel 110, and thus, may block or decrease the transfer of a sound of the fifth region 5 to the sixth region 6 and may block or decrease the transfer of a sound of the sixth region 6 to the fifth region 5. Accordingly, the degradation in sound quality caused by sound interference occurring in the fifth region 5 and the sixth region 6 may be reduced, and a sound characteristic of a middle-high-pitched sound band may be more enhanced.

The seventh sound generating module 1500BL may be provided in the seventh region 7, the ninth sound generating module 1500BC may be provided in the ninth region 9, and a sound generating module may not be provided in the fourteenth region 14. Therefore, a vibration of each of the seventh sound generating module 1500BL and the ninth sound generating module 1500BC may be attenuated or absorbed in the fourteenth region 14 of the display panel 110, and thus, may block or decrease the transfer of a sound of the seventh region 7 to the ninth region 9 and may block or decrease the transfer of a sound of the ninth region 9 to the seventh region 7. Accordingly, the degradation in sound quality caused by sound interference occurring in the seventh region 7 and the ninth region 9 may be reduced, and a sound characteristic of a middle-high-pitched sound band may be more enhanced. For example, the eighth sound generating module 1500BR may be provided in the eighth region 8, the ninth sound generating module 1500BC may be provided in the ninth region 9, and a sound generating module may not be provided in the fifteenth region 15. Therefore, a vibration of the eighth sound generating module 1500BR and the ninth sound generating module 1500BC may be attenuated or absorbed in the fifteenth region 15 of the display panel 110, and thus, may block or decrease the transfer of a sound of the eighth region 8 to the ninth region 9 and may block or decrease the transfer of a sound of the ninth region 9 to the eighth region 8. Accordingly, the degradation in sound quality caused by sound interference occurring in the eighth region 8 and the ninth region 9 may be reduced, and a sound characteristic of a middle-high-pitched sound band may be more enhanced.

In FIG. 31A, a partition may not be disposed near the rear cover 300. The rear cover 300 may be attached on the display panel 110 by an adhesive member, described above with reference to FIGS. 8, 10, and 19 to 21, for attaching the display panel on the rear cover, and the adhesive member may be a partition.

In a process of placing the first partition 1721, the second partition 1722, the third partition 1723, the fourth partition 1713, the fifth partition 1714, the sixth partition 1711, and the seventh partition 1712, the first partition 1721, the second partition 1722, the third partition 1723 may be placed, and then, the fourth partition 1713, the fifth partition 1714, the sixth partition 1711, and the seventh partition 1712 may be placed. As another example, the fourth partition 1713, the fifth partition 1714, the sixth partition 1711, and the seventh partition 1712 may be placed, and then, the first partition 1721, the second partition 1722, the third partition 1723 may be placed. However, an order in which the partitions are placed does not limit descriptions of an embodiment of the present disclosure. In the following embodiments, an example where the first partition 1721, the second partition 1722, the third partition 1723 are placed and then the fourth partition 1713, the fifth partition 1714, the sixth partition 1711, and the seventh partition 1712 are placed is illustrated, but an embodiment of the present disclosure is not limited thereto. Such a description may be identically or similarly applied to the following embodiments.

Figure 31B:
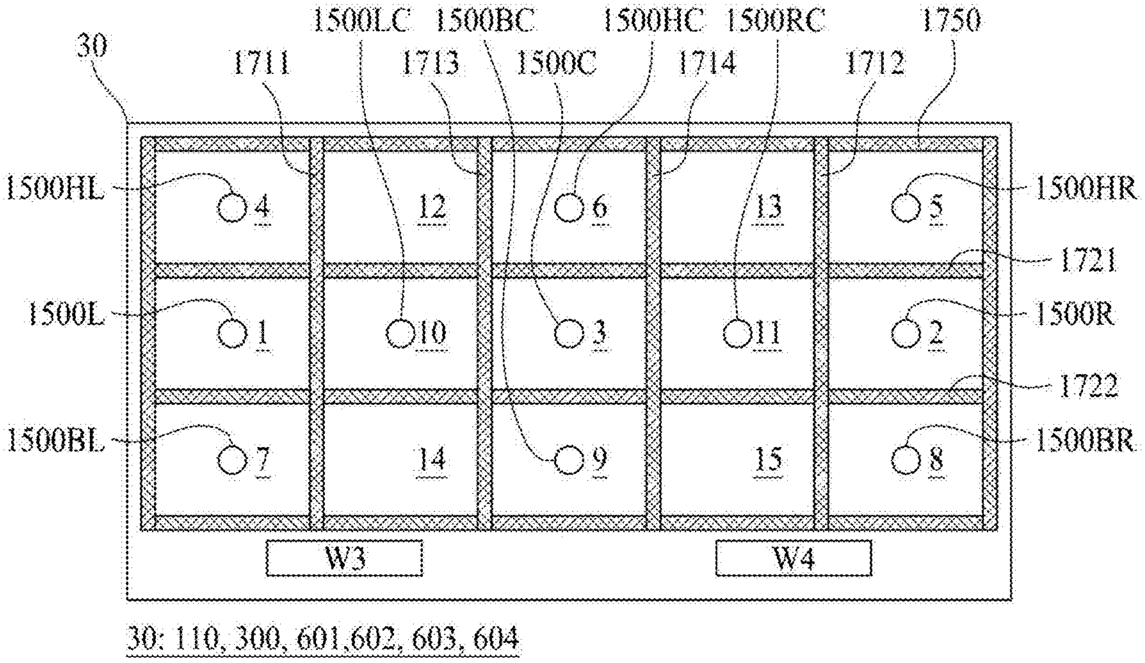

With reference to FIG. 31B, a first partition 1721, a second partition 1722, a third partition 1723, a fourth partition 1713, a fifth partition 1714, a sixth partition 1711, and a seventh partition 1712 may be provided, and a partition 1750 may be disposed between a rear cover 300 and a display panel 110. For example, the partition 1750 may be disposed at an edge or periphery of the rear cover 300. For example, the partition 1750 may be disposed at an edge or periphery of the rear cover 300. The partition 1750 may be a whole region of four outer sides of a front surface of the rear cover 300. As another example, the partition 1750 may be disposed at an edge or periphery of a rear surface of the display panel 110. The partition 1750 may be a whole region of four outer sides of the rear surface of the display panel 110. The partition 1750 may be a whole region of the rear cover 300 or the rear surface of the display panel 110. The partition 1750 may be disposed along a shape of the display panel 110 so as to prevent a wave phenomenon of the display panel 110. For example, when the partition 1750 is an adhesive member for attaching a rear cover on the display panel described above with reference to FIGS. 8, 10, and 19 to 21, the adhesive member described above with reference to FIGS. 8, 10, and 19 to 21 may be omitted. However, an embodiment of the present disclosure is not limited thereto, and an adhesive for attaching a display panel on a rear cover may be provided on a rear surface of the display panel or at the rear cover. The other elements are the same as or similar to FIG. 31A, and thus, their detailed descriptions are omitted.

Figure 31C:
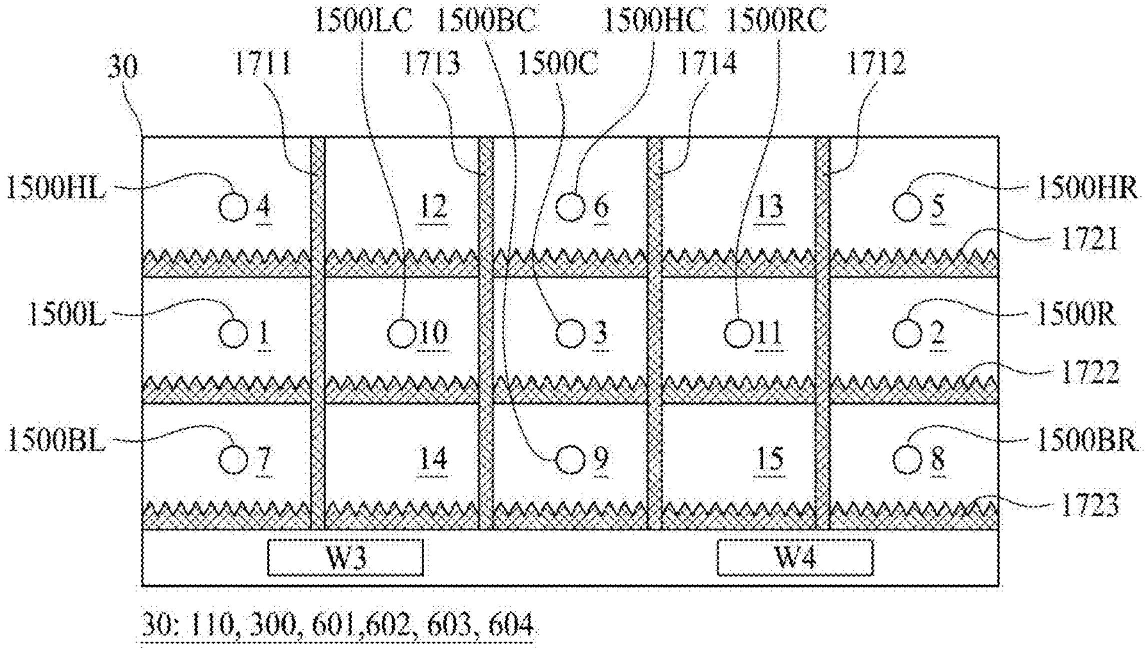

With reference to FIG. 31C, a shape of a first partition 1721, a shape of a second partition 1722, and a shape of a third partition 1723 may be differently implemented. A shape of the first partition 1721, a shape of the second partition 1722, and a shape of the third partition 1723 may differ from a shape of a display panel 110. For example, the first partition 1721, the second partition 1722, and the third partition 1723 may have a non-flat shape or may not have a linear shape. When a partition has a non-flat shape or does not have a linear shape, the partition may diffuse a standing wave. For example, when a partition is implemented in a saw-toothed shape, a triangular shape, and an end-rounded triangular shape, a standing wave may be diffused in various directions by the saw-toothed shape, the triangular shape, and the end-rounded triangular shape, thereby enhancing a sound output characteristic. For example, the first partition 1721, the second partition 1722, and the third partition 1723 may have a saw-toothed shape, a triangular shape, and an end-rounded triangular shape. For example, sawtooth of a partition may be disposed toward a sound generating module. For example, when a partition has a triangular shape, an end of a triangle may be disposed toward a sound generating module. For example, when a partition has an end-rounded triangular shape, an end of an end-rounded triangle may be disposed toward a sound generating module. For example, With reference to FIG. 31C, when the first partition 1721 has an end-rounded triangular shape, an end of an end-rounded triangle may be provided toward a fourth sound generating module 1500HL, a fifth sound generating module 1500HR, and a sixth sound generating module 1500HC. For example, when the second partition 1722 has an end-rounded triangular shape, an end of an end-rounded triangle may be provided toward a first sound generating module 1500L, a second sound generating module 1500R, a third sound generating module 1500C, a tenth sound generating module 1500LC, and an eleventh sound generating module 1500RC. For example, when the third partition 1723 has an end-rounded triangular shape, an end of an end-rounded triangle may be provided toward a seventh sound generating module 1500BL, an eighth sound generating module 1500BR, and a ninth sound generating module 1500BC. Accordingly, since a shape of a partition is provided toward at least one sound generating module, a peak or a dip phenomenon caused by a standing wave of the sound generating module may be controlled, and a wave phenomenon of a display panel may be reduced. Also, by modifying a shape of a partition, sound interference such as diffused reflection of a sound generating module may be solved.

Figure 31D:
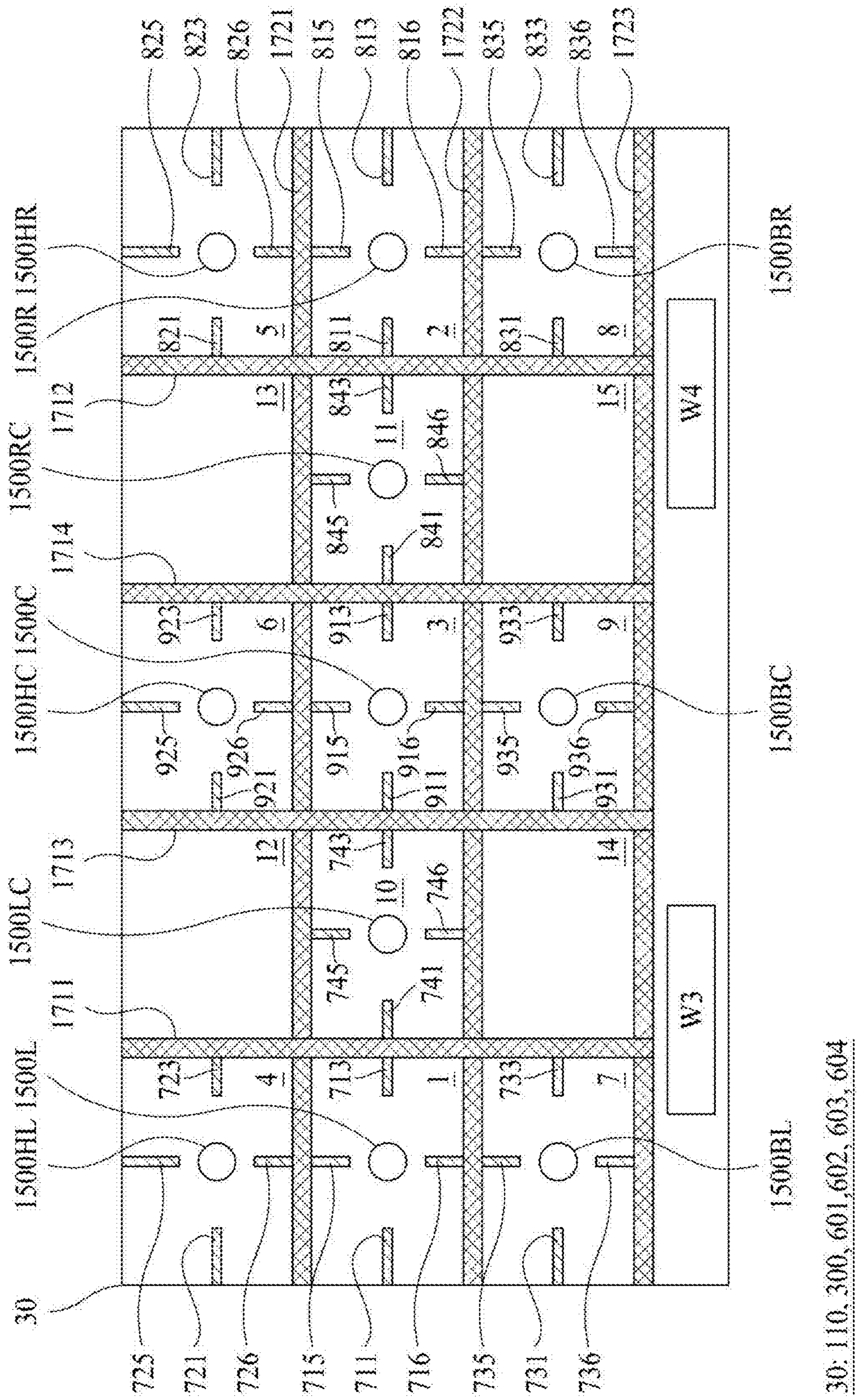

With reference to FIG. 31D, a pad may be disposed on at least one side of a sixth partition 1711 to face a first sound generating module 1500L, a fourth sound generating module 1500HL, and a seventh sound generating module 1500BL. For example, a 1-3rd pad 713 may be disposed on at least one side of the sixth partition 1711 to face the first sound generating module 1500L. A 1-1st pad 711 may be disposed on a side facing the 1-3rd pad 713. The 1-1st pad 711 and the 1-3rd pad 713 may be provided as one, but are not limited thereto and one of the 1-1st pad 711 and the 1-3rd pad 713 may be provided as two or more. For example, a 4-3rd pad 723 may be disposed on at least one side of the sixth partition 1711 to face the fourth sound generating module 1500HL. A 4-1st pad 721 may be disposed on a side facing the 4-3rd pad 723. The 4-1st pad 721 and the 4-3rd pad 723 may be provided as one, but are not limited thereto. One of the 4-1st pad 721 and the 4-3rd pad 723 may be provided as two or more. For example, a 7-3rd pad 733 may be disposed on at least one side of the sixth partition 1711 to face the seventh sound generating module 1500BL. A 7-1st pad 731 may be disposed on a side facing the 7-3rd pad 733. The 7-1st pad 731 and the 7-3rd pad 733 may be provided as one, but are not limited thereto. One of the 7-1st pad 731 and the 7-3rd pad 733 may be provided as two or more.

A pad may be disposed on at least one other side of the sixth partition 1711 to face the tenth sound generating module 1500LC. For example, a 10-1st pad 741 may be disposed on at least one other side of the sixth partition 1711 to face the tenth sound generating module 1500LC. The 10-1st pad 741 may be provided as one, but is not limited thereto, and may be provided as two or more.

A pad may be disposed on at least one side of a seventh partition 1712 to face a second sound generating module 1500R, a fifth sound generating module 1500HR, and an eighth sound generating module 1500BR. For example, a 2-1st pad 811 may be disposed on at least one side of the seventh partition 1712 to face the second sound generating module 1500R. A 2-3rd pad 813 may be disposed on a side facing the 2-1st pad 811. The 2-1st pad 811 and the 2-3rd pad 813 may be provided as one, but are not limited thereto. One of the 2-1st pad 811 and the 2-3rd pad 813 may be provided as two or more. For example, a 5-1st pad 821 may be disposed on at least one side of the seventh partition 1712 to face the fifth sound generating module 1500HR. A 5-3rd pad 823 may be disposed on a side facing the 5-1st pad 821. The 5-1st pad 821 and the 5-3rd pad 823 may be provided as one, but are not limited thereto. One of the 5-1st pad 821 and the 5-3rd pad 823 may be provided as two or more. For example, an 8-1st pad 831 may be disposed on at least one side of the seventh partition 1712 to face the eighth sound generating module 1500BR. An 8-3rd pad 833 may be disposed on a side facing the 8-1st pad 831. The 8-1st pad 831 and the 8-3rd pad 833 may be provided as one, but are not limited thereto and one of the 8-1st pad 831 and the 8-3rd pad 833 may be provided as two or more.

A pad may be disposed on at least one other side of the seventh partition 1712 to face the eleventh sound generating module 1500RC. For example, an 11-3rd pad 843 may be disposed on at least one other side of the seventh partition 1712 to face the eleventh sound generating module 1500RC. The 11-3rd pad 843 may be provided as one, but is not limited thereto, and may be provided as two or more.

A pad may be disposed on at least one side of a fourth partition 1713 and at least one side of the fifth partition 1714 to face a third sound generating module 1500C, a sixth sound generating module 1500HC, and a ninth sound generating module 1500BC. For example, a 3-1st pad 911 may be disposed on at least one side of the fourth partition 1713 to face the third sound generating module 1500C. For example, a 3-3$^{rd}$ pad 913 may be disposed on at least one side of the fifth partition 1714 to face the third sound generating module 1500C. The 3-1$^{st}$ pad 911 may be disposed to face the 3-3$^{rd}$ pad 913. The 3-3$^{rd}$ pad 913 may be disposed on a side of the fifth partition 1714 facing the 3-1$^{st}$ pad 911. The 3-1$^{st}$ pad 911 and the 3-3$^{rd}$ pad 913 may be provided as one, but are not limited thereto. One of the 3-1$^{st}$ pad 911 and the 3-3$^{rd}$ pad 913 may be provided as two or more. For example, a 6-1$^{st}$ pad 921 may be disposed on at least one side of the fourth partition 1713 to face the sixth sound generating module 1500HC. For example, a 6-3$^{rd}$ pad 923 may be disposed on at least one side of the fifth partition 1714 to face the sixth sound generating module 1500HC. The 6-1$^{st}$ pad 921 may be disposed to face the 6-3$^{rd}$ pad 923. The 6-3$^{rd}$ pad 923 may be disposed on a side of the fifth partition 1714 facing the 6-1$^{st}$ pad 921. The 6-1$^{st}$ pad 921 and the 6-3$^{rd}$ pad 923 may be provided as one, but are not limited thereto. One of the 6-1$^{st}$ pad 921 and the 6-3$^{rd}$ pad 923 may be provided as two or more. For example, a 9-1$^{st}$ pad 931 may be disposed on at least one side of the fourth partition 1713 to face the ninth sound generating module 1500BC. For example, a 9-3$^{rd}$ pad 933 may be disposed on at least one side of the fifth partition 1714 to face the ninth sound generating module 1500BC. The 9-1$^{st}$ pad 931 may be disposed to face the 9-3$^{rd}$ pad 933. The 9-3$^{rd}$ pad 933 may be disposed on a side of the fifth partition 1714 facing the 9-1$^{st}$ pad 931. The 9-1$^{st}$ pad 931 and the 9-3$^{rd}$ pad 933 may be provided as one, but are not limited thereto. One of the 9-1$^{st}$ pad 931 and the 9-3$^{rd}$ pad 933 may be provided as two or more.

For example, a 10-3$^{rd}$ pad 743 may be disposed on at least one other side of the fourth partition 1713 to face the tenth sound generating module 1500LC. For example, an 11-1$^{st}$ pad 841 may be disposed on at least one other side of the fifth partition 1714 to face the eleventh sound generating module 1500RC. The 10-3$^{rd}$ pad 743 and the 11-1$^{st}$ pad 841 may be provided as one, but is not limited thereto. One of the 10-3$^{rd}$ pad 743 and the 11-1$^{st}$ pad 841 may be provided as two or more.

A pad may be disposed on at least one side of a first partition 1721 to face the fourth sound generating module 1500HL, the fifth sound generating module 1500HR, and the sixth sound generating module 1500HC. For example, a 4-6$^{th}$ pad 726 may be disposed on at least one side of the first partition 1721 to face the fourth sound generating module 1500HL. A 4-5$^{th}$ pad 725 may be disposed on a side facing the 4-6$^{th}$ pad 726, and the 4-5$^{th}$ pad 725 may be disposed to face the fourth sound generating module 1500HL. The 4-5$^{th}$ pad 725 and the 4-6$^{th}$ pad 726 may be provided as one, but are not limited thereto. One of the 4-5$^{th}$ pad 725 and the 4-6$^{th}$ pad 726 may be provided as two or more.

For example, a 5-6$^{th}$ pad 826 may be disposed on at least one side of the first partition 1721 to face the fifth sound generating module 1500HR. A 5-5$^{th}$ pad 825 may be disposed on a side facing the 5-6$^{th}$ pad 826, and the 5-5$^{th}$ pad 825 may be disposed to face the fifth sound generating module 1500HR. The 5-5$^{th}$ pad 825 and the 5-6$^{th}$ pad 826 may be provided as one, but are not limited thereto. One of the 5-5$^{th}$ pad 825 and the 5-6$^{th}$ pad 826 may be provided as two or more.

For example, a 6-6$^{th}$ pad 926 may be disposed on at least one side of the first partition 1721 to face the sixth sound generating module 1500HC. A 6-5$^{th}$ pad 925 may be disposed on a side facing the 6-6$^{th}$ pad 926, and the 6-5$^{th}$ pad 925 may be disposed to face the sixth sound generating module 1500HC. The 6-5$^{th}$ pad 925 and the 6-6$^{th}$ pad 926 may be provided as one, but are not limited thereto. One of the 6-5$^{th}$ pad 925 and the 6-6$^{th}$ pad 926 may be provided as two or more.

For example, a pad may be disposed on at least one other side of the first partition 1721 to face the first sound generating module 1500L, the second sound generating module 1500R, the third sound generating module 1500C, the tenth sound generating module 1500LC, and the eleventh sound generating module 1500RC. For example, a 1-5$^{th}$ pad 715 may be disposed on at least one other side of the first partition 1721 to face the first sound generating module 1500L. For example, a 2-5$^{th}$ pad 815 may be disposed on at least one other side of the first partition 1721 to face the second sound generating module 1500R. For example, a 3-5$^{th}$ pad 915 may be disposed on at least one other side of the first partition 1721 to face the third sound generating module 1500C. For example, a 10-5$^{th}$ pad 745 may be disposed on at least one other side of the first partition 1721 to face the tenth sound generating module 1500LC. For example, an 11-5$^{th}$ pad 845 may be disposed on at least one other side of the first partition 1721 to face the eleventh sound generating module 1500RC. The 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as one, but are not limited thereto. One of the 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as two or more.

For example, a pad may be disposed on at least one other side of the second partition 1722 to face the first sound generating module 1500L, the second sound generating module 1500R, the third sound generating module 1500C, the tenth sound generating module 1500LC, and the eleventh sound generating module 1500RC. For example, a 1-6$^{th}$ pad 716 may be disposed on at least one other side of the second partition 1722 to face the first sound generating module 1500L. For example, a 2-6$^{th}$ pad 816 may be disposed on at least one other side of the second partition 1722 to face the second sound generating module 1500R. For example, a 3-6$^{th}$ pad 916 may be disposed on at least one other side of the second partition 1722 to face the third sound generating module 1500C. For example, a 10-6$^{th}$ pad 746 may be disposed on at least one other side of the second partition 1722 to face the tenth sound generating module 1500LC. For example, an 11-6$^{th}$ pad 846 may be disposed on at least one other side of the second partition 1722 to face the eleventh sound generating module 1500RC. The 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as one, but are not limited thereto. One of the 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as two or more.

The 1-5$^{th}$ pad 715 may be disposed to face the 1-6$^{th}$ pad 716. For example, the 1-6$^{th}$ pad 716 may be disposed on a side of the second partition 1722 facing the 1-5$^{th}$ pad 715. The 2-5$^{th}$ pad 815 may be disposed to face the 2-6$^{th}$ pad 816. For example, the 2-6$^{th}$ pad 816 may be disposed on a side of the second partition 1722 facing the 2-5$^{th}$ pad 815. The 3-5$^{th}$ pad 915 may be disposed to face the 3-6$^{th}$ pad 916. For example, the 3-6$^{th}$ pad 916 may be disposed on a side of the second partition 1722 facing the 3-5$^{th}$ pad 915. The 10-5$^{th}$ pad 745 may be disposed to face the 10-6$^{th}$ pad 746. For example, the 10-6$^{th}$ pad 746 may be disposed on a side facing the 10-5$^{th}$ pad 745. The 11-5$^{th}$ pad 845 may be disposed to face the 11-6$^{th}$ pad 846. For example, the 11-6$^{th}$ pad 846 may be disposed on a side of the second partition 1722 facing the 11-5$^{th}$ pad 845.

For example, a pad may be disposed on at least one other side of the second partition 1722 to face the seventh sound generating module 1500BL, the eighth sound generating module 1500BR, and the ninth sound generating module 1500BC. For example, a 7-5$^{th}$ pad 735 may be disposed on at least one other side of the second partition 1722 to face the seventh sound generating module 1500BL. For example, an 8-5$^{th}$ pad 835 may be disposed on at least one other side of the second partition 1722 to face the eighth sound generating module 1500BR. For example, a 9-5$^{th}$ pad 935 may be disposed on at least one other side of the second partition 1722 to face the ninth sound generating module 1500BC. The 7-5$^{th}$ pad 735, the 8-5$^{th}$ pad 835, and the 9-5$^{th}$ pad 935 may be provided as one, but are not limited thereto. One of the 7-5$^{th}$ pad 735, the 8-5$^{th}$ pad 835, and the 9-5$^{th}$ pad 935 may be provided as two or more.

For example, a pad may be disposed on at least one side of the third partition 1723 to face the seventh sound generating module 1500BL, the eighth sound generating module 1500BR, and the ninth sound generating module 1500BC. For example, a 7-6$^{th}$ pad 736 may be disposed on at least one side of the third partition 1723 to face the seventh sound generating module 1500BL. For example, an 8-6$^{th}$ pad 836 may be disposed on at least one side of the third partition 1723 to face the eighth sound generating module 1500BR. For example, a 9-6$^{th}$ pad 936 may be disposed on at least one side of the third partition 1723 to face the ninth sound generating module 1500BC. The 7-6$^{th}$ pad 736, the 8-6$^{th}$ pad 836, and the 9-6$^{th}$ pad 936 may be provided as one, but are not limited thereto. One of the 7-6$^{th}$ pad 736, the 8-6$^{th}$ pad 836, and the 9-6$^{th}$ pad 936 may be provided as two or more.

In embodiments of the present disclosure, sizes of each of the 1-1$^{st}$ and 1-3$^{rd}$ pads 711 and 713 are illustrated to be greater than that of each of the 1-5$^{th}$ pad 715 and the 1-6$^{th}$ pad 716, but a size of each pad does not limit descriptions of the present disclosure. For example, sizes of the 1-1$^{st}$ and 1-3$^{rd}$ pads 711 and 713 may be equal to or greater than that of each of the 1-5$^{th}$ pad 715 and the 1-6$^{th}$ pad 716. This may be identically applied to the other pads. In FIG. 31D, a partition may not be disposed near the rear cover 300. The rear cover 300 may be attached on the display panel 110 by an adhesive member, described above with reference to FIGS. 8, 10, and 19 to 21, for attaching the display panel on the rear cover.

Figure 31E:
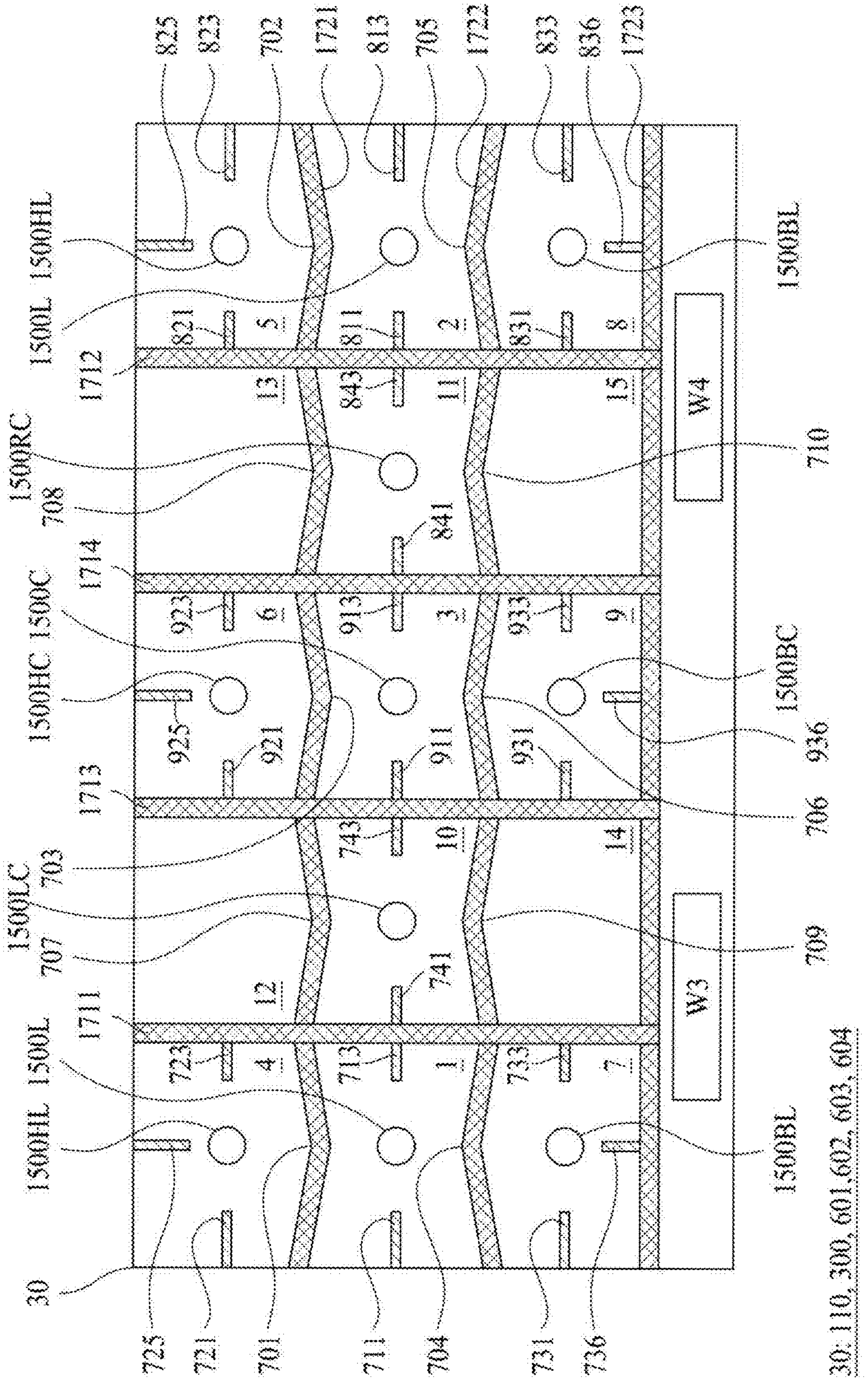

With reference to FIG. 31E, a first partition 1721 may include one or more bent portions. For example, the first partition 1721 may include a first bent portion 701 toward a first sound generating module 1500L and may include a seventh bent portion 707 toward a tenth sound generating module 1500LC. The first partition 1721 may include a second bent portion 702 toward a second sound generating module 1500R and may include an eighth bent portion 708 toward an eleventh sound generating module 1500RC. The first partition 1721 may include a third bent portion 703 toward a third sound generating module 1500C. Also, a reduction in sound pressure caused by standing waves of a fourth sound generating module 1500HL a fifth sound generating module 1500HR, and a sixth sound generating module 1500HC may be reduced by a 4-5$^{th}$ pad 725, a 5-5$^{th}$ pad 825, and a 6-5$^{th}$ pad 925.

A second partition 1722 may include one or more bent portions. For example, the second partition 1722 may include a fourth bent portion 704 toward the first sound generating module 1500L and may include a ninth bent portion 709 toward the tenth sound generating module 1500LC. The second partition 1722 may include a fifth bent portion 705 toward the second sound generating module 1500R and may include a tenth bent portion 710 toward the eleventh sound generating module 1500RC. The second partition 1722 may include a sixth bent portion 706 toward the third sound generating module 1500C.

When a partition 1750 is not provided, a third partition 1723 may be provided. The third partition 1723, as described above with reference to FIG. 30D, may configure a pad. However, the present disclosure is not limited thereto, and like the second partition 1722, the third partition 1723 may include one or more bent portions. For example, a bent portion may be provided based on a shape of the third partition 1723. For example, as described above with reference to FIG. 30E, when the third partition 1723 includes a bent portion in FIG. 31E, the bent portion may be provided to face the seventh sound generating module 1500BL, the ninth sound generating module 1500BC, and the eighth sound generating module 1500BR.

FIGS. 32A to 32E illustrate a sound generating module and a partition according to another embodiment of the present disclosure.

With reference to FIGS. 32A to 32E, a partition may be further provided near a sound generating module. For example, the partition may be disposed between a rear cover 300 and a display panel 110 corresponding to first to fifteenth regions 1 to 15. For example, a fourth partition 1713 may be disposed between the first, fourth, and seventh regions 1, 4, and 7 and the third, sixth, and ninth regions 3, 6, and 9. The fourth partition 1713 may separate channels or sounds, generated by first, fourth, and seventh sound generating modules 1500L, 1500HL, and 1500BL, and channels or sounds generated by third, sixth, and ninth sound generating modules 1500C, 1500HC, and 1500BC. For example, a fifth partition 1714 may be disposed between the second, fifth, and eighth regions 2, 5, and 8, the third, sixth, and ninth regions 3, 6, and 9. The fifth partition 1714 may separate channels or sounds, generated by second, fifth, and eighth sound generating modules 1500R, 1500HR, and 1500BR, and channels or sounds generated by third, sixth, and ninth sound generating modules 1500C, 1500HC, and 1500BC. Accordingly, the fourth partition 1713 and the fifth partition 1714 may separate a left sound and a right sound.

For example, a first partition 1721 may separate a height channel of the display panel 110 and a bottom channel of the display panel 110. For example, the first partition 1721 may separate channels or sounds, generated by the fourth sound generating module 1500HL, the fifth sound generating module 1500HR, the sixth sound generating module 1500HC, a twelfth sound generating module 1500HLC, and a thirteenth sound generating module 1500HRC, and channels or sounds generated by the seventh sound generating module 1500BL, the eighth sound generating module 1500BR, the ninth sound generating module 1500BC, a fourteenth sound generating module 1500BLC, and a fifteenth sound generating module 1500BRC. In order to realize a stereo sound or a stereophonic sound, the tenth sound generating module 1500LC and the eleventh sound generating module 1500RC may be further provided, and a partition should be provided for separating a channel or a sound, generated by the tenth sound generating module 1500LC, and channels or sounds generated by the seventh sound generating module 1500BL, the eighth sound generating module 1500BR, and the ninth sound generating module 1500BC. Also, a partition should be provided for separating a channel or a sound, generated by the eleventh sound generating module 1500RC, and channels or sounds generated by the seventh sound generating module 1500BL, the eighth sound generating module 1500BR, and the ninth sound generating module 1500BC.

The fourth partition 1713 and the fifth partition 1714 may separate a left sound and a right sound or a left channel and a right channel. In order to realize a stereo sound or a stereophonic sound, the twelfth sound generating module 1500HLC and the fourteenth sound generating module 1500BLC may be further provided, and a partition should be provided for separating channels or sounds, generated by the tenth sound generating module 1500LC, the twelfth sound generating module 1500HLC, and the fourteenth sound generating module 1500BLC, and channels or sounds generated by the first sound generating module 1500L, the fourth sound generating module 1500HL, and the seventh sound generating module 1500BL. Also, in order to realize a stereo sound or a stereophonic sound, the thirteenth sound generating module 1500HRC and the fifteenth sound generating module 1500BRC may be further provided, and a partition should be provided for separating channels or sounds, generated by the eleventh sound generating module 1500RC, the thirteenth sound generating module 1500HRC, and the fifteenth sound generating module 1500BRC, and channels or sounds generated by the second sound generating module 1500R, the fifth sound generating module 1500HR, and the eighth sound generating module 1500BR. In a case where the first partition 1721 is provided, a height sound and a bottom sound or a height channel and a bottom channel may be separated from each other, but a height sound and a bottom sound or a height channel and a bottom channel may not be separated from a center sound or a center channel, whereby a partition should be provided. In a case where the fourth partition 1713 and the fifth partition 1714 are provided, a left sound and a right sound or a left channel and a right channel may be separated, but a left sound and a right sound or a left channel and a right channel may not be separated from a center sound or a center channel, whereby a partition should be provided.

For example, a sixth partition 1711 may be disposed between the first, fourth, and seventh regions 1, 4, and 7 and the tenth, twelfth, and fourteenth regions 10, 12, and 14. For example, the sixth partition 1711 may separate channels or sounds generated by the first, fourth, and seventh sound generating modules 1500L, 1500HL, and 1500BL, and channels or sounds generated by the tenth, twelfth, and fourteenth sound generating modules 1500LC, 1500HLC, and 1500BLC, thereby enhancing a sound output characteristic. For example, the sixth partition 1711 may separate channels or sounds generated by the first, fourth, and seventh sound generating modules 1500L, 1500HL, and 1500BL, and channels or sounds generated by the third, sixth, and ninth sound generating modules 1500C, 1500HC, and 1500BC, thereby enhancing a sound output characteristic. For example, the sixth partition 1711 may separate a left sound or a left channel, a left center sound or a left center channel, and a center sound or a center channel, thereby enhancing a sound output characteristic.

For example, a seventh partition 1712 may be disposed between the second, fifth, and eighth regions 2, 5, and 8 and the eleventh, thirteenth, and fifteenth regions 11, 13, and 15. For example, the seventh partition 1712 may separate channels or sounds generated by the second, fifth, and eighth sound generating modules 1500R, 1500HR, and 1500BR, and channels or sounds generated by the eleventh, thirteenth, and fifteenth sound generating modules 1500RC, 1500HRC, and 1500BRC, thereby enhancing a sound output characteristic. For example, the seventh partition 1712 may separate channels or sounds generated by the second, fifth, and eighth sound generating modules 1500R, 1500HR, and 1500BR, and the channels or the sounds generated by the third, sixth, and ninth sound generating modules 1500C, 1500HC, and 1500BC, thereby enhancing a sound output characteristic. For example, the seventh partition 1712 may separate a right sound or a right channel, a right center sound or a right center channel, and a center sound or a center channel, thereby enhancing a sound output characteristic.

For example, a fourth partition 1713 may be disposed between the third, sixth, and ninth regions 3, 6, and 9 and the tenth, twelfth, and fourteenth regions 10, 12, and 14. For example, the fourth partition 1713 may separate channels or sounds generated by the third, sixth, and ninth sound generating modules 1500C, 1500HC, and 1500BC, and channels or sounds generated by the tenth, twelfth, and fourteenth sound generating modules 1500LC, 1500HLC, and 1500BLC, thereby enhancing a sound output characteristic. For example, a fifth partition 1714 may be disposed between the third, sixth, and ninth regions 3, 6, and 9 and the eleventh, thirteenth, and fifteenth regions 11, 13, and 15. For example, the fifth partition 1714 may separate the channels or the sounds generated by the third, sixth, and ninth sound generating modules 1500C, 1500HC, and 1500BC, and channels or sounds generated by the eleventh, thirteenth, and fifteenth sound generating modules 1500RC, 1500HRC, and 1500BRC, thereby enhancing a sound output characteristic. For example, the fourth partition 1713 may separate a channel or a sound of a center region and a channel or a sound of a left center region. For example, the fifth partition 1714 may separate the channel or the sound of the center region and a channel or a sound of a right center region.

The first partition 1721 may separate a height channel of the display panel 110 and a center channel of the display panel 110. For example, the first partition 1721 may separate the channels or the sounds, generated by the fourth, fifth, sixth, twelfth, and thirteenth sound generating modules 1500HL, 1500HR, 1500HC, 1500HLC, and 1500HRC, and the channels or the sounds generated by the first, second, third, tenth, and eleventh sound generating modules 1500L, 1500R, 1500C, 1500LC, and 1500RC.

The second partition 1722 may separate the center channel of the display panel 110 and the bottom channel of the display panel 110. For example, the second partition 1722 may separate the channels or the sounds, generated by the first, second, third, tenth, and eleventh sound generating modules 1500L, 1500R, 1500C, 1500LC, and 1500RC and the channels or the sounds generated by the seventh, eighth, ninth, fourteenth, and fifteenth sound generating modules 1500BL, 1500BR, 1500BC, 1500BLC, and 1500BRC.

The third partition 1723 may separate the bottom channel of the display panel 110 and a woofer. For example, the third partition 1723 may be disposed under or a lower portion of the seventh, eighth, and ninth sound generating modules 1500BL, 1500BR, and 1500BC. For example, the third partition 1723 may separate the channels or the sounds, generated by the seventh, eighth, ninth, fourteenth, and fifteenth sound generating modules 1500BL, 1500BR, 1500BC, 1500BLC, and 1500BRC, and channels or sounds generated by a first woofer W3 and a second woofer W4.

The first partition 1721, the second partition 1722, the third partition 1723, the fourth partition 1713, the fifth partition 1714, the sixth partition 1711, and the seventh partition 1712 may be disposed at the rear cover 300. For example, the first partition 1721, the second partition 1722, the third partition 1723, the fourth partition 1713, the fifth partition 1714, the sixth partition 1711, and the seventh partition 1712 may be disposed on a front surface of the rear cover 300. As another example, the first partition 1721, the second partition 1722, the third partition 1723, the fourth partition 1713, the fifth partition 1714, the sixth partition 1711, and the seventh partition 1712 may be disposed on a rear surface of the display panel 100. For example, the first partition 1721, the second partition 1722, the third partition 1723, the fourth partition 1713, the fifth partition 1714, the sixth partition 1711, and the seventh partition 1712 may be disposed between the display panel 110 and the rear cover 300. For example, the first partition 1721, the second partition 1722, the third partition 1723, the fourth partition 1713, the fifth partition 1714, the sixth partition 1711, and the seventh partition 1712 may be disposed between the rear surface of the display panel 110 and the front surface of the rear cover 300.

The first partition 1721, the second partition 1722, the third partition 1723, the fourth partition 1713, the fifth partition 1714, the sixth partition 1711, and the seventh partition 1712 may be formed of one or more of a double-sided tape, a double-sided foam tape, a double-sided foam pad, a single-sided tape, a single-sided foam tape, a single-sided foam pad, an adhesive, and a bond, but is not limited thereto. When the first partition 1721, the second partition 1722, the third partition 1723, the fourth partition 1713, the fifth partition 1714, the sixth partition 1711, and the seventh partition 1712 are formed of the double-sided tape, the double-sided foam tape, or the double-sided foam pad, an adhesive force may be enhanced in a process of attaching the front surface of the rear cover 300 on the rear surface of the display panel 110. For example, the first partition 1721, the second partition 1722, the third partition 1723, the fourth partition 1713, the fifth partition 1714, the sixth partition 1711, and the seventh partition 1712 may include a material having an elastic force which enables compression to be made to a certain degree, and for example, may include polyurethane, polyolefin, polyethylene, and/or the like, but is not limited thereto.

In a process of placing the first partition 1721, the second partition 1722, the third partition 1723, the fourth partition 1713, the fifth partition 1714, the sixth partition 1711, and the seventh partition 1712, the first partition 1721, the second partition 1722, the third partition 1723 may be placed, and then, the fourth partition 1713, the fifth partition 1714, the sixth partition 1711, and the seventh partition 1712 may be placed. As another example, the fourth partition 1713, the fifth partition 1714, the sixth partition 1711, and the seventh partition 1712 may be placed, and then, the first partition 1721, the second partition 1722, the third partition 1723 may be placed. However, an order in which the partitions are placed does not limit descriptions of the present disclosure. In the following embodiments, an example where the first partition 1721, the second partition 1722, the third partition 1723 are placed and then the fourth partition 1713, the fifth partition 1714, the sixth partition 1711, and the seventh partition 1712 are placed is illustrated, but an embodiment of the present disclosure is not limited thereto. Such a description may be identically or similarly applied to the following embodiments.

Figure 32A:
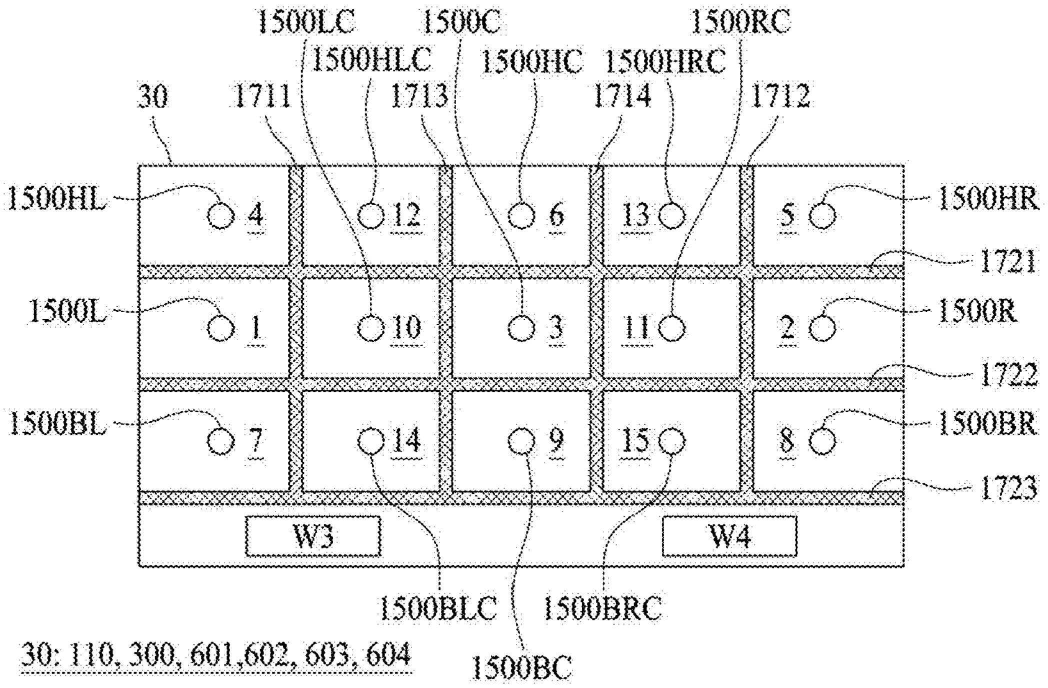
FIGS. 32A to 32E illustrate a sound generating module and a partition according to another embodiment of the present disclosure.
Figure 32B:
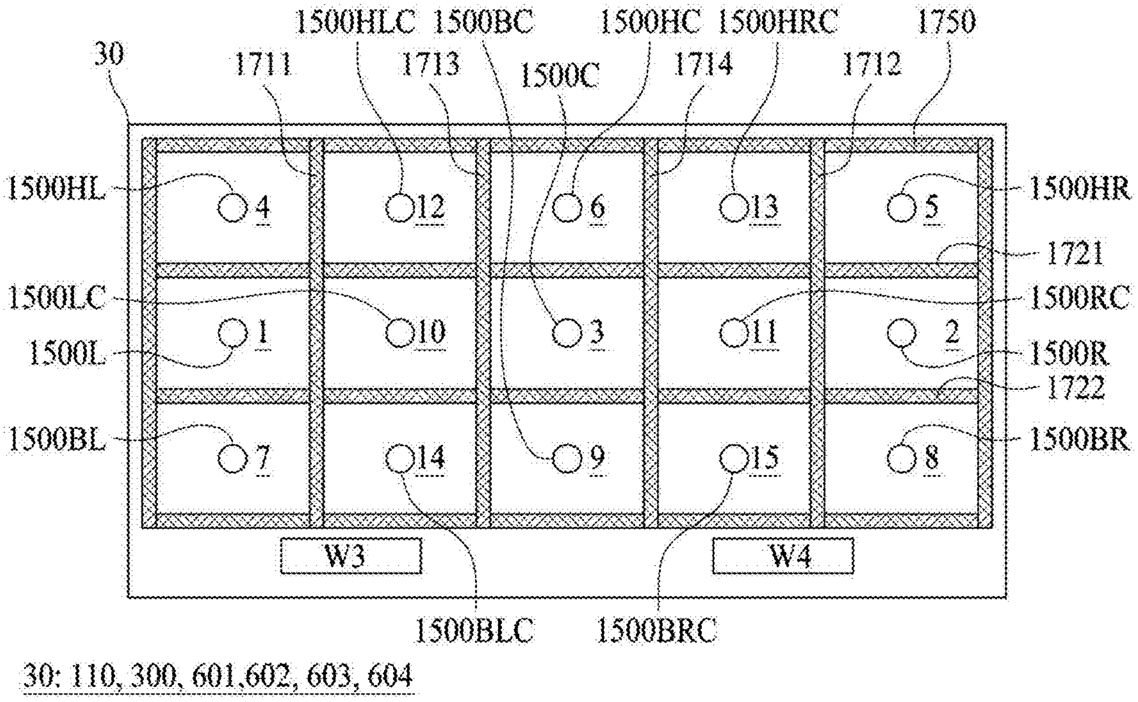

With reference to FIG. 32B, a first partition 1721, a second partition 1722, a third partition 1723, a fourth partition 1713, a fifth partition 1714, a sixth partition 1711, and a seventh partition 1712 may be provided, and a partition 1750 may be disposed between a rear cover 300 and a display panel 110. For example, the partition 1750 may be disposed at an edge or periphery of the rear cover 300. For example, the partition 1750 may be disposed at an edge or periphery of a front surface of the rear cover 300. For example, the partition 1750 may be disposed at an edge or periphery of the rear cover 300. The partition 1750 may be a whole region of four outer sides of the front surface of the rear cover 300. As another example, the partition 1750 may be disposed at an edge or periphery of a rear surface of the display panel 110. The partition 1750 may be a whole region of four outer sides of the rear surface of the display panel 110. The partition 1750 may be a whole region of the rear cover 300 or the rear surface of the display panel 110. The partition 1750 may be disposed along a shape of the display panel 110 so as to prevent a wave phenomenon of the display panel 110. For example, when the partition 1750 is an adhesive member for attaching a rear cover on the display panel described above with reference to FIGS. 8, 10, and 19 to 21, the adhesive member described above with reference to FIGS. 8, 10, and 19 to 21 may be omitted. However, the present disclosure is not limited thereto, and an adhesive for attaching a display panel on a rear cover may be provided on a rear surface of the display panel or at the rear cover.

In a process of placing the first partition 1721, the second partition 1722, the fourth partition 1701, the fifth partition 1702, the sixth partition 1711, the seventh partition 1712, and the partition 1750, the first partition 1721 and the second partition 1722 may be placed, the partition 1750 may be placed, and the fourth partition 1701, the fifth partition 1702, the sixth partition 1711, and the seventh partition 1712 may be placed subsequently. As another example, the fourth partition 1701, the fifth partition 1702, the sixth partition 1711, and the seventh partition 1712 may be placed, the first partition 1721 and the second partition 1722 may be placed, and the partition 1750 may be placed subsequently. However, an order in which the partitions are placed does not limit descriptions of an embodiment of the present disclosure. The partition 1750 may be first placed in a lengthwise direction of the rear cover, and then, may be placed in a widthwise direction. However, an order in which the partitions are placed does not limit descriptions of an embodiment of the present disclosure. In the following embodiments, an example where the first partition 1721 and the second partition 1722 are placed, the partition 1750 is placed, and the fourth partition 1701, the fifth partition 1702, the sixth partition 1711, and the seventh partition 1712 are placed subsequently is illustrated, but the present disclosure is not limited thereto. Such a description may be identically or similarly applied to the following embodiments.

Figure 32C:
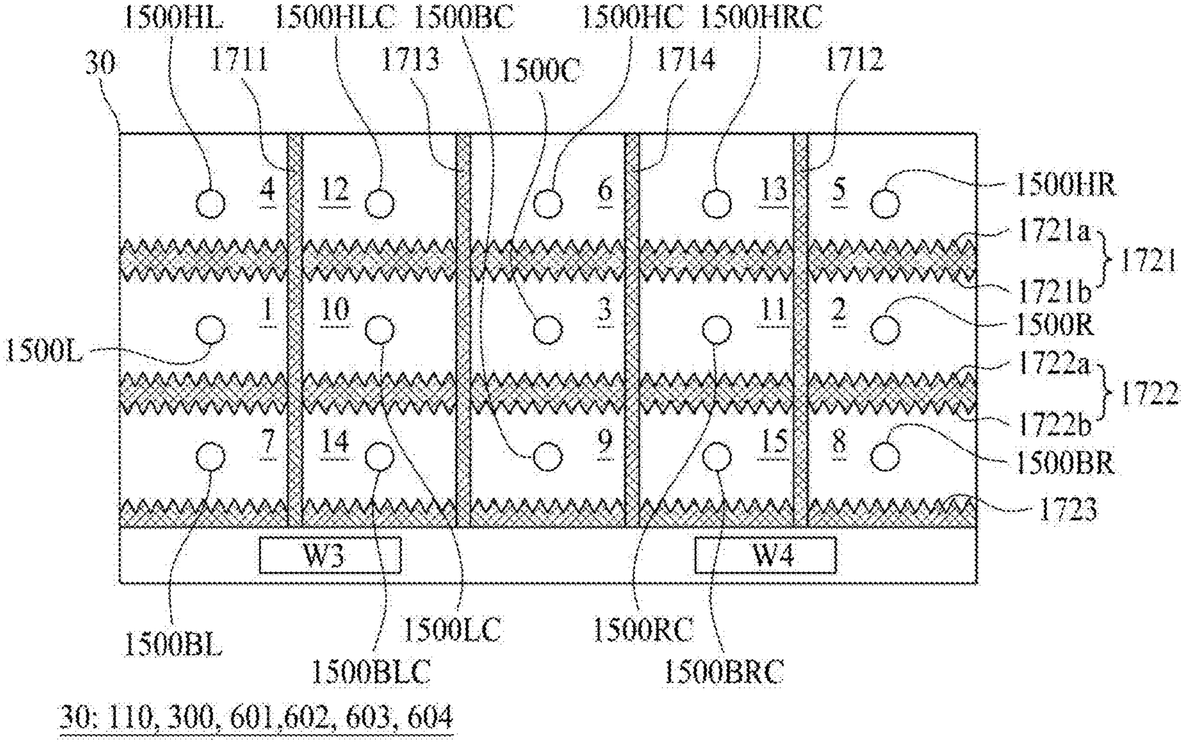

With reference to FIG. 32C, a shape of a first partition 1721, a shape of a second partition 1722, and a shape of a third partition 1723 may be differently implemented. A shape of the first partition 1721, a shape of the second partition 1722, and a shape of the third partition 1723 may differ from a shape of a display panel 110. For example, the first partition 1721, the second partition 1722, and the third partition 1723 may have a non-flat shape or may not have a linear shape. When a partition has a non-flat shape or does not have a linear shape, the partition may diffuse a standing wave. For example, when a partition is implemented in a saw-toothed shape, a triangular shape, and an end-rounded triangular shape, a standing wave may be diffused in various directions by the saw-toothed shape, the triangular shape, and the end-rounded triangular shape, thereby enhancing a sound output characteristic. For example, the first partition 1721, the second partition 1722, and the third partition 1723 may have a saw-toothed shape, a triangular shape, and an end-rounded triangular shape. For example, sawtooth of a partition may be disposed toward a sound generating module. The first partition 1721 and the second partition 1722 may be provided as two partitions, but are not limited thereto and one of the first partition 1721 and the second partition 1722 may be provided as two partitions. For example, the first partition 1721 may include a 1-1$^{st}$ partition 1721$a$ and a 1-2$^{rd}$ partition 1721$b$ and may be configured in an end-rounded triangular shape. An end of a triangular or end-rounded triangular shape of the 1-1$^{st}$ partition 1721$a$ may be provided to face a fourth sound generating module 1500HL, a fifth sound generating module 1500HR, a sixth sound generating module 1500HC, a twelfth sound generating module 1500HLC, and a thirteenth sound generating module 1500HRC. An end of a triangular or end-rounded triangular shape of the 1-2$^{nd}$ partition 1721$b$ may be provided to face a first sound generating module 1500L, a second sound generating module 1500R, a third sound generating module 1500C, a tenth sound generating module 1500LC, and an eleventh sound generating module 1500RC. For example, the second partition 1722 may include a 2-1$^{st}$ partition 1722$a$ and a 2-2$^{rd}$ partition 1722$b$ and may be configured in an end-rounded triangular shape. An end of a triangular or end-rounded triangular shape of the 2-1$^{st}$ partition 1722$a$ may be provided to face the first sound generating module 1500L, the second sound generating module 1500R, the third sound generating module 1500C, the tenth sound generating module 1500LC, and the eleventh sound generating module 1500RC. An end of a triangular or end-rounded triangular shape of the 2-2$^{nd}$ partition 1722$b$ may be provided to face a seventh sound generating module 1500BL, an eighth sound generating module 1500BR, a ninth sound generating module 1500BC, a fourteenth sound generating module 1500BLC, and a fifteenth sound generating module 1500BRC. Accordingly, a peak or a dip phenomenon caused by a standing wave of a sound generating module may be controlled, and a wave phenomenon of a display panel may be reduced. However, the present disclosure is not limited thereto, and the first partition 1721 and the second partition 1722 may be provided as one. For example, the embodiment of FIG. 32C may be identically or similarly applied to each partition of FIGS. 31A to 31E. The embodiment of FIG. 31C may be identically or similarly applied to each partition of FIGS. 32A to 32E.

Figure 32D:
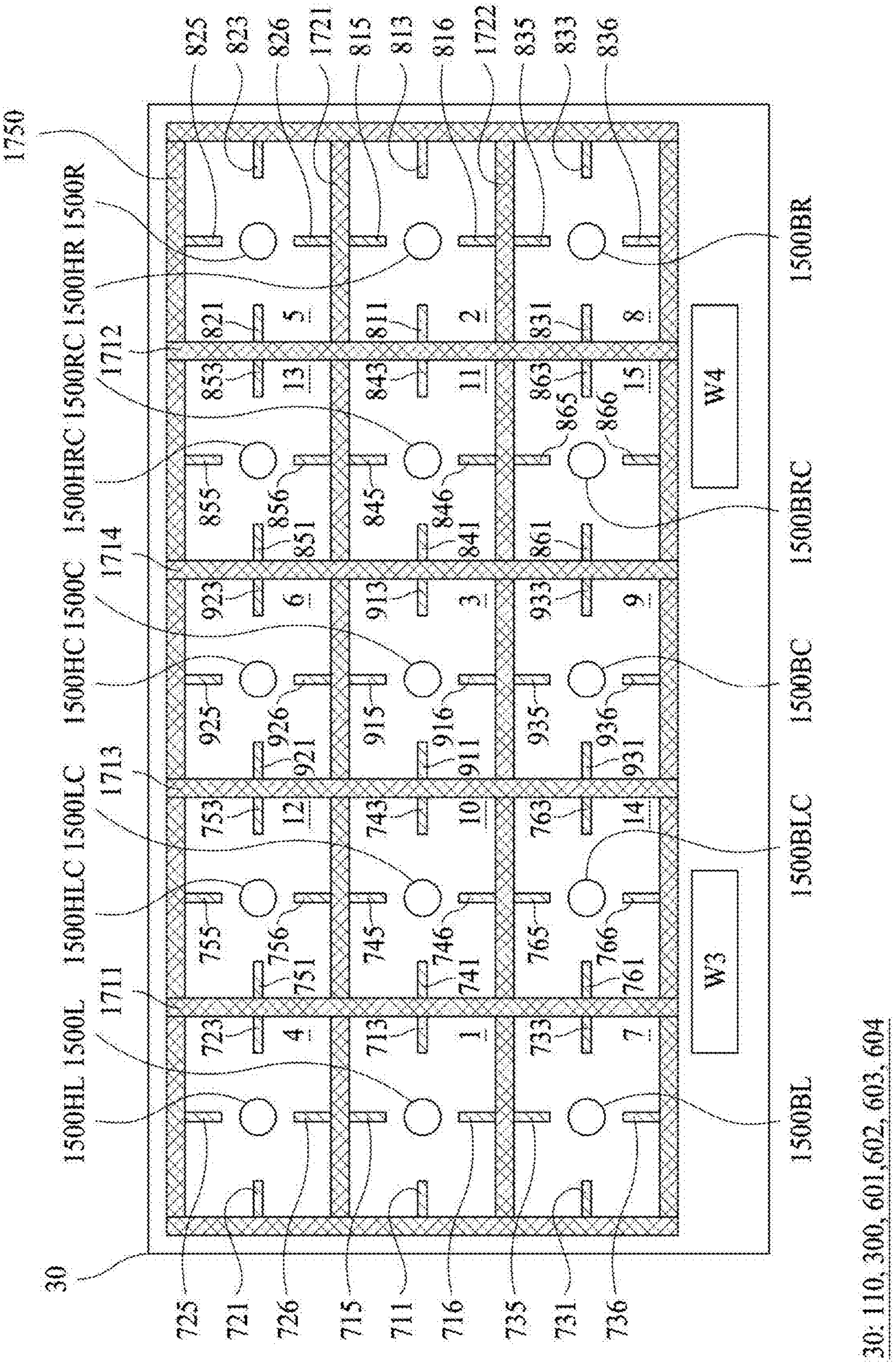

With reference to FIG. 32D, a pad may be disposed on at least one side of a sixth partition 1711 to face a first sound generating module 1500L, a fourth sound generating module 1500HL, and a seventh sound generating module 1500BL. For example, a 1-3$^{rd}$ pad 713 may be disposed on at least one side of the sixth partition 1711 to face the first sound generating module 1500L. A 1-1$^{st}$ pad 711 may be disposed on a side facing the 1-3$^{rd}$ pad 713. The 1-1$^{st}$ pad 711 and the 1-3$^{rd}$ pad 713 may be provided as one, but are not limited thereto and one of the 1-1$^{st}$ pad 711 and the 1-3$^{rd}$ pad 713 may be provided as two or more. For example, a 4-3$^{rd}$ pad 723 may be disposed on at least one side of the sixth partition 1711 to face the fourth sound generating module 1500HL. A 4-1$^{st}$ pad 721 may be disposed on a side facing the 4-3$^{rd}$ pad 723. The 4-1$^{st}$ pad 721 and the 4-3$^{rd}$ pad 723 may be provided as one, but are not limited thereto and one of the 4-1$^{st}$ pad 721 and the 4-3$^{rd}$ pad 723 may be provided as two or more. For example, a 7-3$^{rd}$ pad 733 may be disposed on at least one side of the sixth partition 1711 to face the seventh sound generating module 1500BL. A 7-1$^{st}$ pad 731 may be disposed on a side facing the 7-3$^{rd}$ pad 733. The 7-1$^{st}$ pad 731 and the 7-3$^{rd}$ pad 733 may be provided as one, but are not limited thereto and one of the 7-1$^{st}$ pad 731 and the 7-3$^{rd}$ pad 733 may be provided as two or more.

A pad may be disposed on at least one other side of the sixth partition 1711 to face the tenth sound generating module 1500LC. For example, a 10-1$^{st}$ pad 741 may be disposed on at least one other side of the sixth partition 1711 to face the tenth sound generating module 1500LC. The 10-1$^{st}$ pad 741 may be provided as one, but is not limited thereto and may be provided as two or more.

A pad may be disposed on at least one other side of the sixth partition 1711 to face the twelfth sound generating module 1500HLC. For example, a 12-1$^{st}$ pad 751 may be disposed on at least one other side of the sixth partition 1711 to face the twelfth sound generating module 1500HLC. The 12-1$^{st}$ pad 751 may be provided as one, but is not limited thereto and may be provided as two or more.

A pad may be disposed on at least one other side of the sixth partition 1711 to face the fourteenth sound generating module 1500BLC. For example, a 14-1$^{st}$ pad 761 may be disposed on at least one other side of the sixth partition 1711 to face the fourteenth sound generating module 1500BLC. The 14-1$^{st}$ pad 761 may be provided as one, but is not limited thereto and may be provided as two or more.

A pad may be disposed on at least one side of a seventh partition 1712 to face a second sound generating module 1500R, a fifth sound generating module 1500HR, and an eighth sound generating module 1500BR. For example, a 2-1$^{st}$ pad 811 may be disposed on at least one side of the seventh partition 1712 to face the second sound generating module 1500R. A 2-3$^{rd}$ pad 813 may be disposed on a side facing the 2-1$^{st}$ pad 811. The 2-1$^{st}$ pad 811 and the 2-3$^{rd}$ pad 813 may be provided as one, but are not limited thereto and one of the 2-1$^{st}$ pad 811 and the 2-3$^{rd}$ pad 813 may be provided as two or more. For example, a 5-1$^{st}$ pad 821 may be disposed on at least one side of the seventh partition 1712 to face the fifth sound generating module 1500HR. A 5-3$^{rd}$ pad 823 may be disposed on a side facing the 5-1$^{st}$ pad 821. The 5-1$^{st}$ pad 821 and the 5-3$^{rd}$ pad 823 may be provided as one, but are not limited thereto and one of the 5-1$^{st}$ pad 821 and the 5-3$^{rd}$ pad 823 may be provided as two or more. For example, an 8-1$^{st}$ pad 831 may be disposed on at least one side of the seventh partition 1712 to face the eighth sound generating module 1500BR. An 8-3$^{rd}$ pad 833 may be disposed on a side facing the 8-1$^{st}$ pad 831. The 8-1$^{st}$ pad 831 and the 8-3$^{rd}$ pad 833 may be provided as one, but are not limited thereto and one of the 8-1$^{st}$ pad 831 and the 8-3$^{rd}$ pad 833 may be provided as two or more.

A pad may be disposed on at least one other side of the seventh partition 1712 to face the eleventh sound generating module 1500RC. For example, an 11-3$^{rd}$ pad 843 may be disposed on at least one other side of the seventh partition 1712 to face the eleventh sound generating module 1500RC. The 11-3$^{rd}$ pad 843 may be provided as one, but is not limited thereto and may be provided as two or more. A pad may be disposed on at least one other side of the seventh partition 1712 to face the thirteenth sound generating module 1500HRC. For example, a 13-3$^{rd}$ pad 853 may be disposed on at least one other side of the seventh partition 1712 to face the thirteenth sound generating module 1500HRC. The 13-3$^{rd}$ pad 853 may be provided as one, but is not limited thereto and may be provided as two or more. A pad may be disposed on at least one other side of the seventh partition 1712 to face the fifteenth sound generating module 1500BRC. For example, a 15-3$^{rd}$ pad 863 may be disposed on at least one other side of the seventh partition 1712 to face the fifteenth sound generating module 1500BRC. The 15-3$^{rd}$ pad 863 may be provided as one, but is not limited thereto and may be provided as two or more.

A pad may be disposed on at least one side of a fourth partition 1713 and at least one side of the fifth partition 1714 to face a third sound generating module 1500C, a sixth sound generating module 1500HC, and a ninth sound generating module 1500BC. For example, a 3-1$^{st}$ pad 911 may be disposed on at least one side of the fourth partition 1713 to face the third sound generating module 1500C. For example, a 3-3$^{rd}$ pad 913 may be disposed on at least one side of the fifth partition 1714 to face the third sound generating module 1500C. The 3-1$^{st}$ pad 911 may be disposed to face the 3-3$^{rd}$ pad 913. The 3-3$^{rd}$ pad 913 may be disposed on a side facing the 3-1$^{st}$ pad 911. The 3-1$^{st}$ pad 911 and the 3-3$^{rd}$ pad 913 may be provided as one, but are not limited thereto and one of the 3-1$^{st}$ pad 911 and the 3-3$^{rd}$ pad 913 may be provided as two or more. For example, a 6-1$^{st}$ pad 921 may be disposed on at least one side of the fourth partition 1713 to face the sixth sound generating module 1500HC. For example, a 6-3$^{rd}$ pad 923 may be disposed on at least one side of the fifth partition 1714 to face the sixth sound generating module 1500HC. The 6-1$^{st}$ pad 921 may be disposed to face the 6-3$^{rd}$ pad 923. The 6-3$^{rd}$ pad 923 may be disposed on a side facing the 6-1$^{st}$ pad 921. The 6-1$^{st}$ pad 921 and the 6-3$^{rd}$ pad 923 may be provided as one, but are not limited thereto and one of the 6-1$^{st}$ pad 921 and the 6-3$^{rd}$ pad 923 may be provided as two or more. For example, a 9-1$^{st}$ pad 931 may be disposed on at least one side of the fourth partition 1713 to face the ninth sound generating module 1500BC. For example, a 9-3$^{rd}$ pad 933 may be disposed on at least one side of the fifth partition 1714 to face the ninth sound generating module 1500BC. The 9-1$^{st}$ pad 931 may be disposed to face the 9-3$^{rd}$ pad 933. The 9-3$^{rd}$ pad 933 may be disposed on a side facing the 9-1$^{st}$ pad 931. The 9-1$^{st}$ pad 931 and the 9-3$^{rd}$ pad 933 may be provided as one, but are not limited thereto and one of the 9-1$^{st}$ pad 931 and the 9-3$^{rd}$ pad 933 may be provided as two or more.

For example, a 10-3$^{th}$ pad 743 may be disposed on at least one other side of the fourth partition 1713 to face the tenth sound generating module 1500LC. For example, a 12-3$^{rd}$ pad 753 may be disposed on at least one other side of the fourth partition 1713 to face the twelfth sound generating module 1500HLC. For example, a 14-3$^{th}$ pad 763 may be disposed on at least one other side of the fourth partition 1713 to face the fourteenth sound generating module 1500BLC. The 10-3$^{rd}$ pad, the 12-3$^{rd}$ pad 753, and the 14-3$^{rd}$ pad 763 may be provided as one, but is not limited thereto and one of the 10-3$^{rd}$ pad, the 12-3$^{rd}$ pad 753, and the 14-3$^{rd}$ pad 763 may be provided as two or more.

For example, an 11-1$^{st}$ pad 841 may be disposed on at least one other side of the fifth partition 1714 to face the eleventh sound generating module 1500RC. For example, a 13-1$^{st}$ pad 851 may be disposed on at least one other side of the fifth partition 1714 to face the thirteenth sound generating module 1500HRC. For example, a 15-1$^{st}$ pad 861 may be disposed on at least one other side of the fifth partition 1714 to face the fifteenth sound generating module 1500BRC. The 11-1$^{st}$ pad 841, the 13-1$^{st}$ pad 851, and the 15-1$^{st}$ pad 861 may be provided as one, but is not limited thereto and one of the 11-1$^{st}$ pad 841, the 13-1$^{st}$ pad 851, and the 15-1$^{st}$ pad 861 may be provided as two or more.

A pad may be disposed on at least one side of a first partition 1721 to face the fourth sound generating module 1500HL, the fifth sound generating module 1500HR, the sixth sound generating module 1500HC, the twelfth sound generating module 1500HLC, and the thirteenth sound generating module 1500HRC. For example, a 4-6$^{th}$ pad 726 may be disposed on at least one side of the first partition 1721 to face the fourth sound generating module 1500HL. The 4-6$^{th}$ pad 726 may be provided as one, but is not limited thereto and may be provided as two or more.

For example, a 5-6$^{th}$ pad 826 may be disposed on at least one side of the first partition 1721 to face the fifth sound generating module 1500HR. A 5-5$^{th}$ pad 825 may be disposed on a side facing the 5-6$^{th}$ pad 826, and the 5-5$^{th}$ pad 825 may be disposed to face the fifth sound generating module 1500HR. The 5-5$^{th}$ pad 825 and the 5-6$^{th}$ pad 826 may be provided as one, but are not limited thereto and one of the 5-5$^{th}$ pad 825 and the 5-6$^{th}$ pad 826 may be provided as two or more.

For example, a 6-6$^{th}$ pad 926 may be disposed on at least one side of the first partition 1721 to face the sixth sound generating module 1500HC. A 6-5$^{th}$ pad 925 may be disposed on a side facing the 6-6$^{th}$ pad 926, and the 6-5$^{th}$ pad 925 may be disposed to face the sixth sound generating module 1500HC. The 6-5$^{th}$ pad 925 and the 6-6$^{th}$ pad 926 may be provided as one, but are not limited thereto and one of the 6-5$^{th}$ pad 925 and the 6-6$^{th}$ pad 926 may be provided as two or more.

For example, a 12-6$^{th}$ pad 756 may be disposed on at least one side of the first partition 1721 to face the twelfth sound generating module 1500HLC. A 12-5$^{th}$ pad 755 may be disposed on a side facing the 12-6$^{th}$ pad 756, and the 12-5$^{th}$ pad 755 may be disposed to face the twelfth sound generating module 1500HLC. The 12-5$^{th}$ pad 755 and the 12-6$^{th}$ pad 756 may be provided as one, but are not limited thereto and one of the 12-5$^{th}$ pad 755 and the 12-6$^{th}$ pad 756 may be provided as two or more.

For example, a 13-6$^{th}$ pad 856 may be disposed on at least one side of the first partition 1721 to face the thirteenth sound generating module 1500HRC. A 13-5$^{th}$ pad 855 may be disposed on a side facing the 13-6$^{th}$ pad 856, and the 13-5$^{th}$ pad 855 may be disposed to face the thirteenth sound generating module 1500HRC. The 13-5$^{th}$ pad 855 and the 13-6$^{th}$ pad 856 may be provided as one, but are not limited thereto and one of the 13-5$^{th}$ pad 855 and the 13-6$^{th}$ pad 856 may be provided as two or more.

For example, a pad may be disposed on at least one other side of the first partition 1721 to face the first sound generating module 1500L, the second sound generating module 1500R, the third sound generating module 1500C, the tenth sound generating module 1500LC, and the eleventh sound generating module 1500RC. For example, a 1-5$^{th}$ pad 715 may be disposed on at least one other side of the first partition 1721 to face the first sound generating module 1500L. For example, a 2-5$^{th}$ pad 815 may be disposed on at least one other side of the first partition 1721 to face the second sound generating module 1500R. For example, a 3-5$^{th}$ pad 915 may be disposed on at least one other side of the first partition 1721 to face the third sound generating module 1500C. For example, a 10-5$^{th}$ pad 745 may be disposed on at least one other side of the first partition 1721 to face the tenth sound generating module 1500LC. For example, an 11-5$^{th}$ pad 845 may be disposed on at least one other side of the first partition 1721 to face the eleventh sound generating module 1500RC. The 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as one, but are not limited thereto and one of the 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as two or more.

For example, a pad may be disposed on at least one side of the second partition 1722 to face the first sound generating module 1500L, the second sound generating module 1500R, the third sound generating module 1500C, the tenth sound generating module 1500LC, and the eleventh sound generating module 1500RC. For example, a 1-6$^{th}$ pad 716 may be disposed on at least one side of the second partition 1722 to face the first sound generating module 1500L. For example, a 2-6$^{th}$ pad 816 may be disposed on at least one side of the second partition 1722 to face the second sound generating module 1500R. For example, a 3-6$^{th}$ pad 916 may be disposed on at least one side of the second partition 1722 to face the third sound generating module 1500C. For example, a 10-6$^{th}$ pad 746 may be disposed on at least one other of the second partition 1722 to face the tenth sound generating module 1500LC. For example, an 11-6$^{th}$ pad 846 may be disposed on at least one other of the second partition 1722 to face the eleventh sound generating module 1500RC. The 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as one, but are not limited thereto and one of the 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as two or more.

The 1-5$^{th}$ pad 715 may be disposed to face the 1-6$^{th}$ pad 716. For example, the 1-6$^{th}$ pad 716 may be disposed on a side of the second partition 1722 facing the 1-5$^{th}$ pad 715. The 2-5$^{th}$ pad 815 may be disposed to face the 2-6$^{th}$ pad 816. For example, the 2-6$^{th}$ pad 816 may be disposed on a side of the second partition 1722 facing the 2-5$^{th}$ pad 815. The 3-5$^{th}$ pad 915 may be disposed to face the 3-6$^{th}$ pad 916. For example, the 3-6$^{th}$ pad 916 may be disposed on a side of the second partition 1722 facing the 3-5$^{th}$ pad 915. The 10-5$^{th}$ pad 745 may be disposed to face the 10-6$^{th}$ pad 746. For example, the 10-6$^{th}$ pad 746 may be disposed on a side of the second partition 1722 facing the 10-5$^{th}$ pad 745. The 11-5$^{th}$ pad 845 may be disposed to face the 11-6$^{th}$ pad 846. For example, the 11-6$^{th}$ pad 846 may be disposed on a side of the second partition 1722 facing the 11-5$^{th}$ pad 845.

For example, a pad may be disposed on at least one other side of the second partition 1722 to face the seventh sound generating module 1500BL, the eighth sound generating module 1500BR, the ninth sound generating module 1500BC, the fourteenth sound generating module 1500BLC, and the fifteenth sound generating module 1500BRC. For example, a 7-5$^{th}$ pad 735 may be disposed on at least one other side of the second partition 1722 to face the seventh sound generating module 1500BL. For example, an 8-5$^{th}$ pad 835 may be disposed on at least one other side of the second partition 1722 to face the eighth sound generating module 1500BR. For example, a 9-5$^{th}$ pad 935 may be disposed on at least one other side of the second partition 1722 to face the ninth sound generating module 1500BC. For example, a 14-5$^{th}$ pad 765 may be disposed on at least one other side of the second partition 1722 to face the fourteenth sound generating module 1500BLC. For example, a 15-5$^{th}$ pad 865 may be disposed on at least one other side of the second partition 1722 to face the fifteenth sound generating module 1500BRC. The 7-5$^{th}$ pad 735, the 8-5$^{th}$ pad 835, the 9-5$^{th}$ pad 935, the 14-5$^{th}$ pad 765, and the 15-5$^{th}$ pad 865 may be provided as one, but are not limited thereto and one of the 7-5$^{th}$ pad 735, the 8-5$^{th}$ pad 835, the 9-5$^{th}$ pad 935, the 14-5$^{th}$ pad 765, and the 15-5$^{th}$ pad 865 may be provided as two or more.

In embodiments of the present disclosure, sizes of each of the 1-1$^{st}$ and 1-3$^{rd}$ pads 711 and 713 are illustrated to be greater than that of each of the 1-5$^{th}$ pad 715 and the 1-6$^{th}$ pad 716, but a size of each pad does not limit descriptions of the present disclosure. For example, sizes of the 1-1$^{st}$ and 1-3$^{rd}$ pads 711 and 713 may be equal to or greater than that of each of the 1-5$^{th}$ pad 715 and the 1-6$^{th}$ pad 716. This may be identically applied to the other pads.

One or more pads may be provided on a side of the partition 1750. A 4-5$^{th}$ pad 725 may be disposed on one side of the partition 1750 to face the fourth sound generating module 1500HL, a 5-5$^{th}$ pad 825 may be disposed on the one side of the partition 1750 to face the fifth sound generating module 1500HR, and a 6-5$^{th}$ pad 925 may be disposed on the one side of the partition 1750 to face the sixth sound generating module 1500HC. A 12-5$^{th}$ pad 755 may be disposed on one side of the partition 1750 to face the twelfth sound generating module 1500HLC, and a 13-5$^{th}$ pad 855 may be disposed on the one side of the partition 1750 to face the thirteenth sound generating module 1500HRC. A 7-6$^{th}$ pad 736 may be disposed on one other side of the partition 1750 to face the seventh sound generating module 1500BL, an 8-6$^{th}$ pad 836 may be disposed on the one other side of the partition 1750 to face the eighth sound generating module 1500BR, and a 9-6$^{th}$ pad 936 may be disposed on the one other side of the partition 1750 to face the ninth sound generating module 1500BC. A 14-6$^{th}$ pad 766 may be disposed on one other side of the partition 1750 to face the fourteenth sound generating module 1500BLC, and a 15-6$^{th}$ pad 866 may be disposed on the one other side of the partition 1750 to face the fifteenth sound generating module 1500BRC. Since the partition 1750 is provided, a fixing force of a sound generating module disposed on the rear surface of the display panel may be enhanced, and the leakage of a sound occurring in the edge of the display panel may be reduced, thereby enhancing a sound output characteristic.

Figure 32E:
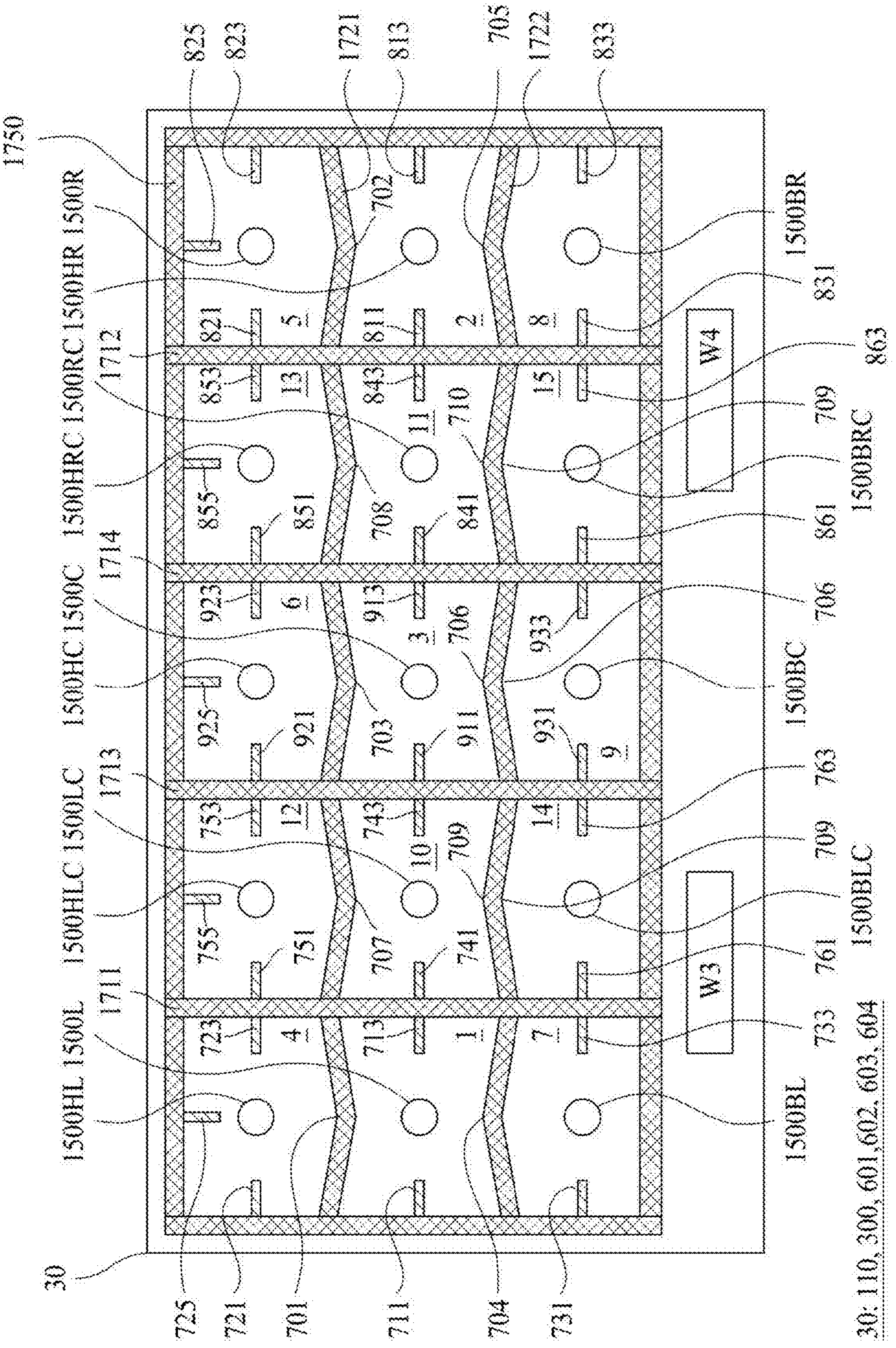

With reference to FIG. 32E, a first partition 1721 and a second partition 1722 may include a bent portion. The first partition 1721 may include one or more bent portions. For example, the first partition 1721 may include a first bent portion 701 toward a first sound generating module 1500L and may include a seventh bent portion 707 toward a tenth sound generating module 1500LC. The first partition 1721 may include a second bent portion 702 toward a second sound generating module 1500R and may include an eighth bent portion 708 toward an eleventh sound generating module 1500RC. The first partition 1721 may include a third bent portion 703 toward a third sound generating module 1500C.

A second partition 1722 may include one or more bent portions. For example, the second partition 1722 may include a fourth bent portion 704 toward the first sound generating module 1500L and may include a ninth bent portion 709 toward the tenth sound generating module 1500LC. The second partition 1722 may include a fifth bent portion 705 toward the second sound generating module 1500R and may include a tenth bent portion 710 toward the eleventh sound generating module 1500RC. The second partition 1722 may include a sixth bent portion 706 toward the third sound generating module 1500C.

When a partition 1750 is not provided, a third partition 1723 may be provided. The third partition 1723, as described above with reference to FIG. 30D, may configure a pad. However, an embodiment of the present disclosure is not limited thereto, and like the second partition 1722, the third partition 1723 may include one or more bent portions. For example, a bent portion may be provided based on a shape of the second partition 1722. For example, as described above with reference to FIG. 30E, when the third partition 1723 includes a bent portion in FIG. 32E, the bent portion may be provided to face the seventh sound generating module 1500BL, the eighth sound generating module 1500BR, the ninth sound generating module 1500BC, the fourteenth sound generating module 1500BLC, and the fifteenth sound generating module 1500BRC.

In the embodiments described above with reference to FIGS. 29A to 32E, partitions, pads, and bent portions may be compatibly applied. For example, the third partition 1723 may not be provided in FIG. 31D, and the partition 1750 and the pad of FIG. 32D may be provided.

Figure 33:
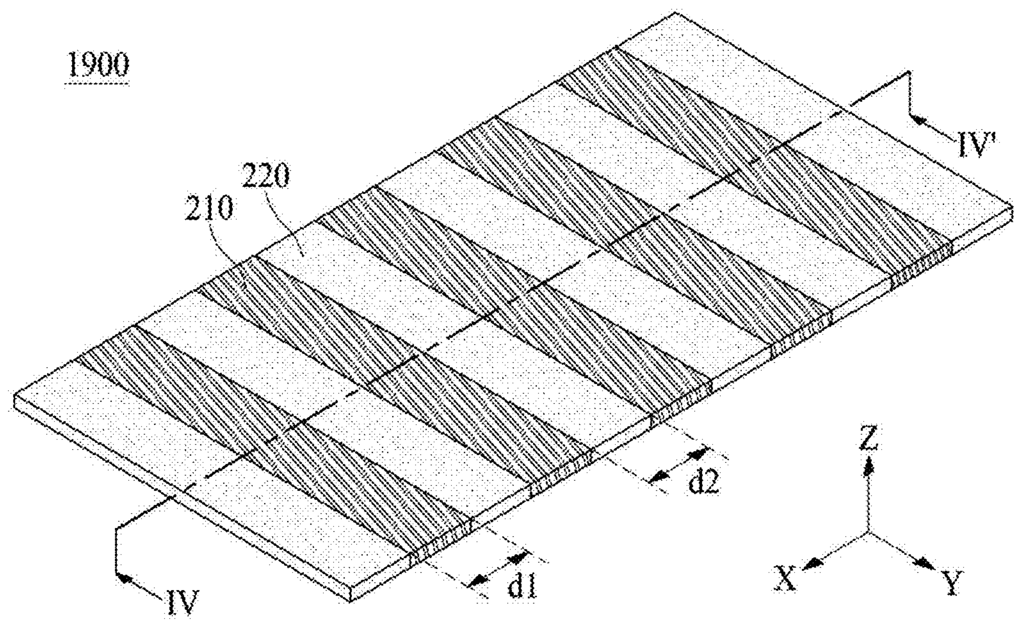
FIG. 33 illustrates a sound generating module according to another embodiment of the present disclosure.
Figure 34:
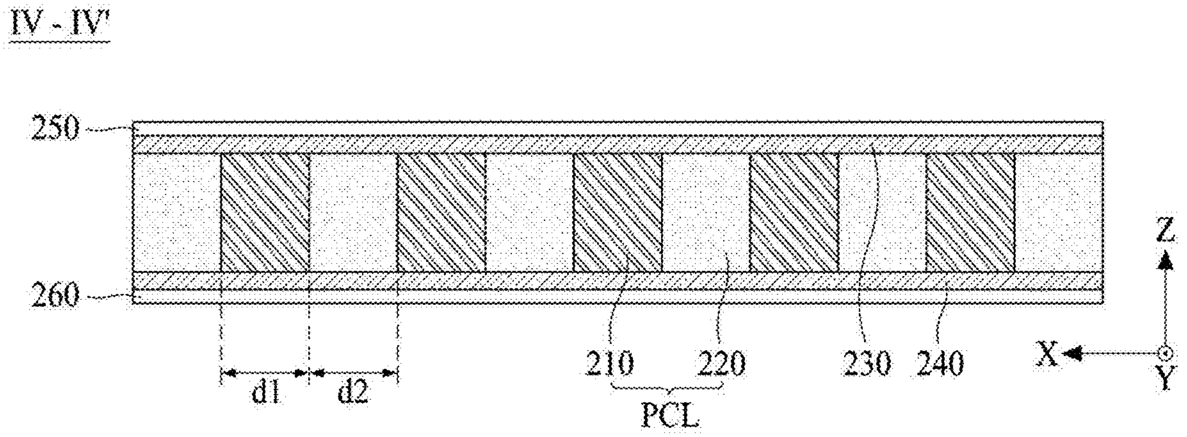
FIG. 34 is a cross-sectional view taken along line IV-IV' illustrated in FIG. 33.

FIG. 33 illustrates a sound generating module according to another embodiment of the present disclosure. FIG. 34 is a cross-sectional view taken along line IV-IV' illustrated in FIG. 33.

With reference to FIGS. 33 and 34, the sound generating module 1900 according to another embodiment of the present disclosure may include a piezoelectric composite layer PCL, a first electrode 230, and a second electrode 240.

The piezoelectric composite layer PCL may include a plurality of first portions 210 and a plurality of second portions 220 each disposed between two adjacent first portions of the plurality of first portions 210. For example, the piezoelectric composite layer PCL may include the plurality of first portions 210 and the plurality of second portions 220, which are alternatively and repeatedly arranged in a first direction X.

Each of the plurality of first portions 210 may have a first width d1 parallel to the first direction X and a length parallel to a second direction Y. Each of the plurality of second portions 220 may have a second width d2 equal to the first width d1 and a length parallel to the second direction Y. For example, the first portion 210 and the second portion 220 may include a line type or a stripe type, which has the same size.

Each of the plurality of first portions 210 may include a polygonal pattern. For example, each of the plurality of first portions 210 may have a line pattern having the first width d1, and the plurality of first portions 210 may be apart from one another to have the second width d2 (or an interval) in the first direction X and may be disposed in parallel with the second direction Y intersecting the first direction X. Each of the plurality of first portions 210 may have the same size (for example, the same width, area, or volume) within a process error range (or an allowable error) occurring in a manufacturing process.

Each of the plurality of first portions 210 according to an embodiment of the present disclosure may include an inorganic material or a piezoelectric material, which vibrates based on a piezoelectric effect (or a piezoelectric characteristic) caused by an electric field. For example, each of the plurality of first portions 210 may be referred to as an electro active portion, an inorganic material portion, a piezoelectric material portion, or a vibration portion, but the term is not limited thereto.

Each of the plurality of first portions 210 according to an embodiment of the present disclosure may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". Here, A may include a divalent metal element, and B may include a tetravalent metal element. For example, in the chemical formula "$ABO_3$", A and B may be cations, and O may be anions. For example, the chemical formula "$ABO_3$" may include one of $PbTiO_3$, $PbZrO_3$, $BaTiO_3$, and $SrTiO_3$, but is not limited thereto.

In a case where the perovskite crystalline structure includes a center ion (for example, $PbTiO_3$), a position of a Ti ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal (e.g., quadrilateral), orthorhombic, or rhombohedral structure corresponding to an unsymmetric structure, and thus, a piezoelectric effect may be generated. In a tetragonal (e.g., quadrilateral), orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

For example, the inorganic material portion included in each of the plurality of first portions 210 may include one or more materials of lead (Pb), zirconium (Zr), titanium (Ti), zinc (Zn), nickel (Ni), and niobium (Nb), but is not limited thereto.

As another example, the inorganic material portion included in each of the plurality of first portions 210 may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but is not limited thereto. Also, the inorganic material portion may include at least one of $CaTiO_3$, $BaTiO_3$, and $SrTiO_3$ each including no Pb, but is not limited thereto.

Each of the plurality of second portions 220 may include a polygonal pattern. Each of the plurality of second portions 220 may be disposed between two adjacent first portions of the plurality of portions 210. The plurality of first portions 210 and the plurality of second portions 220 may be disposed (or arranged) on the same plane (or the same layer) in parallel. Each of the plurality of second portions 220 may be configured to fill a gap between two adjacent first portions of the plurality of first portions 210 and may be connected to or attached on a second portion 220 adjacent thereto. For example, each of the plurality of second portions 220 may include a line pattern having the second width d2 and may be disposed in parallel with a corresponding first portion 210 between two adjacent second portions 220. Each of the plurality of second portions 220 may have the same size (for example, the same width, area, or volume) within a process error range (or an allowable error) occurring in a manufacturing process.

A size of each second portion 220 may be equal to or different from that of each first portion 210. For example, a size of each second portion 220 and a size of each first portion 210 may be set based on a requirement condition including the vibration characteristic and/or flexibility of the sound generating module 1900.

Each of the plurality of second portions 220 according to an embodiment may have modulus and viscoelasticity which are lower than those of each first portion 210, and thus, may enhance the reliability of each first portion 210 vulnerable to an impact due to a fragile characteristic. For example, when the sound generating module 1900 for vibrating the display panel has an impact resistance and high stiffness, the sound generating module 1900 may have a maximum vibration characteristic. In order for the sound generating module 1900 to have an impact resistance and high stiffness, the plurality of second portions 220 may include a material having a relatively high damping factor (tan δ) and relatively high stiffness. For example, the plurality of second portions 220 may include a material having a damping factor (tan δ) of about 0.1 [Gpa] to about 1 [Gpa] and relatively high stiffness of about 0 [Gpa] to about 10 [Gpa]. Also, a damping factor (tan δ) and a stiff characteristic may be described based on a correlation between a loss coefficient and modulus, and for example, the plurality of second portions 220 may include a material having a loss coefficient of about 0.01 to about 1 and modulus of about 1 [Gpa] to about 10 [Gpa].

The plurality of second portions 220 may include an organic material or an organic polymer which each has a flexible characteristic in comparison with the inorganic material portion which is the first portion 210. For example, the plurality of second portions 220 may include an organic material, an organic polymer, an organic piezoelectric material, or an organic non-piezoelectric material. For example, each of the plurality of second portions 220 may be referred to as an adhesive portion, an elastic portion, a bending portion, a damping portion, or a flexible portion each having flexibility, but is not limited thereto.

The organic material portion according to an embodiment may include at least one of an organic piezoelectric material and an organic non-piezoelectric material.

The organic material portion including the organic piezoelectric material may absorb an impact applied to the inorganic material portion (or the first portion), and thus, may enhance the total durability of the sound generating module 1900 and may provide a piezoelectric characteristic corresponding to a certain level or more. The organic piezoelectric material according to an embodiment of the present disclosure may be an organic material having an electro active material. For example, the organic piezoelectric material may include at least one of polyvinylidene fluoride (PVDF), β-Polyvinylidene fluoride (β-PVDF), and polyvinylidene-trifluoroethylene (PVDF-TrFE), but is not limited thereto.

The organic material portion including the organic piezoelectric material may include a curable resin composition and an adhesive including the curable resin composition, and thus, may absorb an impact applied to the inorganic material portion (or the first portion), thereby enhancing the total durability of the sound generating module 1900. The organic non-piezoelectric material according to an embodiment of the present disclosure may include at least one of an epoxy-based polymer, an acryl-based polymer, and a silicon-based polymer, but is not limited thereto.

For example, the organic material portion including the organic non-piezoelectric material may include an adhesion promoter for adhesiveness between epoxy resin and an inorganic material portion, for a high stiff characteristic needed for the sound generating module 1900. For example, the adhesion promoter may be phosphate or the like. The organic material portion may be cured by at least one curing process of a thermal curing process and a photo-curing process. In a process of curing the organic material portion, solvent free type epoxy resin may be used for preventing the thickness uniformity of the sound generating module 1900 from being reduced by contraction of the organic material portion caused by volatilization of a solvent.

Moreover, the organic material portion including the organic non-piezoelectric material may further include a reinforcing agent, for a damping characteristic in addition to high stiffness of the sound generating module 1900. For example, the reinforcing agent may be methylmethacrylate-butadiene-styrene (MBS) having a core shell type, and a content thereof may be about 5 wt % to about 40 wt %. The reinforcing agent may be an elastic body having the core cell type and may have a high coupling force to epoxy resin such as an acryl-based polymer, and thus, may enhance an impact resistance or a damping characteristic of the sound generating module 1900.

Therefore, the first portions 210 including an inorganic material and having a piezoelectric characteristic and the second portions 220 including an organic material and having flexibility may be alternately and repeatedly arranged to be connected, and thus, the piezoelectric composite layer PCL may have a thin film type. Accordingly, the piezoelectric composite layer PCL may be bent based on a shape of the display panel 110 and may have a size based on the display panel 110 or may have a size for realizing a vibration characteristic or a sound characteristic which is each set based on a vibration of the display panel 110. For example, a size of each first portion 210 and a size of each second portion 220 may be set based on a piezoelectric characteristic and flexibility. For example, in a display apparatus requiring a piezoelectric characteristic rather than flexibility, a size of each first portion 210 may be adjusted to be greater than that of each second portion 220. As another example, in a display apparatus requiring flexibility rather than a piezoelectric characteristic, a size of each second portion 220 may be adjusted to be greater than that of each first portion 210. As a result, the piezoelectric composite layer PCL may be adjusted based on a characteristic needed for a display apparatus, and thus, it may be easy to design the piezoelectric composite layer PCL.

As another example, the first portions 210 and the second portions 220 may include the inorganic material. The first portions 210 and the second portions 220 may be implemented as one film and may be applied to a display apparatus.

The first electrode 230 may be disposed on a first surface (or a front surface) of the piezoelectric composite layer PCL.

The first electrode 230 may be disposed on a first surface of each of the plurality of first portions 210 and may be electrically connected to the first surface. The first electrode 230 according to an embodiment of the present disclosure may include a transparent conductive material, a semitransparent conductive material, or an opaque conductive material. For example, examples of the transparent conductive material or the semitransparent conductive material of the first electrode 230 may include indium tin oxide (ITO) or indium zinc oxide (IZO), but is not limited thereto. Examples of the opaque conductive material may include aluminum (Al), copper (Cu), gold (Au), silver (Ag), molybdenum (Mo), and Mg or an alloy thereof, but is not limited thereto.

The second electrode 240 may be disposed on a second surface (or a rear surface), which is opposite to the first surface, of the piezoelectric composite layer PCL. The second electrode 240 may be electrically connected to a second surface of each of the plurality of first portions 210. The second electrode 240 according to an embodiment of the present disclosure may include a transparent conductive material, a semitransparent conductive material, or an opaque conductive material. For example, the second electrode 240 may include the same material as that of the first electrode 230, but is not limited thereto.

The piezoelectric composite layer PCL may be polarized by a certain voltage applied to the first electrode 230 and the second electrode 240 in a certain temperature atmosphere or a temperature atmosphere which is changed from a high temperature to a room temperature.

The sound generating module 1900 according to an embodiment of the present disclosure may further include a first passivation layer 250 and a second passivation layer 260.

The first passivation layer 250 may be disposed on the first electrode 230 and may protect the first electrode 230 and the first surface of the piezoelectric composite layer PCL. For example, the first passivation layer 250 may be a polyimide (PI) film or a polyethyleneterephthalate (PET) film, but is not limited thereto.

The second passivation layer 260 may be disposed on the second electrode 240 and may protect the second electrode 240 and the second surface of the piezoelectric composite layer PCL. For example, the second passivation layer 260 may be a PI film or a PET film, but is not limited thereto. For example, the sound generating module 1900 may be a sound generating module including a piezoelectric composite. For example, the sound generating module according to an embodiment of the present disclosure may be a piezoelectric composite where the first portion 210 and the second portion 220 are provided. As another example, the first portion 210 and the second portion 220 may be provided in the sound generating module according to an embodiment of the present disclosure, and the sound generating module according to an embodiment of the present disclosure may include the first electrode 230 and the second electrode 240. As another example, the first portion 210 and the second portion 220 may be provided in the sound generating module according to an embodiment of the present disclosure, and the sound generating module according to an embodiment of the present disclosure may include the first electrode 230, the second electrode 240, the first passivation layer 250, and the second passivation layer 260. The sound generating module 1900 may be referred to as a sound generating unit, a vibration generating module, or a vibration generating unit, but the term is not limited thereto.

Therefore, according to another embodiment of the present disclosure, the piezoelectric composite layer PCL may have a single thin film type because the first portions 210 and the second portions 220 having the same size are alternately and repeatedly arranged (or connected) on the same plane, may vertically vibrate based on the first portion 210 having a vibration characteristic and may be bent in a curve shape by the second portion 220 having flexibility. The piezoelectric composite layer PCL according to another embodiment of the present disclosure may extend by a desired size or length on the basis of the side coupling (or connection) of the first portion 210 and the second portion 220.

Figure 35A:
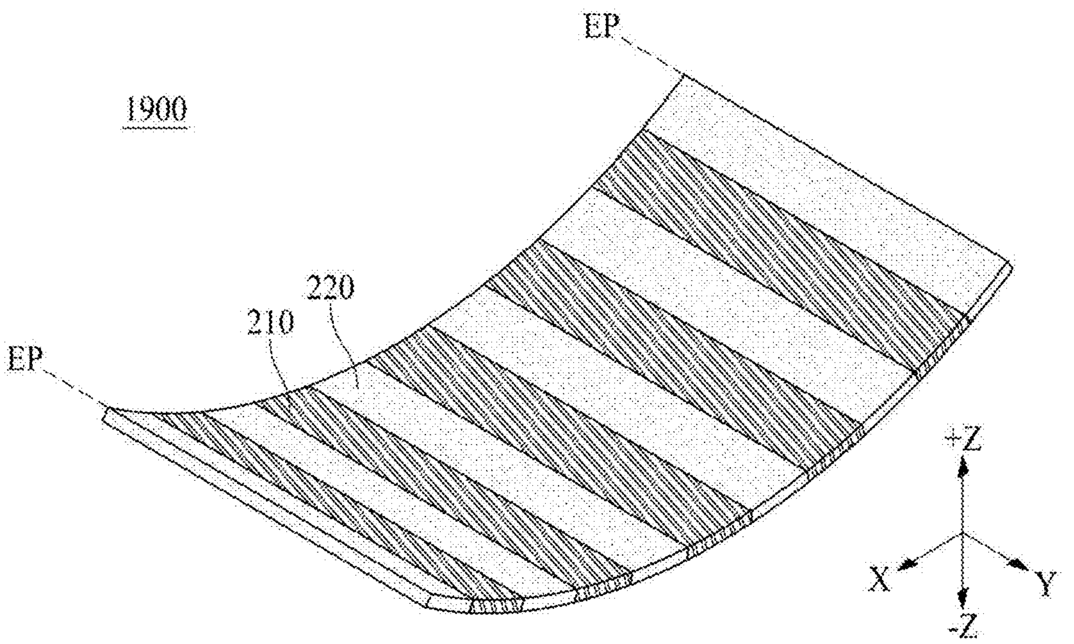
FIG. 35A illustrates a state where both ends of a piezoelectric composite are upward folded.
Figure 35B:
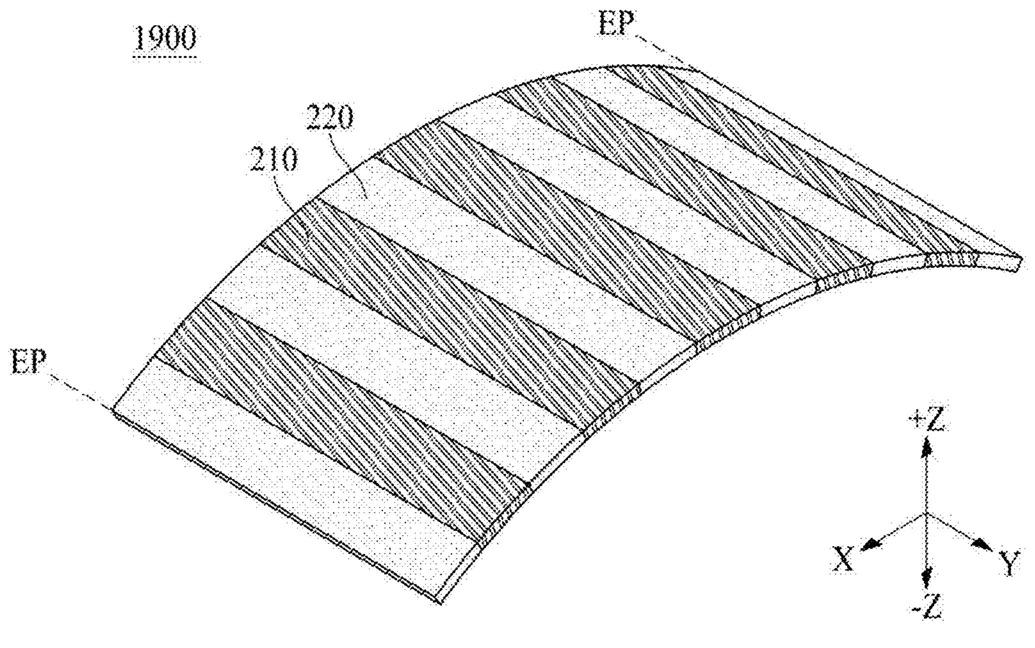
FIG. 35B illustrates a state where both ends of a piezoelectric composite of FIG. 33 are downward folded.

FIG. 35A illustrates a state where both ends of the piezoelectric composite are upward folded. FIG. 35B illustrates a state where both ends of the piezoelectric composite of FIG. 33 are downward folded.

With reference to FIGS. 35A and 35B, according to another embodiment of the present embodiment, the piezoelectric composite layer PCL may vibrate with an electric field based on a signal applied to each of the plurality of first portions 210 having a line pattern, and thus, both ends EP of the piezoelectric composite layer PCL in a first lengthwise direction X may be folded in an upward direction +Z or folded in a downward direction −Z. For example, each of the plurality of second portions 220 filled or disposed between two adjacent first portions of the plurality of first portions 210 may have flexibility, and thus, even when the both ends EP of the piezoelectric composite layer PCL are bent in the upward direction +Z or the downward direction −Z, the inorganic material portion which is each first portion 210 may not be damaged or may not be reduced in performance. Also, a display apparatus including the sound generating module 1900 including the piezoelectric composite layer PCL according to another embodiment of the present disclosure may be used as a flexible display apparatus, and for example, may be used as a curved display apparatus bent at a certain curvature radius, but is not limited thereto and may be used as a rollable display apparatus wound in a spiral form and unwound, a bendable display apparatus, or a wearable display apparatus wound around a wrist. The bendable display apparatus may be an edge bending display apparatus, a bezel bending display apparatus, or an active bending display apparatus, but is not limited thereto.

Figure 36:
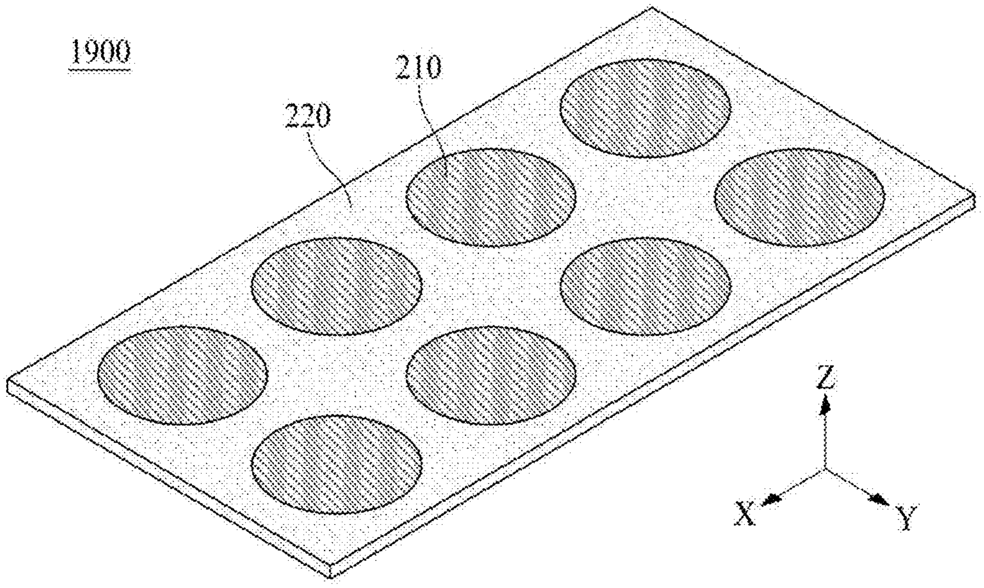
FIG. 36 illustrates a sound generating module including a piezoelectric composite according to another embodiment of the present disclosure.

FIG. 36 illustrates a sound generating module including a piezoelectric composite according to another embodiment of the present disclosure.

With reference to FIG. 36, a piezoelectric composite layer PCL according to another embodiment of the present disclosure may include a plurality of first portions 210, which each have a circular shape and are apart from one another, and a second portion 220 surrounding each of the plurality of first portions 210.

Each of the plurality of first portions 210 may have a circular shape. For example, each of the plurality of first portions 210 may have a circular plate shape. Each of the plurality of first portions 210 may include an inorganic material portion having a vibration characteristic as described above, and thus, its repetitive description is omitted.

The second portion 220 may be disposed or filled between two adjacent first portions of the plurality of first portions 210 and may surround a side surface of each of the plurality of first portions 210. The second portion 220 may include an organic material portion having flexibility as described above, and thus, its repetitive description is omitted. The second portion 220 may provide flexibility between two adjacent first portions of the plurality of first portions 210, and thus, a shape of the piezoelectric composite layer PCL or the sound generating module 1900 may be changed to various shapes such as a two-dimensional (2D) or three-dimensional (3D) shape, based on deformation occurring between two adjacent first portions of the plurality of first portions 210.

Each of the plurality of first portions 210 may have various shapes in addition to a circular plate shape. For example, each of the plurality of first portions 210 may have an elliptical shape, a polygonal shape, or a donut shape, but is not limited thereto.

Each of the plurality of first portions 210 may have a dotted shape including a fine circular shape, a fine elliptical shape, a fine polygonal shape, or a fine donut shape, and a shape of a display apparatus including the sound generating module 1900 including the plurality of first portions 210 may be changed to various shapes, based on flexibility of the second portion 220 disposed between two adjacent first portions of the plurality of first portions 210. For example, a shape of a display panel of a display apparatus including the flexible vibration module 200 illustrated in FIG. 33 may be changed to a 2D shape which is concave or convex, based on the first portions 210 (or an inorganic material portion) having a line shape, and thus, a shape of a display panel of a display apparatus including the sound generating module 1900 illustrated in FIG. 36 may be changed to various shapes such as a 3D shape as well as a 2D shape, based on the first portions 210 (or an inorganic material portion) having a dotted shape. Accordingly, the sound generating module 1900 including the piezoelectric composite layer PCL according to another embodiment of the present disclosure may be enhanced in degree of freedom in design based on a shape of a display apparatus and may be applied to a flexible display apparatus having a shape capable of being changed to various shapes such as a 2D shape or a 3D shape.

Figure 37:
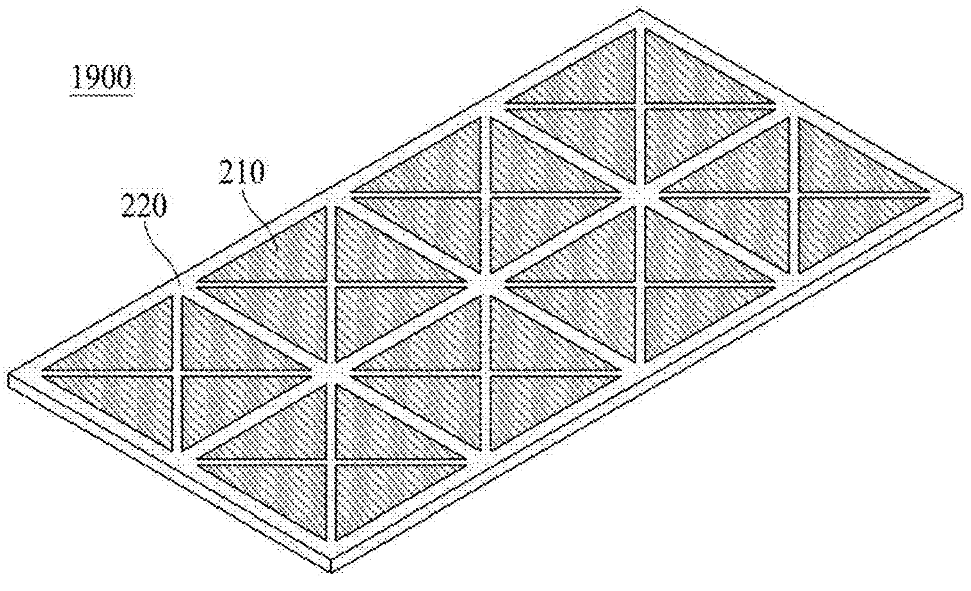
FIG. 37 illustrates a sound generating module including a piezoelectric composite according to another embodiment of the present disclosure.
Figure 38:
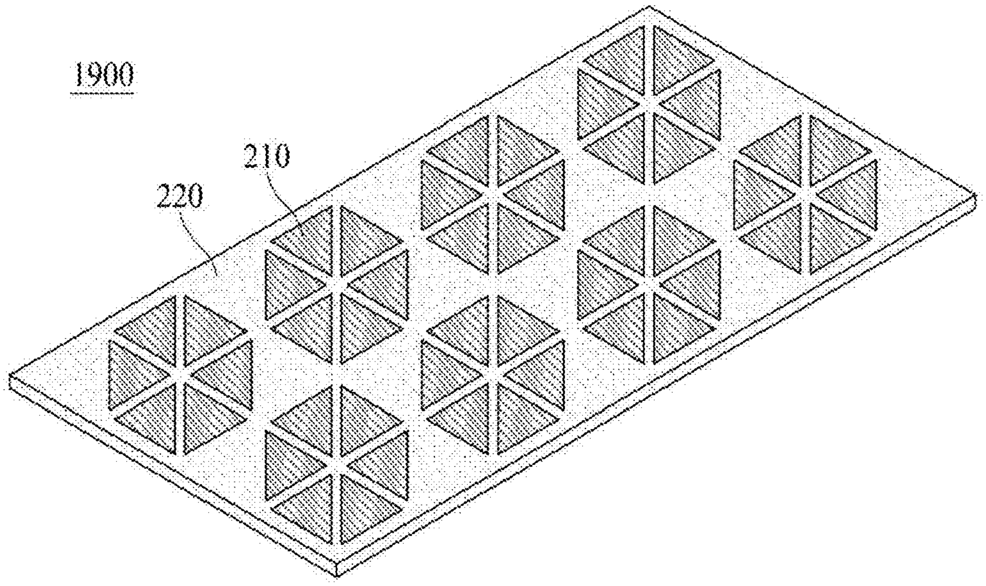
FIG. 38 illustrates a sound generating module including a piezoelectric composite according to another embodiment of the present disclosure.

FIG. 37 illustrates a sound generating module including a piezoelectric composite according to another embodiment of the present disclosure. FIG. 38 illustrates a sound generating module including a piezoelectric composite according to another embodiment of the present disclosure.

With reference to FIG. 37, a piezoelectric composite layer PCL according to another embodiment of the present disclosure may include a plurality of first portions 210, which each have a triangular shape and are spaced apart from each other, and a second portion 220 which surrounds each of the plurality of first portions 210.

Each of the plurality of first portions 210 may have a triangular shape. For example, each of the plurality of first portions 210 may have a triangular plate shape. Each of the plurality of first portions 210 may include an inorganic material portion having a vibration characteristic as described above, and thus, its repetitive description is omitted.

For example, four adjacent first portions 210 of the plurality of first portions 210 may be disposed adjacent to one another to form a tetragonal shape (or a square or a quadrilateral shape). Vertexes of the four adjacent first portions 210 forming a tetragonal (e.g., quadrilateral) shape may be disposed adjacent to one another in a tetragonal center portion.

As another example, as illustrated in FIG. 38, six adjacent first portions 210 of the plurality of first portions 210 may be disposed adjacent to one another to form a hexagonal shape (or a regularly hexagonal shape). Vertexes of the six adjacent first portions 210 forming a hexagonal shape may be disposed adjacent to one another in a hexagonal center portion. Therefore, 2N (where N is a natural number equal to or more than two) adjacent first portions 210 of the plurality of first portions 210 may be disposed adjacent to one another to form a 2N-angular shape.

The second portion 220 may be disposed or filled between two adjacent first portions of the plurality of first portions 210 and may surround a side surface of each of the plurality of first portions 210. The second portion 220 may include an organic material portion having flexibility as described above, and thus, its repetitive description is omitted. The second portion 220 may provide flexibility between two adjacent first portions of the plurality of first portions 210, and thus, a shape of the piezoelectric composite layer PCL or the sound generating module 1900 may be changed to various shapes such as a 3D shape as well as a 2D shape, based on deformation occurring between two adjacent first portions of the plurality of first portions 210.

Therefore, a display panel of a display apparatus including the sound generating module 1900 having the piezoelectric composite layer PCL according to another embodiment of the present disclosure may have a shape which is changed based on various 3D-shape changes of the sound generating module 1900. Also, the plurality of first portions 210 having a triangular shape may have a fine pattern corresponding to various shapes, and a display panel of a display apparatus including the sound generating module 1900 including the first portions 210 may have various shapes which are changed based on flexibility of the second portion 220 disposed between two adjacent first portions of the plurality of first portions 210. Also, a display apparatus including the piezoelectric composite layer PCL according to another embodiment of the present disclosure may use a flexible display apparatus which is the same as a display apparatus including the sound generating module 1900 illustrated in FIG. 33.

Figure 39:
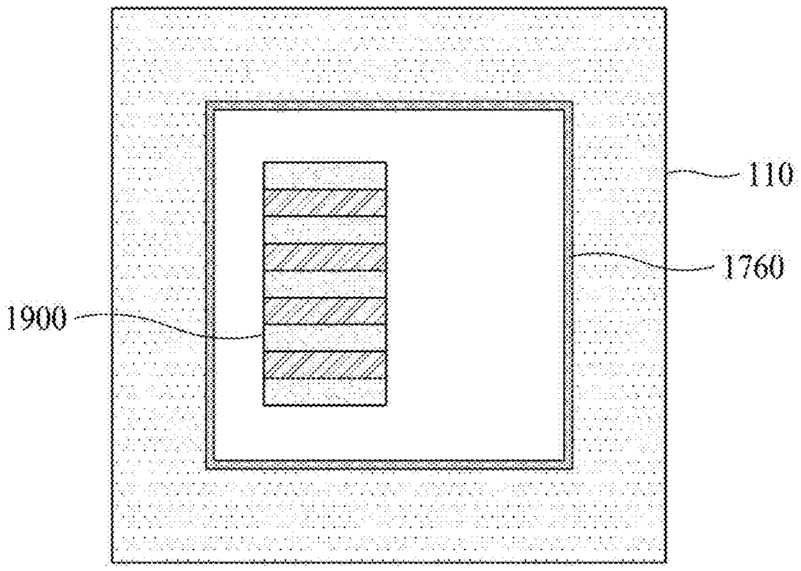
FIG. 39 illustrates a sound generating module and a partition according to another embodiment of the present disclosure.

FIG. 39 illustrates a sound generating module and a partition according to another embodiment of the present disclosure.

With reference to FIG. 39, a sound generating module 1900 including a piezoelectric composite may be disposed on a rear surface of a display panel 110. The sound generating module 1900 may be disposed in a widthwise direction with respect to a widthwise direction of the display panel 110. The sound generating module 1900 may further include a partition 1760 surrounding the sound generating module 1900. When a plurality of partitions 1760 and a plurality of sound generating modules 1900 are arranged at equal intervals, the inventors have recognized that a dip phenomenon occurs in a specific frequency due to a standing wave of the sound generating module 1900. Therefore, the inventors have performed various experiments on the arrangement of partitions, for solving the dip phenomenon. Through the various experiments, the inventors have placed the partition 1760 at a position close to one side of the sound generating module 1900. A sound output characteristic based thereon will be described below with reference to FIG. 40.

Figure 40:
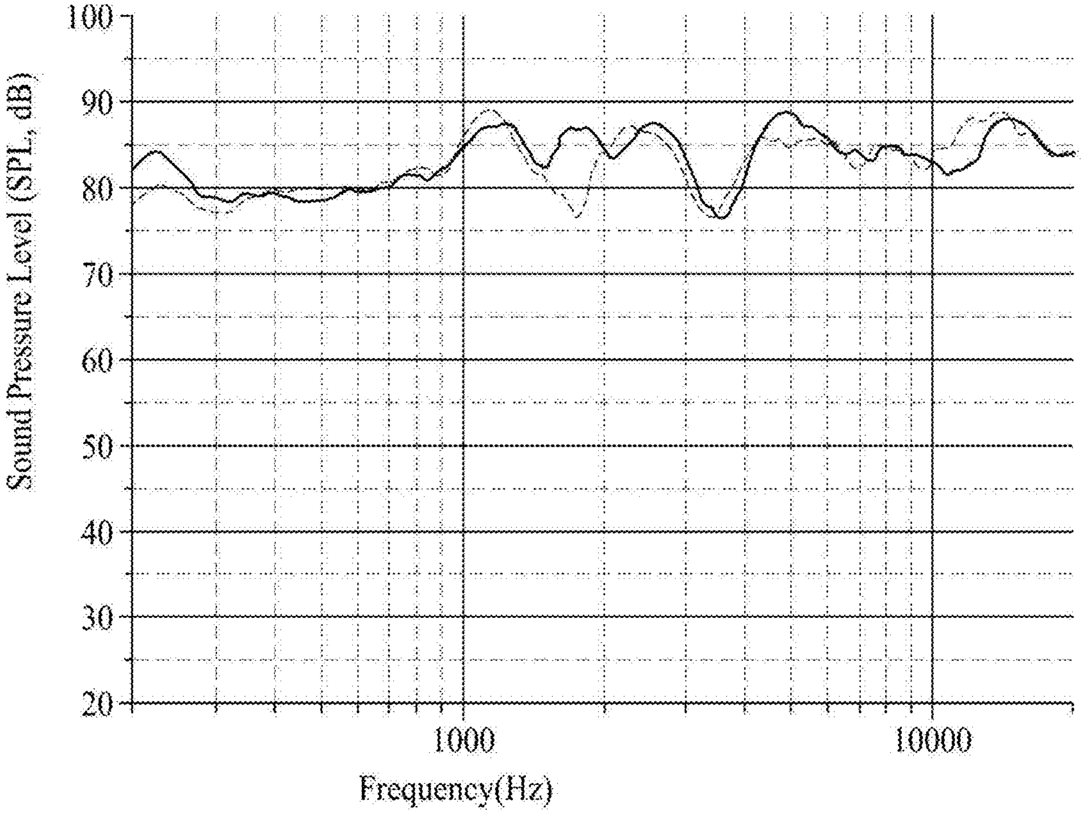
FIG. 40 illustrates a sound output characteristic of a sound generating module according to an embodiment of the present disclosure.

FIG. 40 illustrates a sound output characteristic of a sound generating module according to an embodiment of the present disclosure.

In FIG. 40, the abscissa axis represents a frequency (Hz), and the ordinate axis represents a sound pressure level (SPL) (dB). A sound output characteristic may be measured by B&K equipment which is a sound analysis apparatus. The sound analysis apparatus may include a sound card which transmits or receives a sound to or from a control personal computer (PC), an amplifier which amplifies a signal generated from the sound card and transfers the amplified signal to the sound generating module, and a microphone which collects a sound generated by the sound generating module in a display panel. The sound collected through the microphone may be input to the control PC through the sound card, and a control program may check the input sound to analyze the sounds of the sound generating module 1900.

With reference to FIG. 40, a solid line represents that a partition is disposed on one side of the sound generating module 1900 as in FIG. 39, and a dotted line represents that a plurality of partitions 1760 and a plurality of sound generating modules 1900 are arranged at equal intervals. For example, it may be seen that a dip phenomenon appears in about 1,800 Hz in the dotted line, but when the partition according to an embodiment of the present disclosure is provided, the dip phenomenon is reduced. For example, it may be seen that a sound pressure level is about 76 dB in about 1,800 Hz in the dotted line, but when the partition according to an embodiment of the present disclosure is provided, the sound pressure level is about 87 dB in about 1,800 Hz. Accordingly, since the partition is disposed on one side of the sound generating module 1900, the dip phenomenon may be reduced in a specific frequency.

Figure 41A:
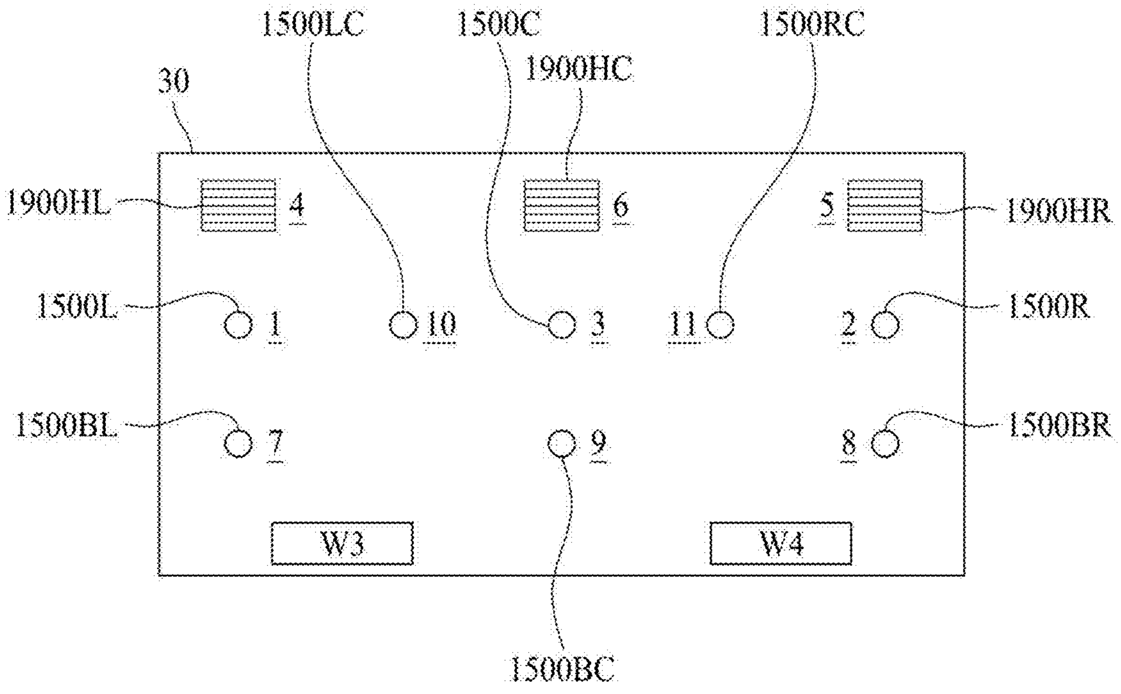
FIGS. 41A to 41C illustrate a display apparatus including a sound generating module according to another embodiment of the present disclosure.
Figure 41B:
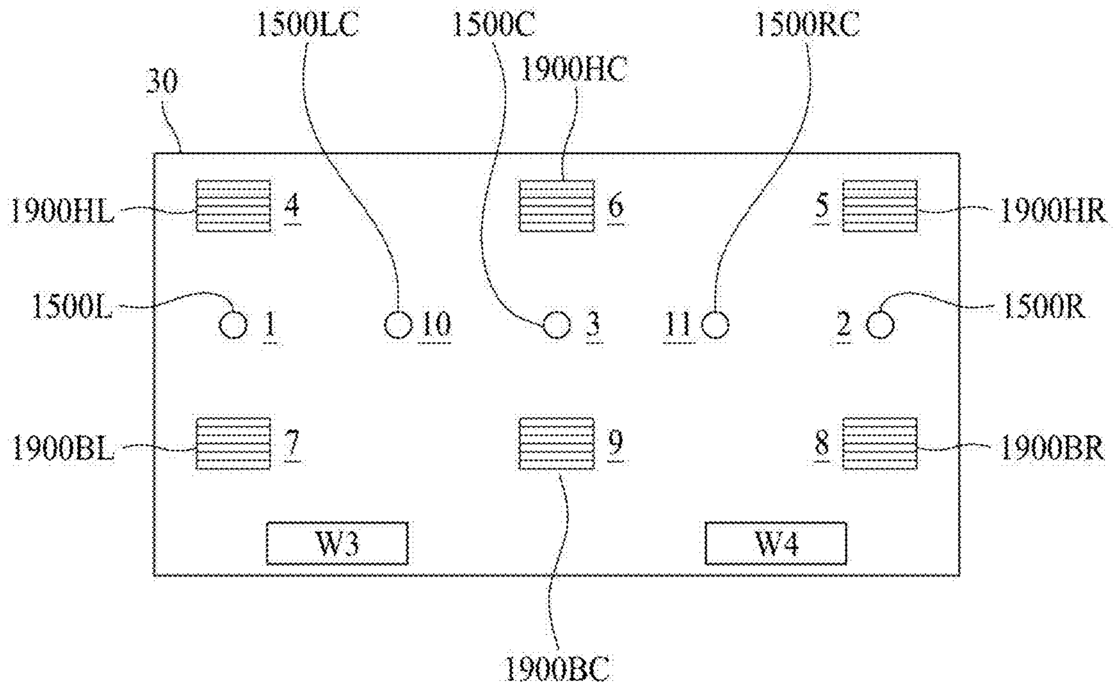
Figure 41C:
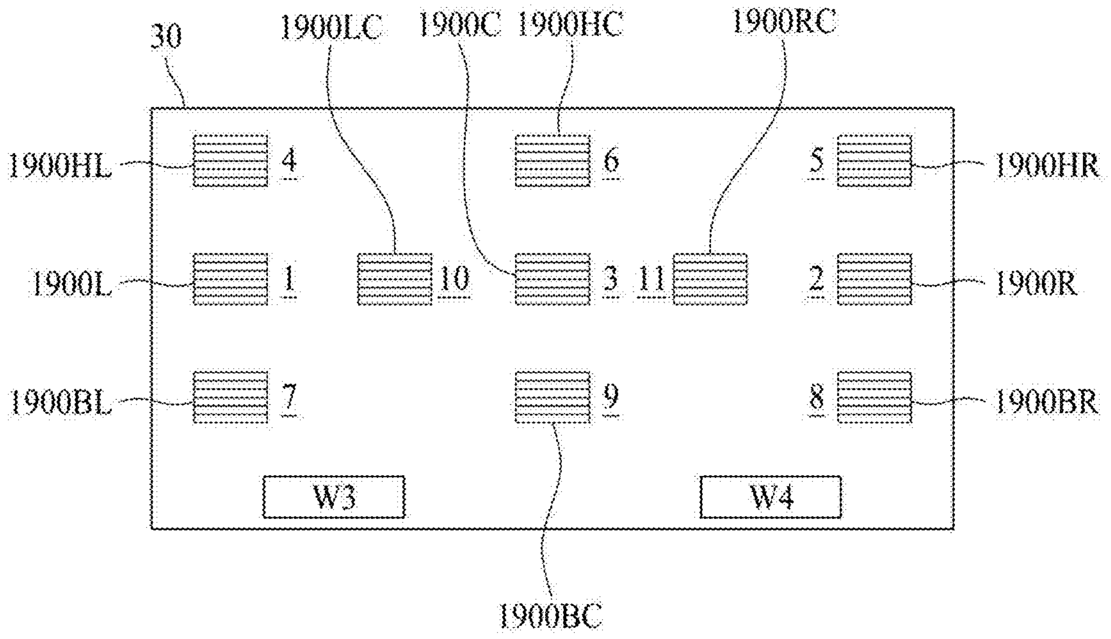

FIGS. 41A to 41C illustrate a display apparatus including a sound generating module according to another embodiment of the present disclosure.

With reference to FIG. 41A, at least one sound generating module may be disposed in at least one of first to eleventh regions 1 to 11. For example, a first sound generating module 1500L may be disposed in the first region 1 of a rear surface of a display panel 110, a fourth sound generating module 1900HL may be disposed in the fourth region 4 of the rear surface of the display panel 110, and a seventh sound generating module 1500BL may be disposed in the seventh region 7 of the rear surface of the display panel 110. A second sound generating module 1500R may be disposed in the second region 2 of the rear surface of the display panel 110, a fifth sound generating module 1900HR may be disposed in the fifth region 5 of the rear surface of the display panel 110, and an eighth sound generating module 1500BR may be disposed in the eighth region 8 of the rear surface of the display panel 110. A third sound generating module 1500C may be disposed in the third region 3 of the rear surface of the display panel 110, a sixth sound generating module 1900HC may be disposed in the sixth region 6 of the rear surface of the display panel 110, and a ninth sound generating module 1500BC may be disposed in the ninth region 9 of the rear surface of the display panel 110. A tenth sound generating module 1500LC may be disposed in the tenth region 10 of the rear surface of the display panel 110, and an eleventh sound generating module 1500RC may be disposed in the eleventh region 11 of the rear surface of the display panel 110. As another example, as described above with reference to FIG. 22, the first to eleventh sound generating modules may be disposed on a rear surface of a rear cover. For example, the first to eleventh sound generating modules may be disposed in a module structure.

The fourth sound generating module 1900HL, the fifth sound generating module 1900HR, and the sixth sound generating module 1900HC may use the sound generating module 1900 described above with reference to FIGS. 33 to 39. The sound generating module 1900 may be modularized into the module structure as described above with reference to FIGS. 3, 6, 12 to 14, and 18 to 21. For example, at least one sound generating module may be disposed on a rear surface of a rear cover including a module accommodating part and may be accommodated into the module accommodating part of the rear cover. As another example, as described above with reference to FIG. 22, the sound generating module 1900 may be disposed on the rear surface of the rear cover and may be modularized. As another example, as described above with reference to FIGS. 23A to 23D, the sound generating module 1900 may be provided on a plate. The fourth sound generating module 1900HL, the fifth sound generating module 1900HR, and the sixth sound generating module 1900HC may be disposed at an upper portion of the display panel 110. When a sound generating module includes a piezoelectric composite, a sound of a high-pitched sound band may be more enhanced than a sound generating module including a voice coil. Therefore, the fourth sound generating module 1900HL, the fifth sound generating module 1900HR, and the sixth sound generating module 1900HC may be disposed at the upper portion of the display panel 110, thereby providing a display apparatus with enhanced sound of the high-pitched sound band. For example, the fourth sound generating module 1900HL, the fifth sound generating module 1900HR, and the sixth sound generating module 1900HC may output sounds of about 150 Hz to about 40 kHz.

The fourth sound generating module 1900HL, the fifth sound generating module 1900HR, and the sixth sound generating module 1900HC may be disposed in a widthwise direction with respect to a widthwise direction of the display panel 110. When the fourth sound generating module 1900HL, the fifth sound generating module 1900HR, and the sixth sound generating module 1900HC are disposed in the widthwise direction with respect to the widthwise direction of the display panel 110, a screen ratio of 16:9 may be easily realized, and thus, a space may be easily secured based on the arrangement of sound generating modules. As another example, the fourth sound generating module 1900HL, the fifth sound generating module 1900HR, and the sixth sound generating module 1900HC may be disposed in a lengthwise direction with respect to a lengthwise direction of the display panel 110.

The first sound generating module 1500L may be a left channel of the display panel 110, the fourth sound generating module 1900HL may be a height left channel of the display panel 110, and the seventh sound generating module 1500BL may be a bottom left channel of the display panel 110. The tenth sound generating module 1500LC may be a left center channel of the display panel 110. The second sound generating module 1500R may be a right channel of the display panel 110, the fifth sound generating module 1900HR may be a height right channel of the display panel 110, and the eighth sound generating module 1500BR may be a bottom right channel of the display panel 110. The eleventh sound generating module 1500RC may be a right center channel of the display panel 110. The third sound generating module 1500C may be a center channel of the display panel 110, the sixth sound generating module 1900HC may be a height center channel of the display panel 110, and the ninth sound generating module 1500BC may be a bottom center channel of the display panel 110. The other descriptions are the same as descriptions given above with reference to FIG. 27, and thus, are omitted.

Moreover, a woofer may be disposed for more enhancing a sound of a low-pitched sound band. For example, one or more woofers may be further disposed under or a lower portion of at least one of the seventh region 7 and the eighth region 8. For example, one or more woofers may be further provided under at least one of the seventh sound generating module 1500BL and the eighth sound generating module 1500BR. For example, a first woofer W3 may be disposed under or a lower portion of the seventh region 7 of the display panel 110. For example, the first woofer W3 may be disposed under or a lower portion of the seventh sound generating module 1500BL. For example, a second woofer W4 may be disposed under or a lower portion of the eighth region 8 of the display panel 110. For example, the second woofer W4 may be disposed under or a lower portion of the eighth sound generating module 1500BR. Therefore, the first woofer W3 and the second woofer W4 may output sounds of a low-pitched sound band. The other descriptions are the same as descriptions given above with reference to FIG. 27, and thus, are omitted.

As another example, the first woofer W3 and the second woofer W4 may not be provided, and at least one of the first sound generating module 1500L and the second sound generating module 1500R may be configured as a sound generating module including a woofer. For example, the first woofer-integrated sound generating module W1 may be provided in the first region 1, and the second woofer-integrated sound generating module W2 may be provided in the second region 2. For example, a sound generating module including a woofer may be provided in one or more of the first region 1 and the second region 2. As another example, at least one of the seventh sound generating module 1500BL and the eighth sound generating module 1500BR may be configured as a sound generating module including a woofer. For example, the first woofer-integrated sound generating module W1 may be provided in the seventh region 7, and the second woofer-integrated sound generating module W2 may be provided in the eighth region 8. For example, a sound generating module including a woofer may be provided in one or more of the seventh region 7 and the eighth region 8. However, the present embodiment is not limited thereto. For example, when a sound generating module including a woofer is provided in one or more of the first region 1 and the second region 2 or one or more of the seventh region 7 and the eighth region 8, the display apparatus may output an 11.2-channel sound or a 9.4-channel sound.

Therefore, the fourth sound generating module 1900HL, the fifth sound generating module 1900HR, and the sixth sound generating module 1900HC may output sounds of about 150 Hz to about 40 kHz. The first sound generating module 1500L, the second sound generating module 1500R, the third sound generating module 1500C, the seventh sound generating module 1500BL, the eighth sound generating module 1500BR, the ninth sound generating module 1500BC, the tenth sound generating module 1500LC, and the eleventh sound generating module 1500RC may output sounds of about 80 Hz to about 40 kHz. The first woofer W3 and the second woofer W4 may output sounds of 80 Hz or less. Accordingly, the display apparatus may output an 11.1-channel sound.

With reference to FIG. 41B, a first sound generating module 1500L may be disposed in a first region 1 of a rear surface of a display panel 110, a fourth sound generating module 1900HL may be disposed in a fourth region 4 of the rear surface of the display panel 110, and a seventh sound generating module 1900BL may be disposed in a seventh region 7 of the rear surface of the display panel 110. A second sound generating module 1500R may be disposed in a second region 2 of the rear surface of the display panel 110, a fifth sound generating module 1900HR may be disposed in a fifth region 5 of the rear surface of the display panel 110, and an eighth sound generating module 1900BR may be disposed in an eighth region 8 of the rear surface of the display panel 110. A third sound generating module 1500C may be disposed in a third region 3 of the rear surface of the display panel 110, a sixth sound generating module 1900HC may be disposed in a sixth region 6 of the rear surface of the display panel 110, and a ninth sound generating module 1900BC may be disposed in a ninth region 9 of the rear surface of the display panel 110. A tenth sound generating module 1500LC may be disposed in a tenth region 10 of the rear surface of the display panel 110, and an eleventh sound generating module 1500RC may be disposed in an eleventh region 11 of the rear surface of the display panel 110.

The fourth sound generating module 1900HL, the fifth sound generating module 1900HR, the sixth sound generating module 1900HC, the seventh sound generating module 1900BL, the eighth sound generating module 1900BR, and the ninth sound generating module 1900BC may use the sound generating module 1900 described above with reference to FIGS. 33 to 39. The sound generating module 1900 may be modularized into the module structure as described above with reference to FIGS. 3A to 3E, 6, 12 to 14, and 18 to 21. For example, at least one sound generating module may be disposed on a rear surface of a rear cover including a module accommodating part and may be accommodated into the module accommodating part of the rear cover. As another example, as described above with reference to FIG. 22, the sound generating module 1900 may be disposed on the rear surface of the rear cover and may be modularized. As another example, as described above with reference to FIGS. 23A to 23D, the sound generating module 1900 may be provided on a plate. The fourth sound generating module 1900HL, the fifth sound generating module 1900HR, and the sixth sound generating module 1900HC may be disposed at an upper portion of the display panel 110, and the seventh sound generating module 1900BL, the eighth sound generating module 1900BR, and the ninth sound generating module 1900BC may be disposed at a lower portion of the display panel 110. When a sound generating module includes a piezoelectric composite, a sound of a high-pitched sound band may be more enhanced than a sound generating module including a voice coil. Therefore, since the fourth sound generating module 1900HL, the fifth sound generating module 1900HR, and the sixth sound generating module 1900HC are disposed at the upper portion of the display panel 110, and the seventh sound generating module 1900BL and the eighth sound generating module 1900BR, and the ninth sound generating module 1900BC are disposed at the lower portion of the display panel 110, a sound of the high-pitched sound band may be more enhanced, and based on a sound generating module with enhanced directionality, uniform sounds may be output from the upper portion and the lower portion of the display panel 110, thereby providing a display apparatus with enhanced three-dimensional effect.

A woofer may be provided for more enhancing a sound of a low-pitched sound band. For example, a first woofer W3 and a second woofer W4 may not be provided, and at least one of the first sound generating module 1500L and the second sound generating module 1500R may be configured as a sound generating module including one or more woofers. For example, a first woofer-integrated sound generating module W1 may be provided in the first region 1, and a second woofer-integrated sound generating module W2 may be provided in the second region 2. For example, a sound generating module including a woofer may be provided in one or more of the first region 1 and the second region 2. For example, when a sound generating module including a woofer is provided in one or more of the first region 1 and the second region 2, the display apparatus may output an 11.2-channel sound.

Therefore, the first sound generating module 1500L, the second sound generating module 1500R, the third sound generating module 1500C, the fourth sound generating module 1900HL, the fifth sound generating module 1900HR, the sixth sound generating module 1900HC, the seventh sound generating module 1900BL, the eighth sound generating module 1900BR, the ninth sound generating module 1900BC, the tenth sound generating module 1500LC, and the eleventh sound generating module 1500RC may output sounds of about 150 Hz to about 40 kHz or about 80 Hz to about 40 kHz. The first woofer W3 and the second woofer W4 may output sounds of 80 Hz or less. Accordingly, the display apparatus may output an 11.1-channel sound.

With reference to FIG. 41C, a first sound generating module 1900L may be disposed in a first region 1 of a rear surface of a display panel 110, a fourth sound generating module 1900HL may be disposed in a fourth region 4 of the rear surface of the display panel 110, and a seventh sound generating module 1900BL may be disposed in a seventh region 7 of the rear surface of the display panel 110. A second sound generating module 1900R may be disposed in a second region 2 of the rear surface of the display panel 110, a fifth sound generating module 1900HR may be disposed in a fifth region 5 of the rear surface of the display panel 110, and an eighth sound generating module 1900BR may be disposed in an eighth region 8 of the rear surface of the display panel 110. A third sound generating module 1900C may be disposed in a third region 3 of the rear surface of the display panel 110, a sixth sound generating module 1900HC may be disposed in a sixth region 6 of the rear surface of the display panel 110, and a ninth sound generating module 1900BC may be disposed in a ninth region 9 of the rear surface of the display panel 110. A tenth sound generating module 1900LC may be disposed in a tenth region 10 of the rear surface of the display panel 110, and an eleventh sound generating module 1900RC may be disposed in an eleventh region 11 of the rear surface of the display panel 110.

The first to eleventh sound generating modules may use the sound generating module 1900 described above with reference to FIGS. 33 to 39. The sound generating module 1900 may be modularized into a module structure as described above with reference to FIGS. 3A to 3E, 6, 12 to 14, and 18 to 21. As another example, as described above with reference to FIG. 22, the sound generating module 1900 may be disposed on a rear surface of a rear cover and may be modularized. As another example, as described above with reference to FIGS. 23A to 23D, the sound generating module 1900 may be provided on a plate. When each of the first to eleventh sound generating modules is configured as a sound generating module including a piezoelectric composite, a sound of a high-pitched sound band may be more enhanced than a sound generating module including a voice coil. Therefore, since the first to eleventh sound generating modules are provided, a sound of a high-pitched sound band may be more enhanced, and based on a sound generating module with enhanced directionality, uniform sounds may be output from an upper portion and a lower portion of the display panel 110, thereby providing a display apparatus with enhanced three-dimensional effect.

Therefore, the first sound generating module 1900L, the second sound generating module 1900R, the third sound generating module 1900C, the fourth sound generating module 1900HL, the fifth sound generating module 1900HR, the sixth sound generating module 1900HC, the seventh sound generating module 1900BL, the eighth sound generating module 1900BR, the ninth sound generating module 1900BC, the tenth sound generating module 1900LC, and the eleventh sound generating module 1900RC may output sounds of about 150 Hz to about 40 kHz or about 80 Hz to about 40 kHz. The first woofer W3 and the second woofer W4 may output sounds of 80 Hz or less. Accordingly, the display apparatus may output an 11.1-channel sound.

The display apparatus according to another embodiment of the present disclosure may realize left and right sounds corresponding left and right images and height and bottom sounds corresponding to upper and lower images, and a real stereo sound of a real sound including stereo left and right sounds and stereo height and bottom sounds may be realized, thereby providing a user with a real sound instead of a virtual sound. Therefore, a real stereo sound or surround sound of a real sound including stereo left and right sounds and stereo height and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic AV or Dolby sound system.

Moreover, when a sound generating module having a multi-channel illustrated in FIGS. 24A and 24B is implemented in the sound plate of FIGS. 23A to 23D, a real stereo sound or surround sound of a real sound including stereo left and right sounds and stereo height and bottom sounds may be provided to a user, thereby enhancing a sense of realism. When the sound generating module having a multi-channel illustrated in FIGS. 24A and 24B and a projection or image reproduction device are provided in the sound plate of FIGS. 23A to 23D, a realistic AV or Dolby sound system may be provided so that a user simultaneously feels a realistic sound and image similarly or identically to reality, and moreover, a stereo sound for providing an immersion experience of a user and a realistic sense may be provided. Also, as described above with reference to FIGS. 1 to 22, a modularized sound generating module may be applied, and thus, a degree of freedom in design of a display apparatus or a rear cover may be enhanced in a case where a sound generating module is provided.

Figure 42A:
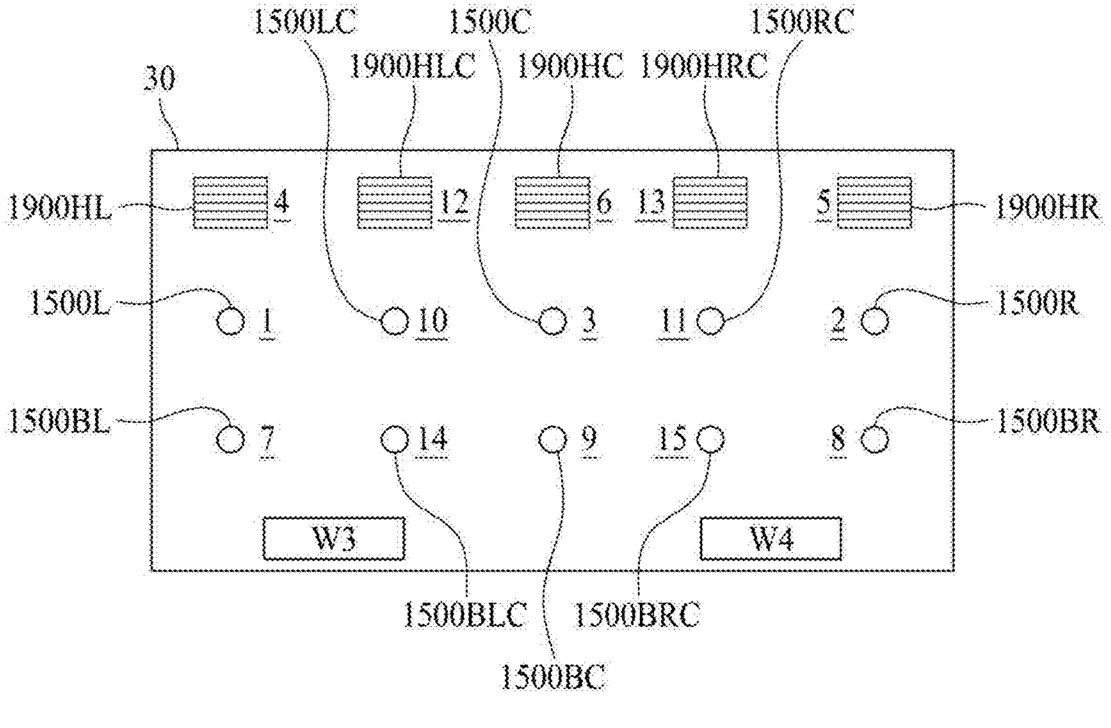
FIGS. 42A to 42C illustrate a display apparatus including a sound generating module according to another embodiment of the present disclosure.
Figure 42B:
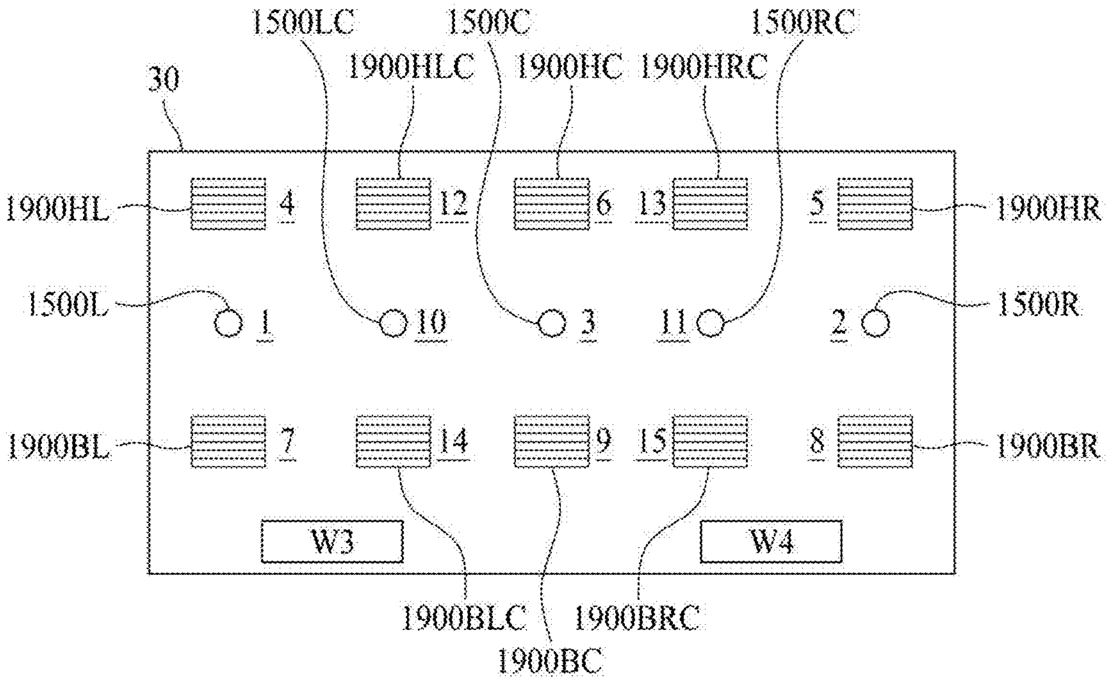
Figure 42C:
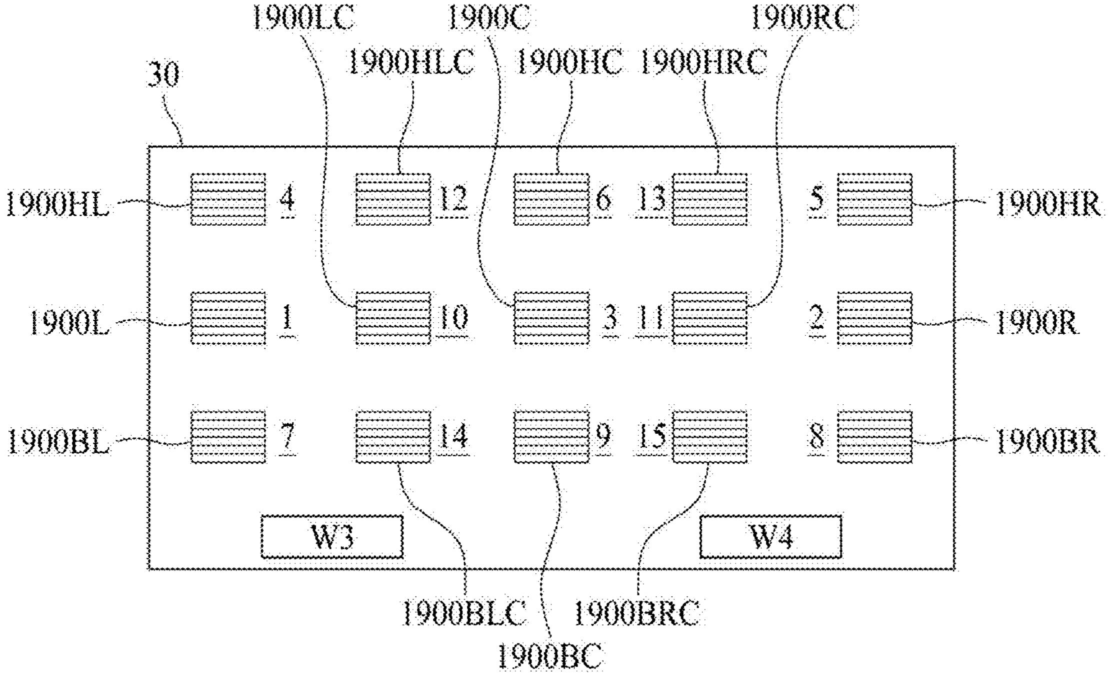

FIGS. 42A to 42C illustrate a display apparatus including a sound generating module according to another embodiment of the present disclosure.

With reference to FIG. 42A, at least one sound generating module may be disposed in at least one of the first to fifteenth regions 1 to 15. For example, a first sound generating module 1500L may be disposed in the first region 1 of the rear surface of the display panel 110, a fourth sound generating module 1900HL may be disposed in the fourth region 4 of the rear surface of the display panel 110, and a seventh sound generating module 1500BL may be disposed in the seventh region 7 of the rear surface of the display panel 110. A second sound generating module 1500R may be disposed in the second region 2 of the rear surface of the display panel 110, a fifth sound generating module 1900HR may be disposed in the fifth region 5 of the rear surface of the display panel 110, and an eighth sound generating module 1500BR may be disposed in the eighth region 8 of the rear surface of the display panel 110. A third sound generating module 1500C may be disposed in the third region 3 of the rear surface of the display panel 110, a sixth sound generating module 1900HC may be disposed in the sixth region 6 of the rear surface of the display panel 110, and a ninth sound generating module 1500BC may be disposed in the ninth region 9 of the rear surface of the display panel 110. A tenth sound generating module 1500LC may be disposed in the tenth region 10 of the rear surface of the display panel 110, a twelfth sound generating module 1900HLC may be disposed in the twelfth region 12 of the rear surface of the display panel 110, and a fourteenth sound generating module 1500BLC may be disposed in the fourteenth region 14 of the rear surface of the display panel 110. An eleventh sound generating module 1500RC may be disposed in the eleventh region 11 of the rear surface of the display panel 110, a thirteenth sound generating module 1900HRC may be disposed in the thirteenth region 13 of the rear surface of the display panel 110, and a fifteenth sound generating module 1500BRC may be disposed in the fifteenth region 15 of the rear surface of the display panel 110. As another example, as described above with reference to FIG. 22, the first to fifteenth sound generating modules may be disposed on a rear surface of a rear cover. For example, the first to fifteenth sound generating modules may be disposed in a module structure.

The fourth sound generating module 1900HL, the fifth sound generating module 1900HR, the sixth sound generating module 1900HC, the twelfth sound generating module 1900HLC, and the thirteenth sound generating module 1900HRC may use the sound generating module 1900 described above with reference to FIGS. 33 to 39. The sound generating module 1900 may be modularized into the module structure as described above with reference to FIGS. 3A to 3E, 6, 12 to 14, and 18 to 21. For example, at least one sound generating module may be disposed on a rear surface of a rear cover including a module accommodating part and may be accommodated into the module accommodating part of the rear cover. As another example, as described above with reference to FIG. 22, the sound generating module 1900 may be disposed on the rear surface of the rear cover and may be modularized. As another example, as described above with reference to FIGS. 23A to 23D, the sound generating module 1900 may be provided on a plate. The fourth sound generating module 1900HL, the fifth sound generating module 1900HR, the sixth sound generating module 1900HC, the twelfth sound generating module 1900HLC, and the thirteenth sound generating module 1900HRC may be disposed at an upper portion of the display panel 110. When a sound generating module includes a piezoelectric composite, a sound of a high-pitched sound band may be more enhanced than a sound generating module including a voice coil. Therefore, since the fourth sound generating module 1900HL, the fifth sound generating module 1900HR, the sixth sound generating module 1900HC, the twelfth sound generating module 1900HLC, and the thirteenth sound generating module 1900HRC are disposed at the upper portion of the display panel 110, a display apparatus for outputting a sound of the high-pitched sound band and a sound with enhanced directionality may be implemented.

The first sound generating module 1500L may be a left channel of the display panel 110, the fourth sound generating module 1900HL may be a height left channel of the display panel 110, and the seventh sound generating module 1500BL may be a bottom left channel of the display panel 110. The tenth sound generating module 1500LC may be a left center channel of the display panel 110, the twelfth sound generating module 1900HLC may be a height left channel of the display panel 110, and the fourteenth sound generating module 1500BLC may be a bottom left channel of the display panel 110. The second sound generating module 1500R may be a right channel of the display panel 110, the fifth sound generating module 1900HR may be a height right channel of the display panel 110, and the eighth sound generating module 1500BR may be a bottom right channel of the display panel 110. The eleventh sound generating module 1500RC may be a right center channel of the display panel 110, the thirteenth sound generating module 1900HRC may be a height right channel of the display panel 110, and the fifteenth sound generating module 1500BRC may be a bottom right channel of the display panel 110. The third sound generating module 1500C may be a center channel of the display panel 110, the sixth sound generating module 1900HC may be a height center channel of the display panel 110, and the ninth sound generating module 1500BC may be a bottom center channel of the display panel 110. The other descriptions are the same as descriptions given above with reference to FIG. 28, and thus, are omitted.

Moreover, a woofer may be disposed for more enhancing a sound of a low-pitched sound band. For example, one or more woofers may be further disposed under or a lower portion of at least one of the seventh region 7 and the eighth region 8. For example, one or more woofers may be further provided under or a lower portion of at least one of the seventh sound generating module 1500BL and the eighth sound generating module 1500BR. For example, a first woofer W3 may be disposed under or a lower portion of the seventh region 7 of the display panel 110. For example, the first woofer W3 may be disposed under or a lower portion of the seventh sound generating module 1500BL. For example, a second woofer W4 may be disposed under or a lower portion of the eighth region 8 of the display panel 110. For example, the second woofer W4 may be disposed under or a lower portion of the eighth sound generating module 1500BR. Therefore, the first woofer W3 and the second woofer W4 may output sounds of a low-pitched sound band. The other descriptions are the same as descriptions given above with reference to FIG. 28, and thus, are omitted.

As another example, the first woofer W3 and the second woofer W4 may not be provided, and at least one of the first sound generating module 1500L and the second sound generating module 1500R may be configured as a sound generating module including a woofer. For example, the first woofer-integrated sound generating module W1 may be provided in the first region 1, and the second woofer-integrated sound generating module W2 may be provided in the second region 2. For example, a sound generating module including a woofer may be provided in one or more of the first region 1 and the second region 2. As another example, at least one of the seventh sound generating module 1500BL and the eighth sound generating module 1500BR may be configured as a sound generating module including a woofer. For example, the first woofer-integrated sound generating module W1 may be provided in the seventh region 7, and the second woofer-integrated sound generating module W2 may be provided in the eighth region 8. For example, a sound generating module including a woofer may be provided in one or more of the seventh region 7 and the eighth region 8. As another example, at least one of the tenth sound generating module 1500LC and the eleventh sound generating module 1500RC may be configured as a sound generating module including a woofer. For example, the first woofer-integrated sound generating module W1 may be provided in the tenth region 10, and the second woofer-integrated sound generating module W2 may be provided in the eleventh region 11. For example, a sound generating module including a woofer may be provided in one or more of the tenth region 10 and the eleventh region 11. As another example, at least one of the fourteenth sound generating module 1500BLC and the fifteenth sound generating module 1500BRC may be configured as a sound generating module including a woofer. For example, the first woofer-integrated sound generating module W1 may be provided in the fourteenth region 14, and the second woofer-integrated sound generating module W2 may be provided in the fifteenth region 15. For example, a sound generating module including a woofer may be provided in one or more of the fourteenth region 14 and the fifteenth region 15. However, the present embodiment is not limited thereto. For example, when a sound generating module including a woofer is provided in one or more of the first region 1 and the second region 2, one or more of the seventh region 7 and the eighth region 8, one or more of the tenth region 10 and the eleventh region 11, or one or more of the fourteenth region 14 and the fifteenth region 15, the display apparatus may output a 15.2-channel sound or a 13.4-channel sound.

Therefore, the first sound generating module 1500L, the second sound generating module 1500R, the third sound generating module 1500C, the seventh sound generating module 1500BL, the eighth sound generating module 1500BR, the ninth sound generating module 1500BC, the tenth sound generating module 1500LC, the eleventh sound generating module 1500RC, the fourteenth sound generating module 1500BLC, and the fifteenth sound generating module 1500BRC may output sounds of about 80 Hz to about 40 kHz. The fourth sound generating module 1900HL, the fifth sound generating module 1900HR, the sixth sound generating module 1900HC, the twelfth sound generating module 1900HLC, and the thirteenth sound generating module 1900HRC may output sounds of about 150 Hz to about 40 kHz. The first woofer W3 and the second woofer W4 may output sounds of 80 Hz or less. Accordingly, the display apparatus may output a 15.1-channel sound.

With reference to FIG. 42B, a first sound generating module 1500L may be disposed in a first region 1 of a rear surface of the display panel 110, a fourth sound generating module 1900HL may be disposed in a fourth region 4 of the rear surface of the display panel 110, and a seventh sound generating module 1900BL may be disposed in a seventh region 7 of the rear surface of the display panel 110. A second sound generating module 1500R may be disposed in a second region 2 of the rear surface of the display panel 110, a fifth sound generating module 1900HR may be disposed in a fifth region 5 of the rear surface of the display panel 110, and an eighth sound generating module 1900BR may be disposed in an eighth region 8 of the rear surface of the display panel 110. A third sound generating module 1500C may be disposed in a third region 3 of the rear surface of the display panel 110, a sixth sound generating module 1900HC may be disposed in a sixth region 6 of the rear surface of the display panel 110, and a ninth sound generating module 1900BC may be disposed in a ninth region 9 of the rear surface of the display panel 110. A tenth sound generating module 1500LC may be disposed in a tenth region 10 of the rear surface of the display panel 110, a twelfth sound generating module 1900HLC may be disposed in a twelfth region 12 of the rear surface of the display panel 110, and a fourteenth sound generating module 1900BLC may be disposed in a fourteenth region 14 of the rear surface of the display panel 110. An eleventh sound generating module 1500RC may be disposed in an eleventh region 11 of the rear surface of the display panel 110, a thirteenth sound generating module 1900HRC may be disposed in a thirteenth region 13 of the rear surface of the display panel 110, and a fifteenth sound generating module 1900BRC may be disposed in a fifteenth region 15 of the rear surface of the display panel 110. As another example, as described above with reference to FIG. 22, the first to fifteenth sound generating modules may be disposed on a rear surface of a rear cover. For example, the first to fifteenth sound generating modules may be disposed in a module structure.

The fourth sound generating module 1900HL, the fifth sound generating module 1900HR, the sixth sound generating module 1900HC, the seventh sound generating module 1900BL, the eighth sound generating module 1900BR, the ninth sound generating module 1900BC, the twelfth sound generating module 1900HLC, the thirteenth sound generating module 1900HRC, the fourteenth sound generating module 1900BLC, and the fifteenth sound generating module 1900BRC may use the sound generating module 1900 described above with reference to FIGS. 33 to 39. The sound generating module 1900 may be modularized into the module structure as described above with reference to FIGS. 3A to 3E, 6, 12 to 14, and 18 to 21. For example, at least one sound generating module may be disposed on a rear surface of a rear cover including a module accommodating part and may be accommodated into the module accommodating part of the rear cover. As another example, as described above with reference to FIG. 22, the sound generating module 1900 may be disposed on the rear surface of the rear cover and may be modularized. As another example, as described above with reference to FIGS. 23A to 23D, the sound generating module 1900 may be provided on a plate. The fourth sound generating module 1900HL, the fifth sound generating module 1900HR, the sixth sound generating module 1900HC, the twelfth sound generating module 1900HLC, and the thirteenth sound generating module 1900HRC may be disposed at an upper portion of the display panel 110, and the seventh sound generating module 1900BL, the eighth sound generating module 1900BR, the ninth sound generating module 1900BC, the fourteenth sound generating module 1900BLC, and the fifteenth sound generating module 1900BRC may be disposed at a lower portion of the display panel 110. When a sound generating module includes a piezoelectric composite, a sound of a high-pitched sound band may be more enhanced than a sound generating module including a voice coil. Therefore, since the fourth sound generating module 1900HL, the fifth sound generating module 1900HR, the sixth sound generating module 1900HC, the twelfth sound generating module 1900HLC, and the thirteenth sound generating module 1900HRC are disposed at the upper portion of the display panel 110, and the seventh sound generating module 1900BL, the eighth sound generating module 1900BR, the ninth sound generating module 1900BC, the fourteenth sound generating module 1900BLC, and the fifteenth sound generating module 1900BRC are disposed at the lower portion of the display panel 110, a display apparatus for outputting a sound of the high-pitched sound band and a sound with enhanced directionality may be implemented.

As another example, the first woofer W3 and the second woofer W4 may not be provided, and at least one of the first sound generating module 1500L and the second sound generating module 1500R may be configured as a sound generating module including a woofer. For example, the first woofer-integrated sound generating module W1 may be provided in the first region 1, and the second woofer-integrated sound generating module W2 may be provided in the second region 2. For example, a sound generating module including a woofer may be provided in one or more of the first region 1 and the second region 2. As another example, at least one of the tenth sound generating module 1500LC and the eleventh sound generating module 1500RC may be configured as a sound generating module including a woofer. The first woofer-integrated sound generating module W1 may be provided in the tenth region 10, and the second woofer-integrated sound generating module W2 may be provided in the eleventh region 11. For example, a sound generating module including a woofer may be provided in one or more of the tenth region 10 and the eleventh region 11. However, the present embodiment is not limited thereto. For example, when a sound generating module including a woofer is provided in one or more of the first region 1 and the second region 2 or one or more of the tenth region 10 and the eleventh region 11, the display apparatus may output a 15.2-channel sound or a 13.4-channel sound.

Therefore, the first sound generating module 1500L, the second sound generating module 1500R, the third sound generating module 1500C, the fourth sound generating module 1900HL, the fifth sound generating module 1900HR, the sixth sound generating module 1900HC, the seventh sound generating module 1900BL, the eighth sound generating module 1900BR, the ninth sound generating module 1900BC, the tenth sound generating module 1500LC, the eleventh sound generating module 1500RC, the twelfth sound generating module 1900HLC, the thirteenth sound generating module 1900HRC, the fourteenth sound generating module 1900BLC, and the fifteenth sound generating module 1900BRC may output sounds of about 150 Hz to about 40 kHz or about 80 Hz to about 40 kHz. The first woofer W3 and the second woofer W4 may output sounds of 80 Hz or less. Accordingly, the display apparatus may output a 15.1-channel sound.

With reference to FIG. 42C, a first sound generating module 1900L may be disposed in a first region 1 of a rear surface of the display panel 110, a fourth sound generating module 1900HL may be disposed in a fourth region 4 of the rear surface of the display panel 110, and a seventh sound generating module 1900BL may be disposed in a seventh region 7 of the rear surface of the display panel 110. A second sound generating module 1900R may be disposed in a second region 2 of the rear surface of the display panel 110, a fifth sound generating module 1900HR may be disposed in a fifth region 5 of the rear surface of the display panel 110, and an eighth sound generating module 1900BR may be disposed in an eighth region 8 of the rear surface of the display panel 110. A third sound generating module 1900C may be disposed in a third region 3 of the rear surface of the display panel 110, a sixth sound generating module 1900HC may be disposed in a sixth region 6 of the rear surface of the display panel 110, and a ninth sound generating module 1900BC may be disposed in a ninth region 9 of the rear surface of the display panel 110. A tenth sound generating module 1900LC may be disposed in a tenth region 10 of the rear surface of the display panel 110, a twelfth sound generating module 1900HLC may be disposed in a twelfth region 12 of the rear surface of the display panel 110, and a fourteenth sound generating module 1900BLC may be disposed in a fourteenth region 14 of the rear surface of the display panel 110. An eleventh sound generating module 1900RC may be disposed in an eleventh region 11 of the rear surface of the display panel 110, a thirteenth sound generating module 1900HRC may be disposed in a thirteenth region 13 of the rear surface of the display panel 110, and a fifteenth sound generating module 1900BRC may be disposed in a fifteenth region 15 of the rear surface of the display panel 110. As another example, as described above with reference to FIG. 22, the first to fifteenth sound generating modules may be disposed on a rear surface of a rear cover. For example, the first to fifteenth sound generating modules may be disposed in a module structure.

The first to fifteenth sound generating modules may use the sound generating module 1900 described above with reference to FIGS. 33 to 39. The sound generating module 1900 may be modularized into a module structure as described above with reference to FIGS. 3A to 3E, 6, 12 to 14, and 18 to 21. For example, at least one of the first to fifteenth sound generating modules may be disposed on a rear surface of a rear cover including a module accommodating part and may be accommodated into the module accommodating part of the rear cover. As another example, as described above with reference to FIG. 22, the sound generating module 1900 may be disposed on a rear surface of a rear cover and may be modularized. As another example, as described above with reference to FIGS. 23A to 23D, the sound generating module 1900 may be provided on a plate. When each of the first to eleventh sound generating modules is configured as a sound generating module including a piezoelectric composite, a sound of a high-pitched sound band may be more enhanced than a sound generating module including a voice coil. Therefore, since the first to fifteenth sound generating modules are provided, a display apparatus for outputting a sound of the high-pitched sound band and a sound with enhanced directionality may be implemented.

Therefore, the first sound generating module 1900L, the second sound generating module 1900R, the third sound generating module 1900C, the fourth sound generating module 1900HL, the fifth sound generating module 1900HR, the sixth sound generating module 1900HC, the seventh sound generating module 1900BL, the eighth sound generating module 1900BR, the ninth sound generating module 1900BC, the tenth sound generating module 1900LC, the eleventh sound generating module 1900RC, the twelfth sound generating module 1900HLC, the thirteenth sound generating module 1900HRC, the fourteenth sound generating module 1900BLC, and the fifteenth sound generating module 1900BRC may output sounds of about 150 Hz to about 40 kHz or about 80 Hz to about 40 kHz. The first woofer W3 and the second woofer W4 may output sounds of 80 Hz or less. Accordingly, the display apparatus may output a 15.1-channel sound.

The display apparatus according to another embodiment of the present disclosure may realize left and right sounds corresponding left and right images and height and bottom sounds corresponding to upper and lower images, and a real stereo sound of a real sound including stereo left and right sounds and stereo height and bottom sounds may be realized, thereby providing a user with a real sound instead of a virtual sound. Therefore, a real stereo sound or surround sound of a real sound including stereo left and right sounds and stereo height and bottom sounds may be provided to a user, thereby enhancing a sense of realism. Accordingly, in theaters, private cinemas, and apparatuses such as televisions, a user may simultaneously feel a realistic sound and image similarly or identically to reality, and for example, may feel a realistic AV or Dolby sound system.

Moreover, when a sound generating module having a multi-channel illustrated in FIGS. 24A and 24B is implemented in the sound plate of FIGS. 23A to 23D, a real stereo sound or surround sound of a real sound including stereo left and right sounds and stereo height and bottom sounds may be provided to a user, thereby enhancing a sense of realism. When the sound generating module having a multi-channel illustrated in FIGS. 24A and 24B and a projection or image reproduction device are provided in the sound plate of FIGS. 23A to 23D, a realistic AV or Dolby sound system may be provided so that a user simultaneously feels a realistic sound and image similarly or identically to reality, and moreover, a stereo sound for providing an immersion experience of a user and a realistic sense may be provided. Also, as described above with reference to FIGS. 1 to 22, a modularized sound generating module may be applied, and thus, a degree of freedom in design of a display apparatus or a rear cover may be enhanced in a case where a sound generating module is provided.

Figure 43A:
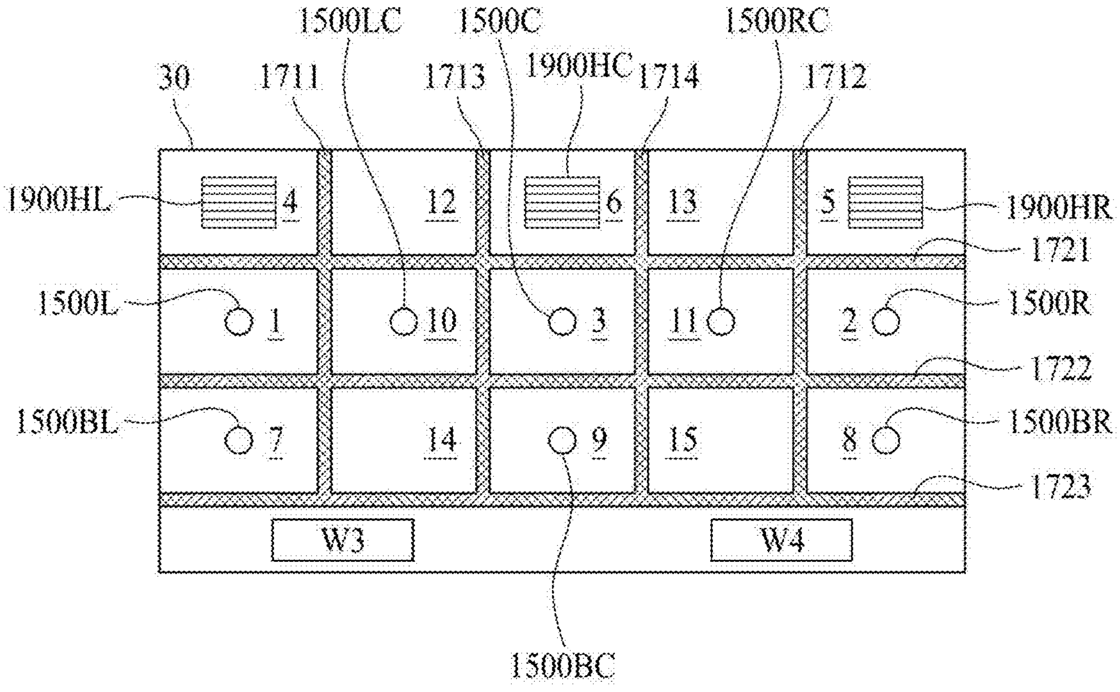
FIGS. 43A to 43C illustrate a display apparatus including a sound generating module according to another embodiment of the present disclosure.
Figure 43B:
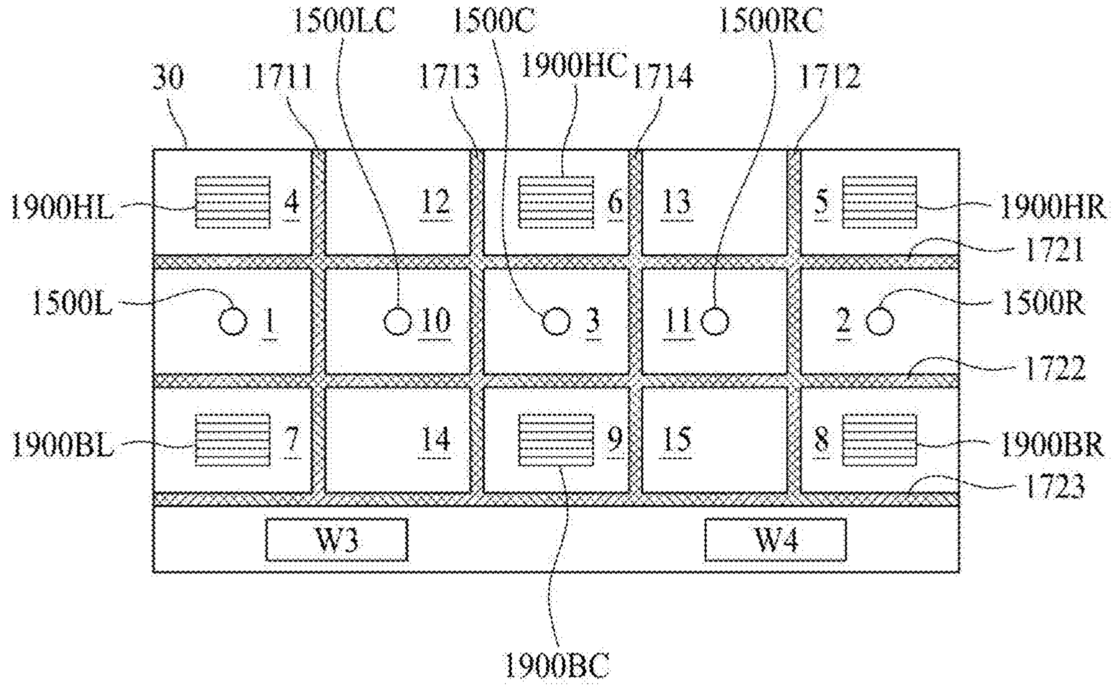
Figure 43C:
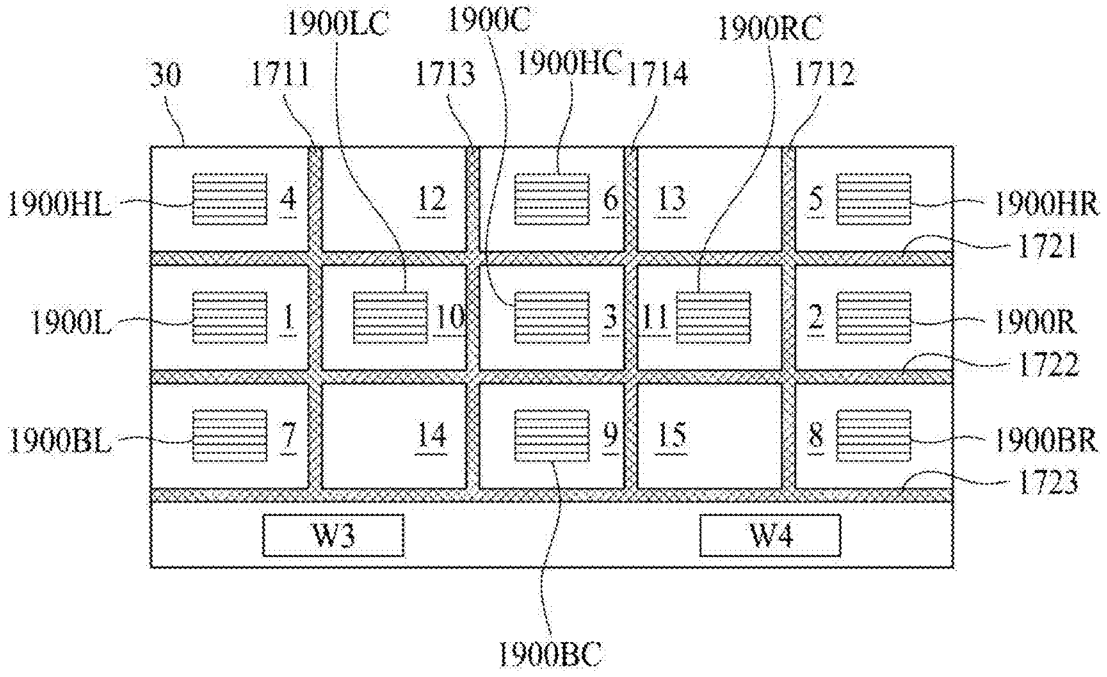

FIGS. 43A to 43C illustrate a display apparatus including a sound generating module according to another embodiment of the present disclosure.

FIGS. 43A to 43C illustrate an embodiment of a sound generating module and a partition, but are not limited thereto. Descriptions of the sound generating module and the partition illustrated in FIGS. 43A to 43C are the same as descriptions given above with reference to FIG. 31A, and thus, are omitted. A structure of each of a partition, a pad, and a bent portion may be applied to FIGS. 31A to 32E.

Figure 44A:
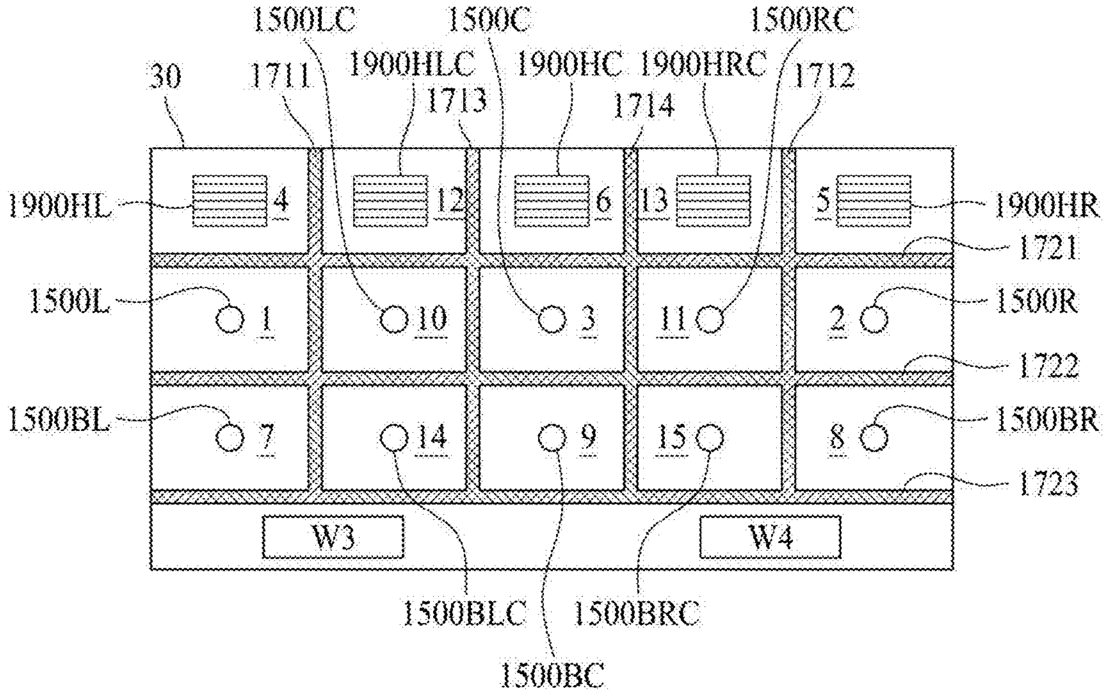
FIGS. 44A to 44C illustrate a display apparatus including a sound generating module according to another embodiment of the present disclosure.
Figure 44B:
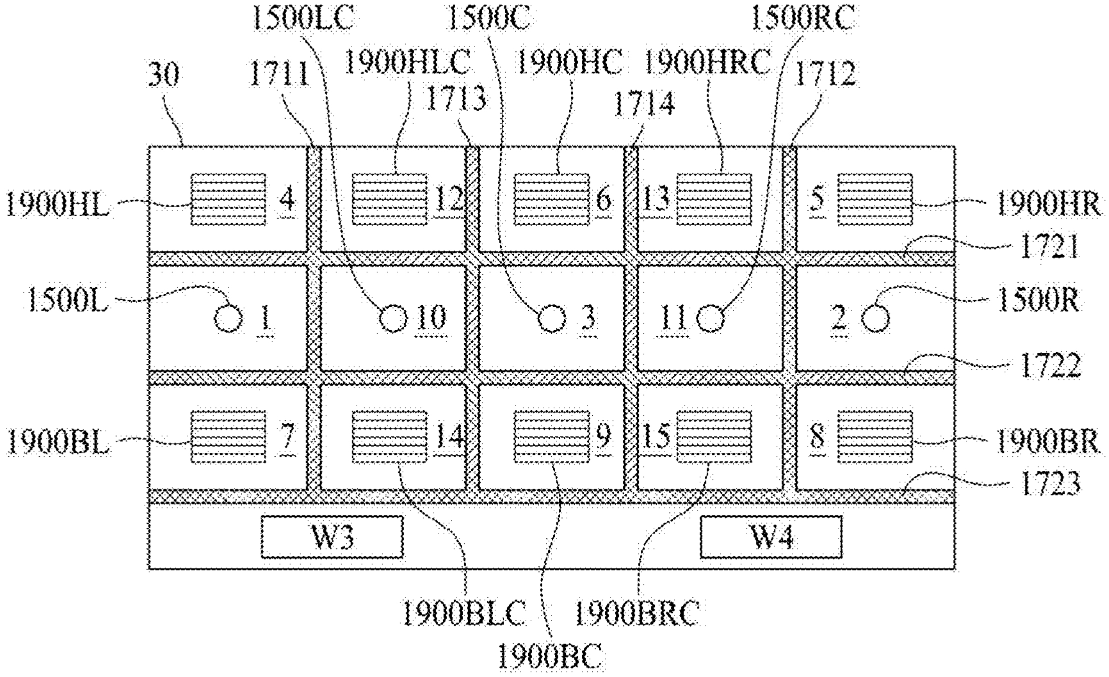
Figure 44C:
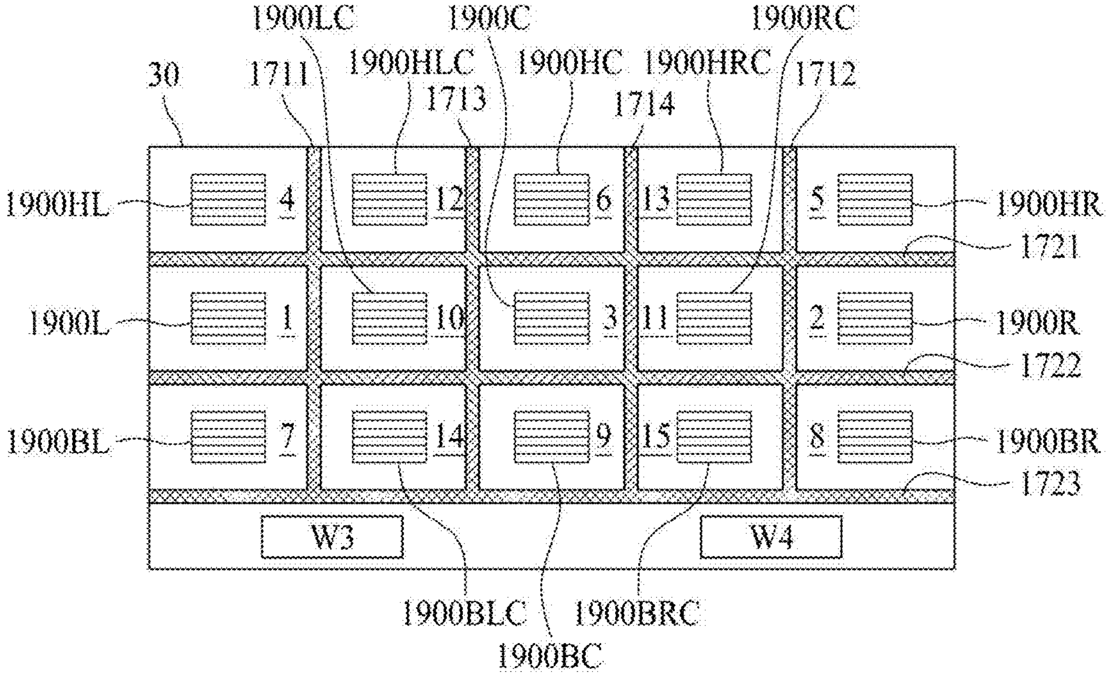

FIGS. 44A to 44C illustrate a display apparatus including a sound generating module according to another embodiment of the present disclosure.

FIGS. 44A to 44C illustrate an embodiment of a sound generating module and a partition, but are not limited thereto. Descriptions of the sound generating module and the partition illustrated in FIGS. 44A to 44C are the same as descriptions given above with reference to FIG. 32A, and thus, are omitted. A structure of each of a partition, a pad, and a bent portion may be applied to FIGS. 31A to 32E.

Figure 45A:
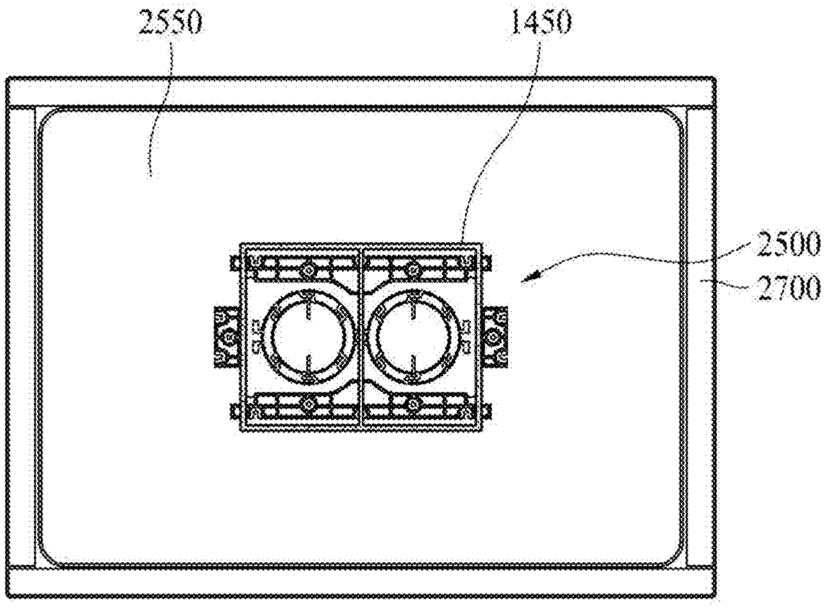
FIGS. 45A and 45B illustrate a modularized sound generating module according to another embodiment of the present disclosure.
Figure 45B:
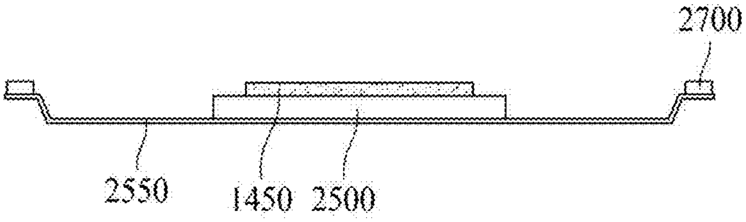

FIGS. 45A and 45B illustrate a modularized sound generating module according to another embodiment of the present disclosure.

FIGS. 45A and 45B illustrate an example where a sound generating module 2500 and a partition 2700 are modularized. With reference to FIGS. 45A and 45B, the sound generating module 2500 may be disposed on a rear surface of a display panel 110 or a rear surface of a rear cover 300. The sound generating module 2500 and the partition 2700 may be disposed in a module structure 2550. For example, the partition 2700 may be disposed to surround the sound generating module 2500. The sound generating module 2500 may be configured as the sound generating module of FIG. 5B, and is not limited thereto. As another example, the sound generating module 2500 may be configured as the sound generating module of FIG. 5A. For example, the sound generating module 2500 and the partition 2700 may be disposed and modularized in the module structure 2550, or may be modularized as one element. Since the sound generating module 2500 and the partition 2700 are disposed and modularized in the module structure 2550, uniform sound quality may be realized. Also, when the module structure 2550 is provided to be flat, a design of an external appearance may be improved. The sound generating module 2500 may be attached on the display panel 110 or the rear cover 300 by an adhesive member 1450. For example, the adhesive member 1450 may include one or more of a double-sided tape, a double-sided foam tape, a double-sided pad, a double-sided foam pad, and a bond, but is not limited thereto.

Figure 46A:
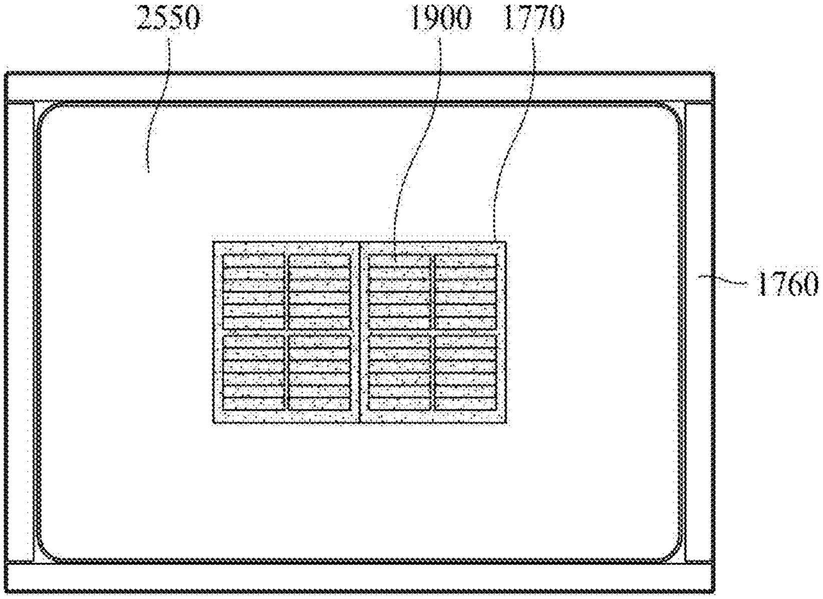
FIGS. 46A and 46B illustrate a modularized sound generating module according to another embodiment of the present disclosure.
Figure 46B:
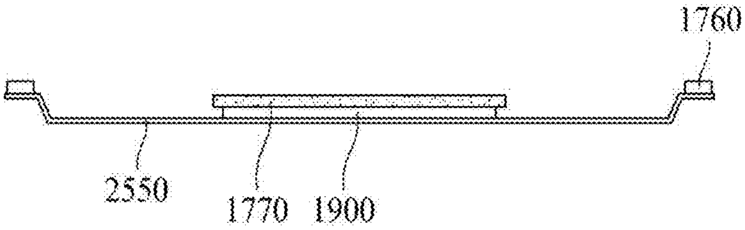

FIGS. 46A and 46B illustrate a modularized sound generating module according to another embodiment of the present disclosure.

FIGS. 46A and 46B illustrate an example where a sound generating module 1900 and a partition 1760 are modularized. With reference to FIGS. 46A and 46B, the sound generating module 1900 may be disposed on a rear surface of a display panel 110 or a rear surface of a rear cover 300. A module structure 2550 may be disposed at the rear cover 300. The sound generating module 1900 and the partition 1760 may be disposed in the module structure 2550. For example, the partition 1760 may be disposed to surround the sound generating module 1900. The sound generating module 1900 may be configured as the sound generating module of each of FIGS. 33 to 38. For example, the sound generating module 1900 and the partition 1760 may be disposed and modularized in the module structure 2550, or may be modularized as one element. Since the sound generating module 1900 and the partition 1760 are disposed and modularized in the module structure 2550, uniform sound quality may be realized. Also, when the module structure 2550 is provided to be flat, a design of an external appearance may be improved.

In the sound generating module 1900, a structure where four piezoelectric composites are arranged may be provided as one, or a structure including four piezoelectric composites may be provided as two. However, the present disclosure is not limited thereto. For example, the sound generating module 1900 may be provided as one piezoelectric composite. As another example, in the sound generating module 1900, a structure where two or more piezoelectric composites are arranged may be provided as one, or a structure where two or more piezoelectric composites are arranged may be provided as two or more. In the sound generating module 1900, when a structure where two or more piezoelectric composites are arranged is provided as one, there may be a problem where resonance is not performed between the two or more piezoelectric composites. In order to solve such a problem, a pad may be disposed between two or more piezoelectric composites.

The sound generating module 1900 may be attached on the display panel 110 or the rear cover 300 by an adhesive member 1770. For example, the adhesive member 1770 may include one or more of a double-sided tape, a double-sided foam tape, a double-sided pad, a double-sided foam pad, and a bond, but is not limited thereto.

The sound generating module according to an embodiment of the present disclosure may be applied to a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the sound generating module according to an embodiment of the present disclosure may be applied to organic light emitting lighting apparatuses or inorganic light emitting lighting apparatuses. In a case where the sound generating module is applied to a lighting apparatus, the sound generating module may act as lighting and a speaker. Also, in a case where the display apparatus according to an embodiment of the present disclosure is applied to a mobile apparatus, the sound generating module may act as a speaker or a receiver, but is not limited thereto.

A display apparatus according to an embodiment of the present disclosure will be described below.

A display apparatus according to an embodiment of the present disclosure includes a display module including a display panel configured to display an image, a rear cover on a rear surface of the display module, and a sound generating module at the rear cover and configured to vibrate the display module to generate sound, wherein a rear surface of the sound generating module is covered by the rear cover.

According to some embodiments of the present disclosure, the sound generating module may include a module structure at the rear cover and a vibration device at the module structure to vibrate the display module.

According to some embodiments of the present disclosure, the sound generating module may further include a connection member between the module structure and the display module.

According to some embodiments of the present disclosure, the module structure and the vibration device may be modularized as one element.

According to some embodiments of the present disclosure, the vibration device may include a base plate at the module structure, a bobbin on the base plate to vibrate the display module, a magnet inside or outside the bobbin; a coil wound around the bobbin, an edge frame at an outer portion of the base plate, and a damper connected between the edge frame and the bobbin.

According to some embodiments of the present disclosure, the display apparatus may further include a heat diffusion member between the vibration device and the display module.

According to some embodiments of the present disclosure, the sound generating module may include a module structure at the rear cover, a vibration transfer member on the module structure and connected to the display module, a connection member between the vibration transfer member and the module structure, and a vibration device at the module structure to vibrate the vibration transfer member.

According to some embodiments of the present disclosure, the connection member may include at least one of a bent portion and a protrusion portion toward the vibration device.

According to some embodiments of the present disclosure, the sound generating module may include a module structure at the rear cover, a vibration transfer member on the module structure and connected to the display module, a plurality of vibration devices at the module structure to vibrate the vibration transfer member, a connection member between the vibration transfer member and the module structure, and a partition between the plurality of vibration devices.

According to some embodiments of the present disclosure, the rear cover may include a first rear cover including a module accommodating part and a second rear cover on a rear surface of the first rear cover, and the sound generating module is accommodated into the module accommodating part of the first rear cover.

According to some embodiments of the present disclosure, the sound generating module may include a module structure accommodated into the module accommodating part of the first rear cover, a vibration device at the module structure to vibrate the display module, and a connection member between the module structure and the display module.

According to some embodiments of the present disclosure, the module structure may include a border portion under the connection member and a receiving part accommodated into the module accommodating part of the first rear cover and disposed at the second rear cover to protrude from a portion other than the border portion to the rear cover.

According to some embodiments of the present disclosure, the rear cover may include a first rear cover and a second rear cover on a rear surface of the first rear cover, and the sound generating module is accommodated into the first rear cover.

According to some embodiments of the present disclosure, the rear cover may include a first rear cover and a second rear cover on a rear surface of the first rear cover, and the sound generating module is accommodated between the first rear cover and the second rear cover.

According to some embodiments of the present disclosure, the rear cover may comprise at least one module accommodating part, and the display apparatus may further comprise at least one cover covering the at least one module accommodating part into which the sound generating module may be not accommodated.

According to some embodiments of the present disclosure, the vibration device may include a piezoelectric composite.

A display apparatus according to an embodiment of the present disclosure includes a display module configured to display an image, a rear cover on a rear surface of the display module with a gap space therebetween, and a sound generating module in the gap space to vibrate the display module to generate sound, wherein the sound generating module includes a module structure disposed at the rear cover and a vibration device disposed at the module structure to vibrate the display module, and the module structure and the vibration device are modularized as one element.

According to some embodiments of the present disclosure, the sound generating module may include a vibration transfer member on the module structure and connected to the display module and a connection member between the vibration transfer member and the module structure, and the sound generating module is configured to vibrate the vibration transfer member to vibrate the display module.

According to some embodiments of the present disclosure, the rear cover may include a first rear cover including a module accommodating part and a second rear cover on a rear surface of the first rear cover, and the module structure is accommodated into the module accommodating part of the first rear cover.

According to some embodiments of the present disclosure, the sound generating module may further include a connection member between the module structure and the display module, and the module structure includes a border portion under the connection member and a receiving part accommodated into the module accommodating part of the first rear cover and disposed at the second rear cover to protrude from a portion other than the border portion to the rear cover.

A display apparatus according to an embodiment of the present disclosure includes a display module configured to display an image, a rear cover on a rear surface of the display module, the rear cover including a plurality of module accommodating parts, at least one sound generating module accommodated into at least one of the plurality of module accommodating parts to vibrate the display module to generate sound, and at least one cover covering at least one of the plurality of module accommodating parts.

According to some embodiments of the present disclosure, the rear cover may include a first rear cover including the plurality of module accommodating parts and a second rear cover on a rear surface of the first rear cover.

According to some embodiments of the present disclosure, the at least one sound generating module includes a module structure accommodated into at least one of the plurality of module accommodating parts, a vibration device at the module structure to vibrate the display module, and a connection member between the module structure and the display module, and the module structure includes a border portion supporting the connection member and a receiving part accommodated into a corresponding module accommodating part of the first rear cover and disposed at the second rear cover to protrude from a portion other than the border portion to the rear cover.

According to some embodiments of the present disclosure, the at least one sound generating module may include a module structure accommodated into at least one of the plurality of module accommodating parts and a vibration device at the module structure to vibrate the display module, the module structure and the vibration device are modularized as one element.

According to some embodiments of the present disclosure, the rear cover may include a hole overlapping the at least one sound generating module.

According to some embodiments of the present disclosure, the sound generating module may be accommodated into the hole of the rear cover.

According to some embodiments of the present disclosure, the vibration device may further include a hollow portion, and the module structure may include a groove overlapping the vibration device.

According to some embodiments of the present disclosure, the module structure may include a cable hole through that a signal cable connected to the vibration device passes.

A display apparatus according to an embodiment of the present disclosure includes a plate including a first region, a second region, a third region, a fourth region, and a fifth region, a first sound generating module and a fourth sound generating module in the first region and the fourth region to correspond to a left region of a rear surface of the plate, a second sound generating module and a fifth sound generating module in the second region and the fifth region to correspond to a right region of the rear surface of the plate, and a third sound generating module in the third region to correspond to a center region of the rear surface of the plate, wherein one or more sound generating modules of the first to fifth sound generating modules include a module structure, and the one or more sound generating modules are disposed at the module structure.

According to some embodiments of the present disclosure, the plate may include a display panel configured to display an image.

According to some embodiments of the present disclosure, the plate may include one of a glass, a wood, a plastic, and a metal.

According to some embodiments of the present disclosure, the display apparatus may further include a second plate including the first to fifth regions, the second plate may include one of a glass, a wood, a plastic, and a metal.

According to some embodiments of the present disclosure, the plate may be a display panel configured to display an image, and the first to fifth sound generating modules are disposed on the second plate.

According to some embodiments of the present disclosure, one or more of the first sound generating module and the second sound generating module may include a sound generating module including a woofer.

According to some embodiments of the present disclosure, the first sound generating module and the second sound generating module may be disposed to be asymmetrical or symmetrical with the third sound generating module.

According to some embodiments of the present disclosure, one or more of the first to fifth sound generating modules may include a sound generating module including a woofer.

According to some embodiments of the present disclosure, the display apparatus may further include one or more woofers under at least one of the first region and the second region.

According to some embodiments of the present disclosure, the plate may include a display panel configured to display an image, the display apparatus may further include a rear cover on a rear surface of the display panel, and the first to fifth sound generating modules are disposed on the rear surface of the display panel or a rear surface of the rear cover.

According to some embodiments of the present disclosure, the display apparatus may further include a sixth sound generating module in a sixth region between the fourth region and the fifth region, a seventh sound generating module in a seventh region under the first region, an eighth sound generating module in an eighth region under the second region, a ninth sound generating module in a ninth region between the seventh region and the eighth region, a tenth sound generating module in a tenth region between the first region and the third region, and an eleventh sound generating module in an eleventh region between the second region and the third region.

According to some embodiments of the present disclosure, one or more of the sixth to eleventh sound generating modules may be disposed at the module structure.

According to some embodiments of the present disclosure, the display apparatus may further include one or more woofers under at least one of the seventh region and the eighth region.

According to some embodiments of the present disclosure, one or more of the seventh sound generating module and the eighth sound generating module may include a sound generating module including a woofer.

According to some embodiments of the present disclosure, one or more of the first sound generating module and the second sound generating module may include a sound generating module including a woofer.

According to some embodiments of the present disclosure, one or more of the tenth sound generating module and the eleventh sound generating module may include a sound generating module including a woofer.

According to some embodiments of the present disclosure, one or more of the first to eleventh sound generating modules may include a sound generating module including a woofer.

According to some embodiments of the present disclosure, one or more of the fourth to sixth sound generating modules may include a sound generating module including a piezoelectric composite.

According to some embodiments of the present disclosure, one or more of the fourth to ninth sound generating modules may include a sound generating module including a piezoelectric composite.

According to some embodiments of the present disclosure, one or more of the first to eleventh sound generating modules may include a sound generating module including a piezoelectric composite, a sound generating module including a voice coil, or a sound generating module including a woofer.

According to some embodiments of the present disclosure, the plate may include a display panel configured to display an image, the display apparatus may further include a rear cover on a rear surface of the display panel, and the first to eleventh sound generating modules are on the rear surface of the display panel or a rear surface of the rear cover.

According to some embodiments of the present disclosure, the display apparatus may further include a twelfth sound generating module in a twelfth region between the fourth region and the fifth region, a thirteenth sound generating module in a thirteenth region between the fifth region and the sixth region, a fourteenth sound generating module in a fourteenth region between the seventh region and the ninth region, and a fifteenth sound generating module in a fifteenth region between the eighth region and the ninth region.

According to some embodiments of the present disclosure, one or more of the twelfth to fifteenth sound generating modules may be disposed at the module structure.

According to some embodiments of the present disclosure, the display apparatus may further include one or more woofers under one of the seventh region and the eighth region.

According to some embodiments of the present disclosure, one or more of the seventh sound generating module and the eighth sound generating module may include a sound generating module including a woofer.

According to some embodiments of the present disclosure, one or more of the first sound generating module and the second sound generating module may include a sound generating module including a woofer.

According to some embodiments of the present disclosure, one or more of the tenth sound generating module and the eleventh sound generating module may include a sound generating module including a woofer.

According to some embodiments of the present disclosure, one or more of the fourteenth sound generating module and the fifteenth sound generating module may include a sound generating module including a woofer.

According to some embodiments of the present disclosure, one or more of the first to fifteenth sound generating modules may include a sound generating module including a woofer.

According to some embodiments of the present disclosure, one or more of the fourth to sixth sound generating modules, the twelfth sound generating module, and the thirteenth sound generating module may include a sound generating module including a piezoelectric composite.

According to some embodiments of the present disclosure, one or more of the fourth to ninth sound generating modules and the twelfth to fifteenth sound generating modules may include a sound generating module including a piezoelectric composite.

According to some embodiments of the present disclosure, one or more of the first to fifteenth sound generating modules may include a sound generating module including a piezoelectric composite, a sound generating module including a voice coil, or a sound generating module including a woofer.

According to some embodiments of the present disclosure, the plate may include a display panel configured to display an image, the display apparatus further includes a rear cover on a rear surface of the display panel, and the first to fifteenth sound generating modules are on the rear surface of the display panel or a rear surface of the rear cover.

According to some embodiments of the present disclosure, the display apparatus may further include a partition surrounding the first to fifteenth sound generating modules, wherein the partition and the first to fifteenth sound generating modules are disposed at the module structure.

According to some embodiments of the present disclosure, the plate may include a display panel configured to display an image, the display apparatus may further include a rear cover on a rear surface of the display panel, the rear cover including a module accommodating part, and the one or more sound generating modules are accommodated into the module accommodating part of the rear cover.

Since the display apparatus according to the embodiments of the present disclosure includes the sound generating module which vibrates the display panel to generate sound, the display apparatus may output sound to a forward region in front of the display panel, thereby enhancing an immersion experience of a viewer who is watching an image displayed by the display apparatus.

In the display apparatus according to the embodiments of the present disclosure, a modularized sound generating module of one element may be disposed between the display module and the rear cover, thereby enhancing assemblability or assembling between the display module and the sound generating module.

In the display apparatus according to the embodiments of the present disclosure, at least one sound generating module and at least one cover may be selectively disposed in the plurality of module accommodating parts provided in the rear cover, thereby enabling elements to be used in common in the rear cover.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. An electronic apparatus, comprising:

a plate;

one or more sound generating modules configured to vibrate the plate; and a rear cover at a rear surface of the plate, wherein the one or more sound generating modules comprise:

a vibration device configured to vibrate the plate;

a supporting frame configured to include a pocket part to receive the vibration device; and a connection member configured to be connected to the supporting frame and the plate.

2. The electronic apparatus of claim 1, wherein the supporting frame comprises:

a first portion connected to the connection member;

a second portion configured to support the vibration device; and a third portion connected between the first portion and the second portion to provide the pocket part along with the second portion.

3. The electronic apparatus of claim 2, wherein the third portion is configured to be inclined between the first portion and the second portion.

4. The electronic apparatus of claim 1, wherein the supporting frame further comprises a border portion connected to the connection member, and wherein the pocket part is configured to protrude from a portion other than the border portion to the rear cover to receive the vibration device.

5. The electronic apparatus of claim 1, wherein the rear cover comprises one or more grooves configured to accommodate the one or more sound generating modules.

6. The electronic apparatus of claim 5, wherein the pocket part of the one or more sound generating modules is accommodated into a corresponding groove of the one or more grooves.

7. The electronic apparatus of claim 1, wherein the rear cover comprises:

a first rear cover configured to include one or more grooves;

a second rear cover configured to cover a rear surface of the first rear cover, and wherein the pocket part of the one or more sound generating modules protrudes to be accommodated into a corresponding groove of the one or more grooves.

8. The electronic apparatus of claim 1, further comprising at least one cover, wherein the rear cover comprises one or more grooves to receive the one or more sound generating modules, and wherein the at least one cover is configured to cover the one or more grooves into which the one or more sound generating modules are not accommodated.

9. The electronic apparatus of claim 1, wherein the supporting frame further comprises a hole overlapping the vibration device.

10. The electronic apparatus of claim 1, wherein the one or more sound generating modules further comprise an integration member disposed between the vibration device and the supporting frame.

11. The electronic apparatus of claim 10, wherein the integration member includes an adhesive member, one or more screws, or a bolt and a nut.

12. The electronic apparatus of claim 1, wherein the vibration device comprises:

a base plate at the supporting frame;

a bobbin on the base plate;

a magnet inside or outside the bobbin;

a coil wound around the bobbin;

an edge frame at an outer portion of the base plate; and a damper connected between the edge frame and the bobbin.

13. The electronic apparatus of claim 1, wherein the vibration device comprises a piezoelectric material or a piezoelectric composite.

14. The electronic apparatus of claim 1, wherein:

the plate is configured to display an image, output a sound, or output a sound associated with the image, or the plate comprises a display panel configured to display an image, output a sound, or output a sound associated with the image, or the plate comprises a photograph or a picture.

15. The electronic apparatus of claim 1, wherein the plate comprises one of a glass, a wood, a plastic, and a metal, and wherein the plate is a sound plate to generate sound.

16. An electronic apparatus, comprising:

a plate including a first region, a second region, a third region, a fourth region, and a fifth region;

a first sound generating module and a fourth sound generating module at the first region and the fourth region to correspond to a left region of a rear surface of the plate;

a second sound generating module and a fifth sound generating module at the second region and the fifth region to correspond to a right region of the rear surface of the plate; and a third sound generating module at the third region to correspond to a center region of the rear surface of the plate, wherein one or more sound generating modules of the first to fifth sound generating modules comprise:

a vibration device configured to vibrate the plate;

a supporting frame configured to include a pocket part to receive the vibration device; and a connection member configured to be connected to the supporting frame and the plate.

17. The electronic apparatus of claim 16, wherein the supporting frame further comprises a border portion connected to the connection member, and wherein the pocket part is configured to protrude from a portion other than the border portion to a rear cover of the electronic apparatus to receive the vibration device.

18. The electronic apparatus of claim 16, further comprising a rear cover disposed at the rear surface of the plate, wherein the rear cover comprises:

a first rear cover configured to include one or more grooves;

a second rear cover configured to cover a rear surface of the first rear cover, and wherein the pocket part of the one or more sound generating modules protrudes to be accommodated into a corresponding groove of the one or more grooves.

19. The electronic apparatus of claim 16, wherein the supporting frame comprises a hole overlapping the vibration device.

20. The electronic apparatus of claim 16, wherein the one or more sound generating modules further comprise an integration member disposed between the vibration device and the supporting frame.

21. The electronic apparatus of claim 16, wherein the vibration device comprises:

a base plate at the supporting frame;

a bobbin on the base plate;

a magnet inside or outside the bobbin;

a coil wound around the bobbin;

an edge frame at an outer portion of the base plate; and a damper connected between the edge frame and the bobbin.

22. The electronic apparatus of claim 16, wherein the one or more sound generating modules further comprise an adhesive member disposed between the base plate of the vibration device and the supporting frame.

23. The electronic apparatus of claim 16, wherein the vibration device comprises a piezoelectric material or a piezoelectric composite.

24. The electronic apparatus of claim 16, wherein:

the plate is configured to display an image, output a sound, or output a sound associated with the image, or the plate comprises a display panel configured to display an image, output a sound, or output a sound associated with the image, or the plate comprises a photograph or a picture, or the plate is a sound plate to generate sound, the sound plate including one of a glass, a wood, a plastic, and a metal.

25. The electronic apparatus of claim 16, further comprising a second plate including the first to fifth regions, wherein the second plate comprises one of glass, a wood, a plastic, and a metal.

26. The electronic apparatus of claim 25, wherein the plate includes a display panel configured to display an image, and wherein the first to fifth sound generating modules are disposed at the second plate.

27. The electronic apparatus of claim 16, wherein one or more of the first sound generating module and the second sound generating module comprise a sound generating module including a woofer.

28. The electronic apparatus of claim 16, wherein one or more of the first to fifth sound generating modules comprise a sound generating module including a woofer.

29. The electronic apparatus of claim 16, further comprising one or more woofers under at least one of the first region and the second region.

30. The electronic apparatus of claim 16, further comprising:

a sixth sound generating module at a sixth region between the fourth region and the fifth region;

a seventh sound generating module at a seventh region under the first region;

an eighth sound generating module at an eighth region under the second region;

a ninth sound generating module at a ninth region between the seventh region and the eighth region;

a tenth sound generating module at a tenth region between the first region and the third region; and an eleventh sound generating module at an eleventh region between the second region and the third region.

31. The electronic apparatus of claim 30, wherein one or more sound generating modules of the sixth to eleventh sound generating modules comprise the vibration device, the supporting frame, and the connection member.

32. The electronic apparatus of claim 30, further comprising one or more woofers under at least one of the seventh region and the eighth region.

33. The electronic apparatus of claim 30, wherein one or more of the seventh sound generating module and the eighth sound generating module, one or more of the first sound generating module and the second sound generating module, or one or more of the tenth sound generating module and the eleventh sound generating module comprise a sound generating module including a woofer.

34. The electronic apparatus of claim 30, wherein one or more of the fourth to ninth sound generating modules comprise a sound generating module including a piezoelectric composite or a piezoelectric material.

35. The electronic apparatus of claim 30, wherein one or more of the first to eleventh sound generating modules comprise a sound generating module including a piezoelectric composite or a piezoelectric material, a sound generating module including a voice coil, or a sound generating module including a woofer.

36. The electronic apparatus of claim 30, further comprising:

a twelfth sound generating module at a twelfth region between the fourth region and the fifth region;

a thirteenth sound generating module at a thirteenth region between the fifth region and the sixth region;

a fourteenth sound generating module at a fourteenth region between the seventh region and the ninth region; and a fifteenth sound generating module at a fifteenth region between the eighth region and the ninth region.

37. The electronic apparatus of claim 36, wherein one or more of the twelfth to fifteenth sound generating modules comprise the vibration device, the supporting frame, and the connection member.

38. The electronic apparatus of claim 36, further comprising one or more woofers under one of the seventh region and the eighth region.

39. The electronic apparatus of claim 36, wherein one or more of the seventh sound generating module and the eighth sound generating module, one or more of the first sound generating module and the second sound generating module, one or more of the tenth sound generating module and the eleventh sound generating module or one or more of the fourteenth sound generating module and the fifteenth sound generating module comprise a sound generating module including a woofer.

40. The electronic apparatus of claim 36, wherein one or more of the fourth to sixth sound generating modules, the twelfth sound generating module, and the thirteenth sound generating module comprise a sound generating module including a piezoelectric composite or a piezoelectric material.

41. The electronic apparatus of claim 36, wherein one or more of the fourth to ninth sound generating modules and the twelfth to fifteenth sound generating modules comprise a sound generating module including a piezoelectric composite or a piezoelectric material.

42. The electronic apparatus of claim 36, wherein one or more of the first to fifteenth sound generating modules comprise a sound generating module including a piezoelectric composite or a piezoelectric material, a sound generating module including a voice coil, or a sound generating module including a woofer.

43. The electronic apparatus of claim 36, further comprising:

a rear cover at the rear surface of the plate;

a partition disposed between the plate and the rear cover and configured to surround the first to fifteenth sound generating modules.

44. The electronic apparatus of claim 43, wherein the supporting frame is configured to receive one or more vibration devices of one or more of first to fifteenth sound generating modules and the partition.

45. The electronic apparatus of claim 43, wherein the partition, the supporting frame and one or more of first to fifteenth sound generating modules are modularized as one element.

46. The electronic apparatus of claim 36, further comprising;

a rear cover at the rear surface of the plate; and a partition disposed between the plate and the rear cover, wherein the partition is configured to surround one or more of the first to fifteenth sound modules.

47. The electronic apparatus of claim 46, wherein the partition is at a position close to one side of the one or more of the first to fifteenth sound generating modules.

48. The electronic apparatus of claim 46, wherein the partition, the supporting frame and the one or more of first to fifteenth sound generating modules are modularized as one element.

* * * * *